US012522582B2

(12) United States Patent
Cho et al.

(10) Patent No.: US 12,522,582 B2
(45) Date of Patent: Jan. 13, 2026

(54) ANTIVIRAL INDOLINYL COMPOUNDS AND USES THEREOF

(71) Applicant: Gilead Sciences, Inc., Foster City, CA (US)

(72) Inventors: Aesop Cho, Mountain View, CA (US); Katherine De La Fuente, Mountain View, CA (US); Thomas P. Stratton, San Francisco, CA (US); Peiyuan Wang, San Mateo, CA (US); William J. Watkins, Saratoga, CA (US); Jie Xu, Foster City, CA (US); Kin S. Yang, Foster City, CA (US)

(73) Assignee: Gilead Sciences, Inc., Foster City, CA (US)

( * ) Notice: Subject to any disclaimer, the term of this patent is extended or adjusted under 35 U.S.C. 154(b) by 420 days.

(21) Appl. No.: 18/319,846

(22) Filed: May 18, 2023

(65) Prior Publication Data

US 2024/0101529 A1    Mar. 28, 2024

Related U.S. Application Data

(60) Provisional application No. 63/344,487, filed on May 20, 2022.

(51) Int. Cl.
| | | |
|---|---|---|
| *C07D 401/10* | (2006.01) | |
| *A61P 31/22* | (2006.01) | |
| *C07D 209/08* | (2006.01) | |
| *C07D 403/10* | (2006.01) | |
| *C07D 405/06* | (2006.01) | |
| *C07D 405/14* | (2006.01) | |
| *C07D 413/10* | (2006.01) | |
| *C07D 417/10* | (2006.01) | |

(52) U.S. Cl.
CPC .......... *C07D 401/10* (2013.01); *A61P 31/22* (2018.01); *C07D 209/08* (2013.01); *C07D 403/10* (2013.01); *C07D 405/06* (2013.01); *C07D 405/14* (2013.01); *C07D 413/10* (2013.01); *C07D 417/10* (2013.01)

(58) Field of Classification Search
CPC .. C07D 209/08; C07D 403/10; C07D 504/06; C07D 405/14; C07D 413/10; C07D 417/10; A61P 31/122
See application file for complete search history.

(56) References Cited

U.S. PATENT DOCUMENTS

| 7,105,553 B2 | 9/2006 | Fischer et al. |
| 2002/0119995 A1 | 8/2002 | Hendrix et al. |
| 2019/0375744 A1 | 12/2019 | He et al. |

FOREIGN PATENT DOCUMENTS

| WO | WO-2000076966 A2 | 12/2000 |
| WO | WO-2014070976 A1 | 5/2014 |
| WO | WO-2018127207 A1 | 7/2018 |
| WO | WO-2020007355 A1 | 1/2020 |
| WO | WO-2021126804 A1 | 6/2021 |

OTHER PUBLICATIONS

Hou et al. (2022) "Pharmacokinetics and Safety Study of HN0037, a Novel Anti-Human Herpes Simplex Virus Inhibitor, in Healthy Volunteers" Clin Pharmacol Drug Dev 11(12):1467-1473.
Intl. Search Report-Written Opinion dated Aug. 2, 2023 for Intl. Appl. No. PCT/US2023/022679.
Kleymann, G. (2004) "Discovery, SAR and Medicinal Chemistry of Herpesvirus Helicase Primase Inhibitors" Curr Med Chem-Anti-Infective Agents, 3, 69-83.
Sadowski et al. (2021) "Current Drugs to Treat Infections with Herpes Simplex Viruses-1 and -2" Viruses 13(7):1228.
Shiraki et al. (2021) "Amenamevir, a Helicase-Primase Inhibitor, for the Optimal Treatment of Herpes Zoster" Viruses 13(8):1547.

*Primary Examiner* — Rebecca L Anderson
(74) *Attorney, Agent, or Firm* — Barnes & Thornburg LLP

(57) ABSTRACT

The present disclosure relates to indolinyl compounds. The present disclosure further relates to compounds that inhibit viral helicase-primase. The present disclosure further relates to the use of the compounds for the preparation a medicament for the treatment of diseases and/or condition through inhibiting viral helicase-primase. The present disclosure also relates to use of those compounds in the treatment of viral infections. The present disclosure further relates to intermediates for its preparation and to pharmaceutical compositions containing those compounds.

37 Claims, No Drawings

Specification includes a Sequence Listing.

SEQUENCE LISTING

```
Sequence total quantity: 3
SEQ ID NO: 1           moltype = DNA  length = 22
FEATURE                Location/Qualifiers
source                 1..22
                       mol_type = other DNA
                       organism = synthetic construct
SEQUENCE: 1
agagggacat ccaggacttt gt                                              22

SEQ ID NO: 2           moltype = DNA  length = 19
FEATURE                Location/Qualifiers
source                 1..19
                       mol_type = other DNA
                       organism = synthetic construct
SEQUENCE: 2
caggcgcttg ttggtgtac                                                  19

SEQ ID NO: 3           moltype = DNA  length = 16
FEATURE                Location/Qualifiers
source                 1..16
                       mol_type = other DNA
                       organism = synthetic construct
SEQUENCE: 3
accgccgaac tgagca                                                     16
```

ANTIVIRAL INDOLINYL COMPOUNDS AND USES THEREOF

CROSS REFERENCE TO RELATED APPLICATIONS

This application claims priority to U.S. Provisional Application No. 63/344,487, filed May 20, 2022, which is incorporated herein in its entireties for all purposes.

SEQUENCE LISTING

The instant application contains a Sequence Listing which has been submitted electronically in .XML file format and is hereby incorporated by reference in its entirety. Said .XML copy, created on Apr. 10, 2023, is named 1422-US-NP.xml and is 3,466 bytes in size.

FIELD

The present disclosure relates to indolinyl compounds. The present disclosure also relates to use of those compounds in the treatment of viral infections. The present disclosure further relates to intermediates for its preparation and to pharmaceutical compositions containing those compounds.

BACKGROUND

Herpesviruses have a very high global prevalence and disease burden. Herpesvirues include herpes simplex virus 1 (HSV-1), herpes simplex virus 2 (HSV-2), varicella-zoster virus, Epstein-Barr virus, and cytomegalovirus. HSV-1 and HSV-2 are contagious human pathogens. HSV-1 is mainly transmitted by oral-to-oral contact to cause oral herpes, while HSV-2 is a sexually transmitted infection that causes genital herpes. These infections are lifelong and characterized by periodic re-activation and viral shedding, which can cause symptoms such as painful blisters or ulcers and transmissions to others. Currently available medications to treat these infections are largely based on nucleoside analogs such as acyclovir, famciclovir, and valacyclovir. Although effective at reducing severity and frequency of the symptoms, these compounds do not eliminate viral shedding and thus a risk of transmission. In addition, dosing regimens are complex and inconvenient.

Herpesvirus encodes its own helicase and primase for synthesis of viral DNA. The helicase-primase complex performs a key role in viral DNA replication. The helicase separates the viral DNA double helix, and the primase synthesizes RNA primers on the single-stranded DNA which initiates DNA synthesis directed by the DNA polymerase (Kleymann G. 2004).

There is a need for new agents that are more effective and safer with improved pharmacokinetics. Inhibition of viral helicase-primase interferes with viral replication and thus could lead to the development of drugs with desirable selectivity, potency, metabolic stability, or reduced detrimental effects.

SUMMARY

The present disclosure relates to indolinyl compounds. The present disclosure also relates to compounds that inhibit viral helicase-primase. The present disclosure further relates to use of the compounds for the treatment and/or prevention of diseases and/or conditions.

In one embodiment, provided herein is a compound of Formula (I),

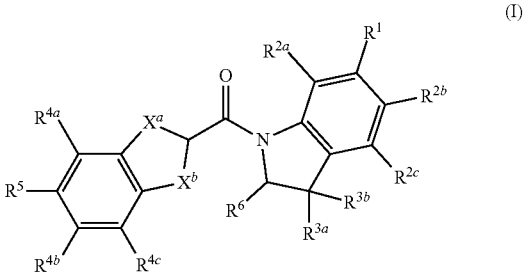

or a pharmaceutically acceptable salt thereof, wherein $R^1$ is

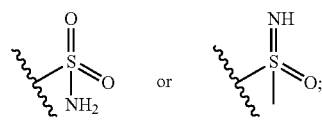

$R^{2a}$, $R^{2b}$, and $R^{2c}$ are each independently H, halogen, $C_{1-6}$ alkyl, $C_{1-6}$ haloalkyl, $C_{1-6}$ alkoxy, —CN, $C_{1-6}$ haloalkoxy, or —$SCF_3$;

$R^{3a}$ and $R^{3b}$ are each independently H, halogen, $C_{1-6}$ alkyl, or $C_{1-6}$ haloalkyl;

or $R^{3a}$ and $R^{3b}$ together with the carbon to which they are attached form $C_{3-6}$ cycloalkyl; wherein the cycloalkyl formed from $R^{3a}$ and $R^{3b}$ may be optionally substituted with one to three $Z^3$, which may be the same or different;

$X^a$ and $X^b$ are each independently O or $CR^{7a}R^{7b}$;

$R^{7a}$ and $R^{7b}$ are each independently H, $C_{1-6}$ alkyl, or $C_{1-6}$ haloalkyl;

or $R^{7a}$ and $R^{7b}$ together with the carbon to which they are attached form $C_{3-6}$ cycloalkyl; wherein the $C_{3-6}$ cycloalkyl formed from $R^{7a}$ and $R^{7b}$ may be optionally substituted with one to three $Z^7$, which may be the same or different;

$R^{4a}$, $R^{4b}$, and $R^{4c}$ are each independently H, halogen, $C_{1-6}$ alkyl, $C_{1-6}$ haloalkyl, $C_{1-6}$ alkoxy, —CN, —$SCF_3$, or $C_{3-6}$ cycloalkyl optionally substituted with $Z^4$;

$R^5$ is $C_{6-10}$ aryl or heteroaryl; wherein the aryl or heteroaryl of $R^5$ may be optionally substituted with one to three $Z^5$, which may be the same or different; the heteroaryl of $R^5$ is 5 to 10 membered heteroaryl having one to three heteroatoms each independently N, O, or S;

$R^6$ is H, $C_{1-6}$ alkyl, $C_{1-6}$ haloalkyl, $C_{2-8}$ alkoxyalkyl, or $C_{3-6}$ cycloalkyl, wherein the cycloalkyl of $R^6$ is optionally substituted with one to three $Z^6$; and each $Z^3$, $Z^4$, $Z^5$, $Z^6$, and $Z^7$ is independently halogen, —CN, $C_{1-6}$ alkyl, $C_{1-6}$ haloalkyl, $C_{1-6}$ alkoxy, or $C_{1-6}$ haloalkoxy.

In some embodiments, provided herein are pharmaceutical compositions comprising a compound provided herein, or pharmaceutically acceptable salt thereof, and a pharmaceutically acceptable excipient or carrier. In some embodiments, the pharmaceutical compositions comprise a therapeutically effective amount of a compound provided herein, or pharmaceutically acceptable salt thereof, and a pharmaceutically acceptable excipient or carrier.

In some embodiments, the pharmaceutical compositions provided herein further comprise one or more (e.g., one, two, three, four, one or two, one to three, or one to four) additional therapeutic agents, or pharmaceutically acceptable salts thereof. In some embodiments, the pharmaceutical compositions further comprise a therapeutically effective amount of the one or more (e.g., one, two, three, four, one or two, one to three, or one to four) additional therapeutic agents, or pharmaceutically acceptable salts thereof.

In some embodiments, the present disclosure provides methods of inhibiting the helicase-primase of herpesviruses in a subject in need thereof, comprising administering to the subject a therapeutically effective amount of a compound provided herein (e.g., a compound of Formula (I), (IIa), (IIb), (IIc), (IId), (IIe), or (IIf)), or pharmaceutically acceptable salt thereof, or a pharmaceutical composition provided herein.

In some embodiments, the present disclosure provides methods of treating a patient having a herpesvirus mediated condition, comprising administering to the patient a therapeutically effective amount of a compound provided herein (e.g., a compound of Formula (I), (IIa), (IIb), (IIc), (IId), (IIe), or (IIf)), or pharmaceutically acceptable salt thereof, or a pharmaceutical composition provided herein.

DETAILED DESCRIPTION

The present disclosure relates to compounds that inhibit the helicase primase of herpesviruses. In one embodiment, the present disclosure relates to indolinyl compounds. The present disclosure further relates to use of the compounds for the treatment and/or prevention of diseases and/or conditions by said compounds. The disclosure also relates to compositions and methods of treating and/or preventing viral infections that include an inhibitor of herpesvirus helicase primase in combination with one or more additional therapeutic agents.

Patients infected with herpesviruses can benefit from the treatment with an inhibitor of herpesvirus helicase primase and optionally one or more additional therapeutic agents.

Definitions and General Parameters

The description below is made with the understanding that the present disclosure is to be considered as an exemplification of the claimed subject matter and is not intended to limit the appended claims to the specific embodiments illustrated. The headings used throughout this disclosure are provided for convenience and are not to be construed to limit the claims in any way. Embodiments illustrated under any heading may be combined with embodiments illustrated under any other heading.

Unless defined otherwise, all technical and scientific terms used herein have the same meaning as commonly understood by one of ordinary skill in the art. It must be noted that as used herein and in the appended claims, the singular forms "a", "and", and "the" include plural referents unless the context clearly dictates otherwise. Thus, e.g., reference to "the compound" includes a plurality of such compounds and reference to "the assay" includes reference to one or more assays and equivalents thereof known to those skilled in the art, and so forth.

As used in the present specification, the following terms and phrases are generally intended to have the meanings as set forth below, except to the extent that the context in which they are used indicates otherwise.

A dash ("-") that is not between two letters or symbols is used to indicate a point of attachment for a substituent. For example, —CONH$_2$ is attached through the carbon atom. A dash at the front or end of a chemical group is a matter of convenience; chemical groups may be depicted with or without one or more dashes without losing their ordinary meaning. A wavy line drawn through a line in a structure indicates a point of attachment of a group. Unless chemically or structurally required, no directionality is indicated or implied by the order in which a chemical group is written or named. A solid line coming out of the center of a ring indicates that the point of attachment for a substituent on the ring can be at any ring atom. For example, Ra in the structure below can be attached to any of the five carbon ring atoms or Ra can replace the hydrogen attached to the nitrogen ring atom:

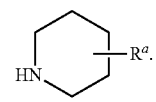

The prefix "C$_{u-v}$" indicates that the following group has from u to v carbon atoms. For example, "C$_{1-6}$ alkyl" indicates that the alkyl group has from 1 to 6 carbon atoms. Likewise, the term "x-y membered" rings, wherein x and y are numerical ranges, such as "3 to 12-membered heterocyclyl", refers to a ring containing x-y atoms (e.g., 3-12), of which up to 80% may be heteroatoms, such as N, O, S, P, and the remaining atoms are carbon.

Also, certain commonly used alternative chemical names may or may not be used. For example, a divalent group such as a divalent "alkyl" group, a divalent "aryl" group, etc., may also be referred to as an "alkylene" group or an "alkylenyl" group, or alkylyl group, an "arylene" group or an "arylenyl" group, or aryl group, respectively.

"A compound disclosed herein" or "a compound of the present disclosure" or "a compound provided herein" or "a compound described herein" refers to the compounds of Formula (I), (IIa), (IIb), (IIc), (IId), (IIe), or (IIf). Also included are the specific compounds provided herein.

Reference to "about" a value or parameter herein includes (and describes) embodiments that are directed to that value or parameter per se. In certain embodiments, the term "about" includes the indicated amount ±10%. In other embodiments, the term "about" includes the indicated amount ±5%. In certain other embodiments, the term "about" includes the indicated amount ±1%. Also, the term "about X" includes description of "X". Also, the singular forms "a" and "the" include plural references unless the context clearly dictates otherwise. Thus, e.g., reference to "the compound" includes a plurality of such compounds and reference to "the assay" includes reference to one or more assays and equivalents thereof known to those skilled in the art.

"Alkyl" refers to an unbranched or branched saturated hydrocarbon chain. As used herein, alkyl has 1 to 20 carbon atoms (i.e., C$_{1-20}$ alkyl), 1 to 8 carbon atoms (i.e., C$_{1-8}$ alkyl), 1 to 6 carbon atoms (i.e., C$_{1-6}$ alkyl), 1 to 4 carbon atoms (i.e., C$_{1-4}$ alkyl), or 1 to 3 carbon atoms (i.e., C$_{1-3}$ alkyl). Examples of alkyl groups include methyl, ethyl, propyl, isopropyl, n-butyl, sec-butyl, iso-butyl, tert-butyl, pentyl, 2-pentyl, isopentyl, neopentyl, hexyl, 2-hexyl, 3-hexyl, and 3-methylpentyl. When an alkyl residue having a specific number of carbons is named by chemical name or identified by molecular formula, all positional isomers having that number of carbons may be encompassed; thus, for example, "butyl" includes n-butyl (i.e., —$(CH_2)_3CH_3$), sec-butyl (i.e., —$CH(CH_3)CH_2CH_3$), isobutyl (i.e., —$CH_2CH(CH_3)_2$) and tert-butyl (i.e., —$C(CH_3)_3$); and "propyl" includes n-propyl (i.e., —$(CH_2)_2CH_3$) and isopropyl (i.e., —$CH(CH_3)_2$).

"Alkenyl" refers to an aliphatic group containing at least one carbon-carbon double bond and having from 2 to 20 carbon atoms (i.e., $C_{2-20}$ alkenyl), 2 to 8 carbon atoms (i.e., $C_{2-8}$ alkenyl), 2 to 6 carbon atoms (i.e., $C_{2-6}$ alkenyl), or 2 to 4 carbon atoms (i.e., $C_{2-4}$ alkenyl). Examples of alkenyl groups include ethenyl, propenyl, butadienyl (including 1,2-butadienyl and 1,3-butadienyl).

"Alkynyl" refers to an aliphatic group containing at least one carbon-carbon triple bond and having from 2 to 20 carbon atoms (i.e., $C_{2-20}$ alkynyl), 2 to 8 carbon atoms (i.e., $C_{2-8}$ alkynyl), 2 to 6 carbon atoms (i.e., $C_{2-6}$ alkynyl), or 2 to 4 carbon atoms (i.e., $C_{2-4}$ alkynyl). The term "alkynyl" also includes those groups having one triple bond and one double bond.

"Acyl" refers to a group —C(=O)R, wherein R is hydrogen, alkyl, cycloalkyl, heterocyclyl, aryl, heteroalkyl, or heteroaryl; each of which may be optionally substituted, as defined herein. Examples of acyl include formyl, acetyl, cylcohexylcarbonyl, cyclohexylmethyl-carbonyl, and benzoyl.

"Alkoxy" refers to an alkyl group having an oxygen atom that connects the alkyl group to the point of attachment: alkyl-O—. As for alkyl group, alkoxy groups will have any suitable number of carbon atoms, such as $C_{1-6}$. Alkoxy groups include, for example, methoxy, ethoxy, propoxy, isopropoxy, butoxy, 2butoxy, isobutoxy, secbutoxy, tertbutoxy, pentoxy, hexoxy, etc. The alkoxy groups can be further substituted with a variety of substituents described within. Alkoxy groups can be substituted or unsubstituted.

"Alkoxyalkyl" refers an alkoxy group linked to an alkyl group which is linked to the remainder of the compound. Alkoxyalkyl has any suitable number of carbon atoms, such as from 2 to 6 ($C_{2-6}$ alkoxyalkyl), 2 to 5 ($C_{2-5}$ alkoxyalkyl), 2 to 4 ($C_{2-4}$ alkoxyalkyl), or 2 to 3 ($C_{2-3}$ alkoxyalkyl). The number of carbons refers to the total number of carbons in the alkoxy and the alkyl group. For example, in some embodiments, $C_6$ alkoxyalkyl refers to ethoxy ($C_2$ alkoxy) linked to a butyl ($C_4$ alkyl), and in other embodiments, n-propoxy ($C_3$ alkoxy) linked to isopropyl ($C_3$ alkyl). Alkoxy and alkyl are as defined above where the alkyl is divalent, and can include, but is not limited to, methoxymethyl ($CH_3OCH_2$), methoxyethyl ($CH_3OCH_2CH_2$) and others.

"Amino" refers to the group $NR^yR^z$ wherein $R^y$ and $R^z$ are independently selected from the group consisting of hydrogen, alkyl, haloalkyl, aryl, heteroaryl, cycloalkyl, or heterocyclyl; each of which may be optionally substituted.

"Aryl" as used herein refers to a single all carbon aromatic ring or a multicyclic all carbon ring system wherein at least one of the rings is aromatic. For example, in some embodiments, an aryl group has 6 to 20 carbon atoms, 6 to 14 carbon atoms, or 6 to 12 carbon atoms. Aryl includes a phenyl radical. Aryl also includes multicyclic ring systems (e.g., ring systems comprising 2, 3 or 4 rings) having 9 to 20 carbon atoms, e.g., 9 to 16 carbon atoms, in which at least one ring is aromatic and wherein the other rings may be aromatic or not aromatic (i.e., carbocycle). Such multicyclic ring systems are optionally substituted with one or more (e.g., 1, 2 or 3) oxo groups on any carbocycle portion of the multicyclic ring system. The rings of the multicyclic ring system can be connected to each other via fused, spiro and bridged bonds when allowed by valency requirements. It is also to be understood that when reference is made to a certain atom-range membered aryl (e.g., 6-10 membered aryl), the atom range is for the total ring atoms of the aryl. For example, a 6-membered aryl would include phenyl and a 10-membered aryl would include naphthyl and 1,2,3,4-tetrahydronaphthyl. Non-limiting examples of aryl groups include, but are not limited to, phenyl, indenyl, naphthyl, 1,2,3,4-tetrahydronaphthyl, anthracenyl, and the like.

"Cyano" or "carbonitrile" refers to the group CN.

"Cycloalkyl" refers to a saturated or partially saturated cyclic alkyl group having a single ring or multiple rings including fused, bridged, and spiro ring systems. The term "cycloalkyl" includes cycloalkenyl groups (i.e., the cyclic group having at least one double bond). As used herein, cycloalkyl has from 3 to 20 ring carbon atoms (i.e., $C_{3-20}$ cycloalkyl), 3 to 12 ring carbon atoms (i.e., $C_{3-12}$ cycloalkyl), 3 to 10 ring carbon atoms (i.e., $C_{3-10}$ cycloalkyl), 3 to 8 ring carbon atoms (i.e., $C_{3-8}$ cycloalkyl), or 3 to 6 ring carbon atoms (i.e., $C_{3-6}$ cycloalkyl). Examples of cycloalkyl groups include cyclopropyl, cyclobutyl, cyclopentyl, and cyclohexyl.

"Fused" refers to a ring which is bound to an adjacent ring. In some embodiments the fused ring system is a heterocyclyl. In some embodiments the fused ring system is a oxabicyclohexanyl. In some embodiments the fused ring system is

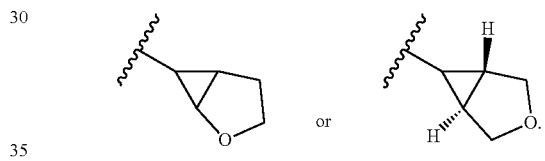

"Bridged" refers to a ring fusion wherein non-adjacent atoms on a ring are joined by a divalent substituent, such as alkylenyl group, an alkylenyl group containing one or two heteroatoms, or a single heteroatom. Quinuclidinyl and admantanyl are examples of bridged ring systems. In some embodiments the bridged ring is a bicyclopentyl (e.g., bicyclo[1.1.1]pentyl), bicycloheptyl (e.g., bicyclo[2.2.1]heptyl, bicyclo[3.1.1]heptyl), or bicyclooctyl (e.g., bicyclo[2.2.2]octyl). In some embodiments, the bridged ring

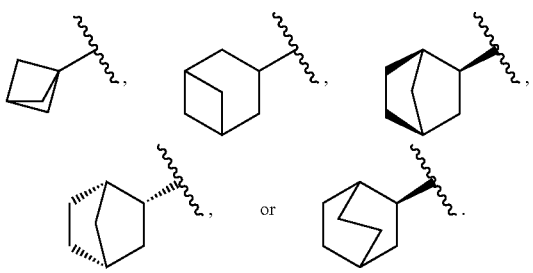

"Spiro" refers to a ring substituent which is joined by two bonds at the same carbon atom. Examples of spiro groups include 1,1-diethylcyclopentane, dimethyl-dioxolane, and 4-benzyl-4-methylpiperidine, wherein the cyclopentane and piperidine, respectively, are the spiro substituents. In some embodiments the spiro substituent is a spiropentanyl (spiro[a.b]pentanyl), spirohexanyl, spiroheptanyl, spirooctyl (e.g., spiro[2.5]octyl), spirononanyl (e.g., spiro[3.5]nonanyl), spirodecanyl (e.g., spiro[4.5]decanyl), or spiroundecanyl (e.g., spiro[5.5]undecanyl). In some embodiments the spiro substituent is

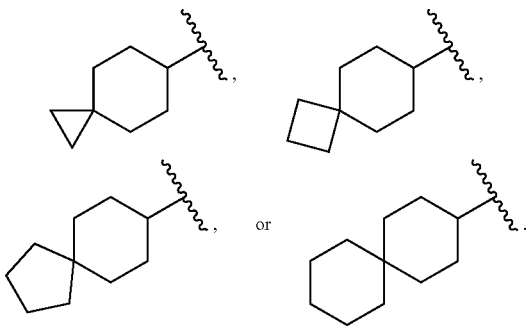

"Halogen" or "halo" includes fluoro, chloro, bromo, and iodo.

"Haloalkyl" as used herein refers to an alkyl as defined herein, wherein one or more hydrogen atoms of the alkyl are independently replaced by a halo substituent, which may be the same or different. For example, $C_{1-4}$ haloalkyl is a $C_{1-4}$ alkyl wherein one or more of the hydrogen atoms of the $C_{1-4}$ alkyl have been replaced by a halo substituent. Examples of haloalkyl groups include but are not limited to fluoromethyl, fluorochloromethyl, difluoromethyl, difluorochloromethyl, trifluoromethyl, 1,1,1-trifluoroethyl and pentafluoroethyl.

"Haloalkoxy" refers to an alkoxy group where some or all of the hydrogen atoms are substituted with halogen atoms. As for an alkyl group, haloalkoxy groups can have any suitable number of carbon atoms, such as $C_{1-6}$. The alkoxy groups can be substituted with 1, 2, 3, or more halogens. When all the hydrogens are replaced with a halogen, for example by fluorine, the compounds are persubstituted, for example, perfluorinated. Haloalkoxy includes, but is not limited to, trifluoromethoxy, 2,2,2, trifluoroethoxy, perfluoroethoxy, etc.

The term "heteroaryl" as used herein refers to a single aromatic ring or a multicyclic ring. The term includes single aromatic rings of from about 1 to 6 carbon atoms and about 1-4 heteroatoms selected from the group consisting of oxygen, nitrogen and sulfur in the rings. The sulfur and nitrogen atoms may also be present in an oxidized form provided the ring is aromatic. Such rings include but are not limited to pyridyl, pyrimidinyl, oxazolyl or furyl. The term also includes multicyclic ring systems (e.g., ring systems comprising 2 or 3 rings) wherein a heteroaryl group, as defined above, can be fused with one or more heteroaryls (e.g. naphthyridinyl), carbocycles (e.g., 5,6,7,8-tetrahydroquinolyl) or aryls (e.g., indazolyl) to form a multicyclic ring. Such multicyclic rings may be optionally substituted with one or more (e.g., 1, 2 or 3) oxo groups on the carbocycle portions of the multicyclic ring. It is to be understood that the point of attachment of a heteroaryl multicyclic ring, as defined above, can be at any position of the ring including a heteroaryl, aryl or a carbocycle portion of the ring. Exemplary heteroaryls include but are not limited to pyridyl, pyrrolyl, pyrazinyl, pyrimidinyl, pyridazinyl, pyrazolyl, thienyl, indolyl, imidazolyl, oxazolyl, thiazolyl, furyl, oxadiazolyl, thiadiazolyl, quinolyl, isoquinolyl, benzothiazolyl, benzoxazolyl, indazolyl, quinoxalyl, quinazolyl, 5,6,7,8-tetrahydroisoquinolinyl benzofuranyl, benzimidazolyl and thianaphthenyl.

"Heterocyclyl" or "heterocyclic ring" or "heterocycle" as used herein refers to a single saturated or partially unsaturated ring or a multicyclic ring. The term includes single saturated or partially unsaturated ring (e.g., 3, 4, 5, 6 or 7-membered ring) from about 1 to 6 carbon atoms and from about 1 to 3 heteroatoms selected from the group consisting of oxygen, nitrogen and sulfur in the ring. The ring may be substituted with one or more (e.g., 1, 2 or 3) oxo groups and the sulfur and nitrogen atoms may also be present in their oxidized forms. Such rings include but are not limited to azetidinyl, tetrahydrofuranyl or piperidinyl. The term also includes multicyclic ring systems (e.g., ring systems comprising 2 or 3 rings) wherein a heterocycle group (as defined above) can be connected to two adjacent atoms (fused heterocycle) with one or more heterocycles (e.g., decahydronapthyridinyl), heteroaryls (e.g., 1,2,3,4-tetrahydronaphthyridinyl), carbocycles (e.g., decahydroquinolyl) or aryls. It is to be understood that the point of attachment of a heterocycle multicyclic ring, as defined above, can be at any position of the ring including a heterocyle, heteroaryl, aryl or a carbocycle portion of the ring. Exemplary heterocycles include, but are not limited to aziridinyl, azetidinyl, pyrrolidinyl, piperidinyl, homopiperidinyl, morpholinyl, thiomorpholinyl, piperazinyl, tetrahydrofuranyl, dihydrooxazolyl, tetrahydropyranyl, tetrahydrothiopyranyl, 1,2,3,4-tetrahydroquinolyl, benzoxazinyl, dihydrooxazolyl, chromanyl, 1,2-dihydropyridinyl, 2,3-dihydrobenzofuranyl, 1,3-benzodioxolyl and 1,4-benzodioxanyl. Exemplary fused bicyclic heterocycles include, but are not limited to

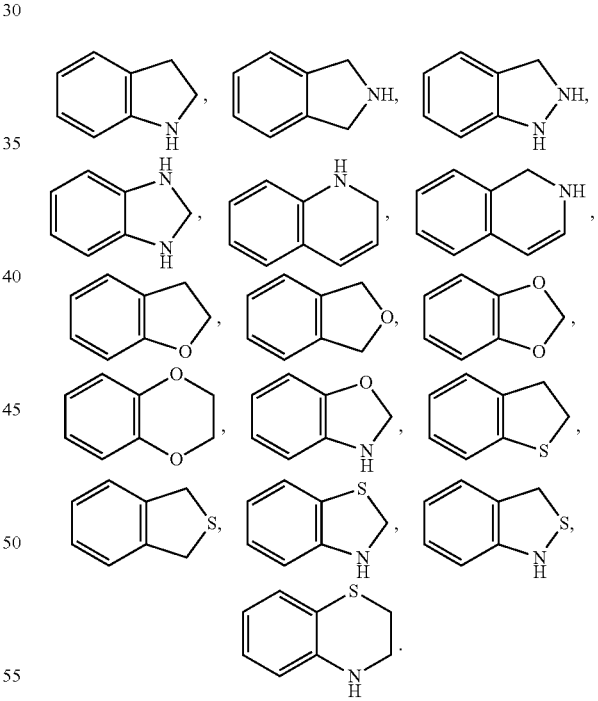

"Hydroxy" or "hydroxyl" refers to the group OH.

"Oxo" refers to the group (=O) or (O).

"Sulfonyl" refers to the group $S(O)_2R^c$, where $R^c$ is alkyl, heterocyclyl, cycloalkyl, heteroaryl, or aryl. Examples of sulfonyl are methylsulfonyl, ethylsulfonyl, phenylsulfonyl, and toluenesulfonyl.

Whenever the graphical representation of a group terminates in a singly bonded nitrogen atom, that group represents an —$NH_2$ group unless otherwise indicated. Similarly, unless otherwise expressed, hydrogen atom(s) are implied and deemed present where necessary in view of the knowledge of one of skill in the art to complete valency or provide stability.

The terms "optional" or "optionally" mean that the subsequently described event or circumstance may or may not occur, and that the description includes instances where said event or circumstance occurs and instances in which it does not. Also, the term "optionally substituted" means that any one or more hydrogen atoms on the designated atom or group may or may not be replaced by a moiety other than hydrogen.

The term "substituted" means that any one or more hydrogen atoms on the designated atom or group is replaced with one or more substituents other than hydrogen, provided that the designated atom's normal valence is not exceeded. The one or more substituents include, but are not limited to, alkyl, alkenyl, alkynyl, alkoxy, acyl, amino, amido, amidino, aryl, azido, carbamoyl, carboxyl, carboxyl ester, cyano, guanidino, halo, haloalkyl, heteroalkyl, heteroaryl, heterocyclyl, hydroxy, hydrazino, imino, oxo, nitro, alkylsulfinyl, sulfonic acid, alkylsulfonyl, thiocyanate, thiol, thione, or combinations thereof. Polymers or similar indefinite structures arrived at by defining substituents with further substituents appended ad infinitum (e.g., a substituted aryl having a substituted alkyl which is itself substituted with a substituted aryl group, which is further substituted by a substituted heteroalkyl group, etc.) are not intended for inclusion herein. Unless otherwise noted, the maximum number of serial substitutions in compounds described herein is three. For example, serial substitutions of substituted aryl groups with two other substituted aryl groups are limited to [(substituted aryl) substituted aryl] substituted aryl. Similarly, the above definitions are not intended to include impermissible substitution patterns (e.g., methyl substituted with 5 fluorines or heteroaryl groups having two adjacent oxygen ring atoms). Such impermissible substitution patterns are well known to the skilled artisan. When used to modify a chemical group, the term "substituted" may describe other chemical groups defined herein. For example, the term "substituted aryl" includes, but is not limited to, "alkylaryl." Unless specified otherwise, where a group is described as optionally substituted, any substituents of the group are themselves unsubstituted.

In some embodiments, the term "substituted alkyl" refers to an alkyl group having one or more substituents including hydroxyl, halo, amino, alkoxy, cycloalkyl, heterocyclyl, aryl, and heteroaryl. In additional embodiments, "substituted cycloalkyl" refers to a cycloalkyl group having one or more substituents including alkyl, haloalkyl, cycloalkyl, heterocyclyl, aryl, heteroaryl, amino, alkoxy, halo, oxo, and hydroxyl; "substituted heterocyclyl" refers to a heterocyclyl group having one or more substituents including alkyl, amino, haloalkyl, heterocyclyl, cycloalkyl, aryl, heteroaryl, alkoxy, halo, oxo, and hydroxyl; "substituted aryl" refers to an aryl group having one or more substituents including halo, alkyl, amino, haloalkyl, cycloalkyl, heterocyclyl, heteroaryl, alkoxy, and cyano; "substituted heteroaryl" refers to an heteroaryl group having one or more substituents including halo, amino, alkyl, haloalkyl, cycloalkyl, aryl, heterocyclyl, heteroaryl, alkoxy, and cyano and "substituted sulfonyl" refers to a group —S(O)$_2$R, in which R is substituted with one or more substituents including alkyl, cycloalkyl, heterocyclyl, aryl, and heteroaryl. In other embodiments, the one or more substituents may be further substituted with halo, alkyl, haloalkyl, hydroxyl, alkoxy, cycloalkyl, heterocyclyl, aryl, or heteroaryl, each of which is substituted. In other embodiments, the substituents may be further substituted with halo, alkyl, haloalkyl, alkoxy, hydroxyl, cycloalkyl, heterocyclyl, aryl, or heteroaryl, each of which is unsubstituted.

In some embodiments, a substituted cycloalkyl, a substituted heterocyclyl, a substituted aryl, and/or a substituted heteroaryl includes a cycloalkyl, a heterocyclyl, an aryl, and/or a heteroaryl that has a substituent on the ring atom to which the cycloalkyl, heterocyclyl, aryl, and/or heteroaryl is attached to the rest of the compound. For example, in the moiety below, the cyclopropyl is substituted with a methyl group:

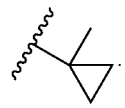

The disclosures illustratively described herein may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the disclosure claimed.

The compounds of the present disclosure can be in the form of a pharmaceutically acceptable salt. The term "pharmaceutically acceptable salts" refers to salts prepared from pharmaceutically acceptable non-toxic bases or acids, including inorganic bases or acids and organic bases or acids. In case the compounds of the present disclosure contain one or more acidic or basic groups, the disclosure also comprises their corresponding pharmaceutically or toxicologically acceptable salts or their pharmaceutically utilizable salts. Thus, the compounds of the present disclosure which contain acidic groups can be present on these groups and can be used according to the disclosure, for example, as alkali metal salts, alkaline earth metal salts or ammonium salts. More precise examples of such salts include sodium salts, potassium salts, calcium salts, magnesium salts or salts with ammonia or organic amines such as, for example, ethylamine, ethanolamine, triethanolamine, amino acids, or other bases known to persons skilled in the art. The compounds of the present disclosure which contain one or more basic groups, i.e., groups which can be protonated, can be present and can be used according to the disclosure in the form of their addition salts with inorganic or organic acids. Examples of suitable acids include hydrogen chloride, hydrogen bromide, phosphoric acid, sulfuric acid, nitric acid, methanesulfonic acid, p-toluenesulfonic acid, naphthalenedisulfonic acids, oxalic acid, acetic acid, tartaric acid, lactic acid, salicylic acid, benzoic acid, formic acid, propionic acid, pivalic acid, diethylacetic acid, malonic acid, succinic acid, pimelic acid, fumaric acid, maleic acid, malic acid, sulfaminic acid, phenylpropionic acid, gluconic acid, ascorbic acid, isonicotinic acid, citric acid, adipic acid, and other acids known to persons skilled in the art.

If the compounds of the present disclosure simultaneously contain acidic and basic groups in the molecule, the disclosure also includes, in addition to the salt forms mentioned, inner salts or betaines (zwitterions). The respective salts can be obtained by customary methods which are known to the person skilled in the art like, for example, by contacting these with an organic or inorganic acid or base in a solvent or dispersant, or by anion exchange or cation exchange with other salts.

The present disclosure also includes all salts of the compounds of the present disclosure which, owing to low physiological compatibility, are not directly suitable for use in pharmaceuticals but which can be used, for example, as intermediates for chemical reactions or for the preparation of pharmaceutically acceptable salts. Acids and bases useful for reaction with an underlying compound to form pharmaceutically acceptable salts (acid addition or base addition salts respectively) are known to one of skill in the art. Similarly, methods of preparing pharmaceutically acceptable salts from an underlying compound (upon disclosure) are known to one of skill in the art and are disclosed in for example, Berge, at al. Journal of Pharmaceutical Science, January 1977 vol. 66, No. 1, and other sources.

Furthermore, compounds disclosed herein may be subject to tautomerism. Where tautomerism, e.g., keto-enol tautomerism, of compounds or their prodrugs may occur, the individual forms, like, e.g., the keto and enol form, are each within the scope of the disclosure as well as their mixtures in any ratio. The same applies for stereoisomers, like, e.g., enantiomers, cis/trans isomers, diastereomers, conformers, and the like.

The term "protecting group" refers to a moiety of a compound that masks or alters the properties of a functional group or the properties of the compound as a whole. Chemical protecting groups and strategies for protection/deprotection are well known in the art (see e.g., Protective Groups in Organic Chemistry, Theodora W. Greene, John Wiley & Sons, Inc., New York, 1991). Protecting groups are often utilized to mask the reactivity of certain functional groups, to assist in the efficiency of desired chemical reactions, e.g., making and breaking chemical bonds in an ordered and planned fashion. The term "deprotecting" refers to removing the protecting group.

It will be appreciated by the skilled person that when lists of alternative substituents include members which, because of their valency requirements or other reasons, cannot be used to substitute a particular group, the list is intended to be read with the knowledge of the skilled person to include only those members of the list which are suitable for substituting the particular group.

Further the compounds of the present disclosure may be present in the form of solvates, such as those which include as solvate water, or pharmaceutically acceptable solvates, such as alcohols, in particular ethanol. A "solvate" is formed by the interaction of a solvent and a compound.

In certain embodiments, provided are optical isomers, racemates, or other mixtures thereof (e.g., scalemic mixtures) of the compounds described herein or a pharmaceutically acceptable salt or a mixture thereof. If desired, isomers can be separated by methods well known in the art, e.g., by liquid chromatography. In those situations, the single enantiomer or diastereomer, i.e., optically active form, can be obtained by asymmetric synthesis or by resolution. Resolution can be accomplished, for example, by conventional methods such as crystallization in the presence of a resolving agent, or chromatography, using for example, a chiral high-pressure liquid chromatography (HPLC) column.

A "stereoisomer" refers to a compound made up of the same atoms bonded by the same bonds but having different three-dimensional structures, which are not interchangeable. The present invention contemplates various stereoisomers and mixtures thereof and includes "enantiomers," which refers to two stereoisomers whose molecules are non-superimposable mirror images of one another. "Diastereomers" are stereoisomers that have at least two asymmetric atoms, but which are not mirror-images of each other. Unless otherwise indicated, the description is intended to include individual stereoisomers as well as mixtures. The methods for the determination of stereochemistry and the separation of stereoisomers are well-known in the art (see, e.g., Chapter 4 of Advanced Organic Chemistry, 4th ed., J. March, John Wiley and Sons, New York, 1992).

Compounds disclosed herein and their pharmaceutically acceptable salts may, in some embodiments, include an asymmetric center and may thus give rise to enantiomers, diastereomers, and other stereoisomeric forms that may be defined, in terms of absolute stereochemistry, as (R)- or (S)- or, as (D)- or (L) for amino acids. Some embodiments include all such possible isomers-, as well as their racemic, scalemic, and optically pure forms. Optically active (+) and (−), (R)- and (S)-, or (D)- and (L) isomers may be prepared using chiral synthons or chiral reagents, or resolved using conventional techniques, for example, chromatography and fractional crystallization. Conventional techniques for the preparation/isolation of individual enantiomers include chiral synthesis from a suitable optically pure precursor or resolution of the racemate (or the racemate of a salt or derivative) using, for example, chiral high-pressure liquid chromatography (HPLC). When the compounds described herein contain olefinic double bonds or other centers—of geometric asymmetry, and unless specified otherwise, it is intended that the compounds include both E and Z geometric isomers. Likewise, all tautomeric forms are also intended to be included. Where compounds are represented in their chiral form, it is understood that the embodiment encompasses, but is not limited to, the specific diastereomerically or enantiomerically enriched form. Where chirality is not specified but is present, it is understood that the embodiment is directed to either the specific diastereomerically or enantiomerically enriched form; or a racemic or scalemic mixture of such compound(s). As used herein, "scalemic mixture" is a mixture of stereoisomers at a ratio other than 1:1.

Compositions provided herein that include a compound described herein or pharmaceutically acceptable salts, isomer, or a mixture thereof may include racemic mixtures, or mixtures containing an enantiomeric excess of one enantiomer or single diastereomers or diastereomeric mixtures. All such isomeric forms of these compounds are expressly included herein the same as if each and every isomeric form were specifically and individually listed.

Any formula or structure given herein is also intended to represent unlabeled forms as well as isotopically labeled forms of the compounds. Isotopically labeled compounds have structures depicted by the formulas given herein except that one or more atoms are replaced by an atom having a selected atomic mass or mass number. Examples of isotopes that can be incorporated into compounds of the disclosure include isotopes of hydrogen, carbon, nitrogen, oxygen, phosphorus, fluorine, and chlorine, such as, but not limited to $^2$H (deuterium, D), $^3$H (tritium), $^{11}$C, $^{13}$C, $^{14}$C, $^{15}$N, $^{18}$F, $^{31}$P, $^{32}$P, $^{35}$S, $^{36}$Cl and $^{125}$I. Various isotopically labeled compounds of the present disclosure, for example those into which radioactive isotopes such as $^3$H, $^{13}$C and $^{14}$C are incorporated. Such isotopically labelled compounds may be useful in metabolic studies, reaction kinetic studies, detection, or imaging techniques, such as positron emission tomography (PET) or single-photon emission computed tomography (SPECT) including drug or substrate tissue distribution assays or in radioactive treatment of patients. Isotopically labeled compounds of this disclosure and prodrugs thereof can generally be prepared by carrying out the procedures disclosed in the schemes or in the examples and preparations described below by substituting a readily available isotopically labeled reagent for a non-isotopically labeled reagent.

The disclosure also includes "deuterated analogs" of compounds disclosed herein, in which from 1 to n hydrogens attached to a carbon atom is/are replaced by deuterium, in which n is the number of hydrogens in the molecule. Such compounds may exhibit increased resistance to metabolism and thus be useful for increasing the half-life of any compound of Formula (I) when administered to a mammal, e.g., a human. See, e.g., Foster, "Deuterium Isotope Effects in Studies of Drug Metabolism," Trends Pharmacol. Sci. 5(12): 524-527 (1984). Such compounds are synthesized by means well known in the art, for example by employing starting materials in which one or more hydrogens have been replaced by deuterium.

Deuterium labelled or substituted therapeutic compounds of the disclosure may have beneficial DMPK (drug metabolism and pharmacokinetics) properties, relating to distribution, metabolism and excretion (ADME). Substitution with heavier isotopes such as deuterium may afford certain therapeutic advantages resulting from greater metabolic stability, for example increased in vivo half-life, reduced dosage requirements and/or an improvement in therapeutic index. An $^{18}F$ labeled compound may be useful for PET or SPECT studies.

The concentration of such a heavier isotope, specifically deuterium, may be defined by an isotopic enrichment factor. In the compounds of this disclosure any atom not specifically designated as a particular isotope is meant to represent any stable isotope of that atom. Unless otherwise stated, when a position is designated specifically as "H" or "hydrogen", the position is understood to have hydrogen at its natural abundance isotopic composition. Accordingly, in the compounds of this disclosure any atom specifically designated as a deuterium (D) is meant to represent deuterium.

Furthermore, the present disclosure provides pharmaceutical compositions comprising a compound of the present disclosure, or a prodrug compound thereof, or a pharmaceutically acceptable salt or solvate thereof as active ingredient together with a pharmaceutically acceptable carrier.

"Pharmaceutical composition" means one or more active ingredients, and one or more inert ingredients that make up the carrier, as well as any product which results, directly or indirectly, from combination, complexation or aggregation of any two or more of the ingredients, or from dissociation of one or more of the ingredients, or from other types of reactions or interactions of one or more of the ingredients. Accordingly, the pharmaceutical compositions of the present disclosure can encompass any composition made by admixing at least one compound of the present disclosure and a pharmaceutically acceptable carrier.

As used herein, "pharmaceutically acceptable carrier" includes excipients or agents such as solvents, diluents, dispersion media, coatings, antibacterial and antifungal agents, isotonic and absorption delaying agents and the like that are not deleterious to the disclosed compound or use thereof. The use of such carriers and agents to prepare compositions of pharmaceutically active substances is well known in the art (see, e.g., Remington's Pharmaceutical Sciences, Mace Publishing Co., Philadelphia, PA 17th Ed. (1985); and Modem Pharmaceutics, Marcel Dekker, Inc. 3rd Ed. (G. S. Banker & C. T. Rhodes, Eds.).

"Treatment" or "treating" is an approach for obtaining beneficial or desired results including clinical results. Beneficial or desired clinical results may include one or more of the following: a) inhibiting the disease or condition (e.g., decreasing one or more symptoms resulting from the disease or condition, and/or diminishing the extent of the disease or condition); b) slowing or arresting the development of one or more clinical symptoms associated with the disease or condition (e.g., stabilizing the disease or condition, preventing or delaying the worsening or progression of the disease or condition, and/or preventing or delaying the spread (e.g., metastasis) of the disease or condition); and/or c) relieving the disease, that is, causing the regression of clinical symptoms (e.g., ameliorating the disease state, providing partial or total remission of the disease or condition, enhancing effect of another medication, delaying the progression of the disease, increasing the quality of life, and/or prolonging survival. In some embodiments, the term "treatment" or "treating" means administering a compound or pharmaceutically acceptable salt of Formula (I), (IIa), (IIb), (IIc), (IId), (IIe), or (IIf) for the purpose of: (i) delaying the onset of a disease, that is, causing the clinical symptoms of the disease not to develop or delaying the development thereof; (ii) inhibiting the disease, that is, arresting the development of clinical symptoms; and/or (iii) relieving the disease, that is, causing the regression of clinical symptoms or the severity thereof.

"Prevention" or "preventing" means any treatment of a disease or condition that causes the clinical symptoms of the disease or condition not to develop. Compounds may, in some embodiments, be administered to a subject (including a human) who is at risk or has a family history of the disease or condition.

"Subject" refers to an animal, such as a mammal (including a human), that has been or will be the object of treatment, observation or experiment. The methods described herein may be useful in human therapy and/or veterinary applications. In some embodiments, the subject is a mammal. In some embodiments, the subject is a human.

The term "therapeutically effective amount" or "effective amount" of a compound described herein or a pharmaceutically acceptable salt, tautomer, stereoisomer, mixture of stereoisomers, prodrug, or deuterated analog thereof means an amount sufficient to effect treatment when administered to a subject, to provide a therapeutic benefit such as amelioration of symptoms or slowing of disease progression. For example, a therapeutically effective amount may be an amount sufficient to decrease a symptom of a disease or condition responsive to herpesvirus helicase-primase inhibitor. The therapeutically effective amount may vary depending on the subject, and disease or condition being treated, the weight and age of the subject, the severity of the disease or condition, and the manner of administering, which can readily be determined by one or ordinary skill in the art.

Compounds

In one embodiment, the present disclosure provides a compound of Formula (I),

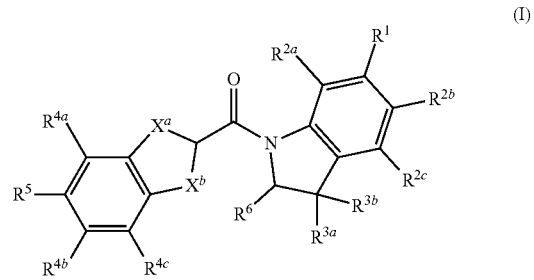

(I)

or a pharmaceutically acceptable salt thereof, wherein $R^1$ is

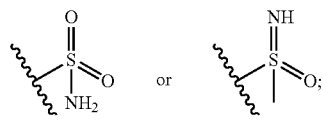

$R^{2a}$, $R^{2b}$, and $R^{2c}$ are each independently H, halogen, $C_{1-6}$ alkyl, $C_{1-6}$ haloalkyl, $C_{1-6}$ alkoxy, —CN, $C_{1-6}$ haloalkoxy, or —SCF$_3$;

$R^{3a}$ and $R^{3b}$ are each independently H, halogen, $C_{1-6}$ alkyl, or $C_{1-6}$ haloalkyl; or $R^{3a}$ and $R^{3b}$ together with the carbon to which they are attached form $C_{3-6}$ cycloalkyl; wherein the cycloalkyl formed from $R^{3a}$ and $R^{3b}$ may be optionally substituted with one to three $Z^3$, which may be the same or different;

$X^a$ and $X^b$ are each independently O or $CR^{7a}R^{7b}$;

$R^{7a}$ and $R^{7b}$ are each independently H, $C_{1-6}$ alkyl, or $C_{1-6}$ haloalkyl;

or $R^{7a}$ and $R^{7b}$ together with the carbon to which they are attached form $C_{3-6}$ cycloalkyl; wherein the $C_{3-6}$ cycloalkyl formed from $R^{7a}$ and $R^{7b}$ may be optionally substituted with one to three $Z^7$, which may be the same or different;

$R^{4a}$, $R^{4b}$, and $R^{4c}$ are each independently H, halogen, $C_{1-6}$ alkyl, $C_{1-6}$ haloalkyl, $C_{1-6}$ alkoxy, —CN, —SCF$_3$, or $C_{3-6}$ cycloalkyl optionally substituted with $Z^4$;

$R^5$ is $C_{6-10}$ aryl or heteroaryl; wherein the aryl or heteroaryl of $R^5$ may be optionally substituted with one to three $Z^5$, which may be the same or different; the heteroaryl of $R^5$ is 5 to 10 membered heteroaryl having one to three heteroatoms each independently N, O, or S;

$R^6$ is H, $C_{1-6}$ alkyl, $C_{1-6}$ haloalkyl, $C_{2-8}$ alkoxyalkyl, or $C_{3-6}$ cycloalkyl, wherein the cycloalkyl of $R^6$ is optionally substituted with one to three $Z^6$; and each $Z^3$, $Z^4$, $Z^5$, $Z^6$, and $Z^7$ is independently halogen, —CN, $C_{1-6}$ alkyl, $C_{1-6}$ haloalkyl, $C_{1-6}$ alkoxy, or $C_{1-6}$ haloalkoxy.

In some embodiments, the compound of formula (I) is a compound of Formula (IIa)

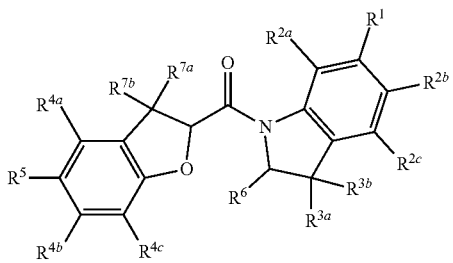

or a pharmaceutically acceptable salt thereof.

In some embodiments, the compound of formula (I) is a compound of Formula (IIb)

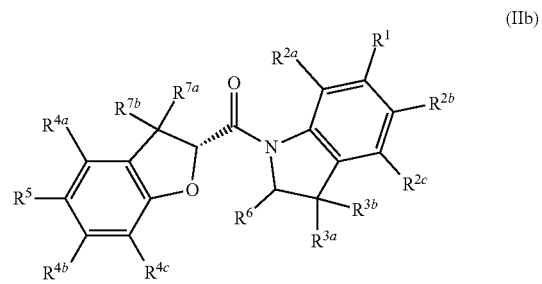

or a pharmaceutically acceptable salt thereof.

In some embodiments, the compound of formula (I) is a compound of Formula (IIc)

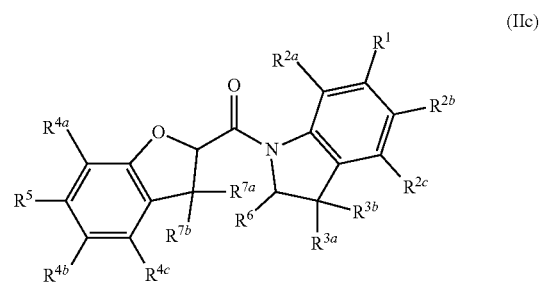

or a pharmaceutically acceptable salt thereof.

In some embodiments, the compound of formula (I) is a compound of Formula (IId)

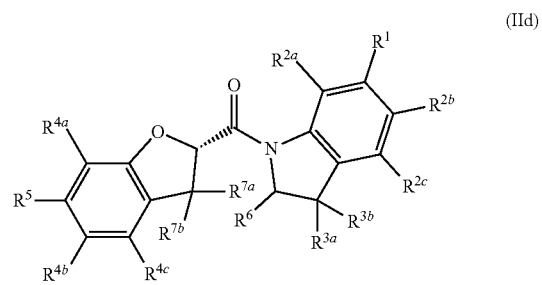

or a pharmaceutically acceptable salt thereof.

In some embodiments, the compound of formula (I) is a compound of Formula (IIe), or a pharmaceutically acceptable salt thereof

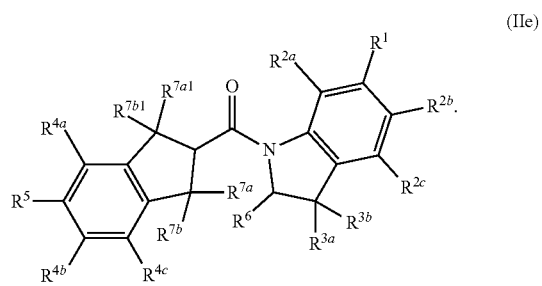

wherein $R^{7a1}$ and $R^{7b1}$ are each independently H, $C_{1-6}$ alkyl, or $C_{1-6}$ haloalkyl; or $R^{7a1}$ and $R^{7b1}$ together with the carbon to which they are attached form $C_{3-6}$ cycloalkyl; wherein the $C_{3-6}$ cycloalkyl formed from $R^{7a1}$ and $R^{7b1}$ may be optionally substituted with one to three $Z^7$, which may be the same or different.

In some embodiments, the compound of formula (I) is a compound of Formula (IIf), or a pharmaceutically acceptable salt thereof

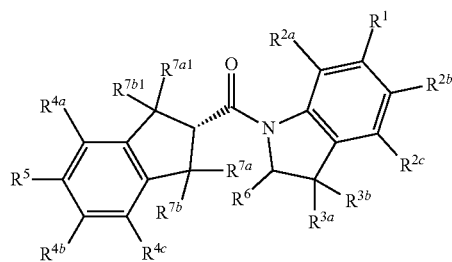

(IIf)

wherein $R^{7a1}$ and $R^{7b1}$ are each independently H, $C_{1-6}$ alkyl, or $C_{1-6}$ haloalkyl; or $R^{7a1}$ and $R^{7b1}$ together with the carbon to which they are attached form $C_{3-6}$ cycloalkyl; wherein the $C_{3-6}$ cycloalkyl formed from $R^{7a1}$ and $R^{7b1}$ may be optionally substituted with one to three $Z^7$, which may be the same or different.

In some embodiments, the compound is a compound of Formula (IIe) or Formula (IIf).

In some embodiments, the compound of Formula (I), (IIa), (IIb), (IIc), (IId), (IIe), or (IIf), or a pharmaceutically acceptable salt thereof, is the compound wherein

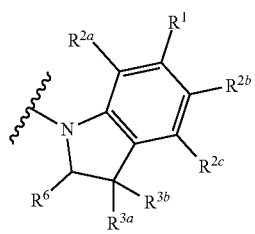

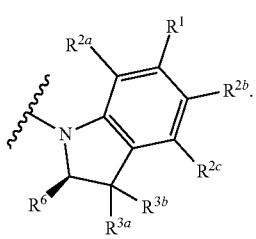

In some embodiments, the compound of Formula (I), (IIa), (IIb), (IIc), (IId), (IIe), or (IIf), or a pharmaceutically acceptable salt thereof, is the compound wherein $R^1$ is

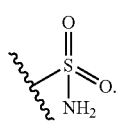

some embodiments, $R^1$ is

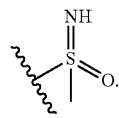

In some embodiments, the compound of Formula (I), (IIa), (IIb), (IIc), (IId), (IIe), or (IIf), or a pharmaceutically acceptable salt thereof, is the compound wherein $R^{2a}$ is H. In some embodiments, $R^{2a}$ is halogen or $C_{1-6}$ alkyl. In some embodiments, $R^{2a}$ is F, Cl, or Br. In some embodiments, $R^{2a}$ is F. In some embodiments, $R^{2a}$ is $C_{1-3}$ alkyl. In some embodiments, $R^{2a}$ is methyl.

In some embodiments, the compound of Formula (I), (IIa), (IIb), (IIc), (IId), (IIe), or (IIf), or a pharmaceutically acceptable salt thereof, is the compound wherein $R^{2b}$ is H. In some embodiments, $R^{2b}$ is halogen or $C_{1-6}$ alkyl. In some embodiments, $R^{2b}$ is F, Cl, or Br. In some embodiments, $R^{2b}$ is F. In some embodiments, $R^{2b}$ is $C_{1-3}$ alkyl. In some embodiments, $R^{2b}$ is methyl.

In some embodiments, the compound of Formula (I), (IIa), (IIb), (IIc), (IId), (IIe), or (IIf), or a pharmaceutically acceptable salt thereof, is the compound wherein $R^{2c}$ is H. In some embodiments, $R^{2c}$ is halogen or $C_{1-6}$ alkyl. In some embodiments, $R^{2c}$ is F, Cl, or Br. In some embodiments, $R^{2c}$ is F. In some embodiments, $R^{2c}$ is $C_{1-3}$ alkyl. In some embodiments, $R^{2c}$ is methyl.

In some embodiments, the compound of Formula (I), (IIa), (IIb), (IIc), (IId), (IIe), or (IIf), or a pharmaceutically acceptable salt thereof, is the compound wherein $R^{3a}$ is H. In some embodiments, $R^{3a}$ is $C_{1-6}$ alkyl. In some embodiments, $R^{3a}$ is $C_{1-3}$ alkyl. In some embodiments, $R^{3a}$ is methyl.

In some embodiments, the compound of Formula (I), (IIa), (IIb), (IIc), (IId), (IIe), or (IIf), or a pharmaceutically acceptable salt thereof, is the compound wherein $R^{3b}$ is H. In some embodiments, wherein $R^{3b}$ is $C_{1-6}$ alkyl. In some embodiments, $R^{3b}$ is $C_{1-3}$ alkyl. In some embodiments, $R^{3b}$ is methyl.

In some embodiments, the compound of Formula (I), (IIa), (IIb), (IIc), (IId), (IIe), or (IIf), or a pharmaceutically acceptable salt thereof, is the compound wherein $R^{3a}$ and $R^{3b}$ together with the carbon to which they are attached form $C_{3-6}$ cycloalkyl. In some embodiments, $R^{3a}$ and $R^{3b}$ together with the carbon to which they are attached form cyclopropyl.

In some embodiments, the compound of Formula (I), (IIa), (IIb), (IIc), (IId), (IIe), or (IIf), or a pharmaceutically acceptable salt thereof, is the compound wherein $R^{4a}$ is H. In some embodiments, $R^{4a}$ is halogen. In some embodiments, $R^{4a}$ is F, Cl, or Br. In some embodiments, $R^{4a}$ is F.

In some embodiments, the compound of Formula (I), (IIa), (IIb), (IIc), (IId), (IIe), or (IIf), or a pharmaceutically acceptable salt thereof, is the compound wherein $R^{4b}$ is H. In some embodiments, $R^{4b}$ is halogen. In some embodiments, $R^{4b}$ is F, Cl, or Br. In some embodiments, $R^{4b}$ is F.

In some embodiments, the compound of Formula (I), (IIa), (IIb), (IIc), (IId), (IIe), or (IIf), or a pharmaceutically acceptable salt thereof, is the compound wherein $R^4{}_c$ is H. In some embodiments, $R^4{}_c$ is halogen. In some embodiments, $R^4{}_c$ is F, Cl, or Br. In some embodiments, $R^{4c}$ is F.

In some embodiments, the compound of Formula (I), (IIa), (IIb), (IIc), (IId), (IIe), or (IIf), or a pharmaceutically acceptable salt thereof, is the compound wherein $R^5$ is $C_{6-10}$ aryl optionally substituted with one to three $Z^5$ which may be the same or different, each $Z^5$ is independently halogen, —CN, $C_{1-6}$ alkyl, or $C_{1-6}$ haloalkyl. In some embodiments, $R^5$ is phenyl optionally substituted with one to three halo. In some embodiments, $R^5$ is phenyl optionally substituted with one to three F. In some embodiments, $R^5$ is phenyl,

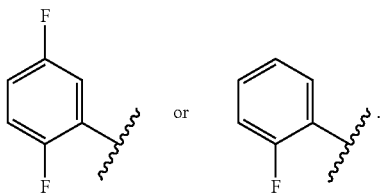 [SMILES: *c1cc(F)ccc1F ; *c1ccccc1F]

In some embodiments, the compound of Formula (I), (IIa), (IIb), (IIc), (IId), (IIe), or (IIf), or a pharmaceutically acceptable salt thereof, is the compound wherein $R^5$ is heteroaryl optionally substituted with one to three $Z^5$, which may be the same or different. In some embodiments, $R^5$ is heteroaryl selected from thiazolyl, isothiazolyl, oxazolyl, isoxazolyl, pyrrolyl, pyrazolyl, triazolyl, pyridyl, pyrazinyl, and pyrimidinyl; the heteroaryl of $R^5$ may be optionally substituted with one to three $Z^5$, which may be the same or different. In some embodiments, $R^5$ is pyridyl optionally substituted with one to three $Z^5$, which may be the same or different. In some embodiments, $R^5$ is diazinyl optionally substituted with one to three $Z^5$, which may be the same or different. In some embodiments, $R^5$ is triazolyl or pyrazolyl, wherein the triazolyl or pyrazolyl is each optionally substituted with one to three $Z^5$, which may be the same or different. In some embodiments, $R^5$ is thiazolyl, isothiazolyl, oxazolyl, or isoxazolyl; the thiazolyl, isothiazolyl, oxazolyl, isoxazolyl of $R^5$ is each optionally substituted with one to three $Z^5$, which may be the same or different. In some embodiments, each $Z^5$ is independently halogen, —CN, $C_{1-6}$ alkyl, $C_{1-6}$ haloalkyl, $C_{1-6}$ alkoxy, or $C_{1-6}$ haloalkoxy. In some embodiments, each $Z^5$ is independently halogen, $C_{1-3}$ alkyl, —CN, or —OCH$_3$. In some embodiments, $Z^5$ is F.

In some embodiments, the compound of Formula (I), (IIa), (IIb), (IIc), (IId), (IIe), or (IIf), or a pharmaceutically acceptable salt thereof, is the compound wherein $R^5$ is pyridyl,

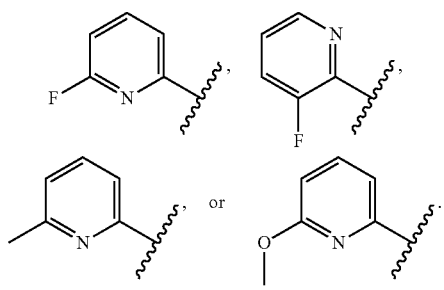

In some embodiments, $R^5$ is pyridyl. In some embodiments, $R^5$ is

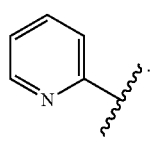

In some embodiments, $R^5$ is

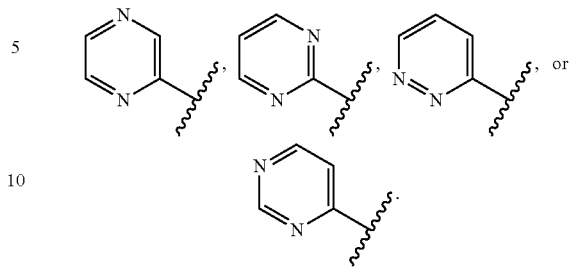

In some embodiments, $R^5$ is

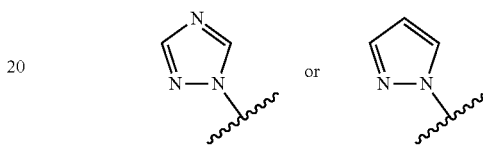

In some embodiments, $R^5$ is

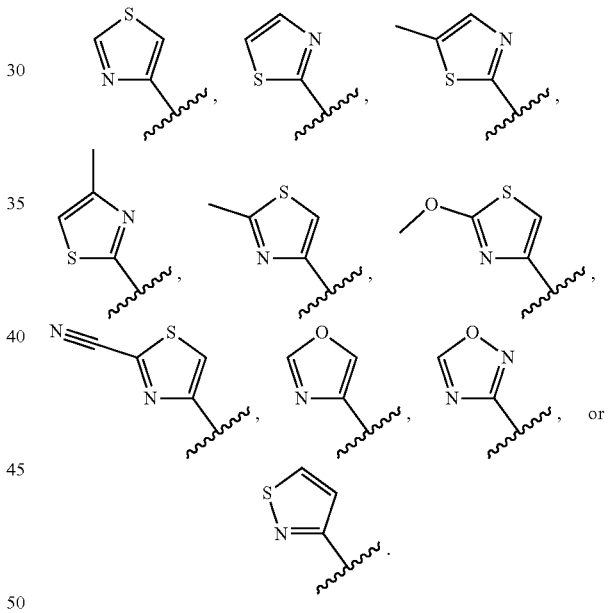

In some embodiments, the compound of Formula (I), (IIa), (IIb), (IIc), (IId), (IIe), or (IIf), or a pharmaceutically acceptable salt thereof, is the compound wherein $R^{7a}$ and $R^{7b}$ are each independently H or $C_{1-6}$ alkyl. In some embodiments, $R^{7a}$ is H. In some embodiments, $R^{7a}$ is $C_{1-3}$ alkyl. In some embodiments, $R^{7a}$ is methyl. In some embodiments, $R^{7b}$ is H. In some embodiments, $R^{7b}$ is $C_{1-3}$ alkyl. In some embodiments, $R^{7b}$ is methyl.

In some embodiments, the compound of Formula (IIe) or (IIf), or a pharmaceutically acceptable salt thereof, is the compound wherein $R^{7a}$ and $R^{7b}$ are each independently H or $C_{1-6}$ alkyl. In some embodiments, $R^{7a1}$ is H. In some embodiments, $R^{7a1}$ is $C_{1-3}$ alkyl. In some embodiments, $R^{7a1}$ is methyl. In some embodiments, $R^{7b1}$ is H. In some embodiments, $R^{7b1}$ is $C_{1-3}$ alkyl. In some embodiments, $R^{7b1}$ is methyl.

In some embodiments, the compound of Formula (I), or a pharmaceutically acceptable salt thereof, is the compound wherein $X^a$ and $X^b$ are O.

In some embodiments, the compound of Formula (I), (IIa), (IIb), (IIc), (IId), (IIe), or (IIf), or a pharmaceutically acceptable salt thereof, is the compound wherein $R^6$ is H. In some embodiments, $R^6$ is $C_{1-6}$ alkyl or $C_{1-6}$ haloalkyl. In some embodiments, $R^6$ is $C_{1-3}$ alkyl or $C_{1-3}$ haloalkyl. In some embodiments, $R^6$ is —CH$_3$ optionally substituted with 1 to 3 halo. In some embodiments, $R^6$ is —CH$_3$, —CHF$_2$, —CH$_2$F, —CF$_3$, —CHCl$_2$, or —CH$_2$C$_1$. In some embodiments, $R^6$ is —CH$_3$.

In some embodiments, the compound of Formula (I), (IIa), (IIb), (IIc), (IId), (IIe), or (IIf), or a pharmaceutically acceptable salt thereof, is the compound wherein $R^1$ is

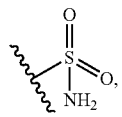

$R^{2a}$, $R^{2b}$, and $R^{2c}$ are each independently H or halogen, $R^{3a}$ and $R^{3b}$ are each H, $R^{4a}$, $R^{4b}$, and $R^{4c}$ are each H, $R^5$ is heteroaryl optionally substituted with one to three $Z^5$ which may be the same or different, and $R^6$ is $C_{1-6}$ alkyl or $C_{1-6}$ haloalkyl.

In some embodiments, the compound of Formula (I), (IIa), (IIb), (IIc), (IId), (IIe), or (IIf), or a pharmaceutically acceptable salt thereof, is the compound wherein $R^1$ is

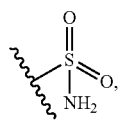

$R^{2a}$, $R^{2b}$, and $R^{2c}$ are each independently H or halogen, $R^{3a}$ and $R^{3b}$ are each H, $R^{4a}$, $R^{4b}$, and $R^{4c}$ are each H, $R^5$ is heteroaryl selected from thiazolyl, isothiazolyl, oxazolyl, isoxazolyl, pyrrolyl, pyrazolyl, triazolyl, pyridyl, pyrazinyl, and pyrimidinyl, optionally substituted with one to three $Z^5$ which may be the same or different, and $R^6$ is $C_{1-3}$ alkyl or $C_{1-3}$ haloalkyl.

In some embodiments, the compound of Formula (I), (IIa), (IIb), (IIc), (IId), (IIe), or (IIf), or a pharmaceutically acceptable salt thereof, is the compound wherein $R^1$ is

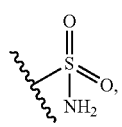

$R^{2a}$, $R^{2b}$, and $R^{2c}$ are each independently H or F, $R^{3a}$ and $R^{3b}$ are each H, $R^{4a}$, $R^{4b}$, and $R^{4c}$ are each H, $R^5$ is pyridyl optionally substituted with one to three $Z^5$, which may be the same or different, and $R^6$ is —CH$_3$, —CHF$_2$, —CH$_2$F, —CF$_3$, —CHCl$_2$, or —CH$_2$C$_1$.

In some embodiments, the compound of Formula (I), (IIa), (IIb), (IIc), (IId), (IIe), or (IIf), or a pharmaceutically acceptable salt thereof, is the compound wherein $R^1$ is

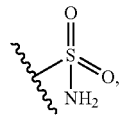

$R^{2a}$, $R^{2b}$, and $R^{2c}$ are each independently H or F, $R^{3a}$ and $R^{3b}$ are each H, $R^{4a}$, $R^{4b}$, and $R^{4c}$ are each H, $R^5$ is pyridyl,

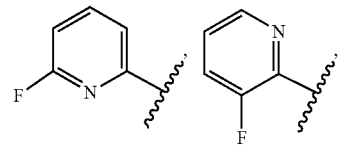

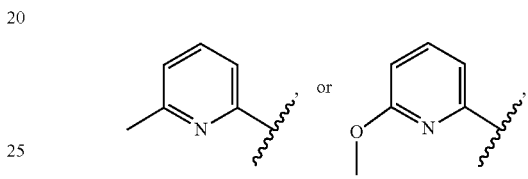

and $R^6$ is —CH$_3$ optionally substituted with 1 to 3 halo.

In some embodiments, the compound is a compound of Formula (IIe), or a pharmaceutically acceptable salt thereof, wherein $R^1$ is

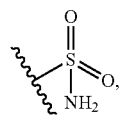

$R^{2a}$, $R^{2b}$, and $R^{2c}$ are each independently H or halogen, $R^{3a}$ and $R^{3b}$ are each H, $R^{4a}$, $R^{4b}$, and $R^{4c}$ are each H, $R^5$ is heteroaryl optionally substituted with one to three $Z^5$ which may be the same or different, and $R^6$ is $C_{1-6}$ alkyl or $C_{1-6}$ haloalkyl.

In some embodiments, the compound is a compound of Formula (IIe), or a pharmaceutically acceptable salt thereof, wherein $R^1$ is

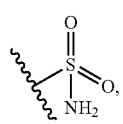

$R^{2a}$, $R^{2b}$, and $R^{2c}$ are each independently H or halogen, $R^{3a}$ and $R^{3b}$ are each H, $R^{4a}$, $R^{4b}$, and $R^{4c}$ are each H, $R^5$ is heteroaryl selected from thiazolyl, isothiazolyl, oxazolyl, isoxazolyl, pyrrolyl, pyrazolyl, triazolyl, pyridyl, pyrazinyl, and pyrimidinyl, optionally substituted with one to three $Z^5$ which may be the same or different, and $R^6$ is $C_{1-3}$ alkyl or $C_{1-3}$ haloalkyl.

In some embodiments, the compound is a compound of Formula (IIe), or a pharmaceutically acceptable salt thereof, wherein $R^1$ is

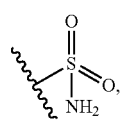

$R^{2a}$, $R^{2b}$, and $R^{2c}$ are each independently H or F, $R^{3a}$ and $R^{3b}$ are each H, $R^{4a}$, $R^{4b}$, and $R^{4c}$ are each H, $R^5$ is pyridyl optionally substituted with one to three $Z^5$, which may be the same or different, and $R^6$ is —CH$_3$, —CHF$_2$, —CH$_2$F, —CF$_3$, —CHCl$_2$, or —CH$_2$C$_1$.

In some embodiments, the compound is a compound of Formula (IIe), or a pharmaceutically acceptable salt thereof, wherein $R^1$ is

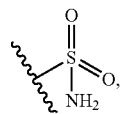

$R^{2a}$, $R^{2b}$, and $R^{2c}$ are each independently H or F, $R^{3a}$ and $R^{3b}$ are each H, $R^{4a}$, $R^{4b}$, and $R^{4c}$ are each H, $R^5$ is pyridyl,

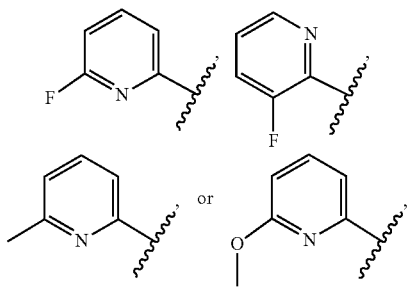

$R^6$ is —CH$_3$ optionally substituted with 1 to 3 halo.

In some embodiments, the compound is a compound of Formula (IIf), or a pharmaceutically acceptable salt thereof, wherein $R^1$ is

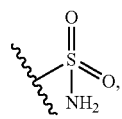

$R^{2a}$, $R^{2b}$, and $R^{2c}$ are each independently H or halogen, $R^{3a}$ and $R^{3b}$ are each H, $R^{4a}$, $R^{4b}$, and $R^{4c}$ are each H, $R^5$ is heteroaryl optionally substituted with one to three $Z^5$ which may be the same or different, and $R^6$ is C$_{1-6}$ alkyl or C$_{1-6}$ haloalkyl.

In some embodiments, the compound is a compound of Formula (IIf), or a pharmaceutically acceptable salt thereof, wherein $R^1$ is

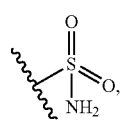

$R^{2a}$, $R^{2b}$, and $R^{2c}$ are each independently H or halogen, $R^{3a}$ and $R^{3b}$ are each H, $R^{4a}$, $R^{4b}$, and $R^{4c}$ are each H, $R^5$ is heteroaryl selected from thiazolyl, isothiazolyl, oxazolyl, isoxazolyl, pyrrolyl, pyrazolyl, triazolyl, pyridyl, pyrazinyl, and pyrimidinyl, optionally substituted with one to three $Z^5$ which may be the same or different, and $R^6$ is C$_{1-3}$ alkyl or C$_{1-3}$ haloalkyl.

In some embodiments, the compound is a compound of Formula (IIf), or a pharmaceutically acceptable salt thereof, wherein $R^1$ is

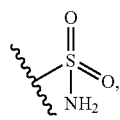

$R^{2a}$, $R^{2b}$, and $R^{2c}$ are each independently H or F, $R^{3a}$ and $R^{3b}$ are each H, $R^{4a}$, $R^{4b}$, and $R^{4c}$ are each H, $R^5$ is pyridyl optionally substituted with one to three $Z^5$, which may be the same or different, and $R^6$ is —CH$_3$, —CHF$_2$, —CH$_2$F, —CF$_3$, —CHCl$_2$, or —CH$_2$Cl.

In some embodiments, the compound is a compound of Formula (IIf), or a pharmaceutically acceptable salt thereof, wherein $R^1$ is

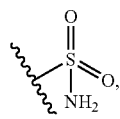

$R^{2a}$, $R^{2b}$, and $R^{2c}$ are each independently H or F, $R^{3a}$ and $R^{3b}$ are each H, $R^{4a}$, $R^{4b}$, and $R^{4c}$ are each H, $R^5$ is pyridyl,

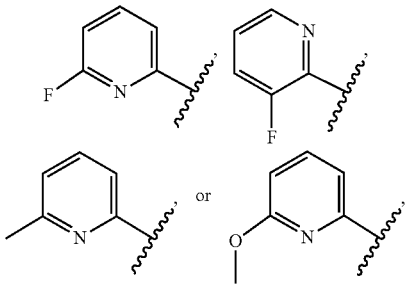

and $R^6$ is —CH$_3$ optionally substituted with 1 to 3 halo.

In some embodiments, the present disclosure provides a compound selected from

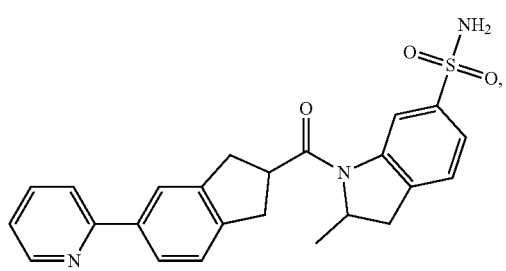

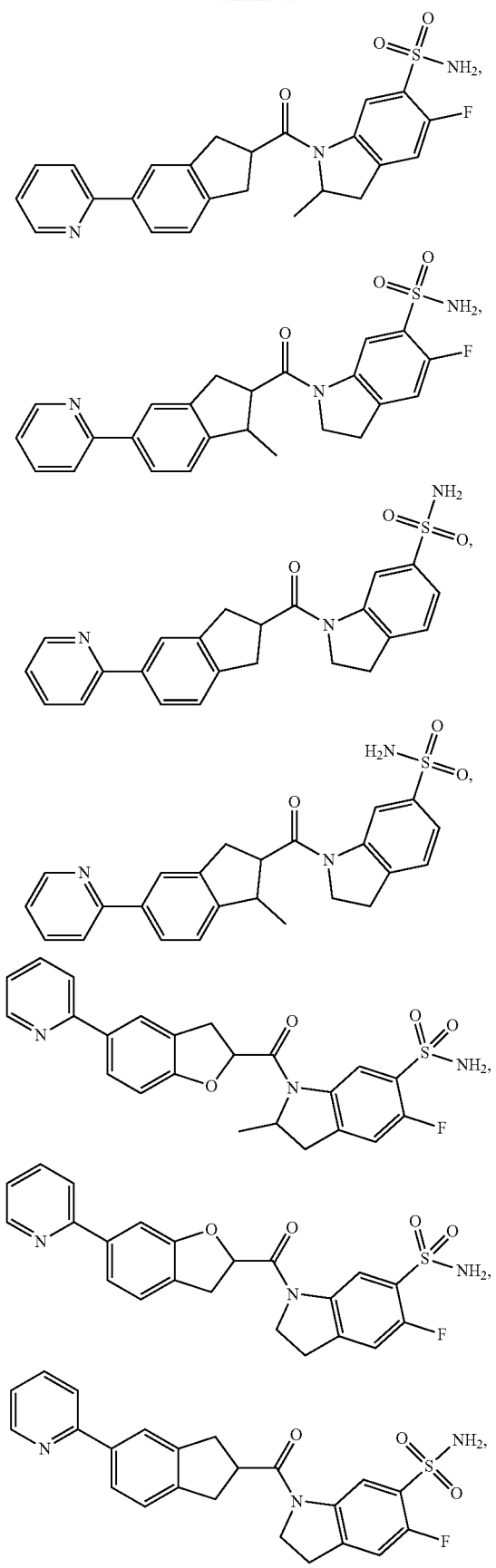
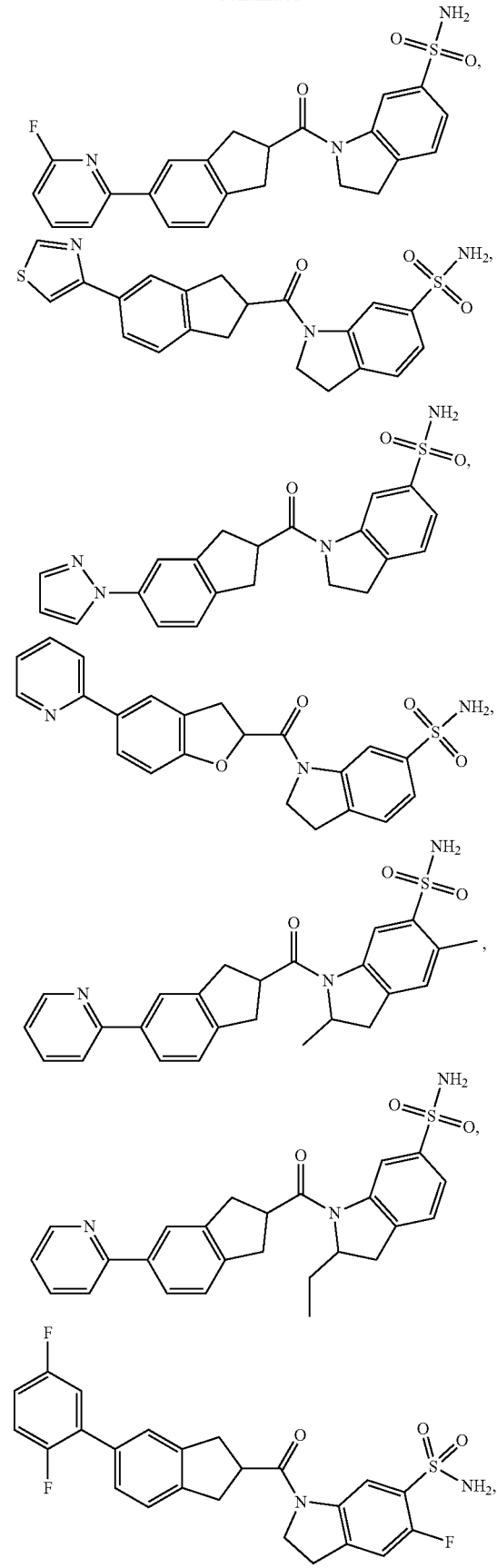

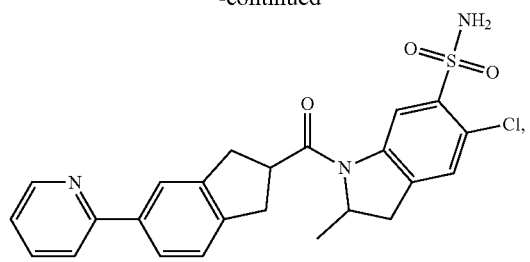
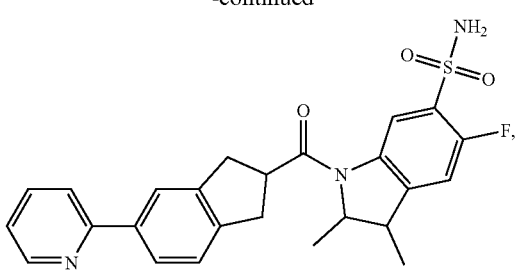
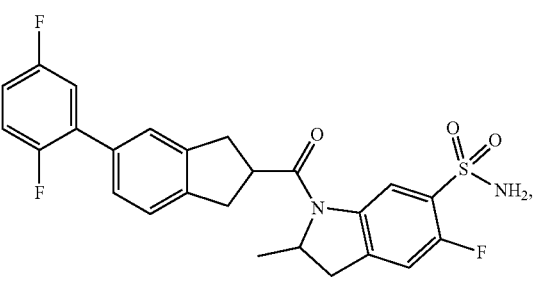
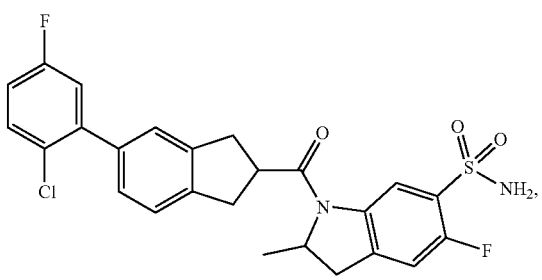
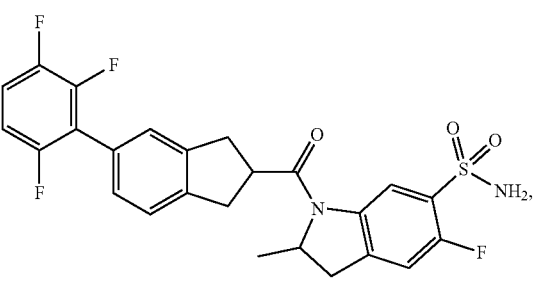
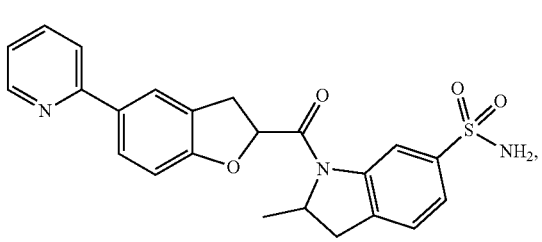
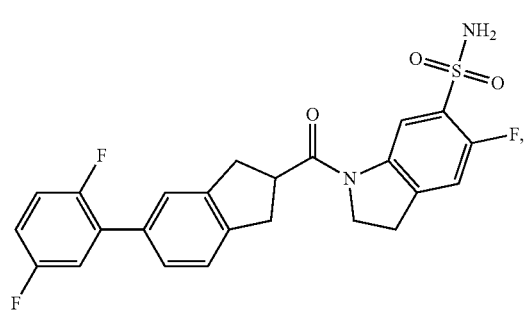
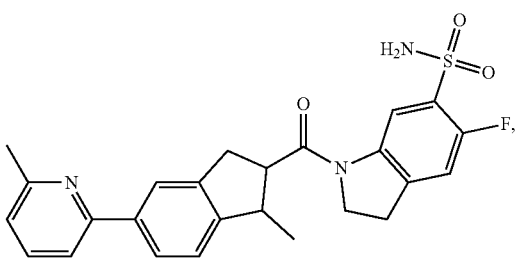
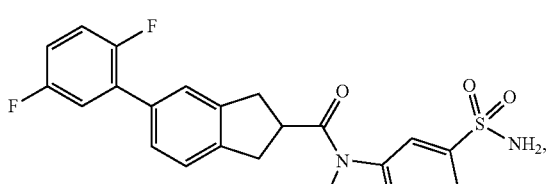
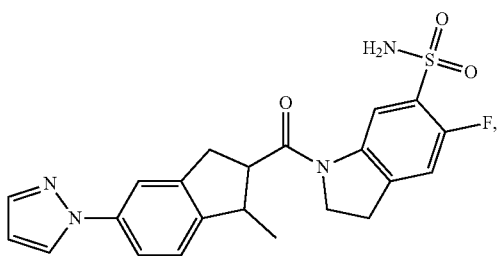
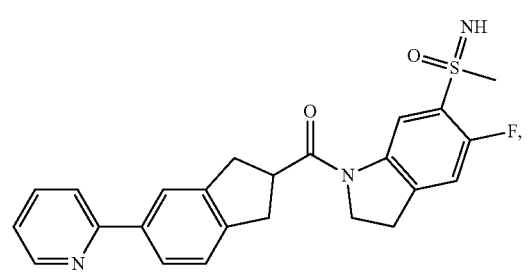 [SMILES: NS(=O)(=O)c1cc2c(cc1Cl)CCN2C(=O)C1Cc2ccc(-c3ccccn3)cc2C1]
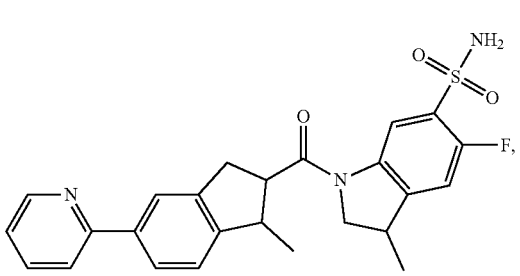

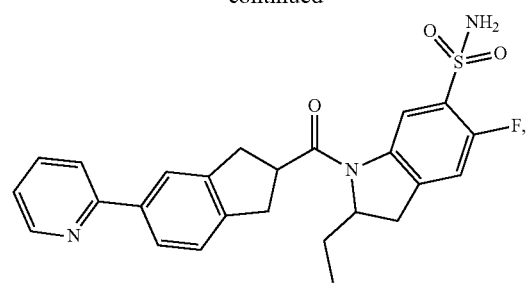
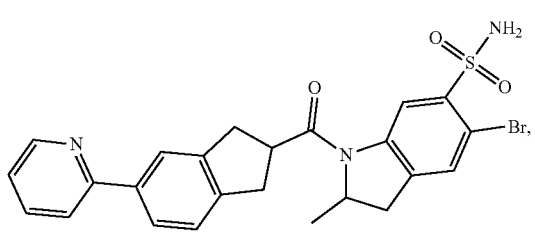
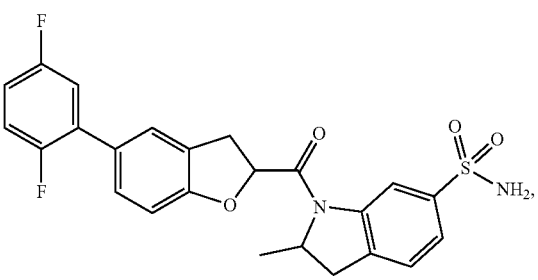
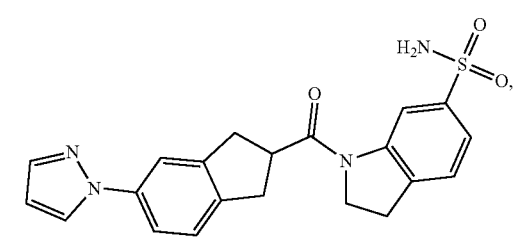
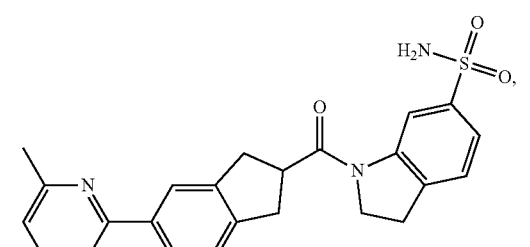
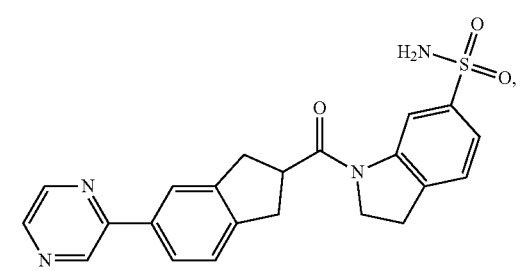
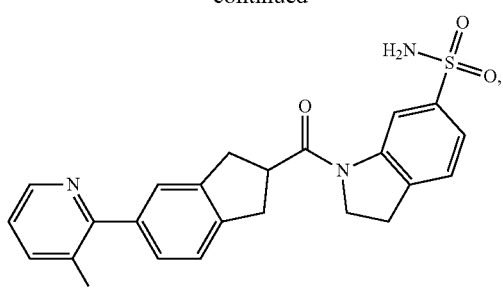
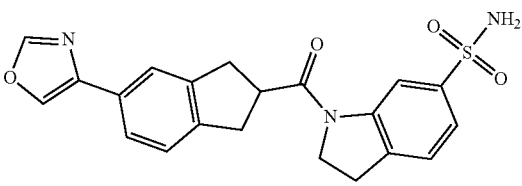
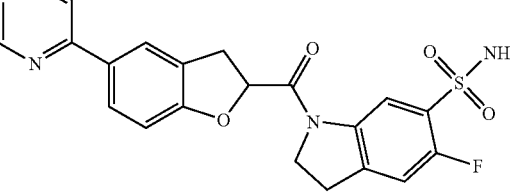
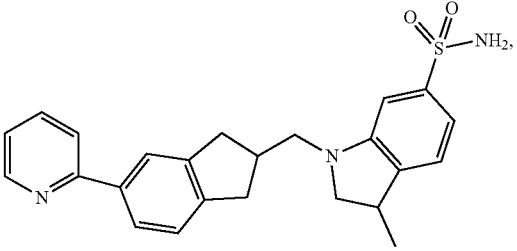
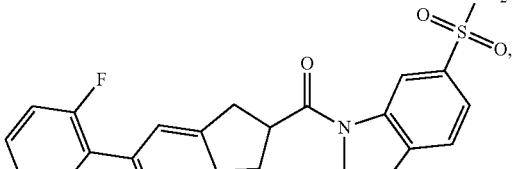
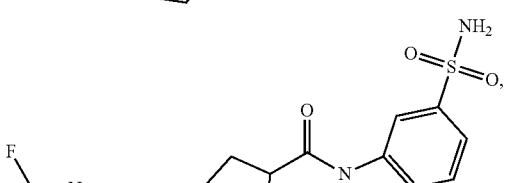
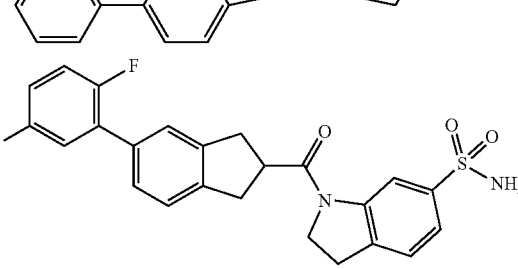

31
-continued
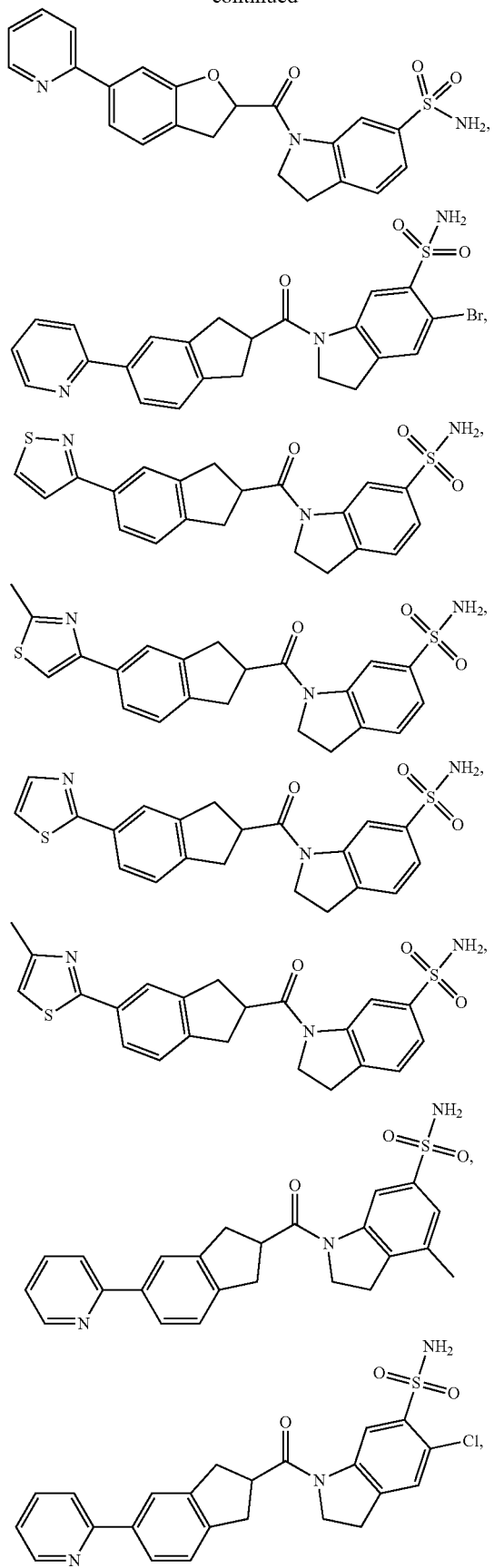
32
-continued
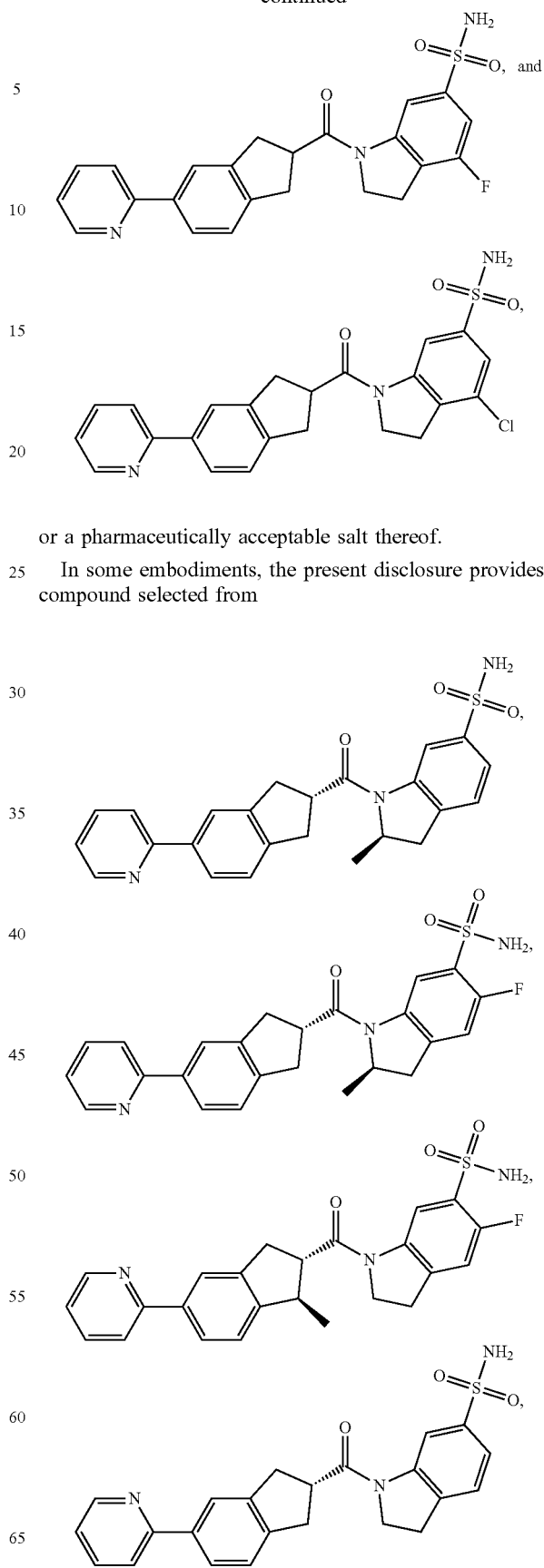
or a pharmaceutically acceptable salt thereof.
In some embodiments, the present disclosure provides a compound selected from

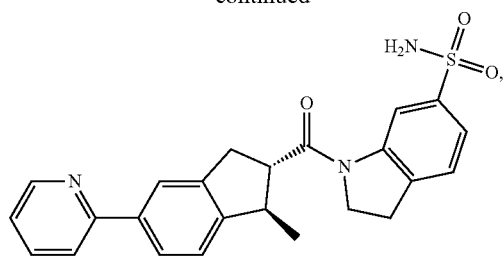
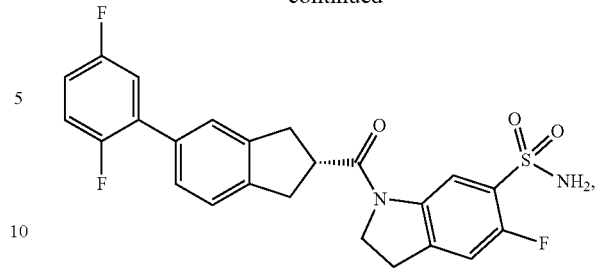
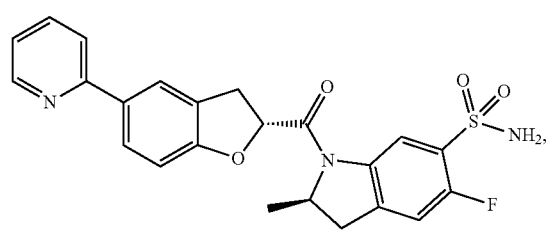
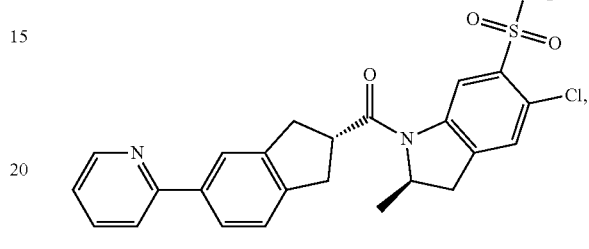
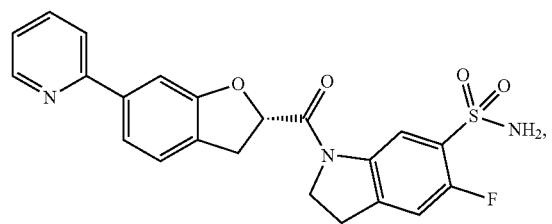
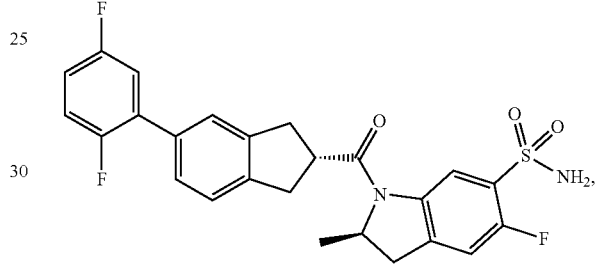
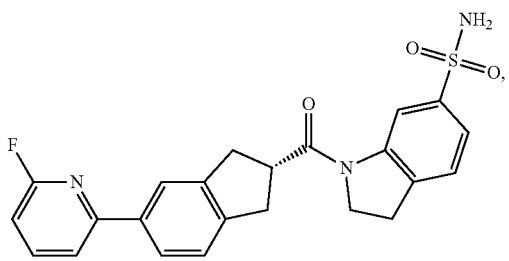
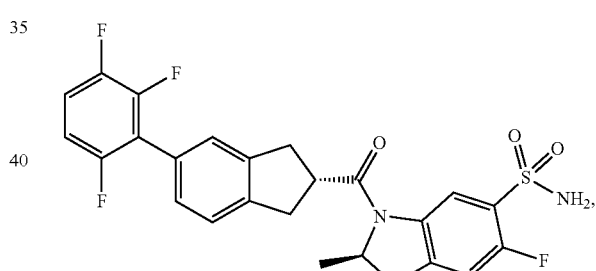
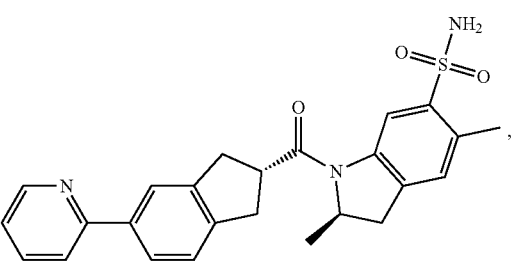
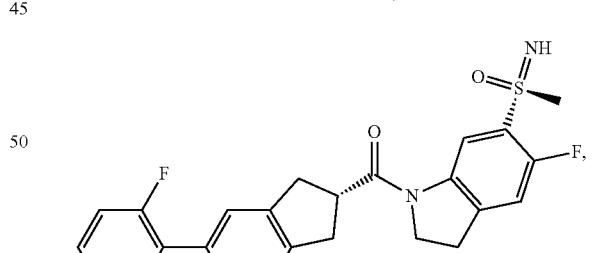
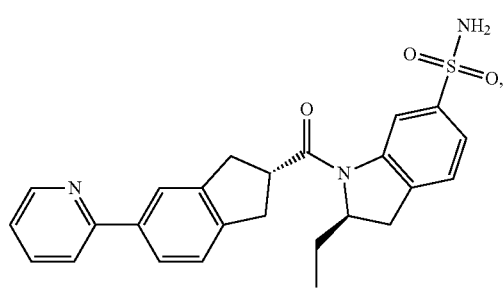
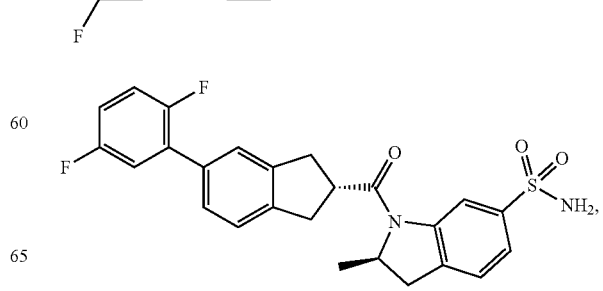

35
-continued
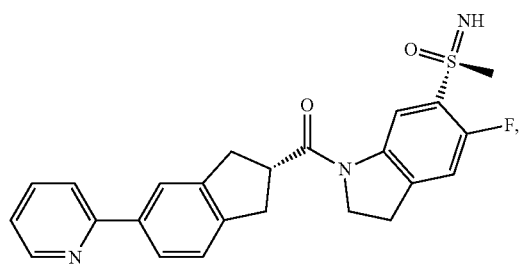
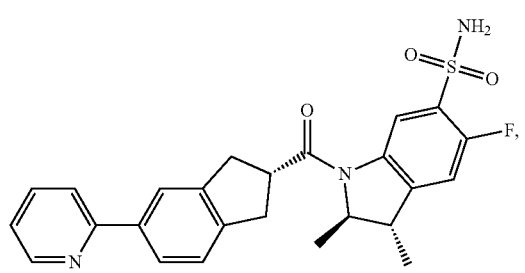
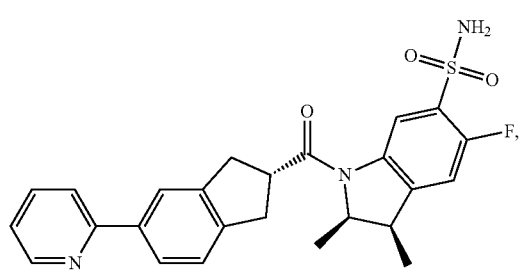
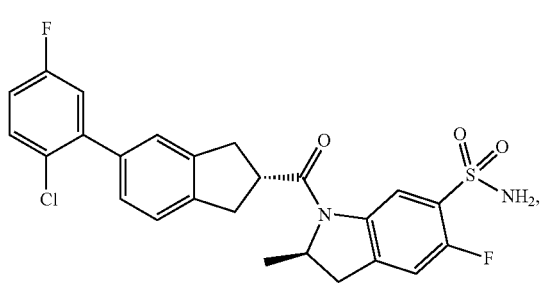
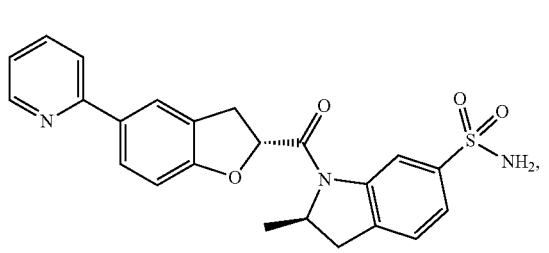
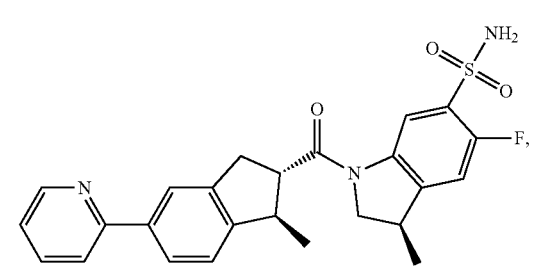
36
-continued
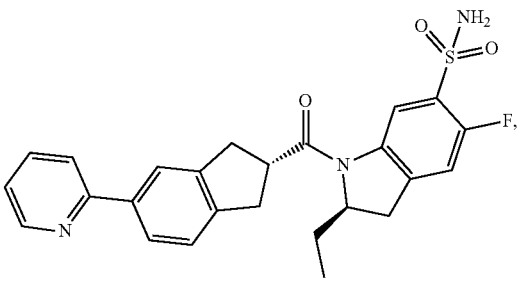
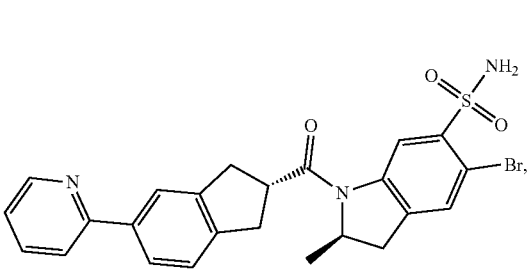
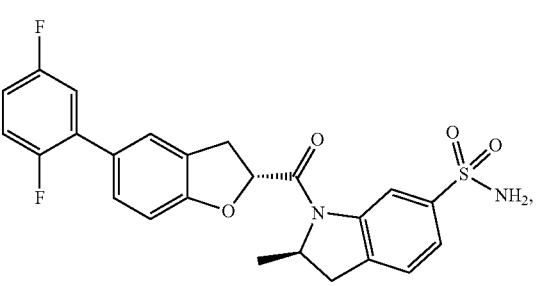
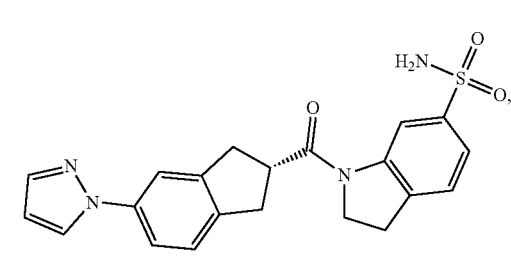
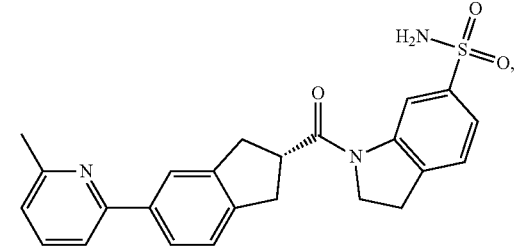
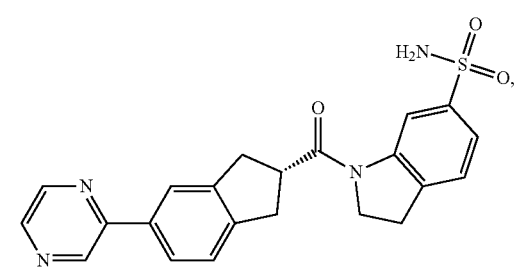

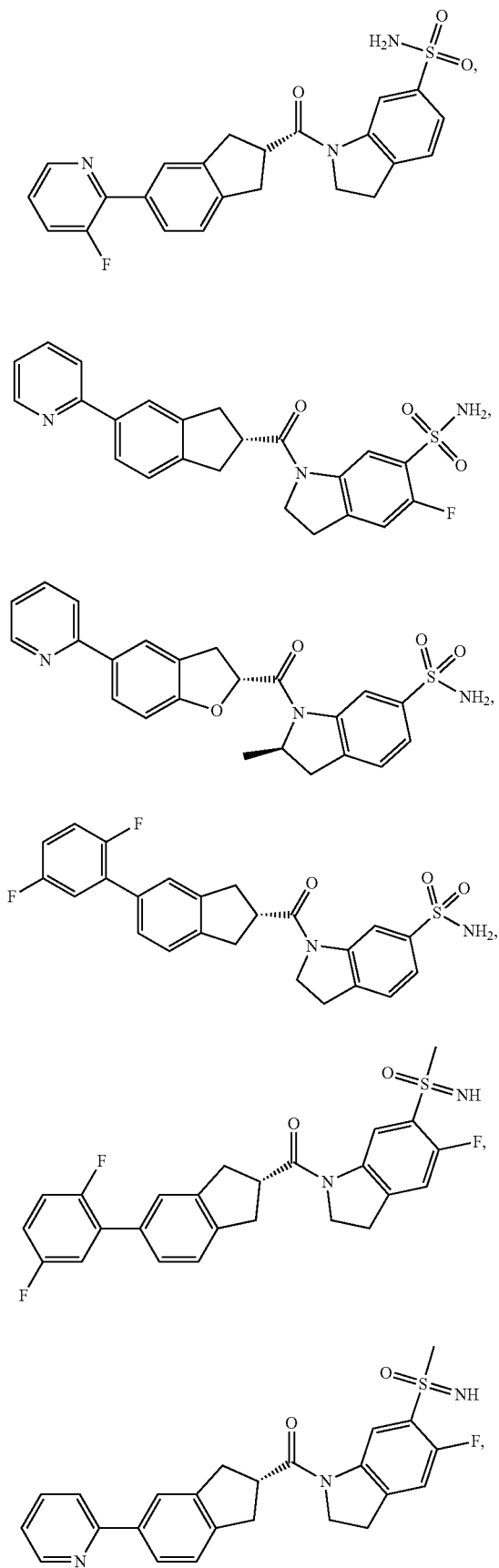

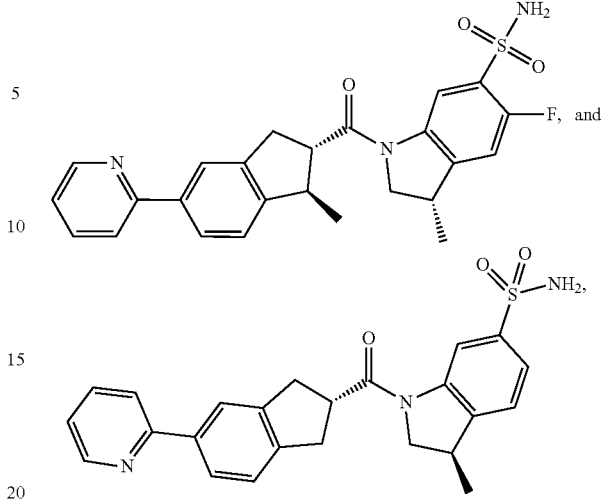

or a pharmaceutically acceptable salt thereof.

In some embodiments, the present disclosure provides a racemic mixture comprising the compound of Formula (I), (IIa), (IIb), (IIc), (IId), (IIe), or (IIf), or a pharmaceutically acceptable salt thereof. In some embodiments, the present disclosure provides a racemic mixture comprising the compound disclosed herein, or a pharmaceutically acceptable salt thereof. In some embodiments, the present disclosure provides a scalemic mixture comprising the compound of Formula (I), (IIa), (IIb), (IIc), (IId), (IIe), or (IIf), or a pharmaceutically acceptable salt thereof. In some embodiments, the present disclosure provides a scalemic mixture comprising the compound disclosed herein, or a pharmaceutically acceptable salt thereof.

One of skill in the art is aware that each and every embodiment of a group (e.g., $R^1$) disclosed herein may be combined with any other embodiment of each of the remaining groups (e.g., $R^{2a}$, $R^{2b}$, $R^{2c}$, $R^{3a}$, $R^{3b}$, etc.) to generate a complete compound of Formula (I), or any Formula described herein or a pharmaceutically acceptable salt, stereoisomer, mixture of stereoisomers, or tautomer thereof, each of which is deemed within the ambit of the present disclosure.

Compositions and Kits

Compounds provided herein, or pharmaceutically acceptable salts thereof, are usually administered in the form of pharmaceutical compositions. Thus, provided herein are also pharmaceutical compositions that comprise one or more of the compounds provided herein or pharmaceutically acceptable salts, isomer, or a mixture thereof and one or more pharmaceutically acceptable vehicles selected from carriers, adjuvants and excipients. The compounds provided herein, or pharmaceutically acceptable salts thereof, may be the sole active ingredient or one of the active ingredients of the pharmaceutical compositions. Suitable pharmaceutically acceptable vehicles may include, for example, inert solid diluents and fillers, diluents, including sterile aqueous solution and various organic solvents, permeation enhancers, solubilizers and adjuvants. Such compositions are prepared in a manner well known in the pharmaceutical art. See, e.g., Remington's Pharmaceutical Sciences, Mace Publishing Co., Philadelphia, Pa. 17th Ed. (1985); and Modern Pharmaceutics, Marcel Dekker, Inc. 3rd Ed. (G. S. Banker & C. T. Rhodes, Eds.).

In some embodiments, provided herein are pharmaceutical compositions comprising a compound provided herein (i.e., a compound of Formula (I), (IIa), (IIb), (IIc), (IId), (IIe), or (IIf)), or a pharmaceutically acceptable salt thereof, and a pharmaceutically acceptable excipient or carrier. In some embodiments, the pharmaceutical compositions comprise a therapeutically effective amount of a compound provided herein, or a pharmaceutically acceptable salt thereof, and a pharmaceutically acceptable excipient or carrier.

In some embodiments, the pharmaceutical compositions provided herein further comprise one or more (i.e., one, two, three, four; one or two; one to three; or one to four) additional therapeutic agents, or a pharmaceutically acceptable salt thereof. In some embodiments, the pharmaceutical compositions further comprise a therapeutically effective amount of the one or more (i.e., one, two, three, four; one or two; one to three; or one to four) additional therapeutic agents, or a pharmaceutically acceptable salt thereof. In some embodiments, the one of more therapeutic agents are selected from Complement receptor 2 antagonists; Duffy antigen chemokine receptor modulators; Envelope glycoprotein GP350 modulators; Glucocorticoid receptor agonists; Helicase inhibitors; helicase-primase inhibitor; HIV gp160 protein inhibitors; HIV gp41 protein inhibitors; HIV-1 reverse transcriptase inhibitors; HLA class I antigen A-2 alpha modulators; HLA class I antigen A-24 alpha modulators; Human cytomegalovirus glycoprotein B modulators; Human cytomegalovirus glycoprotein H modulators; Human cytomegalovirus glycoprotein inhibitors; Human cytomegalovirus glycoprotein L modulators; Immunoglobulin G agonists; Interferon alpha 2 ligands; Interferon gamma receptor antagonists; Latent membrane protein 1 modulators; Latent membrane protein 2 modulators; Latent membrane protein 2 stimulators; Progesterone receptor agonists; Secreted protein BARF1 modulators; Serine threonine protein kinase UL97 modulators; T-cell surface glycoprotein CD8 stimulators; Thymidine kinase inhibitors; Trans acting transcription protein ICP4 modulators; Transferase inhibitors; Unspecified gene inhibitors; Adenosylhomocysteinase inhibitors; Basigin inhibitors; Basigin modulators; CCR5 chemokine modulators; CD4 agonists; CD4 modulators; CD89 agonists; CMV 65 kDa lower matrix phosphoprotein modulators; CRISPR associated endonuclease Cas9 modulators; Cyclin dependent kinase inhibitors; Cyclin dependent kinase inhibitors; Cyclin-dependent kinase-9 inhibitors; DNA polymerase inhibitors; DNA primase inhibitors; Endonuclease modulators; Epstein-Barr nuclear antigen 1 inhibitors; Epstein-Barr nuclear antigen 1 modulators; Epstein-Barr nuclear antigen 1 stimulators; Fatty acid synthase inhibitors; Herpesvirus envelope glycoprotein B stimulators; Herpesvirus envelope glycoprotein D inhibitors; Herpesvirus envelope glycoprotein D modulators; HIV gp120 protein inhibitors; HLA class I antigen A-11 alpha modulators; Hsp 90 inhibitors; Human cytomegalovirus glycoprotein B inhibitors; Human cytomegalovirus glycoprotein B modulators; Human cytomegalovirus glycoprotein inhibitors; Hyaluronidase inhibitors; Immunoglobulin agonists; Interferon alpha 1 ligands; Interferon alpha 2 ligands; Interferon alpha ligand inhibitors; Interferon alpha ligand modulators; Interferon beta ligands; Large terminase protein inhibitors; LAT gene inhibitors; NAD-dependent deacetylase sirtuin modulators; Nicotinic acetylcholine receptor antagonists; NKG2D ligand modulators; Nucleotidyltransferase inhibitors; Protein Jumonji inhibitors; Ribonuclease stimulators; Serine threonine protein kinase UL97 inhibitors; Syntaxin-5 inhibitors; TAT protein modulators; T-cell surface glycoprotein CD8 stimulators; TLR-4 agonists; and viral ribonucleotide reductase inhibitors. In some embodiments, the one of more therapeutic agents are selected from famciclovir, acyclovir, and valacyclovir.

In some embodiments, provided herein are pharmaceutical compositions comprising a therapeutically effective amount of a compound provided herein, or a pharmaceutically acceptable salt thereof, and a pharmaceutically acceptable excipient.

The pharmaceutical compositions may be administered in either single or multiple doses. The pharmaceutical compositions may be administered by various methods including, for example, rectal, buccal, intranasal and transdermal routes. In some embodiments, the pharmaceutical compositions may be administered by intra-arterial injection, intravenously, intraperitoneally, parenterally, intramuscularly, subcutaneously, orally, topically, or as an inhalant.

One mode for administration is parenteral, for example, by injection. The forms in which the pharmaceutical compositions described herein may be incorporated for administration by injection include, for example, aqueous or oil suspensions, or emulsions, with sesame oil, corn oil, cottonseed oil, or peanut oil, as well as elixirs, mannitol, dextrose, or a sterile aqueous solution, and similar pharmaceutical vehicles. In some embodiments, the compounds, or pharmaceutically acceptable salts thereof, and pharmaceutical compositions disclosed herein are administered by subcutaneous injection.

The pharmaceutical compositions of the present disclosure may be in the form of a sterile injectable preparation, such as a sterile injectable aqueous or oleaginous suspension. This suspension may be formulated according to the known art using those suitable dispersing or wetting agents and suspending agents which have been mentioned herein. The sterile injectable preparation may also be a sterile injectable solution or suspension in a non-toxic parenterally acceptable diluent or solvent, such as a solution in 1,3-butane-diol or prepared as a lyophilized powder. Among the acceptable vehicles and solvents that may be employed are water, Ringer's solution and isotonic sodium chloride solution. In addition, sterile fixed oils may conventionally be employed as a solvent or suspending medium. For this purpose, any bland fixed oil may be employed including synthetic mono- or diglycerides. In addition, fatty acids such as oleic acid may likewise be used in the preparation of injectables.

In some embodiments, the sterile injectable preparation disclosed herein may also be a sterile injectable solution or suspension prepared from a reconstituted lyophilized powder in a non-toxic parenterally acceptable diluent or solvent, such as a solution in 1,3-butane-diol. Among the acceptable vehicles and solvents that may be employed are water, Ringer's solution and isotonic sodium chloride solution. In addition, sterile fixed oils may conventionally be employed as a solvent or suspending medium. For this purpose, any bland fixed oil may be employed including synthetic mono- or diglycerides. In addition, fatty acids such as oleic acid may likewise be used in the preparation of injectables.

Formulations suitable for parenteral administration include aqueous and non-aqueous sterile injection solutions which may contain anti-oxidants, buffers, bacteriostats and solutes which render the formulation isotonic with the blood of the intended recipient; and aqueous and non-aqueous sterile suspensions which may include suspending agents and thickening agents. In certain embodiments the suspension is a microsuspension. In certain embodiments the suspension is a nanosuspension.

In some embodiments, formulations suitable for parenteral administration (e.g., intramuscular (IM) and subcutaneous (SC) administration) will include one or more excipients. Excipients should be compatible with the other ingredients of the formulation and physiologically innocuous to the recipient thereof. Examples of suitable excipients are well known to the person skilled in the art of parenteral formulation and may be found e.g., in Handbook of Pharmaceutical Excipients (eds. Rowe, Sheskey & Quinn), 6th edition 2009. Examples of solubilizing excipients in a parenteral formulation (e.g., an SC or IM formulation) include, but are not limited to, polysorbates (such as polysorbate 20 or 80) and poloxamers (such as poloxamer 338, 188, or 207). In some embodiments, the compounds, or pharmaceutically acceptable salts thereof, and pharmaceutical compositions disclosed herein are administered with implants.

Oral administration may be another route for administration of the compounds provided herein or pharmaceutically acceptable salts thereof. Administration may be via, for example, capsule or enteric coated tablets. In making the pharmaceutical compositions that include at least one compound provided herein or pharmaceutically acceptable salts, isomer, or a mixture thereof, the active ingredient (such as a compound provided herein) is usually diluted by an excipient and/or enclosed within such a carrier that can be in the form of a capsule, sachet, paper or other container. When the excipient serves as a diluent, it can be in the form of a solid, semi-solid, or liquid material, which acts as a vehicle, carrier or medium for the active ingredient. Thus, the pharmaceutical compositions can be in the form of tablets, pills, powders, lozenges, sachets, cachets, elixirs, suspensions, emulsions, solutions, syrups, aerosols (as a solid or in a liquid medium), ointments containing, for example, up to 10% by weight of the active compound, soft and hard gelatin capsules, sterile injectable solutions, and sterile packaged powders.

Some examples of suitable excipients include lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, sterile water, syrup, and methyl cellulose or any combinations thereof. The pharmaceutical compositions can additionally include lubricating agents such as talc, magnesium stearate, and mineral oil; wetting agents; emulsifying and suspending agents; preserving agents such as methyl and propylhydroxy-benzoates; sweetening agents; and flavoring agents; or any combinations thereof.

The pharmaceutical compositions that include at least one compound described herein or pharmaceutically acceptable salts, isomer, or a mixture thereof can be formulated so as to provide quick, sustained or delayed release of the active ingredient (such as a compound provided herein) after administration to the subject by employing procedures known in the art. Controlled release drug delivery systems for oral administration include osmotic pump systems and dissolutional systems containing polymer-coated reservoirs or drug-polymer matrix formulations. Examples of controlled release systems are given in U.S. Pat. Nos. 3,845,770; 4,326,525; 4,902,514; and 5,616,345. Another formulation for use in the methods of the present disclosure employs transdermal delivery devices ("patches"). Such transdermal patches may be used to provide continuous or discontinuous infusion of the compounds provided herein in controlled amounts. The construction and use of transdermal patches for the delivery of pharmaceutical agents is well known in the art. See, e.g., U.S. Pat. Nos. 5,023,252, 4,992,445 and 5,001,139. Such patches may be constructed for continuous, pulsatile, or on demand delivery of pharmaceutical agents.

For preparing solid compositions such as tablets, the principal active ingredient may be mixed with a pharmaceutical excipient to form a solid preformulation composition containing a homogeneous mixture of a compound described herein or pharmaceutically acceptable salts, isomer, or a mixture thereof. When referring to these preformulation compositions as homogeneous, the active ingredient may be dispersed evenly throughout the composition so that the composition may be readily subdivided into equally effective unit dosage forms such as tablets, pills and capsules.

The tablets or pills of the compounds provided herein or pharmaceutically acceptable salts thereof may be coated or otherwise compounded to provide a dosage form affording the advantage of prolonged action, or to protect from the acid conditions of the stomach. For example, the tablet or pill can include an inner dosage and an outer dosage component, the latter being in the form of an envelope over the former. The two components can be separated by an enteric layer that serves to resist disintegration in the stomach and permit the inner component to pass intact into the duodenum or to be delayed in release. A variety of materials can be used for such enteric layers or coatings, such materials including a number of polymeric acids and mixtures of polymeric acids with materials such as shellac, cetyl alcohol, and cellulose acetate.

Pharmaceutical compositions for inhalation or insufflation may include solutions and suspensions in pharmaceutically acceptable, aqueous or organic solvents, or mixtures thereof, and powders. The liquid or solid compositions may contain suitable pharmaceutically acceptable excipients as described supra. In some embodiments, the compositions are administered by the oral or nasal respiratory route for local or systemic effect. In other embodiments, compositions in pharmaceutically acceptable solvents may be nebulized by use of inert gases. Nebulized solutions may be inhaled directly from the nebulizing device or the nebulizing device may be attached to a facemask tent, or intermittent positive pressure breathing machine. Solution, suspension, or powder compositions may be administered, preferably orally or nasally, from devices that deliver the formulation in an appropriate manner.

In one embodiment, provided herein are kits that comprise a compound provided herein, (i.e., a compound of Formula (I), (IIa), (IIb), (IIc), (IId), (IIe), or (IIf)), or a pharmaceutically acceptable salt, stereoisomer, prodrug, or solvate thereof, and suitable packaging. In some embodiments, the kit further comprises instructions for use. In some embodiments, the kit comprises a compound provided herein (i.e., a compound of Formula (I), (IIa), (IIb), (IIc), (IId), (IIe), or (IIf)), or a pharmaceutically acceptable salt, stereoisomer, prodrug, or solvate thereof, and a label and/or instructions for use of the compounds in the treatment of the indications, including the diseases or conditions, described herein.

In some embodiments, the kits further comprise one or more (i.e., one, two, three, four; one or two; one to three; or one to four) additional therapeutic agents, or a pharmaceutically acceptable salt thereof.

In one embodiment, provided herein are articles of manufacture that comprise a compound described herein or pharmaceutically acceptable salts, isomer, or a mixture thereof in a suitable container. In some embodiments, the container may be a vial, jar, ampoule, preloaded syringe, or intravenous bag.

Method

The methods provided herein may be applied to cell populations in vivo or ex vivo. "In vivo" means within a living individual, as within an animal or human. In this context, the methods provided herein may be used therapeutically in an individual. "Ex vivo" means outside of a living individual. Examples of ex vivo cell populations include in vitro cell cultures and biological samples including fluid or tissue samples obtained from individuals. Such samples may be obtained by methods well known in the art. Exemplary biological fluid samples include blood, cerebrospinal fluid, urine, and saliva. Exemplary tissue samples include tumors and biopsies thereof. In this context, the present disclosure may be used for a variety of purposes, including therapeutic and experimental purposes. For example, the present disclosure may be used ex vivo to determine the optimal schedule and/or dosing of administration of a compound as disclosed herein for a given cell type, individual, and other parameters. Information gleaned from such use may be used for experimental purposes or in the clinic to set protocols for in vivo treatment. Other ex vivo uses for which the present disclosure may be suited are described below or will become apparent to those skilled in the art. The selected compounds may be further characterized to examine the safety or tolerance dosage in human or non-human subjects. Such properties may be examined using commonly known methods to those skilled in the art.

In one embodiment, the present disclosure provides a method of treating or preventing a herpesvirus infection in a patient in need thereof comprising administering to the patient a therapeutically effective amount of a compound provided herein, or a pharmaceutically acceptable salt thereof, or a pharmaceutical composition provided herein.

In some embodiments, the methods provided herein further comprise administering a therapeutically effective amount of one, two, three, or four additional therapeutic agents, or a pharmaceutically acceptable salt thereof.

The disclosure further relates to the use of compounds disclosed herein for the treatment and/or prophylaxis of diseases and/or conditions through inhibiting the helicase primase of herpesviruses by said compounds. Further, the present disclosure relates to the use of said compounds for the preparation of a medicament for the treatment and/or prophylaxis of a herpesvirus associated disease and/or condition through inhibiting helicase primase of herpesviruses by said compounds. In some embodiments the herpesvirus associated disease or condition is alleviated by inhibiting herpesvirus helicase primase. In some embodiments, the present disclosure relates to the use of the compounds disclosed herein for the preparation of a medicament for the treatment and/or prophylaxis of HSV-1 or HSV-2 associated disease and/or condition through inhibiting the helicase primase by said compounds.

Medicaments as referred to herein can be prepared by conventional processes, including the combination of a compound according to the present disclosure and a pharmaceutically acceptable carrier.

In some embodiments, provided herein is a method of the inhibiting the helicase primase of herpesviruses comprising administering to a patient in need thereof (e.g., a patient having a herpesvirus associated disease or condition) a therapeutically effective amount of a compound of Formula (I), (IIa), (IIb), (IIc), (IId), (IIe), or (IIf), or a pharmaceutically acceptable salt thereof, or a composition comprising a compound of Formula (I), (IIa), (IIb), (IIc), (IId), (IIe), or (IIf), or a pharmaceutically acceptable salt thereof.

In some embodiments, provided herein is a method of inhibiting the helicase primase of HSV-1 or HSV-2 comprising administering to a patient in need thereof (e.g., a patient having a HSV-1 or HSV-2 associated disease or condition) a therapeutically effective amount of a compound of Formula (I), (IIa), (IIb), (IIc), (IId), (IIe), or (IIf), or a pharmaceutically acceptable salt thereof, or a composition comprising a compound of Formula (I), (IIa), (IIb), (IIc), (IId), (IIe), or (IIf), or a pharmaceutically acceptable salt thereof. In some embodiments, provided herein is a method of inhibiting the helicase primase of HSV-1 or HSV-2 comprising administering to a patient in need thereof (e.g., a patient having a HSV-1 or HSV-2 associated disease or condition) a therapeutically effective amount of a compound disclosed herein, or a pharmaceutically acceptable salt thereof, or a composition comprising a compound disclosed herein, or a pharmaceutically acceptable salt thereof.

In some embodiments, provided herein is a method of reducing the proliferation of a virus comprising contacting the virus with a compound of Formula (I), (IIa), (IIb), (IIc), (IId), (IIe), or (IIf), or a pharmaceutically acceptable salt thereof, and inhibiting helicase primase in the virus. In some embodiments, provided herein is a method of reducing the proliferation of herpesviruses comprising contacting the virus with a compound of Formula (I), (IIa), (IIb), (IIc), (IId), (IIe), or (IIf), or a pharmaceutically acceptable salt thereof, and inhibiting helicase primase in the virus. In some embodiments, provided herein is a method of reducing the proliferation of HSV-1 or HSV-2 comprising contacting the virus with a compound disclosed herein, or a pharmaceutically acceptable salt thereof, and inhibiting helicase primase in the virus.

In some embodiments, provided herein is a method of treating a disorder induced, exacerbated, or accelerated by herpesviruses, comprising administering to a patient a therapeutically effective amount of a compound of Formula (I), (IIa), (IIb), (IIc), (IId), (IIe), or (IIf), or a pharmaceutically acceptable salt thereof, or a composition comprising a compound of Formula (IIa), (IIb), (IIc), (IId), (IIe), or (IIf), or a pharmaceutically acceptable salt thereof, to a patient in need thereof. In some embodiments, provided herein is a method of treating a disorder induced, exacerbated, or accelerated by HSV-1 or HSV-2, comprising administering to a patient a therapeutically effective amount of a compound of Formula (I), (IIa), (IIb), (IIc), (IId), (IIe), or (IIf), or a pharmaceutically acceptable salt thereof, or a composition comprising a compound of Formula (IIa), (IIb), (IIc), (IId), (IIe), or (IIf), or a pharmaceutically acceptable salt thereof, to a patient in need thereof. In some embodiments, the disorder is genital herpes, herpes labialis, HSV keratitis, HSV encephalitis, or disseminated HSV. In some embodiments, the disorder is genital herpes.

In some embodiments, provided herein is the use of a compound of Formula (I), (IIa), (IIb), (IIc), (IId), (IIe), or (IIf), or a pharmaceutically acceptable salt thereof, in the treatment of a viral infection. In some embodiments, provided herein is the use of a compound of Formula (I), (IIa), (IIb), (IIc), (IId), (IIe), or (IIf), or a pharmaceutically acceptable salt thereof, in the treatment of a viral infection caused by herpesviruses. In some embodiments, provided herein is the use of a compound of Formula (I), (IIa), (IIb), (IIc), (IId), (IIe), or (IIf), or a pharmaceutically acceptable salt thereof, in the treatment of a viral infection caused by HSV-1 or HSV-2.

In some embodiments, provided herein is the use of a compound of Formula (I), (IIa), (IIb), (IIc), (IId), (IIe), or (IIf), or a pharmaceutically acceptable salt thereof, for the preparation of a medicament for preventing/treating a viral infection. In some embodiments, provided herein is the use of a compound of Formula (I), (IIa), (IIb), (IIc), (IId), (IIe), or (IIf), or a pharmaceutically acceptable salt thereof, for the preparation of a medicament for preventing/treating a viral infection caused by herpesviruses. In some embodiments, provided herein is the use of a compound of Formula (I), (IIa), (IIb), (IIc), (IId), (IIe), or (IIf), or a pharmaceutically acceptable salt thereof, for the preparation of a medicament for preventing/treating a viral infection caused by HSV-1 or HSV-2.

In some embodiments, provided herein is the compound of Formula (I), (IIa), (IIb), (IIc), (IId), (IIe), or (IIf), or pharmaceutically acceptable salt thereof, for use in therapy. In some embodiments, provided herein is the compound of Formula (I), (IIa), (IIb), (IIc), (IId), (IIe), or (IIf), or pharmaceutically acceptable salt thereof, for use in a method of treating a viral infection caused by HSV-1 or HSV-2.

Administration

The compounds of the present disclosure or pharmaceutically acceptable salts thereof (also referred to herein as the active ingredients) can be administered by any route appropriate to the condition to be treated. Suitable routes include oral, rectal, nasal, topical (including buccal and sublingual), transdermal, vaginal and parenteral (including subcutaneous, intramuscular, intravenous, intradermal, intrathecal and epidural), and the like. It will be appreciated that the preferred route may vary with, for example, the condition of the recipient. An advantage of certain compounds disclosed herein, or pharmaceutically acceptable salts thereof, is that they are orally bioavailable and can be dosed orally.

A compound of the present disclosure, or a pharmaceutically acceptable salt thereof, may be administered to an individual in accordance with an effective dosing regimen for a desired period of time or duration, such as at least about one day, at least about 2 days, at least about 3 days, at least about 4 days, at least about 5 days, at least about 6 days, at least about one week, at least about 2 weeks, at least about 3 weeks, at least about one month, at least about 2 months, at least about 3 months, at least about 6 months, or at least about 12 months or longer. In some embodiments, the compound, or a pharmaceutically acceptable salt thereof, is administered on a daily or intermittent schedule for the duration of the individual's life.

The specific dose level of a compound of the present disclosure, or a pharmaceutically acceptable salt thereof, for any particular subject will depend upon a variety of factors including the activity of the specific compound employed, the age, body weight, general health, sex, diet, time of administration, route of administration, and rate of excretion, drug combination and the severity of the particular disease in the subject undergoing therapy. For example, a dosage may be expressed as a number of milligrams of a compound provided herein, or a pharmaceutically acceptable salt thereof, per kilogram of the subject's body weight (mg/kg). Dosages of between about 0.1 and 150 mg/kg may be appropriate. In some embodiments, about 0.1 and 100 mg/kg may be appropriate. In other embodiments a dosage of between 0.5 and 60 mg/kg may be appropriate. Normalizing according to the subject's body weight is particularly useful when adjusting dosages between subjects of widely disparate size, such as occurs when using the drug in both children and adult humans or when converting an effective dosage in a non-human subject such as dog to a dosage suitable for a human subject.

The dosage may also be described as a total amount of a compound described herein, or a pharmaceutically acceptable salt thereof, administered per dose. The dosage or dosing frequency of a compound of the present disclosure, or a pharmaceutically acceptable salt thereof, may be adjusted over the course of the treatment, based on the judgment of the administering physician.

The compounds of the present disclosure, or pharmaceutically acceptable salts thereof, may be administered to an individual (e.g., a human) in a therapeutically effective amount. In some embodiments, the compound of Formula (I), (IIa), (IIb), (IIc), (IId), (IIe), or (IIf), or a pharmaceutically acceptable salt thereof, is administered once daily, once weekly, once monthly, once every two months, once every three months, or once every six months. In some embodiments, the compound of Formula (I), (IIa), (IIb), (IIc), (IId), (IIe), or (IIf), or a pharmaceutically acceptable salt thereof, is administered once daily. In some embodiments, the compound of Formula (I), (IIa), (IIb), (IIc), (IId), (IIe), or (IIf), or a pharmaceutically acceptable salt thereof, is administered once weekly. In some embodiments, the compound of Formula (I), (IIa), (IIb), (IIc), (IId), (IIe), or (IIf), or a pharmaceutically acceptable salt thereof, is administered once monthly. In some embodiments, the compound of Formula (I), (IIa), (IIb), (IIc), (IId), (IIe), or (IIf), or a pharmaceutically acceptable salt thereof, is administered once every two months. In some embodiments, the compound of Formula (I), (IIa), (IIb), (IIc), (IId), (IIe), or (IIf), or a pharmaceutically acceptable salt thereof, is administered once every three months. In some embodiments, the compound of Formula (I), (IIa), (IIb), (IIc), (IId), (IIe), or (IIf), or a pharmaceutically acceptable salt thereof, is administered once every six months.

The compounds provided herein, or pharmaceutically acceptable salts thereof, can be administered by any useful route and means, such as by oral or parenteral (e.g., intravenous) administration. Therapeutically effective amounts of the compound, or a pharmaceutically acceptable salt thereof, may include from about 0.00001 mg/kg body weight per day to about 10 mg/kg body weight per day, such as from about 0.0001 mg/kg body weight per day to about 10 mg/kg body weight per day, or such as from about 0.001 mg/kg body weight per day to about 1 mg/kg body weight per day, or such as from about 0.01 mg/kg body weight per day to about 1 mg/kg body weight per day, or such as from about 0.05 mg/kg body weight per day to about 0.5 mg/kg body weight per day. In some embodiments, a therapeutically effective amount of the compounds provided herein, or pharmaceutically acceptable salts thereof, include from about 30 g to about 300 µg per day, from about 0.3 mg to about 30 mg per day, or from about 30 mg to about 300 mg per day, or from about 300 mg to about 1000 mg per day.

A compound of the present disclosure, or a pharmaceutically acceptable salt thereof, may be combined with one or more additional therapeutic agents in any dosage amount of the compound of the present disclosure or a pharmaceutically acceptable salt thereof (e.g., from 1 mg to 1000 mg of compound). Therapeutically effective amounts may include from about 0.1 mg per dose to about 1000 mg per dose, such as from about 50 mg per dose to about 500 mg per dose, or such as from about 100 mg per dose to about 400 mg per dose, or such as from about 150 mg per dose to about 350 mg per dose, or such as from about 200 mg per dose to about 300 mg per dose, or such as from about 0.01 mg per dose to about 1000 mg per dose, or such as from about 0.01 mg per dose to about 100 mg per dose, or such as from about 0.1 mg per dose to about 100 mg per dose, or such as from about 1 mg per dose to about 100 mg per dose, or such as from about 1 mg per dose to about 10 mg per dose, or such as from about 1 mg per dose to about 1000 mg per dose. Other therapeutically effective amounts of the compound of Formula (I), (IIa), (IIb), (IIc), (IId), (IIe), or (IIf), or a pharmaceutically acceptable salt thereof, are about 50, 100, 125, 150, 175, 200, 225, 250, 275, or 300 mg per dose. Other therapeutically effective amounts of the compound of Formula (I), (IIa), (IIb), (IIc), (IId), (IIe), or (IIf), or pharmaceutically acceptable salts thereof, are about 300, 325, 350, 375, 400, 425, 450, 475, 500, 525, 550, 575, 600, 625, 650, 675, 700, 725, 750, 775, 800, 825, 850, 875, 900, 925, 950, 975, or about 1000 mg per dose.

In some embodiments, a therapeutically effective amount of the compound of Formula (I), (IIa), (IIb), (IIc), (IId), (IIe), or (IIf), or a pharmaceutically acceptable salt thereof, is about 1 mg to about 1000 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 900 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 800 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 700 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 600 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 500 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 400 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 300 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 200 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 100 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 75 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 50 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 25 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 20 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 15 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 10 mg. In some embodiments, a therapeutically effective amount of the compound of Formula (I), (IIa), (IIb), (IIc), (IId), (IIe), or (IIf), or a pharmaceutically acceptable salt thereof, is about 1 mg to about 5 mg.

In some embodiments, a therapeutically effective amount of the compound of Formula (I), (IIa), (IIb), (IIc), (IId), (IIe), or (IIf), or a pharmaceutically acceptable salt thereof, is about 50 mg, about 75 mg, about 100 mg, about 125 mg, about 150 mg, about 175 mg, about 200 mg, about 225 mg, about 275 mg, about 300 mg, about 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, about 1000 mg, or about 1050 mg. In some embodiments, a therapeutically effective amount of the compound of Formula (I), (IIa), (IIb), (IIc), (IId), (IIe), or (IIf), or a pharmaceutically acceptable salt thereof, is about 5 mg. In some embodiments, a therapeutically effective amount of the compound of Formula (I), (IIa), (IIb), (IIc), (IId), (IIe), or (IIf), or a pharmaceutically acceptable salt thereof, is about 100 mg. In some embodiments, a therapeutically effective amount of the compound of Formula (I), (IIa), (IIb), (IIc), (IId), (IIe), or (IIf), or a pharmaceutically acceptable salt thereof, is about 150 mg. In some embodiments, a therapeutically effective amount of the compound of Formula (I), (IIa), (IIb), (IIc), (IId), (IIe), or (IIf), or a pharmaceutically acceptable salt thereof, is about 200 mg. In some embodiments, a therapeutically effective amount of the compound of Formula (I), (IIa), (IIb), (IIc), (IId), (IIe), or (IIf), or a pharmaceutically acceptable salt thereof, is about 250 mg. In some embodiments, a therapeutically effective amount of the compound of Formula (I), (IIa), (IIb), (IIc), (IId), (IIe), or (IIf), or a pharmaceutically acceptable salt thereof, is about 300 mg. In some embodiments, a therapeutically effective amount of the compound of Formula (I), (IIa), (IIb), (IIc), (IId), (IIe), or (IIf), or a pharmaceutically acceptable salt thereof, is about 350 mg. In some embodiments, a therapeutically effective amount of the compound of Formula (I), (IIa), (IIb), (IIc), (IId), (IIe), or (IIf), or a pharmaceutically acceptable salt thereof, is about 400 mg. In some embodiments, a therapeutically effective amount of the compound of Formula (I), (IIa), (IIb), (IIc), (IId), (IIe), or (IIf), or a pharmaceutically acceptable salt thereof, is about 450 mg. In some embodiments, a therapeutically effective amount of the compound of Formula (I), (IIa), (IIb), (IIc), (IId), (IIe), or (IIf), or a pharmaceutically acceptable salt thereof, is about 500 mg. In some embodiments, a therapeutically effective amount of the compound of Formula (I), (IIa), (IIb), (IIc), (IId), (IIe), or (IIf), or a pharmaceutically acceptable salt thereof, is about 550 mg. In some embodiments, a therapeutically effective amount of the compound of Formula (I), (IIa), (IIb), (IIc), (IId), (IIe), or (IIf), or a pharmaceutically acceptable salt thereof, is about 600 mg. In some embodiments, a therapeutically effective amount of the compound of Formula (I), (IIa), (IIb), (IIc), (IId), (IIe), or (IIf), or a pharmaceutically acceptable salt thereof, is about 650 mg. In some embodiments, a therapeutically effective amount of the compound of Formula (I), (IIa), (IIb), (IIc), (IId), (IIe), or (IIf), or a pharmaceutically acceptable salt thereof, is about 700 mg. In some embodiments, a therapeutically effective amount of the compound of Formula (I), (IIa), (IIb), (IIc), (IId), (IIe), or (IIf), or a pharmaceutically acceptable salt thereof, is about 750 mg. In some embodiments, a therapeutically effective amount of the compound of Formula (I), (IIa), (IIb), (IIc), (IId), (IIe), or (IIf), or a pharmaceutically acceptable salt thereof, is about 800 mg. In some embodiments, a therapeutically effective amount of the compound of Formula (I), (IIa), (IIb), (IIc), (IId), (IIe), or (IIf), or a pharmaceutically acceptable salt thereof, is about 850 mg. In some embodiments, a therapeutically effective amount of the compound of Formula (I), (IIa), (IIb), (IIc), (IId), (IIe), or (IIf), or a pharmaceutically acceptable salt thereof, is about 900 mg. In some embodiments, a therapeutically effective amount of the compound of Formula (I), (IIa), (IIb), (IIc), (IId), (IIe), or (IIf), or a pharmaceutically acceptable salt thereof, is about 950 mg. In some embodiments, a therapeutically effective amount of the compound of Formula (I), (IIa), (IIb), (IIc), (IId), (IIe), or (IIf), or a pharmaceutically acceptable salt thereof, is about 1000 mg. In some embodiments, a therapeutically effective amount of the compound of Formula (I), (IIa), (IIb), (IIc), (IId), (IIe), or (IIf), or a pharmaceutically acceptable salt thereof, is about 1050 mg. When administered orally, the total weekly dosage for a human subject may be between about 1 mg and 1,000 mg/week, between about 10-500 mg/week, between about 50-300 mg/week, between about 75-200 mg/week, or between about 100-150 mg/week. In some embodiments, the total weekly dosage for a human subject may be about 100, 200, 300, 400, 500, 600, 700, 800, 900, or 1000 mg/week administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 100 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 150 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 200 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 250 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 300 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 350 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 400 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 450 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 500 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 600 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 700 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 800 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 900 mg administered in a single dose. In some embodiments, the total weekly dosage for a human subject of a compound of Formula (I), (IIa), (IIb), (IIc), (IId), (IIe), or (IIf), or a pharmaceutically acceptable salt thereof, may be about 1000 mg administered in a single dose.

When administered orally, the total monthly dosage for a human subject of a compound of Formula (I), (IIa), (IIb), (IIc), (IId), (IIe), or (IIf), or a pharmaceutically acceptable salt thereof, may be between about 500 mg and 1,000 mg/month, between about 600-900 mg/month, or between about 700-800 mg/month. In some embodiments, the total weekly dosage for a human subject of a compound of Formula (I), (IIa), (IIb), (IIc), (IId), (IIe), or (IIf), or a pharmaceutically acceptable salt thereof, may be about 100, 200, 300, 400, 500, 600, 700, 800, 900, or 1000 mg/week administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 500 mg administered in a single dose. In some embodiments, the total monthly dosage for a human subject may be about 550 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 600 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 650 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 700 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 750 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 800 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 850 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 900 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 950 mg administered in a single dose. In some embodiments, the total monthly dosage for a human subject of a compound of Formula (I), (IIa), (IIb), (IIc), (IId), (IIe), or (IIf), or a pharmaceutically acceptable salt thereof, may be about 1000 mg administered in a single dose.

A single dose can be administered hourly, daily, weekly, or monthly. For example, a single dose can be administered once every 1 hour, 2, 3, 4, 6, 8, 12, 16 or once every 24 hours. A single dose can also be administered once every 1 day, 2, 3, 4, 5, 6, or once every 7 days. A single dose can also be administered once every 1 week, 2, 3, or once every 4 weeks. In certain embodiments, a single dose can be administered once every week. A single dose can also be administered once every month. In some embodiments, a compound provided herein, or a pharmaceutically acceptable salt thereof, is administered once daily in a method disclosed herein. In some embodiments, a compound provided herein, or a pharmaceutically acceptable salt thereof, is administered twice daily in a method disclosed herein.

In some embodiments, a compound provided herein, or a pharmaceutically acceptable salt thereof, is administered once daily in a method disclosed herein. In some embodiments, a compound provided herein, or a pharmaceutically acceptable salt thereof, is administered once weekly in a method disclosed herein. In some embodiments, a compound provided herein, or a pharmaceutically acceptable salt thereof, is administered once monthly in a method disclosed herein. In some embodiments, a compound provided herein, or a pharmaceutically acceptable salt thereof, is administered once every two months in a method disclosed herein. In some embodiments, a compound provided herein, or a pharmaceutically acceptable salt thereof, is administered once every three months in a method disclosed herein. In some embodiments, a compound provided herein, or a pharmaceutically acceptable salt thereof, is administered once every six months in a method disclosed herein.

In some embodiments, a compound provided herein, or a pharmaceutically acceptable salt thereof, is administered orally in a single dose of about 100 mg once weekly. In some embodiments, a compound provided herein, or a pharmaceutically acceptable salt thereof, is administered orally in a single dose of about 150 mg once weekly. In some embodiments, a compound provided herein, or a pharmaceutically acceptable salt thereof, is administered orally in a single dose of about 200 mg once weekly. In some embodiments, a compound provided herein, or a pharmaceutically acceptable salt thereof, is administered orally in a single dose of about 250 mg once weekly. In some embodiments, a compound provided herein, or a pharmaceutically acceptable salt thereof, is administered orally in a single dose of about 300 mg once weekly. In some embodiments, a compound provided herein, or a pharmaceutically acceptable salt thereof, is administered orally in a single dose of about 350 mg once weekly. In some embodiments, a compound provided herein, or a pharmaceutically acceptable salt thereof, is administered orally in a single dose of about 400 mg once weekly. In some embodiments, a compound provided herein, or a pharmaceutically acceptable salt thereof, is administered orally in a single dose of about 450 mg once weekly. In some embodiments, a compound provided herein, or a pharmaceutically acceptable salt thereof, is administered orally in a single dose of about 500 mg once weekly. In some embodiments, a compound provided herein, or a pharmaceutically acceptable salt thereof, is administered orally in a single dose of about 600 mg once weekly.

In some embodiments, a compound provided herein, or a pharmaceutically acceptable salt thereof, is administered orally in a single dose of about 500 mg once monthly. In some embodiments, a compound provided herein, or a pharmaceutically acceptable salt thereof, is administered orally in a single dose of about 550 mg once monthly. In some embodiments, a compound provided herein, or a pharmaceutically acceptable salt thereof, is administered orally in a single dose of about 600 mg once monthly. In some embodiments, a compound provided herein, or a pharmaceutically acceptable salt thereof, is administered orally in a single dose of about 650 mg once monthly. In some embodiments, a compound provided herein, or a pharmaceutically acceptable salt thereof, is administered orally in a single dose of about 700 mg once monthly. In some embodiments, a compound provided herein, or a pharmaceutically acceptable salt thereof, is administered orally in a single dose of about 750 mg once monthly. In some embodiments, a compound provided herein, or a pharmaceutically acceptable salt thereof, is administered orally in a single dose of about 800 mg once monthly. In some embodiments, a compound provided herein, or a pharmaceutically acceptable salt thereof, is administered orally in a single dose of about 850 mg once monthly. In some embodiments, a compound provided herein, or a pharmaceutically acceptable salt thereof, is administered orally in a single dose of about 900 mg once monthly. In some embodiments, a compound provided herein, or a pharmaceutically acceptable salt thereof, is administered orally in a single dose of about 950 mg once monthly. In some embodiments, a compound provided herein, or a pharmaceutically acceptable salt thereof, is administered orally in a single dose of about 1000 mg once monthly.

The frequency of dosage of the compound of the present disclosure, or a pharmaceutically acceptable salt thereof, will be determined by the needs of the individual patient and can be, for example, once per day, once per week, once per month, once per every two months, once per every three months, or once per every six months. Administration of the compound, or a pharmaceutically acceptable salt thereof, continues for as long as necessary to treat the herpesvirus infection, including an HSV-1 and an HSV-2 infection, or any other indication described herein. For example, a compound, or a pharmaceutically acceptable salt thereof, can be administered to a human suffering from a herpesvirus infection, including an HSV-1 and an HSV-2 infection, for the duration of the human's life.

Administration can be intermittent, with a period of several or more days during which a patient receives a daily dose of the compound of the present disclosure, or a pharmaceutically acceptable salt thereof, followed by a period of several or more days during which a patient does not receive a daily dose of the compound or a pharmaceutically acceptable salt thereof. For example, a patient can receive a dose of the compound, or a pharmaceutically acceptable salt thereof, every other day, or three times per week. Again by way of example, a patient can receive a dose of the compound, or a pharmaceutically acceptable salt thereof, each day for a period of from 1 to 14 days, followed by a period of 7 to 21 days during which the patient does not receive a dose of the compound, or a pharmaceutically acceptable salt thereof, followed by a subsequent period (e.g., from 1 to 14 days) during which the patient again receives a daily dose of the compound, or a pharmaceutically acceptable salt thereof. Alternating periods of administration of the compound, or a pharmaceutically acceptable salt thereof, followed by non-administration of the compound, or a pharmaceutically acceptable salt thereof, can be repeated as clinically required to treat the patient.

The compounds of the present disclosure, or pharmaceutically acceptable salts thereof, or the pharmaceutical compositions of the present disclosure may be administered once, twice, three, or four times daily, using any suitable mode described above. Also, administration or treatment with the compounds, or pharmaceutically acceptable salts thereof, may be continued for a number of days; for example, commonly treatment would continue for at least 7 days, 14 days, or 28 days, for one cycle of treatment. Treatment cycles are well known for herpesvirus infections, including an HSV-1 and an HSV-2 infection. In some embodiments, treatment cycles are frequently alternated with resting periods of about 1 to 28 days, commonly about 7 days or about 14 days, between cycles. The treatment cycles, in other embodiments, may also be continuous.

The effective dosage of active ingredient employed may vary depending on the particular compound employed, the mode of administration, the condition being treated and the severity of the condition being treated. Such dosage may be ascertained readily by a person skilled in the art.

Combinations

In some embodiments, a compound of Formula (I), (IIa), (IIb), (IIc), (IId), (IIe), or (IIf), provided herein, or pharmaceutically acceptable salt thereof, is administered in combination with one or more additional therapeutic agents to treat or prevent a disease or condition disclosed herein. In some embodiments, the one or more additional therapeutic agents are one, two, three, or four additional therapeutic agents. In some embodiments, the one or more additional therapeutic agents are one additional therapeutic agent. In some embodiments, the one or more additional therapeutic agents are two additional therapeutic agents. In some embodiments, the one or more additional therapeutic agents are three additional therapeutic agents. In some embodiments, the one or more additional therapeutic agents are four additional therapeutic agents.

In some embodiments, the pharmaceutical compositions provided herein have a compound of Formula (I), (IIa), (IIb), (IIc), (IId), (IIe), or (IIf) provided herein, or pharmaceutically acceptable salt thereof, and one or more additional therapeutic agents. In some embodiments, the one or more additional therapeutic agents are one, two, three, or four additional therapeutic agents. In some embodiments, the one or more additional therapeutic agents are one additional therapeutic agent. In some embodiments, the one or more additional therapeutic agents are two additional therapeutic agents. In some embodiments, the one or more additional therapeutic agents are three additional therapeutic agents. In some embodiments, the one or more additional therapeutic agents are four additional therapeutic agents.

In some embodiments, the one or more additional therapeutic agents include, e.g., DNA polymerase inhibitors such as, brincidofovir; Protein Jumonji inhibitors such as, ML-324, dimethyloxaloylglycine; Interferon alpha 2 ligand modulators such as, interferon alfa-2b, Alpharekin®, recombinant human interferon alfa-2b follow-on biologic, Herpferon®, Anterferon®; Nicotinic acetylcholine receptor antagonists such as, RPI-MN; Virus specific T cell therapies such as off-the-shelf single-virus specific T-cell (VST) therapy, ALVR-108, multi-virus-specific T cells TI1; Other drugs for the treatment of Herpesvirus infection such as, BOR-15001L7, lidocaine, Bryostatin-23; or any combination thereof.

In some embodiments, the one or more additional therapeutic agents include, e.g., anti-Herpesvirus envelope glycoprotein D antibodies such as m27f; Progesterone receptor agonists such as, levonorgestrel; or HIV-1 reverse transcriptase inhibitors such as, tenofovir; or any combination thereof.

In some embodiments, the one or more additional therapeutic agents include, e.g., Endonuclease modulators such as, meganucleases; Interferon alpha ligand/Interferon gamma receptor antagonists such as, Anaferon®, or any combination thereof.

In some embodiments, the one or more additional therapeutic agents include, e.g., CCR5 chemokine modulators; DNA polymerase inhibitors; DNA primase inhibitors; Fatty acid synthase inhibitors; Glucocorticoid receptor agonists; Helicase inhibitors; Herpesvirus envelope glycoprotein D inhibitors; Hsp 90 inhibitors; Human cytomegalovirus glycoprotein inhibitors; Hyaluronidase inhibitors; Interferon alpha 1 ligands; Interferon alpha 2 ligands; Interferon beta ligands; T-cell surface glycoprotein CD8 stimulators; or Cyclin dependent kinase inhibitors, or any combination thereof.

In some embodiments, the one or more additional therapeutic agents include, e.g., DNA primase-helicase inhibitors such as, amenamevir, pritelivir, IM-250; DNA polymerase inhibitors such as famciclovir, penciclovir, valaciclovir, acyclovir, foscarnet sodium; CCR5 chemokine modulators/Human cytomegalovirus glycoprotein inhibitors such as, MB-66; Hsp 90 inhibitors such as, BJ-B11; Glucocorticoid receptor agonists such as, hydrocortisone; Interferon alpha 1 ligand modulators such as, interferon alpha 1b, recombinant human interferon alpha 1b; Interferon alpha 2 ligand modulators such as, recombinant human interferon alpha-2b, KW-045; Interferon beta ligand modulators such as, interferon beta-1a (RebiSmart™); anti-HSV envelope glycoprotein D antibodies, such as UB-621; T-cell surface glycoprotein CD8 stimulators such as, immunogenic peptides, Fatty acid synthase inhibitors such as, TVB-2640; anti-herpes simplex virus monoclonal antibodies such as, HDIT-101; or other drugs for the treatment of Herpes simplex virus infection such as, idoxuridine, BTL-TML-HSV, docosanol, MAR-8644, MAR-8658, NV-HHV-101, PRL-01, HN-0037; or any combination thereof.

In some embodiments, the one or more additional therapeutic agents include, e.g., Hyaluronidase inhibitors such as, astodrimer (SPL-7013); Live-attenuated HSV vaccines such as, RVx-101 HSV-1; Live-attenuated HSV vaccine with deletions in UL20 and UL53 such as, VC2; Live-attenuated HSV vaccine mutated in R2 coding region of UL37 such as, $R^2$; or HSV-2 subunit trivalent vaccine (containing gC2, gD2, gE2) such as, HSV-2 Trivalent Vaccine; or any combination thereof.

In some embodiments, the one or more additional therapeutic agents include, e.g., live attenuated recombinant vaccines such as, AuroVax; HSV-2 replication-defective vaccine with UL5 and UL29 deleted such as, HSV-529; mRNA vaccine targeted against HSV-2 disease such as, mRNA-1608; or any combination thereof.

In some embodiments, the one or more additional therapeutic agents include, e.g., CD4 agonists; CD89 agonists; Duffy antigen chemokine receptor modulators; Herpesvirus envelope glycoprotein D inhibitors; HIV gp120 protein inhibitors; HIV gp160 protein inhibitors; HIV gp41 protein inhibitors; Immunoglobulin G agonists; Nicotinic acetylcholine receptor antagonists; TAT protein modulators; T-cell surface glycoprotein CD8 stimulators; or TLR-4 agonist; or any combination thereof.

In some embodiments, the one or more additional therapeutic agents include, e.g., Nicotinic acetylcholine receptor antagonists such as, RPI-78M; anti-herpes simplex virus monoclonal antibodies such as, HDIT-101; anti-herpesvirus envelope glycoprotein D antibodies such as, UB-621; TLR-4 agonists such as, IDC-G103 vaccines; Inactivated HSV-1 and HSV-2 vaccines such as, Vitaherpavac®; live Inactivated HSV-1 and HSV-2 vaccines such as, Theravax-HSV-2 vaccine; formalin-inactivated herpesvirus (FI-HSV2) vaccine; or RBT-26 T-cell-based subunit vaccine; DNA vaccines such as, pDNA/rVSV vector vaccine; or other drugs for the treatment of HSV-2 such as, EBT-105, Alloferon™; or any combination thereof.

In some embodiments, the one or more additional therapeutic agents include, e.g., HIV gp120/gp160/gp41 protein inhibitors such as, griffithsin; Hyaluronidase inhibitors such as, astodrimer (SPL-7013); CD4 agonist/T-cell surface glycoprotein CD8 vaccine such as GENO-2; TAT protein modulators such as HerpesVaxTat® vaccines; CD89 agonist/Duffy antigen chemokine receptor modulator/Immunoglobulin G agonist such as, glycoprotein D+liposome encapsulated glycoprotein D boost vaccine; or vaccines such as, Profavax-HSV-2 vaccine; HSV-2 mRNA vaccine; glycoprotein D DNA vaccine; or any combination thereof.

In some embodiments, the one or more additional therapeutic agents include, e.g., DNA vaccines such as, HSV-2 vaccine Admedus; RNA vaccines such as, GSK-4108771A; Live attenuated virus vaccines such as, EXD-12; live-attenuated delta-gD2 based viral vaccines; Vaccines such as, NE-gD2 intranasal nanoemulsion NE-based adjuvanted HSV-2 vaccine; or other drugs for the treatment of HSV-2 such as, EBT-105, Alloferon™; or any combination thereof.

In some embodiments, the one or more additional therapeutic agents include, e.g., antimicrobial peptoids; CD4 modulators; CRISPR associated endonuclease Cas9 modulators; Cyclin-dependent kinase-9 inhibitors; DNA polymerase inhibitors; Nicotinic acetylcholine receptor antagonists; TAT protein modulators; Thymidine kinase inhibitors; or viral envelope protein inhibitors; or any combination thereof.

In some embodiments, the one or more additional therapeutic agents include, e.g., DNA polymerase inhibitors/Thymidine kinase inhibitors such as acyclovir; CRISPR associated endonuclease Cas9 modulators such as, EBT-104; Nicotinic acetylcholine receptor antagonists such as, RPI-78M; Cyclin-dependent kinase-9 inhibitors such as, FIT-039; Other drugs for HSV-1 treatment such as, ZEP-3Na, MXB-009; CD4 modulator peptide vaccine such as, CEL-1000; Vaccines such as, Inactivated HSV-1 and HSV-2 vaccines such as, Vitaherpavac® (anti-herpes vaccine); live Inactivated HSV-1 and HSV-2 vaccines such as, Theravax-HSV-1 vaccine; or Viral envelope protein inhibitors such as, MXB-005; or a combination thereof.

In some embodiments, the one or more additional therapeutic agents include, e.g., TAT protein modulators such as HerpesVaxTat® vaccine; or Vaccines such as, Profavax-HSV-1 vaccine; or a combination thereof.

In some embodiments, the one or more additional therapeutic agents include, e.g., Live attenuated virus vaccines such as, EXD-12; or live-attenuated delta-gD2 based viral vaccines; or a combination thereof.

In some embodiments, the one or more additional therapeutic agents include, e.g., DNA polymerase inhibitors; Herpesvirus envelope glycoprotein D inhibitors; or Interferon alpha 2 ligand; or a combination thereof.

In some embodiments, the one or more additional therapeutic agents include, e.g., DNA polymerase inhibitors such as, famciclovir, penciclovir; Interferon alpha 2 ligand modulators such as, Yallaferon®; anti-Herpesvirus envelope glycoprotein D antibodies such as, UB-621; or other drugs for treatment of genital herpes such as, interferon gamma, Alloferon™, ZEP-3Na; or a combination thereof.

In some embodiments, the one or more additional therapeutic agents include, e.g., Vaccines such as, NE-gD2 intranasal nanoemulsion NE-based adjuvanted vaccine; or other drugs for the treatment and prevention of genital herpes such as, SQX-77, anti-STI antibodies; or a combination thereof.

In some embodiments, the one or more additional therapeutic agents include, e.g., SAPNs (self-assembling protein nanoparticles) based herpes vaccine.

In some embodiments, the one or more additional therapeutic agents include, e.g., CMV 65 kDa lower matrix phosphoprotein modulators; DNA polymerase inhibitors; G protein coupled receptor homolog US28 antagonists; Herpesvirus envelope glycoprotein B stimulators; HLA class I antigen A-11 alpha modulators; HLA class I antigen A-2 alpha modulators; HLA class I antigen A-24 alpha modulators; Human cytomegalovirus glycoprotein B inhibitors; Human cytomegalovirus glycoprotein B modulators; Human cytomegalovirus glycoprotein H modulators; Human cytomegalovirus glycoprotein inhibitors; Large terminase protein inhibitors; Ribonuclease stimulators; Serine threonine protein kinase UL97 modulators; Syntaxin-5 inhibitors; Transferase inhibitors; or Viral ribonucleotide reductase inhibitors; or a combination thereof.

In some embodiments, the one or more additional therapeutic agents include, e.g., DNA polymerase inhibitors such as, ganciclovir, fomivirsen, fomivirsen sodium, valganciclovir; DNA polymerase inhibitor/Serine threonine protein kinase UL97 modulators such as, filociclovir; G protein coupled receptor homolog US28 antagonists such as, SYN-002; Large terminase protein inhibitors such as, AIC-387, AIC-476; Serine threonine protein kinase UL97 inhibitors such as, maribavir; Viral ribonucleotide reductase inhibitors such as, didox; Ribonuclease stimulators such as, ranpirnase; HLA class I antigen A-11 alpha modulators/HLA class I antigen A-2 alpha modulators/HLA class I antigen A-24 alpha modulators such as, allogenic anti-CMV-TCR-T-cell therapy, YT-CMV-22, YT-CMV-27 and YT-CMV-45; Human cytomegalovirus glycoprotein B inhibitors such as, CMV-345; Other drugs for treatment of CMV such as, USC-505, USC-596, CMV pp65 and ppM83 derived peptides, artemifone (BAY-44-9585), PG-36, CMX-16669, HN-0141, ALVR-105, NPP-669, CMV pH4 human immunoglobulin, Cytovir™ anti-viral cytotoxic T-cell therapy, CMV TCR-transduced T-cells, adimlecleucel; or Polyclonal antibodies such as, Cytogam®; or a combination thereof.

In some embodiments, the one or more additional therapeutic agents include, e.g., Syntaxin-5 inhibitors such as, Retro-94; Large terminase protein inhibitors such as, letermovir; DNA polymerase inhibitors such as, valganciclovir; anti-CMV antibodies such as, BT-084 (Cytotect® CP); Human cytomegalovirus glycoprotein B and glycoprotein H modulator vaccines such as mRNA-1647; CMV 65 kDa lower matrix phosphoprotein vaccines such as, IRB-12022; or Vaccines such as, mRNA-based vaccine; BD-03 plasmid DNA vaccine; V-212 heat-treated varicella zoster virus vaccine; protein subunit vaccines such as, VBI-1501A; CMV-MVA pentamer vaccine (RhUL128C-MVA); CMV-MVA Triplex vaccine; VLP based vaccine SPYVLP-102; or any combination thereof.

In some embodiments, the one or more additional therapeutic agents include, e.g., Human cytomegalovirus glycoprotein inhibitors such as, CMV-IVIG; Additional drugs for the treatment or prevention of CMV such as, artemisinin derivatives, NPC-21; Herpesvirus envelope glycoprotein B stimulator vaccine such as, HB-101; CMV 65 kDa lower matrix phosphoprotein modulator vaccine such as, AVX-601; Vaccines such as, CMV vaccine; CMVpp65 peptide vaccine; V-160; or Multivirus-specific cytotoxic T-cell therapy; or any combination thereof.

In some embodiments, the one or more additional therapeutic agents include, e.g., DNA polymerase inhibitors such as, ganciclovir, fomivirsen, cidofovir, valganciclovir, foscarnet sodium.

In some embodiments, the one or more additional therapeutic agents include, e.g., DNA polymerase inhibitors; Helicase inhibitors; Immunoglobulin agonists; Interferon alpha 2 ligands; Interferon alpha ligand modulators; Interferon beta ligands; or TLR-4 agonists; or any combination thereof.

In some embodiments, the one or more additional therapeutic agents include, e.g., DNA polymerase inhibitors such as, penciclovir, famciclovir, valaciclovir, acyclovir, USC-373; DNA primase inhibitor-helicase inhibitor such as, amenamevir; Interferon alpha 2 ligand modulators such as, interferon alfa-2b, Yallaferon®, pegylated interferon alpha-1b, INTEFEN®, interferon alpha-2a, Anterferon®; Interferon beta ligand modulators such as, RebiSmart™; Immunoglobulin agonists such as, Varicellon®, Zoster Immunoglobulin-VF; Vaccines such as, varicella vaccine (live attenuated); MMRV vaccine; herpes zoster vaccine; zoster recombinant adjuvanted vaccine; or Drugs for treatment of Varicella zoster virus infection such as, HerpeCide™; or any combination thereof.

In some embodiments, the one or more additional therapeutic agents include, e.g., Vaccines such as, ProQuad®; Priorix-Tetra® (MeMuRu-OKA); protein subunit TLR-4 agonist vaccines such as, CRV-101; VZV ORF29 mutant-based vaccine; varicella vaccine (live attenuated); chickenpox vaccine Sinovac; Varilrix® vaccine (VZV-OKA-strain); attenuated recombinant subunit vaccine containing gE such as, GSK-137173A; protein subunit vaccines such as, SP-0204; pneumococcal conjugate vaccines such as, SP-0202; triple live-attenuated vaccines such as, M-M-RvaxPRO®; adenovirus-vectored vaccine such as, VTP-400; recombinant varicella-zoster virus vaccine; recombinant herpes zoster vaccine; inactivated varicella-zoster vaccine; Live attenuated viral vaccines such as, NBP-608, Suduvax® II, VZV-7D; or anti-Varicella Zoster virus antibodies such as, VariZIG®; or any combination thereof.

In some embodiments, the one or more additional therapeutic agents include, e.g., drugs for treatment or prevention of Varicella zoster virus infection such as, OV-02; or vaccines such as, EG-HZ; or any combination thereof.

In some embodiments, the one or more additional therapeutic agents include, e.g., interferon alpha 2 ligand; DNA polymerase inhibitors; transferase inhibitors; CRISPR associated endonuclease Cas9 modulators; LAT gene inhibitor; or gene inhibitors; or any combination thereof.

In some embodiments, the one or more additional therapeutic agents include, e.g., DNA polymerase inhibitors such as, acyclovir, ganciclovir; Interferon alpha 2 ligand modulators such as, interferon alfa-2b, Anterferon®; CRISPR associated endonuclease Cas9 modulator/gene inhibitors such as, HSV-1-targeted CRISPR/Cas9 gene therapy; LAT gene inhibitors such as, IFNγ/LAT siRNA gene therapy (rdHSV1 vector, herpes simplex keratitis); additional drugs for the treatment of herpetic keratitis such as, EKC-Cide™; or any combination thereof.

In some embodiments, the one or more additional therapeutic agents include, e.g., Basigin inhibitors; Envelope glycoprotein GP350 modulators; Epstein-Barr nuclear antigen 1 inhibitors; Epstein-Barr nuclear antigen 1 stimulators; HLA class I antigen A-11 alpha modulators; HLA class I antigen A-2 alpha modulators; HLA class I antigen A-24 alpha modulators; Human cytomegalovirus glycoprotein B modulators; Human cytomegalovirus glycoprotein H modulators; Human cytomegalovirus glycoprotein L modulators; Latent membrane protein 1 modulators; Latent membrane protein 2 stimulators; NKG2D ligand modulators; or Secreted protein BARF1 modulators; or any combination thereof.

In some embodiments, the one or more additional therapeutic agents include, e.g., NKG2D ligand modulators such as, pamidronic acid; Epstein-Barr nuclear antigen 1 inhibitors such as, VK-2019, anti-Epstein-Barr virus (EBV) peptides; HLA class I antigen A-11 alpha/HLA class I antigen A-2 alpha/HLA class I antigen A-24 alpha modulators such as, allogenic anti-EBV-TCR-T-cells, YT-EBV-44; Additional drugs for EBV treatment such as, ALVR-105, antiviral cytotoxic T-cell therapy; Epstein-Barr nuclear antigen/Latent membrane protein 1 and protein 2/Secreted protein BARF1 modulators such as, baltaleucel-T (CMD-003); or mRNA vaccines such as, mRNA-1195; or any combination thereof.

In some embodiments, the one or more additional therapeutic agents include, e.g., basigin modulators such as, EBV gH/gL/gp42 vaccine; or basigin modulator/Envelope glycoprotein GP350 modulator/Human cytomegalovirus glycoprotein B modulator/Human cytomegalovirus glycoprotein H modulator/Human cytomegalovirus glycoprotein L modulator such as, mRNA-1189 vaccine; vaccines such as, EBV gH/gL vaccine; P-989; mRNA vaccine; or EBV cancer vaccine (mRNA, LPP nanoparticle); or any combination thereof.

In some embodiments, the one or more additional therapeutic agents include, e.g., Epstein-Barr nuclear antigen 1/Latent membrane protein 2 stimulators such as MVA-based vaccines; Multivirus-specific cytotoxic T-cell therapy; or vaccines such as, EBV-VLP vaccine; or any combination thereof.

In some embodiments, the one or more additional therapeutic agents include, e.g., DNA polymerase inhibitors.

In some embodiments, the one or more additional therapeutic agents include, e.g., DNA polymerase inhibitors such as, brincidofovir; Drugs for herpesvirus type 6 treatment such as, ALVR-105; Multivirus-specific cytotoxic T-cell therapy; or HHV-6B glycoprotein complex gH/gL/gQ1/gQ2 subunit vaccine; or any combination thereof.

EXAMPLES

The following examples are included to demonstrate specific embodiments of the disclosure. It should be appreciated by those of skill in the art that the techniques disclosed in the examples which follow represent techniques to function well in the practice of the disclosure, and thus can be considered to constitute specific modes for its practice. However, those of skill in the art should, in light of the present disclosure, appreciate that these examples are exemplary and not exhaustive. Many changes can be made in the specific embodiments which are disclosed and still obtain a like or similar result without departing from the spirit and scope of the disclosure.

Compounds disclosed herein can be prepared according to the procedures of the following Schemes and Examples, using appropriate materials and are further exemplified by the following specific examples. Moreover, by utilizing the procedures described herein, in conjunction with ordinary skills in the art, additional compounds of the present disclosure claimed herein can be readily prepared. The examples further illustrate details for the preparation of the compounds of the present disclosure. Those skilled in the art will readily understand that known variations of the conditions and processes of the following preparative procedures can be used to prepare these compounds. For synthesizing compounds which are embodiments described in the present disclosure, inspection of the structure of the compound to be synthesized will provide the identity of each substituent group. In some cases, the identity of the final product can render apparent the identity of the necessary starting materials by a process of inspection, given the examples herein. Compounds can be isolated in the form of their pharmaceutically acceptable salts, such as those described above. Compounds described herein are typically stable and isolatable at room temperature and pressure.

An illustration of the preparation of compounds disclosed herein is shown below. Unless otherwise indicated, variables have the same meaning as described above. The examples presented below are intended to illustrate particular embodiments of the disclosure. Suitable starting materials, building blocks and reagents employed in the synthesis as described below are commercially available from AbovChem, Acros Organics, Astatech, Combi Blocks, Oakwood Chemical, or Sigma-Aldrich, for example, or can be routinely prepared by procedures described in the literature, for example in "March's Advanced Organic Chemistry: Reactions, Mechanisms, and Structure", $5^{th}$ Edition; John Wiley & Sons or T. Eicher, S. Hauptmann "The Chemistry of Heterocycles; Structures, Reactions, Synthesis and Application", $2^{nd}$ edition, Wiley-VCH 2003; Fieser et al. "Fiesers' Reagents for organic Synthesis" John Wiley & Sons 2000.

LIST OF ABBREVIATIONS AND ACRONYMS

Abbreviation/Acronym Meaning
Ac Acetate
AcOH Acetic acid
aq. Aqueous
Ar Argon
Bn Benzyl
BnSH Benzyl mercaptan
Boc tert-Butyloxycarbonyl
$Boc_2O$ Di-tert-butyl dicarbonate
$Bu_4N$ Tetrabutylammonium
DCM Dichloromethane
DIEA or DIPEA N,N-diisopropylethylamine
DMAP 4-dimethylaminopyridine
DMF N,N-Dimethylformamide
DMSO Dimethylsulfoxide
eq. or equiv equivalent
Et Ethyl
$Et_3N$ Triethylamine
EtOAc Ethyl acetate
h or hr(s) Hour(s)
HPLC High pressure liquid chromatography
i-Pr Isopropyl
LCMS Liquid chromatography mass spectrometry
Me Methyl
MeOH Methanol
MPLC Medium pressure liquid chromatography
MS Mass spectrometry
m/z Mass to charge ratio
NMR Nuclear magnetic resonance spectroscopy
PhMe Toluene
RT or rt Room temperature
sat. or satd. Saturated
SFC supercritical fluid chromatography
t-Bu or tBu tert-Butyl
TCFH chloro(dimethylamino)-N,N-dimethylmethaniminium hexafluorophosphate
TFA Trifluoroacetic acid
THF Tetrahydrofuran General Procedure A

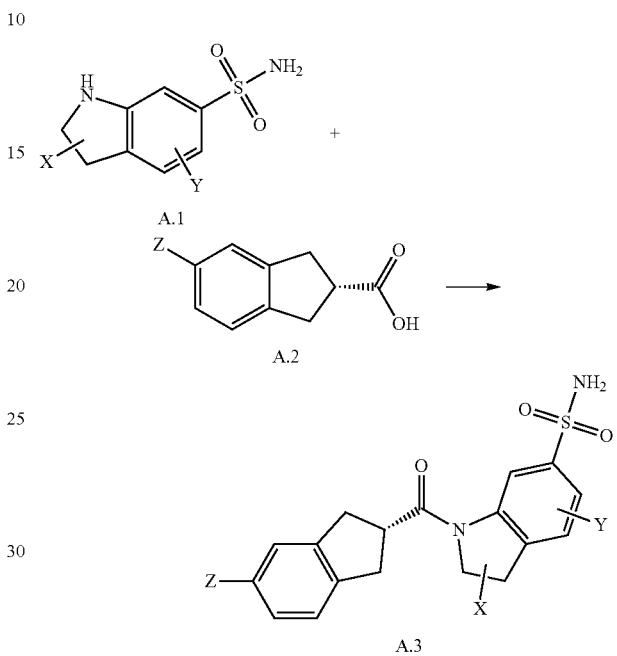

Compounds of formula A.3 may be produced by amide coupling (reactions similar to those described in Chem. Soc. Rev., 2009, 38, 606-631; Amide bond formation: beyond the myth of coupling reagents) from Intermediates A.1 and A.2. An Exemplary procedure is as follow: Intermediates A.1 (1 equiv) and A.2 (1 equiv) are suspended in acetonitrile (10 V). TCFH (1.2 equiv) is then added, followed by dropwise addition of N-methylimidazole (3 equiv) while maintaining the internal temperature at or below 25° C. After complete consumption of starting materials, the reaction mixture is purified by reverse phase HPLC to afford the title compound of type A.3.

General Procedure B

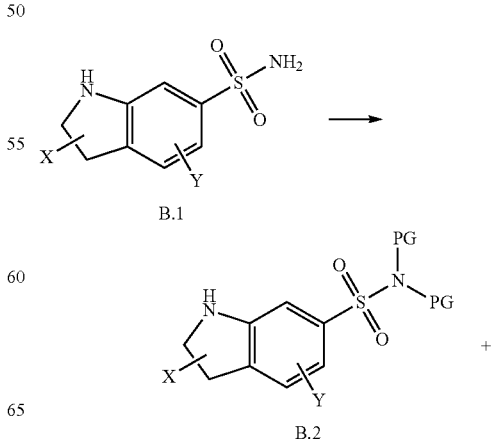

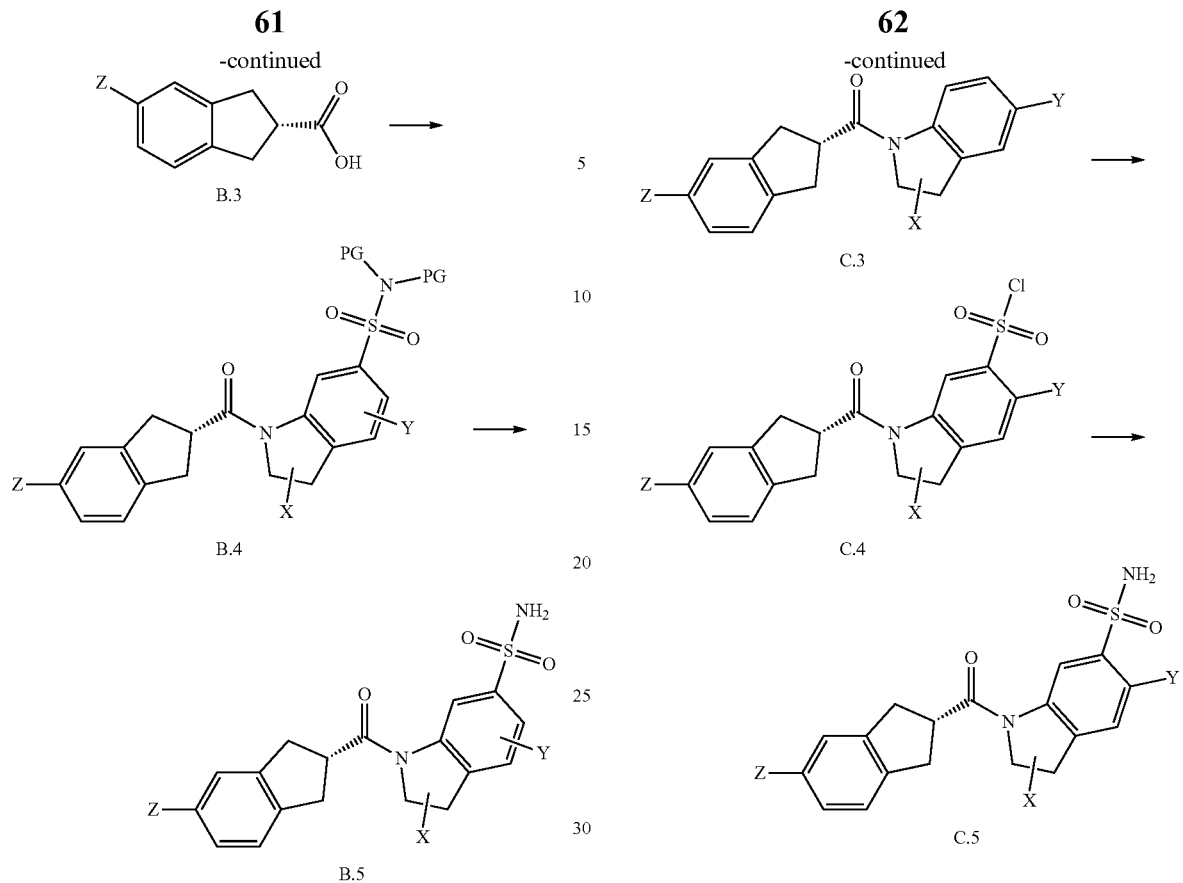

Intermediates of type B.1 are protected with a suitable protecting group (e.g. Boc, PMB, DMB, DMFDMA, etc.) to afford Intermediate B.2. In the subsequent amide coupling step, Intermediate B.2 (1 equiv) and Intermediate B.3 (1 equiv) are suspended in acetonitrile (10 V). TCFH (1.2 equiv) is then added, followed by dropwise addition of N-methylimidazole (3 equiv) while maintaining internal temperature at or below 25° C. Following consumption of Intermediates B.2 and B.3 and conversion to Intermediates of type B.4, removal of the relevant protecting group is carried out in the same pot using suitable conditions (e.g., TFA, hydrazine, etc.). After complete protecting group removal, addition of water (30 V) may result in precipitation of solid material, which is filtered, washed, and dried to afford compounds of type B.5.

General Procedure C

Intermediates of type C.1 (1 equiv) and C.2 (1 equiv) are suspended in acetonitrile (10 V). TCFH (1.2 equiv) is then added, followed by dropwise addition of N-methylimidazole (3 equiv) while maintaining the internal temperature at or below 25° C. Following consumption of Intermediates C.1 and C.2, silica gel is added, the solvent is removed under reduced pressure, and the resulting compound adsorbed onto silica gel is purified by flash column chromatography to provide compounds of type Intermediate C.3. Intermediate C.3 is then dissolved in chloroform (5 V) and chlorosulfonic acid (5 V). The mixture is then stirred at 65° C. until consumption of Intermediate C.3 is observed, at which time, the mixture is carefully poured over ice. The resulting precipitated solid of type Intermediate C.4 is filtered and dissolved in dichloromethane (5 V), and 6 N ammonium hydroxide is added (25 equiv). After complete consumption of Intermediate C.4, the mixture is diluted with dichloromethane (25 V), and the organic phase is washed sequentially with water (10 V) and brine (10 V), and then dried over magnesium sulfate. Following filtration and concentration, the crude residue is purified using reverse phase HPLC to afford compounds of type C.5.

Preparation of Intermediate 1:
7-methylindoline-6-sulfonamide

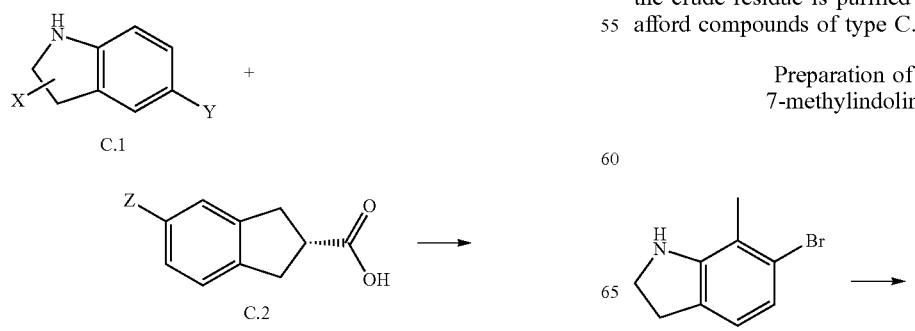

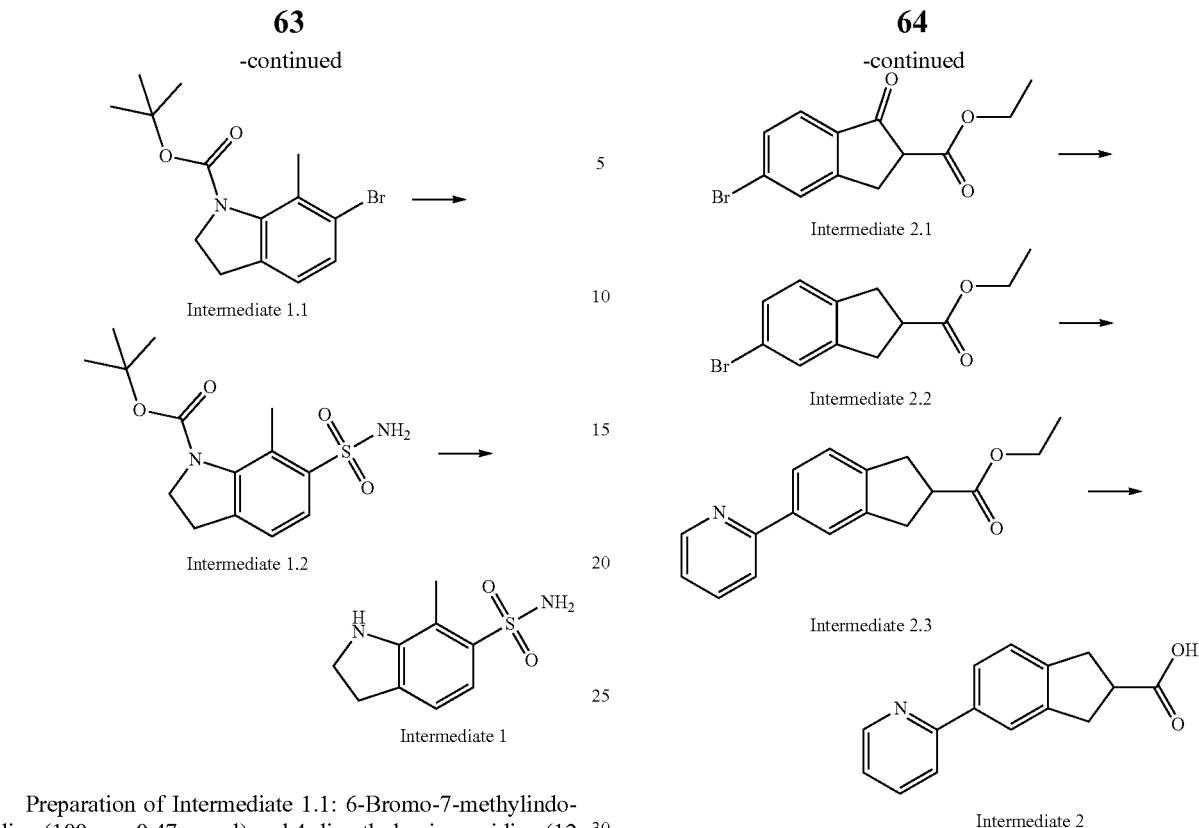

Preparation of Intermediate 1.1: 6-Bromo-7-methylindoline (100 mg, 0.47 mmol) and 4-dimethylaminopyridine (12 mg, 0.2 equiv) were taken up in tetrahydrofuran (5 mL). The solution was cooled to 0° C. and di-tert-butyl dicarbonate (134 mg, 1.3 equiv) was then added at once. The mixture was warmed to room temperature and stirred overnight, at which time silica gel was added and solvent was removed under reduced pressure. The resulting crude material was purified by flash column chromatography on silica gel (0 to 20% ethyl acetate in hexanes) to give Intermediate 1.1. LCMS: 312.1 [M+H].

Preparation of Intermediate 1.2: Intermediate 1.1 (110 mg, 0.35 mmol) was taken up in tetrahydrofuran (5 mL) and cooled to −78° C. n-Butyllithium (2.4 M in hexanes, 0.22 mL, 1.5 equiv) was then added dropwise and was allowed to stir at the same temperature for 5 minutes. 2-methyl-2-(sulfinylamino)oxypropane (95 mg, 2 equiv) was then added at once and the mixture was allowed to warm to room temperature and stirred overnight. Silica gel was then added and the solvent was removed under reduced pressure. The resulting crude material was purified by flash column chromatography on silica gel (0 to 10% methanol in dichloromethane) to give Intermediate 1.2. LCMS: 313.1 [M+H].

Preparation of Intermediate 1: Intermediate 1.2 (45 mg, 0.21 mmol) was taken up in trifluoroacetic acid (2 mL) and stirred for 1 hour. The solvent was then removed under reduced pressure to afford Intermediate 1. LCMS: 213.1 [M+H].

Preparation of Intermediate 2: 5-(pyridin-2-yl)-2,3-dihydro-1H-indene-2-carboxylic acid Preparation of Intermediate 2.1: To a stirred suspension of 60% NaH (22.72 g, 2 equiv) in THF (1000 mL) at 0° C. was added diethyl carbonate (86 mL, 1.5 equiv). To this was added 5-bromo-indan-1-one (100 g, 473.1 mmol) portion wise at this temperature. The reaction mixture continued to stir at this temperature until gas evolution subsided. The reaction mixture was slowly heated to 50° C. and maintained stirring for 2 h. Progress of the reaction was monitored by TLC, and after consumption of starting material, the reaction mixture was allowed to cool to RT. The reaction was diluted with EtOAc (10V). To this was added 3 N aq HCl dropwise. Both layers were separated. Aqueous layer was extracted with EtOAc (2×5V). The combined organic layer was washed with brine solution (5V), dried (Na₂SO₄) and evaporated to obtain the crude, which was purified by column chromatography on silica gel to afford Intermediate 2.1. LCMS: 283.0 [M+H].

Preparation of Intermediate 2.2: To a solution of Intermediate 2.1 (56 g, 197.9 mmol) in TFA (280 mL) at 0° C. was added triethyl silane (224 mL) dropwise and the reaction mixture was stirred at rt for 24 h. Progress of the reaction was monitored by TLC. After consumption of starting materials, the reaction mixture was evaporated to dryness under reduced pressure to obtain the crude. The crude was purified by column chromatography on silica gel to obtain Intermediate 2.2. LC/MS: 269.0 [M+H].

Preparation of Intermediate 2.3: A stirred solution of Intermediate 2.2 (40 g, 148.7 mmol) and 2-tributylstannylpyridine (57.5 g, 1.05 equiv) in 1,4 dioxane (400 mL) was degassed for 10 min using argon, at which time Pd(PPh₃)₄ (8.6 g, 5 mol %) was added and again degassed for another 10 min. The reaction mixture was heated to 90° C. for 16 h. The reaction mixture was filtered through Celite pad and the Celite pad was washed with ethyl acetate twice. The combined filtrate was evaporated to dryness to obtain crude. The crude was purified by column chromatography on silica gel to afford Intermediate 2.3. LC/MS: 268.1 [M+H].

Preparation of Intermediate 2: To a stirred solution of Intermediate 2.3 (35 g, 131.1 mmol) in methanol (350 mL) at 0° C. was added 2 N aq NaOH solution (140 mL, 2.2 equiv) and the reaction mixture was stirred at rt for 4 h. After completion of the reaction, the reaction mixture was concentrated under reduced pressure to 100 mL. The residue was diluted with water (10V) and the aqueous layer washed with ethyl acetate (2×2V). The aqueous phase was neutralized with 2 N aq HCl solution and extracted with 10% Methanol/DCM (3×5V). The organic layer was dried over sodium sulfate and concentrated to afford the crude. Then the crude was taken with 10% isopropanol/toluene (10V) solution and treated with activated carbon. The solvent was then removed under reduced pressure. The residue was taken in 30% toluene/hexane, stirred for 30 min and filtered, and then dried under vacuum. This process was repeated two additional times to afford Intermediate 2. LC/MS: 238.1 [M–H].

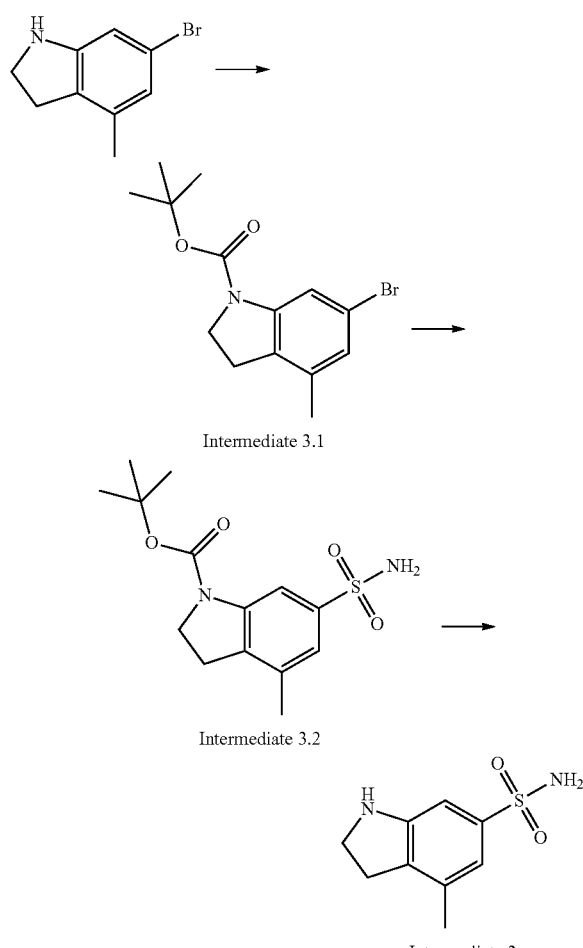

Intermediate 3

Preparation of Intermediate 3: 4-methylindoline-6-sulfonamide

Intermediate 3.1 was prepared in a manner similar to Intermediate 1.1 utilizing 6-bromo-4-methylindoline instead of 6-bromo-7-methylindoline as starting material. LCMS: 312.1 [M+H].

Intermediate 3.2 was prepared in a manner similar to Intermediate 1.2 utilizing Intermediate 3.1 instead of compound Intermediate 1.1 as starting material. LCMS: 313.1 [M+H].

Intermediate 3 was prepared in a manner similar to Intermediate 1 utilizing Intermediate 3.2 instead of Intermediate 1.2 as starting material. LCMS: 213.1 [M+H].

The intermediates in Table 1A were prepared in a manner similar to Intermediates 1 and 3:

TABLE 1A

| Intermediates | Structure | LCMS |
|---|---|---|
| Intermediate 4 | (2-methylindoline-6-sulfonamide) | 213.1 [M + H] |
| Intermediate 5 | (7-fluoroindoline-6-sulfonamide) | 217.0 [M + H] |
| Intermediate 6 | (5-chloroindoline-6-sulfonamide) | 233.0 [M + H] |
| Intermediate 7 | (4-fluoroindoline-6-sulfonamide) | 217.0 [M + H] |
| Intermediate 8 | (4-chloroindoline-6-sulfonamide) | 233.0 [M + H] |
| Intermediate 9 | (5-fluoroindoline-6-sulfonamide) | 217.0 [M + H] |
| Intermediate 17 | (2-ethylindoline-6-sulfonamide) | 227.1 [M + H] |

The intermediates in Table 1B were prepared in a manner similar to Intermediate 2:

TABLE 1B

| Intermediates | Structure | LC/MS |
|---|---|---|
| Intermediate 10 | 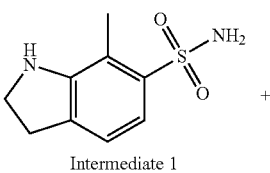 | 256.1 [M − H] |
| Intermediate 11 | | 256.1 [M − H] |
| Intermediate 12 | | 256.1 [M − H] |
| Intermediate 13 | | 244.0 [M − H] |
| Intermediate 14 | | 244.0 [M − H] |
| Intermediate 15 | | 272.1 [M − H] |
| Intermediate 16 | | 272.1 [M − H] |

PREPARATION OF EXAMPLES

Preparation of Example 1: 4-methyl-3-(5-(pyridin-2-yl)-2,3-dihydro-1H-indene-2-carbonyl)-2,3-dihydro-1H-indene-5-sulfonamide (General Procedure A)

Intermediate 1

Intermediate 2

Example 1

Intermediate 1 (25 mg, 0.12 mmol) and Intermediate 2 (34 mg, 1.2 equiv) were taken up in acetonitrile (2 mL). 1-methylimidazole (48 mg, 5 equiv) and TCFH (chloro(dimethylamino)-N,N-dimethylmethaniminium hexafluorophosphate, 33 mg, 1 equiv) were then added sequentially and the reaction mixture stirred overnight at room temperature, after which time the solvent was removed under reduced pressure. The crude residue was purified by reverse phase HPLC to give Example 1. $^1$H NMR (400 MHz, DMSO-d6) δ 8.69-8.59 (m, 1H), 7.99-7.85 (m, 4H), 7.69 (d, J=7.8 Hz, 1H), 7.37 (s, 2H), 7.33 (d, J=10.9 Hz, 2H), 7.29 (d, J=7.9 Hz, 1H), 6.53 (m, 4H), 4.26 (d, J=8.0 Hz, 2H), 3.91 (m, 1H), 3.12 (t, J=7.4 Hz, 2H), 2.28 (s, 3H). LCMS: 434.1 [M+H].

Preparation of Example 2

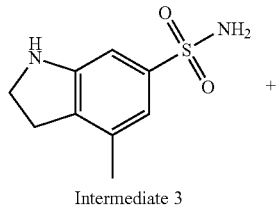

Intermediate 3

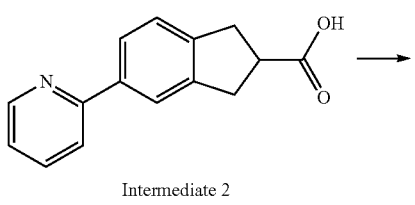

Intermediate 2

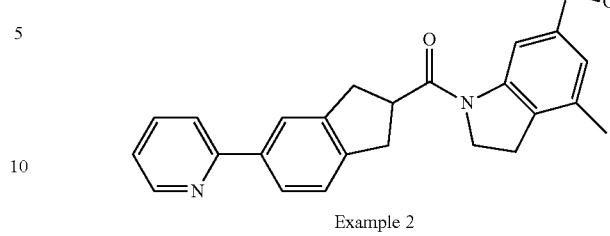

Example 2

Example 2 was prepared in a manner similar to Example 1 utilizing Intermediate 3 as starting material instead of Intermediate 1. $^1$H NMR (400 MHz, DMSO-d$_6$) δ 8.68 (dt, J=5.0, 1.4 Hz, 1H), 8.44 (d, J=1.7 Hz, 1H), 7.98 (dd, J=15.6, 7.9 Hz, 3H), 7.89 (dd, J=7.9, 1.7 Hz, 1H), 7.46-7.40 (m, 1H), 7.38 (d, J=7.8 Hz, 1H), 7.33 (d, J=1.6 Hz, 1H), 7.23 (s, 2H), 4.36 (t, J=8.5 Hz, 2H), 3.78 (q, J=8.1 Hz, 1H), 3.44-3.22 (m, 4H), 3.18 (t, J=8.3 Hz, 2H), 2.29 (s, 3H). LCMS: 434.1 [M+H].

The following examples in Table 1C were prepared in a manner similar to Example 1 (General Procedure A).

TABLE 1C

| Example | Structure | LC/MS | $^1$H-NMR |
|---|---|---|---|
| 3 | | 434.1 [M + H] | $^1$H NMR (400 MHz, DMSO-d6) δ 8.72-8.64 (m, 1H), 8.58 (s, 1H), 8.02-7.89 (m, 4H), 7.59-7.35 (m, 4H), 7.29 (s, 2H), 4.90 (t, J = 7.8 Hz, 1H), 3.64-3.34 (m, 4H), 3.27 (dt, J = 16.9, 9.1 Hz, 1H), 3.15 (dt, J = 16.8, 8.8 Hz, 1H), 2.81 (d, J = 16.6 Hz, 1H), 1.30 (d, J = 6.2 Hz, 3H). |
| 4 | | 438.2 [M + H] | $^1$H NMR (400 MHz, DMSO-d$_6$) δ 8.68 (dt, J = 4.9, 1.3 Hz, 1H), 7.99 (dd, J = 6.4, 1.7 Hz, 2H), 7.95 (d, J = 1.6 Hz, 1H), 7.88 (dd, J = 7.9, 1.7 Hz, 1H), 7.58 (s, 2H), 7.52 (dd, J = 7.8, 6.0 Hz, 1H), 7.44 (ddd, J = 6.8, 5.0, 2.1 Hz, 1H), 7.38 (d, J = 7.9 Hz, 1H), 7.26 (d, J = 7.8 Hz, 1H), 4.30 (t, J = 7.8 Hz, 2H), 3.85 (p, J = 8.3 Hz, 1H), 3.43-3.26 (m, 4H), 3.22 (t, J = 8.0 Hz, 2H). |
| 5 | | 454.1 [M + H] | $^1$H NMR (400 MHz, DMSO-d$_6$) δ 8.78 (s, 1H), 8.70-8.62 (m, 1H), 7.95 (d, J = 3.9 Hz, 2H), 7.89 (dd, J = 7.8, 2.0 Hz, 2H), 7.51 (s, 3H), 7.35 (d, J = 7.8 Hz, 2H), 4.35 (t, J = 8.6 Hz, 2H), 3.75 (t, J = 7.9 Hz, 1H) *6H under water peak |

TABLE 1C-continued

| Example | Structure | LC/MS | ¹H-NMR |
|---|---|---|---|
| 6 | | 438.1 [M + H] | ¹H NMR (400 MHz, DMSO-d₆) δ 8.67-8.64 (m, 1H), 8.43 (s, 1H), 7.98-7.92 (m, 2H), 7.89 (d, J = 7.5 Hz, 2H), 7.44 (s, 2H), 7.36 (d, J = 7.8 Hz, 3H), 7.27 (dd, J = 8.4, 1.5 Hz, 1H), 4.42 (t, J = 8.5 Hz, 2H), 3.76 (t, J = 8.1 Hz, 1H) *6H under water peak |
| 7 | | 454.1 [M + H] | ¹H NMR (400 MHz, DMSO-d₆) δ 8.64 (d, J = 4.7 Hz, 1H), 8.52 (s, 1H), 7.96-7.83 (m, 4H), 7.48 (d, J = 1.5 Hz, 1H), 7.44 (s, 2H), 7.33 (dd, J = 11.6, 6.8 Hz, 2H), 4.40 (t, J = 8.5 Hz, 2H), 3.75 (t, J = 7.9 Hz, 1H). *6H under water peak |
| 8 | | 438.1 [M + H] | ¹H NMR (400 MHz, DMSO-d6) δ 8.68 (d, J = 5.0 Hz, 1H), 8.57 (d, J = 6.7 Hz, 1H), 8.05-7.94 (m, 3H), 7.93-7.84 (m, 1H), 7.57 (s, 2H), 7.43 (d, J = 7.0 Hz, 1H), 7.36 (dd, J = 11.6, 8.9 Hz, 2H), 4.34 (s, 1H), 3.80-3.71 (m, 2H), 3.41-3.15 (m, 6H). |
| 9 | | 438.1 [M + H] | ¹H NMR (400 MHz, DMSO-d₆) δ 8.71 (d, J = 5.0 Hz, 1H), 8.59 (d, J = 1.6 Hz, 1H), 7.98-7.88 (m, 1H), 7.82-7.70 (m, 2H), 7.48 (dd, J = 7.8, 1.7 Hz, 1H), 7.42 (t, J = 6.1 Hz, 2H), 7.28 (s, 2H), 7.23 (d, J = 11.4 Hz, 1H), 4.33 (t, J = 8.6 Hz, 2H), 3.78 (q, J = 7.9 Hz, 1H), 3.37-3.15 (m, 6H). |
| 10 | | 438.1 [M + H] | ¹H NMR (400 MHz, DMSO-d6) δ 8.71 (d, J = 4.9 Hz, 1H), 8.59 (s, 1H), 7.91 (t, J = 7.7 Hz, 1H), 7.80-7.72 (m, 2H), 7.48 (d, J = 7.8 Hz, 1H), 7.43-7.39 (m, 2H), 7.28 (s, 2H), 7.21 (d, J = 7.8 Hz, 1H), 4.35 (td, J = 9.0, 5.7 Hz, 2H), 3.84 (p, J = 7.6 Hz, 1H), 3.33-3.21 (m, 6H) |

TABLE 1C-continued
| Example | Structure | LC/MS | ¹H-NMR |
|---|---|---|---|
| 11 | | 454.1 [M + H] | ¹H NMR (400 MHz, DMSO-d6) δ 8.75-8.68 (m, 1H), 8.59 (d, J = 1.7 Hz, 1H), 7.97 (td, J = 7.8, 1.9 Hz, 1H), 7.69 (d, J = 7.9 Hz, 1H), 7.51-7.44 (m, 2H), 7.44-7.38 (m, 2H), 7.33 (d, J = 7.7 Hz, 1H), 7.28 (s, 2H), 4.35 (td, J = 9.0, 5.1 Hz, 2H), 3.83 (dq, J = 15.3, 7.5, 7.0 Hz, 1H), 3.51-3.31 (m, 4H), 3.27 (t, J = 8.5 Hz, 2H). |
| 12 | | 454.1 [M + H] | ¹H NMR (400 MHz, DMSO-d6) δ 8.72 (dt, J = 4.9, 1.3 Hz, 1H), 8.59 (d, J = 1.7 Hz, 1H), 7.98 (dd, J = 7.7, 1.9 Hz, 1H), 7.69 (d, J = 7.8 Hz, 1H), 7.50 (dd, J = 7.0, 1.5 Hz, 1H), 7.47 (d, J = 1.2 Hz, 2H), 7.44 (s, 1H), 7.41 (d, J = 7.9 Hz, 1H), 7.28 (s, 2H), 4.33 (t, J = 8.5 Hz, 2H), 3.68-3.14 (m, 7H). |
| 13 | | 456.1 [M + H] | ¹H NMR (400 MHz, DMSO-d6) δ 8.66 (d, J = 4.8 Hz, 1H), 8.56 (d, J = 6.7 Hz, 1H), 7.99 (d, J = 8.1 Hz, 1H), 7.93-7.88 (m, 1H), 7.84 (s, 1H), 7.72 (d, J = 10.6 Hz, 1H), 7.57 (s, 2H), 7.36 (t, J = 10.0 Hz, 2H), 4.34 (dd, J = 15.0, 8.0 Hz, 2H), 3.81 (d, J = 8.5 Hz, 1H), 3.30 (m, 6H). |
Preparation of Examples 14, 15, 16, and 17
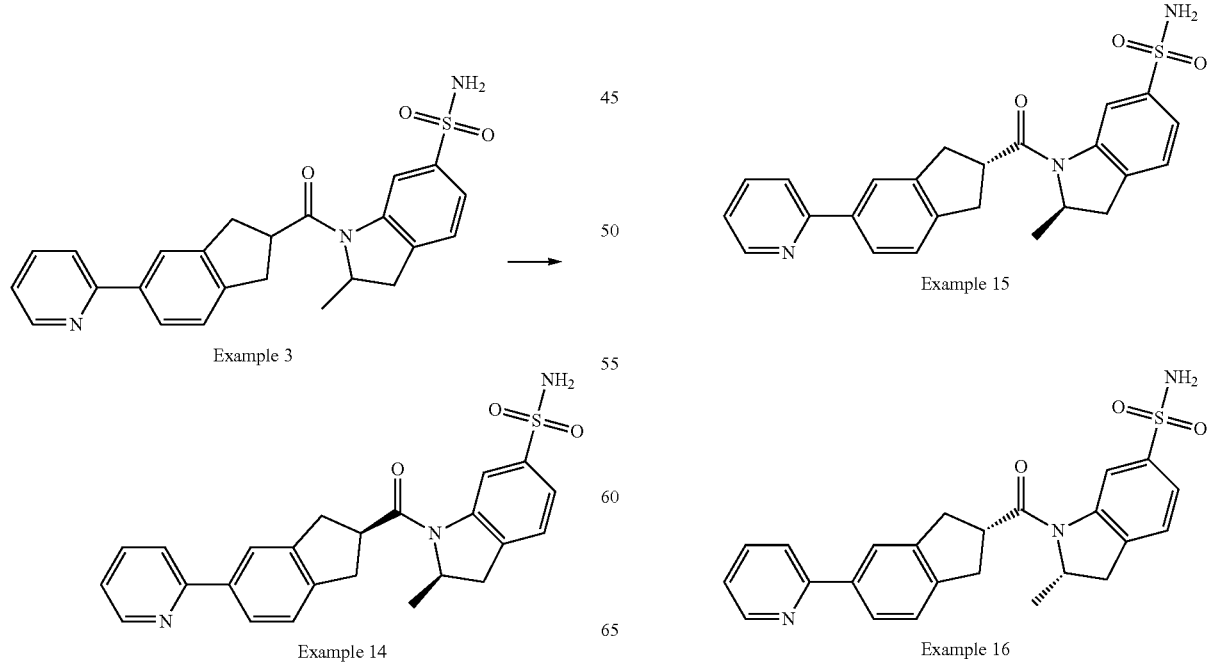

-continued

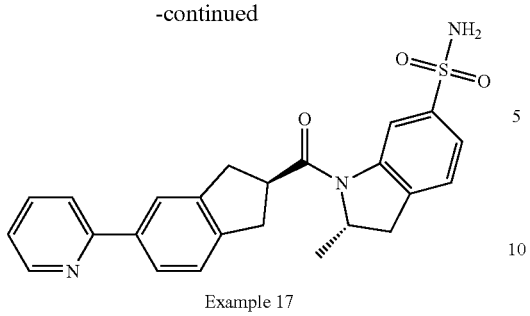

Example 17

Example 14 was obtained from the first eluent of chiral SFC purification of Example 3 using OJ-H 4.6×100 mm column with 50% ethanol as co-solvent. $^1$H NMR (400 MHz, DMSO-d6) δ 8.69 (dd, J=4.8, 1.5 Hz, 1H), 8.58 (s, 1H), 8.07-7.91 (m, 3H), 7.89 (dd, J=7.9, 1.7 Hz, 1H), 7.57-7.35 (m, 4H), 7.29 (s, 2H), 4.90 (t, J=7.5 Hz, 1H), 3.90-3.69 (m, 1H), 3.46 (tt, J=16.9, 8.4 Hz, 3H), 3.28 (dd, J=15.8, 8.5 Hz, 1H), 3.14 (dd, J=16.3, 7.7 Hz, 1H), 2.80 (d, J=16.6 Hz, 1H), 1.30 (d, J=6.2 Hz, 3H). LC/MS: 434.1 [M+H].

Example 15 was obtained from the second eluent of chiral SFC purification of Example 3 using OJ-H 4.6×100 mm column with 50% ethanol as co-solvent. $^1$H NMR (400 MHz, DMSO-d6) δ 8.75-8.67 (m, 1H), 8.58 (s, 1H), 8.06 (d, J=4.1 Hz, 2H), 7.97 (s, 1H), 7.88 (dd, J=7.9, 1.7 Hz, 1H), 7.58-7.37 (m, 4H), 7.29 (s, 2H), 4.90 (t, J=7.5 Hz, 1H), 3.78 (q, J=8.2 Hz, 1H), 3.47 (tt, J=18.5, 8.9 Hz, 3H), 3.29 (dd, J=15.9, 8.5 Hz, 1H), 3.14 (dd, J=16.3, 7.7 Hz, 1H), 2.81 (d, J=16.6 Hz, 1H), 1.30 (d, J=6.2 Hz, 3H). LC/MS: 434.1 [M+H].

Example 16 was obtained from the third eluent of chiral SFC purification of Example 3 using OJ-H 4.6×100 mm column with 50% ethanol as co-solvent. $^1$H NMR (400 MHz, DMSO-d6) δ 8.70 (dd, J=5.0, 1.4 Hz, 1H), 8.58 (s, 1H), 8.04 (d, J=4.1 Hz, 2H), 7.99-7.84 (m, 2H), 7.61-7.39 (m, 4H), 7.29 (s, 2H), 4.91 (q, J=7.0 Hz, 1H), 3.78 (q, J=8.1 Hz, 1H), 3.60-3.33 (m, 3H), 3.27 (dd, J=16.2, 8.5 Hz, 1H), 3.16 (dd, J=16.0, 7.6 Hz, 1H), 2.81 (d, J=16.6 Hz, 1H), 1.30 (d, J=6.2 Hz, 3H). LC/MS: 434.1 [M+H].

Example 17 was obtained from the fourth eluent of chiral SFC purification of Example 3 using OJ-H 4.6×100 mm column with 50% ethanol as co-solvent. $^1$H NMR (400 MHz, DMSO-d6) δ 8.70 (dd, J=5.1, 1.4 Hz, 1H), 8.58 (s, 1H), 8.14-8.01 (m, 2H), 7.97-7.82 (m, 2H), 7.61-7.37 (m, 4H), 7.29 (s, 2H), 4.90 (t, J=7.5 Hz, 1H), 3.86-3.73 (m, 1H), 3.62-3.36 (m, 3H), 3.27 (dd, J=16.2, 8.5 Hz, 1H), 3.16 (dd, J=16.0, 7.6 Hz, 1H), 2.81 (d, J=16.6 Hz, 1H), 1.30 (d, J=6.2 Hz, 3H). LC/MS: 434.1 [M+H].

Alternative Preparation of Example 15 starting with 5-bromo-(R)-2-methylindoline Preparation of Intermediate 49: (R)-2-methylindoline-6-sulfonamide

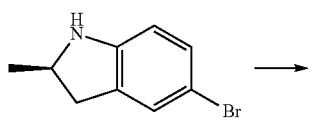

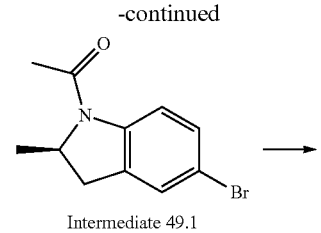

Intermediate 49.1

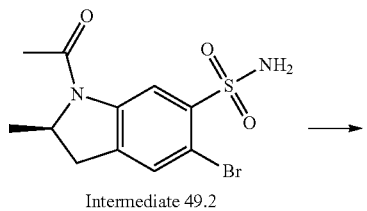

Intermediate 49.2

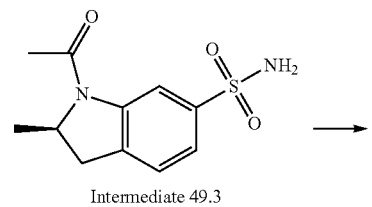

Intermediate 49.3

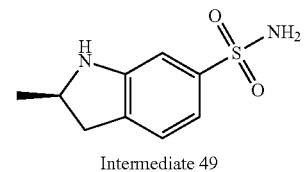

Intermediate 49

Intermediate 49.2 was prepared in a manner similar to Intermediate 42.3 utilizing (R)-5-bromo-2-methylindoline instead of Intermediate 42.1 as starting material.

Preparation of 49.3: To a suspension of (2R)-1-acetyl-5-bromo-2-methyl-indoline-6-sulfonamide 49.2 (145 mg, 0.44 mmol) in EtOH (10 mL) was added 10% Pd/C (93 mg, 0.2 equiv) and Et$_3$N (0.18 mg, 3 equiv). The reaction mixture was evacuated and purged with H$_2$ from a balloon (4×) and allowed to stir under H$_2$. LCMS showed complete conversion after overnight stirring. The mixture was filtered through a pad of Celite, washed the pad with EtOH, the filtrate was concentrated to almost dry. Water was added to the residue, sonicated the mixture, the white solids were collected by filtration, washed the solids with water (×3) and the solids were further dried under high vacuum.

Intermediate 49 was prepared in a manner similar to Intermediate 42 utilizing 49.3 instead of 42.3 as starting material. $^1$H NMR (400 MHz, DMSO-d$_6$) δ 7.14-7.06 (m, 3H), 6.95 (dd, J=7.6, 1.7 Hz, 1H), 6.83 (d, J=1.6 Hz, 1H), 6.04 (d, J=1.9 Hz, 1H), 4.01-3.85 (m, 1H), 3.18-3.03 (m, 1H), 2.59-2.51 (m, 1H), 1.18 (d, J=6.2 Hz, 3H). LCMS: 213.026 [M+H].

Example 15 was then prepared by method A using Intermediate 49 and Intermediate 19. The retention time for this product from analytical chiral column chromatography was identical to that of the material obtained from the preparative chiral SFC purification of Example 3.

Preparation of Intermediate 18: 1-(5-(4,4,5,5-tetramethyl-1,3,2-dioxaborolan-2-yl)-2,3-dihydro-1H-indene-2-carbonyl)indoline-6-sulfonamide Preparation of Example 18

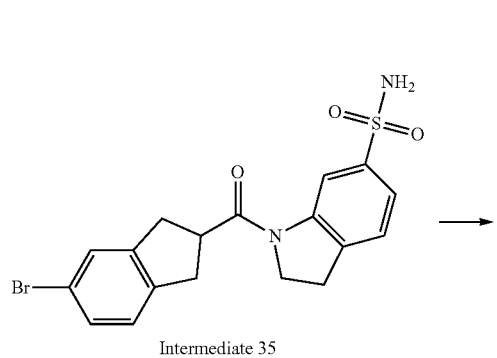

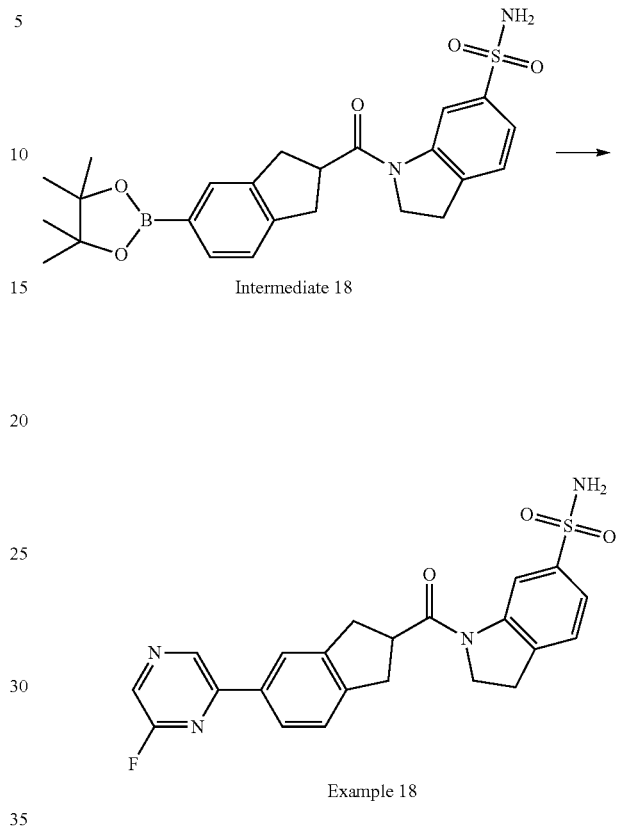

To a solution of Intermediate 35 (750 mg, 1.78 mmol) in 1,4-dioxane (10 mL) was added bis(pinacolato)diboron (L2 equiv), potassium acetate (3.0 equiv), and (1,1'-bis(diphenylphosphino)ferrocene)palladium(II) dichloride (20 mol %). The mixture was sparged with nitrogen for 5 min and then heated to 95° C. Following stirring for 4 hours, the reaction was partitioned between water (25 mL) and EtOAc (25 mL). The aqueous phase was extracted twice with EtOAc (25 mL), and the combined organic layers were dried over magnesium sulfate. Solvent was removed under reduced pressure and the crude residue was purified using flash column chromatography (0 to 100% EtOAc in hexanes) to afford Intermediate 18. LC/MS: 469.2 [M+H].

To a solution of Intermediate 18 (20 mg, 0.043 mmol) in 9:1 1,4-dioxane:water (1 mL) was added 2-brono-6-fluoropyrazine (12 equiv), potassium carbonate (3.0 equiv), and (1,1'-bis(diphenylphosphino)ferrocene)palladium(II) dichloride (20 mol %). The mixture was sparged with nitrogen for 5 mins and then heated to 95° C. Following stirring for 4 hours, the reaction mixture was concentrated and the crude residue was purified using reverse phase HPLC to afford Example 18. $^1$H NMR (400 MHz, DMSO-$d_6$) δ 9.25 (d, J=5.1 Hz, 1H), 8.69-8.53 (m, 2H), 8.02 (s, 1H), 7.97 (d, J=8.0 Hz, 1H), 7.48 (dd, J=7.8, 1.7 Hz, 1H), 7.42 (dd, J=8.0, 3.7 Hz, 2H), 7.28 (s, 2H), 4.35 (t, J=8.5 Hz, 2H), 3.83-3.72 (m, 1H), 3.23-3.34 (m, 6H). LC/MS: 439.1 [M+H].

The following examples in Table 1D were prepared in a manner similar to Example 18 employing the appropriate aryl bromide coupling partners:

TABLE 1D

| Example | Structure | LC/MS | $^1$H-NMR |
|---|---|---|---|
| 19 |  | 426.1 [M + H] | $^1$H NMR (400 MHz, DMSO-$d_6$) δ 8.59 (d, J = 1.7 Hz, 1H), 7.90 (d, J = 3.3 Hz, 1H), 7.82 (s, 1H), 7.78 (dd, J = 7.8, 1.7 Hz, 1H), 7.75 (d, J = 3.3 Hz, 1H), 7.48 (dd, J = 7.8, 1.8 Hz, 1H), 7.41 (d, J = 7.9 Hz, 1H), 7.37 (d, J = 7.9 Hz, 1H), 7.28 (s, 2H), 4.34 (t, J = 8.5 Hz, 2H), 3.83-3.70 (m, 1H), 3.22-3.41 (m, 6H). |

TABLE 1D-continued

| Example | Structure | LC/MS | ¹H-NMR |
|---|---|---|---|
| 20 | | 426.1 [M + H] | ¹H NMR (400 MHz, DMSO-$d_6$) δ 9.18 (d, J = 1.9 Hz, 1H), 8.60 (d, J = 1.5 Hz, 1H), 8.10 (d, J = 1.9 Hz, 1H), 7.87 (s, 1H), 7.84-7.79 (m, 1H), 7.48 (dd, J = 7.8, 1.7 Hz, 1H), 7.41 (d, J = 7.9 Hz, 1H), 7.31 (d, J = 8.0 Hz, 1H), 7.28 (s, 2H), 4.34 (t, J = 8.5 Hz, 2H), 3.81-3.72 (m, 1H), 3.35-3.21 (m, 6H). |
| 22 | | 440.1 [M + H] | ¹H NMR (400 MHz, DMSO-$d_6$) δ 8.59 (d, J = 1.7 Hz, 1H), 7.78 (s, 1H), 7.73 (dd, J = 7.9, 1.7 Hz, 1H), 7.48 (dd, J = 7.8, 1.8 Hz, 1H), 7.41 (d, J = 7.9 Hz, 1H), 7.34 (d, J = 7.9 Hz, 1H), 7.32-7.22 (m, 3H), 4.33 (t, J = 8.5 Hz, 2H), 3.77 (d, J = 8.2 Hz, 1H), 3.29 (td, J = 15.4, 13.5, 8.7 Hz, 6H), 2.42 (d, J = 1.0 Hz, 3H). |
| 23 | | 410.0 [M + H] | ¹H NMR (400 MHz, DMSO-$d_6$) δ 8.59 (d, J = 4.6 Hz, 2H), 8.44 (s, 1H), 7.67 (s, 1H), 7.61 (d, J = 7.9 Hz, 1H), 7.48 (dd, J = 7.8, 1.7 Hz, 1H), 7.41 (d, J = 7.9 Hz, 1H), 7.29 (d, J = 11.5 Hz, 3H), 4.34 (t, J = 8.5 Hz, 2H), 3.74 (t, J = 8.2 Hz, 1H), 3.33-3.18 (m, 6H). |
| 24 | | 426.0 [M + H] | ¹H NMR (400 MHz, DMSO-$d_6$) δ 9.14 (d, J = 4.7 Hz, 1H), 8.59 (d, J = 1.6 Hz, 1H), 7.97-7.90 (m, 2H), 7.89-7.79 (m, 1H), 7.48 (dd, J = 7.8, 1.7 Hz, 1H), 7.41 (d, J = 7.8 Hz, 1H), 7.35 (d, J = 7.9 Hz, 1H), 7.28 (s, 2H), 4.34 (t, J = 8.5 Hz, 2H), 3.76 (t, J = 8.2 Hz, 1H), 3.33-3.24 (m, 6H). |
| 25 | | 440.1 [M + H] | ¹H NMR (400 MHz, DMSO-$d_6$) δ 8.60 (d, J = 1.7 Hz, 1H), 7.85 (s, 1H), 7.81 (s, 1H), 7.75 (d, J = 7.9 Hz, 1H), 7.48 (dd, J = 7.7, 1.7 Hz, 1H), 7.41 (d, J = 7.8 Hz, 1H), 7.28 (t, J = 3.9 Hz, 3H), 4.34 (t, J = 8.5 Hz, 2H), 3.74 (t, J = 8.2 Hz, 1H), 3.33-3.17 (m, 4H), 2.71 (s, 6H). |
| 26 | | 456.0 [M + H] | ¹H NMR (400 MHz, DMSO-$d_6$) δ 8.60 (d, J = 1.7 Hz, 1H), 7.74 (s, 1H), 7.71-7.66 (m, 1H), 7.48 (dd, J = 7.8, 1.8 Hz, 1H), 7.42 (s, 1H), 7.40 (s, 1H), 7.27 (d, J = 7.5 Hz, 3H), 4.33 (t, J = 8.5 Hz, 2H), 4.10 (s, 3H), 3.73 (t, J = 8.1 Hz, 1H), 3.35-3.14 (m, 6H). |

TABLE 1D-continued

| Example | Structure | LC/MS | ¹H-NMR |
|---|---|---|---|
| 27 | | 450.9 [M + H] | ¹H NMR (400 MHz, DMSO-d₆) δ 8.62 (s, 1H), 8.59 (s, 1H), 7.88 (s, 1H), 7.82 (d, J = 8.0 Hz, 1H), 7.48 (dd, J = 7.8, 1.7 Hz, 1H), 7.41 (d, J = 7.9 Hz, 1H), 7.36 (d, J = 7.9 Hz, 1H), 7.28 (s, 2H), 4.34 (t, J = 8.5 Hz, 2H), 3.76 (t, J = 8.0 Hz, 1H), 3.30-3.21 (m, 6H). |

Preparation of Intermediate 19: (R)-5-(pyridin-2-yl)-2,3-dihydro-1H-indene-2-carboxylic acid

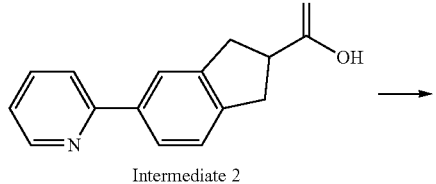

Intermediate 2

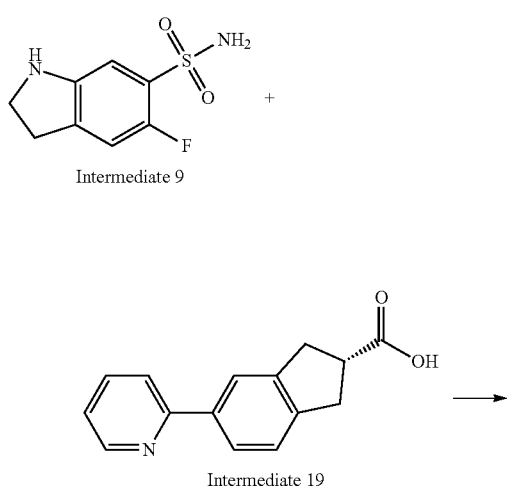

Intermediate 19

Intermediate 19 was obtained as the first eluent of SFC purification of Intermediate 2 using a Chiralpak AD-H column with 20% methanol as co-solvent. LC/MS: 238.1 [M−H].

Preparation of Example 28

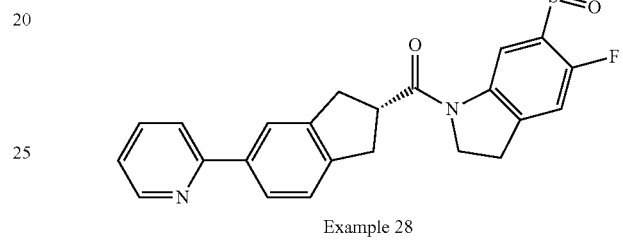

Example 28

Example 28 was prepared in a manner similar to Example 1 employing Intermediate 19 and Intermediate 9 (General Procedure A). ¹H NMR (400 MHz, DMSO-d6) δ 8.70 (dd, J=5.0, 1.4 Hz, 1H), 8.57 (d, J=6.7 Hz, 1H), 8.04 (d, J=4.1 Hz, 2H), 7.94 (s, 1H), 7.88 (dd, J=7.8, 1.7 Hz, 1H), 7.57 (s, 2H), 7.48 (q, J=4.6 Hz, 1H), 7.37 (dd, J=16.6, 8.8 Hz, 2H), 4.34 (t, J=8.5 Hz, 2H), 3.76 (t, J=8.0 Hz, 1H), 3.41-3.22 (m, 6H). LC/MS: 438.1 [M+H].

Preparation of Intermediate 20: Imino(indolin-6-yl)(methyl)-λ⁶-sulfanone

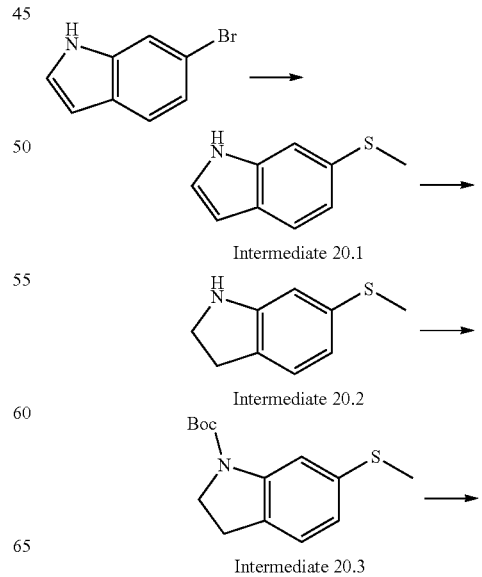

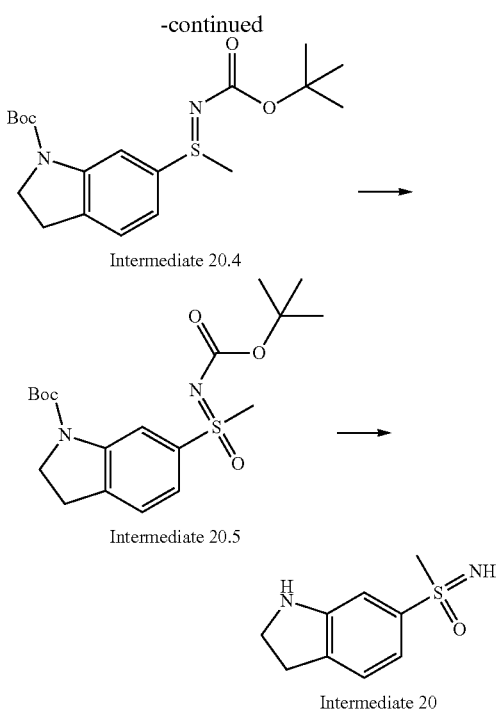

Intermediate 20.4

Intermediate 20.5

Intermediate 20

Preparation of Intermediate 20.1: To a solution of 6-bromo-1H-indole (5.0 g, 25.5 mmol, 1.0 eq) in THF (100 mL) was added NaH (2.0 g, 51.0 mmol, 2.0 eq) at 0° C. under $N_2$. The reaction was stirred for 30 min, then it was cooled to −65° C. and t-BuLi (58.8 mL, 1.3 N, 3.0 eq) was added. It was stirred for 30 min and dimethyl disulfide (7.2 g, 76.5 mmol, 3.0 eq) was added, the reaction was stirred for 2 h and warmed to room temperature for 1 h, then it was quenched by water, and it was extracted with EtOAc. The organic extract was concentrated and the residue was purified by column chromatography to give the compound Intermediate 20.1. LC/MS: 160.4 [M+H].

Preparation of Intermediate 20.2: To a solution of Intermediate 20.1 (8.2 g, 50.3 mmol, 1.0 eq) in AcOH (80 mL) was added $NaBH_3CN$ (9.5 g, 150.9 mmol, 3.0 eq) in small portions at 10° C. The reaction was stirred for 1 h and it was quenched by water, adjusted to pH 6 with $K_2CO_3$, and extracted with EtOAc (150 mL×2). The combined organic fractions were dried over $Na_2SO_4$, concentrated and the residue was purified by column chromatography to give Intermediate 20.2. LC/MS: 166.2 [M+H].

Preparation of Intermediate 20.3: To a solution of Intermediate 20.2 (6.2 g, 37.6 mmol, 1.0 eq) in DCM (60 mL) was added $Boc_2O$ (16.4 g, 75.2 mmol, 2.0 eq) and DMAP (4.6 g, 37.6 mmol) in portions at room temperature. The reaction was stirred overnight and poured into water, extracted with EtOAc (50 mL×2), and the combined organic fractions were concentrated and the residue was purified by column chromatography to provide compound Intermediate 20.3. LC/MS: 265.9 [M+H].

Preparation of Intermediate 20.4: To a solution of Intermediate 20.3 (6.7 g, 25.3 mmol, 1.0 eq) in DCM (60 mL) was added tert-butyl carbonazidate (9.0 g, 63.2 mmol, 2.5 eq) and $FeCl_2$ (3.2 g, 25.3 mmol, 1.0 eq) at 0° C. under $N_2$. The reaction was warmed to room temperature overnight, then it was poured into water and extracted with EtOAc. The organic fractions were concentrated and the residue was purified by column chromatography (DCM/MeOH=40:1) to give the Intermediate 20.4. LC/MS: 381.1 [M+H].

Preparation of Intermediate 20.5: To a solution of Intermediate 20.4 (5.8 g, 15.3 mmol, 1.0 eq) in $THF/H_2O$ (4/1, 75 mL) was added $NaIO_4$ (16.4 g, 76.5 mmol, 5.0 eq) and $RuCl3·H_2O$ (172 mg, 0.77 mmol, 0.05 eq) in portions at room temperature. The reaction mixture was stirred for 10 min and poured into water, and extracted with EtOAc (50 mL×2). The combined organic extracts were concentrated, the residue was purified by column chromatography (petroleum ether/EtOAc=2:1) to provide Intermediate 20.5. LC/MS: 397.1 [M+H].

Preparation of Intermediate 20: Intermediate 20.5 (4.0 g) was dissolved in HCl/dioxane (40 mL, 4 N) and stirred overnight. The resulting solid was filtered and it was dissolved in water. The pH was then adjusted to 7 using sodium bicarbonate, and the residue was purified by reverse phase HPLC to provide Intermediate 20. LC/MS: 197.1 [M+H].

Preparation of Example 29 (General Procedure A): imino(methyl)(1-(5-(pyridin-2-yl)-2,3-dihydro-1H-indene-2-carbonyl)indolin-6-yl)-$\lambda^6$-sulfanone

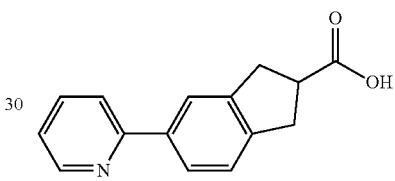

Intermediate 2

Intermediate 20

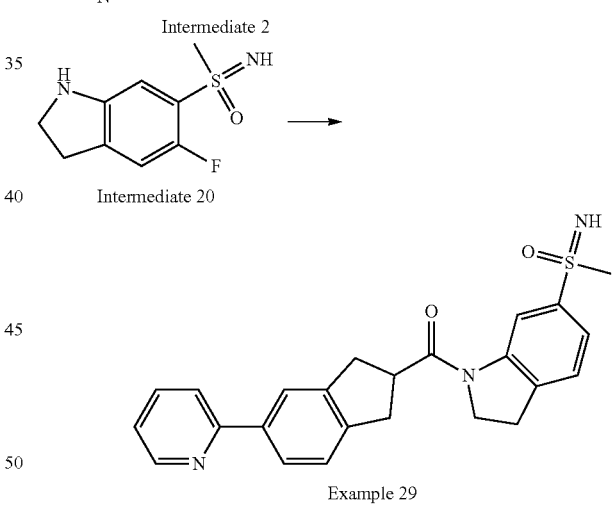

Example 29

To a solution of Intermediate 2 (30 mg, 0.15 mmol) and Intermediate 20 (91 mg, 3 equiv) in acetonitrile (40 V) was added 1-methylimidazole (3 equiv) and TCFH (2 equiv). After 1 hour stirring at room temperature, the reaction was diluted with EtOAc and water was added. The resulting aqueous layer was extracted twice with EtOAc, and the pooled organic fractions were dried over magnesium sulfate. The solvent was removed under reduced pressure and then reconstituted in THF (2 mL) and 2 N NaOH (2 mL). The mixture was then heated at 75° C. for 6 hours, after which time the pH was adjusted to 7 using 1 N HCl. The mixture was extracted with EtOAc (3×25 mL), and the combined organic fractions were dried over magnesium sulfate. Following removal of solvent under reduced pressure, the crude residue was purified by flash column chromatography (10% methanol in EtOAc) to afford Example 29. LC/MS: 418.2 [M+H].

Preparation of Examples 31 and 33

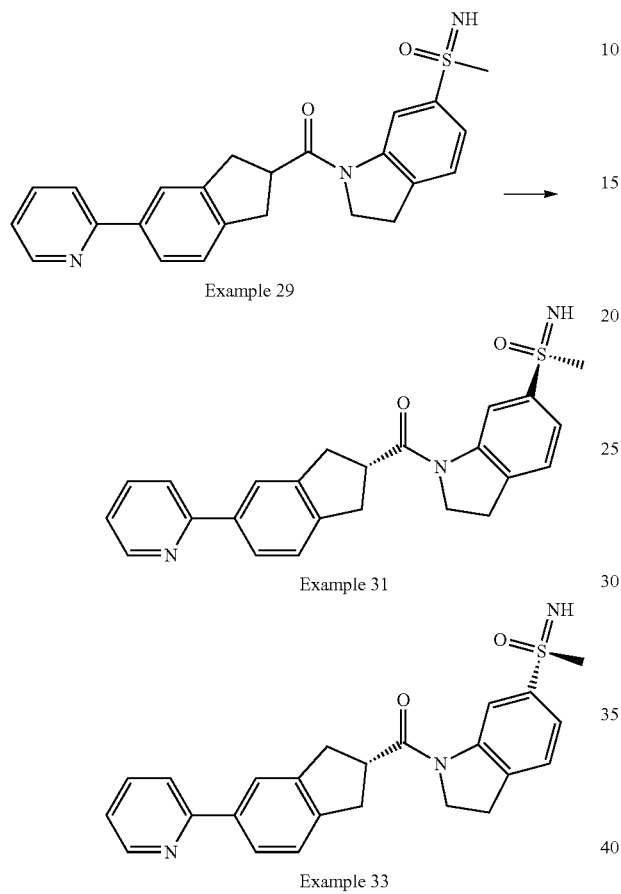

Example 29

Example 31

Example 33

Example 31 was obtained from the fourth eluent of chiral SFC purification of Example 29 using CCO-F2 column with 40% methanol as co-solvent. $^1$H NMR (400 MHz, DMSO-$d_6$) δ 8.65 (q, J=2.1 Hz, 2H), 7.98-7.81 (m, 4H), 7.59 (dd, J=7.8, 1.8 Hz, 1H), 7.46 (d, J=7.8 Hz, 1H), 7.38-7.29 (m, 2H), 4.36 (t, J=8.5 Hz, 2H), 4.09 (s, 1H), 3.75 (q, J=8.2 Hz, 1H), 3.30-3.19 (m, 6H), 3.00 (s, 3H). LC/MS: 418.2 [M+H].

Example 33 was obtained from the third eluent of chiral SFC purification of Example 29 using CCO-F2 column with 40% methanol as co-solvent. $^1$H NMR (400 MHz, DMSO-$d_6$) δ 8.65 (q, J=2.1 Hz, 2H), 8.02-7.77 (m, 4H), 7.59 (dd, J=7.8, 1.8 Hz, 1H), 7.46 (d, J=7.8 Hz, 1H), 7.40-7.27 (m, 2H), 4.36 (t, J=8.6 Hz, 2H), 4.09 (s, 1H), 3.76 (p, J=8.0 Hz, 1H), 3.32-3.21 (m, 6H), 3.00 (s, 3H). LC/MS: 418.2 [M+H].

Preparation of Intermediate 21

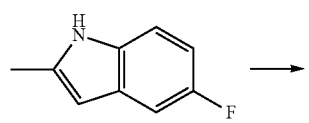

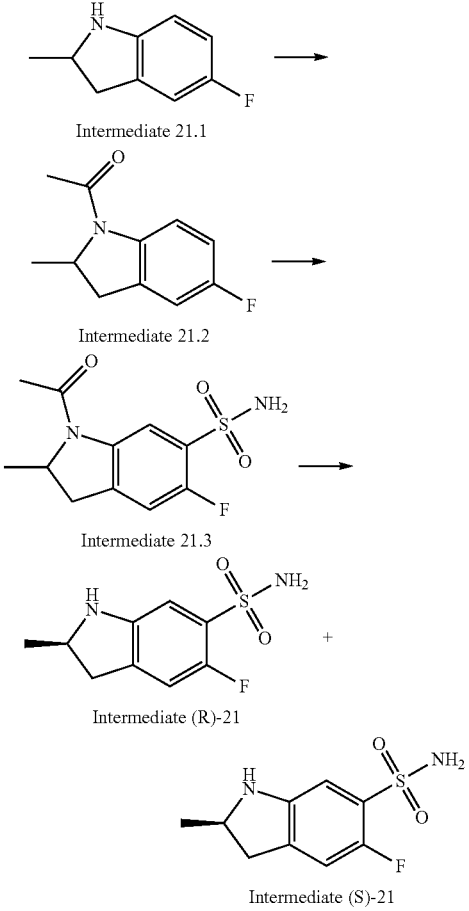

Intermediate 21.1

Intermediate 21.2

Intermediate 21.3

Intermediate (R)-21

Intermediate (S)-21

Preparation of Intermediate 21.1: 5-fluoro-2-methylindoline (40 g, 268 mmol, 1 eq) was taken up in acetic acid (200 mL, 5V). NaBH$_3$CN (50 g, 815 mmol, 3 eq) was added portion-wise while maintaining the temperature below 10° C. The resulting solution was warmed to RT and stirred for 3 h, at which time the reaction was diluted with ice-cold water (500 mL). The reaction was then extracted with EtOAc (3×100 mL). The combined organic layer was washed with brine (750 mL), dried over Na$_2$SO$_4$ and concentrated in vacuo. The crude Intermediate 21.1 was isolated as a thick yellow oil and used in the next step without further purification. LC/MS: 151.2 [M+H].

Preparation of Intermediate 21.2: To a stirred solution of Intermediate 21.1 (35 g, 86.6 mmol) in DCM (300 mL) was added triethylamine (35 mL, 1 vol) followed by acetyl chloride (35 mL, 1 vol) at 0° C. The reaction mixture was stirred at RT for 2 h. The residue was quenched with cold water (200 mL) and extracted with EtOAc (3×100 mL). The combined organic layer was washed with brine (750 mL), dried over Na$_2$SO$_4$ and concentrated in vacuo. The crude residue was purified by column chromatography (100-200 silica gel, eluted 8% EtOAc-Hexane) to afford Intermediate 21.2. LC/MS: 193.2 [M+H].

Preparation of Intermediate 21.3: To a stirred solution of Intermediate 21.2 (35 g, 0.011 mol) in chlorosulfonic acid (250 mL, 10 V) at 0° C. under nitrogen and the reaction mixture was stirred at 50° C. for 3 h. Upon completion of the reaction, the mixturewas diluted with ice-cold water. The precipitate was filtered, taken up in dichloromethane (50 mL), and added to a solution of concentrated ammonium hydroxide (20 mL). After vigorous stirring for 15 minutes at RT, the solvent was removed under pressure and the resulting solid was filtered and rinsed with water to afford Intermediate 21.3. LC/MS: 272.3 [M+H].

Preparation of Intermediates (R)-21 and (S)-21: A racemic mixture of Intermediate 21.3 (30 g, 110 mmol, 1 equiv) in 500 mL of 2 N sodium hydroxide was heated at 100° C. for 3 hours. The reaction was cooled to RT and the pH was adjusted to 7 with acetic acid. The precipitate was filtered, washed with water, and dried under vacuum. The resulting de-acetylated racemic mixture was then subjected to chiral SFC purification using a ChiralPak IG 240×4.6 mm column with a mobile phase consisting of 70:20:10 hexane: methanol: MTBE. Intermediate (R)-21 was collected as the second eluent (retention time 13.1 min). LC/MS: 230.1 [M+H]. Intermediate (S)-21 was collected as the first eluent (retention time 10.5 min). LC/MS: 230.1 [M+H].

Preparation of Example 34

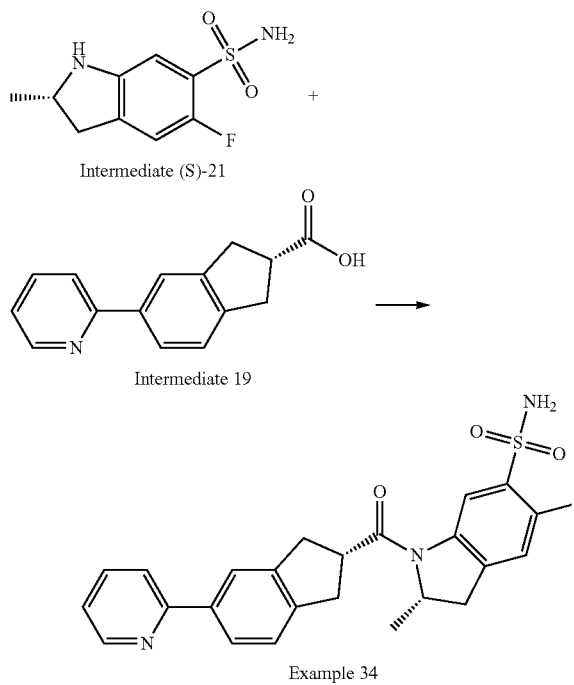

Intermediate (S)-21

Intermediate 19

Example 34

Example 34 was prepared in a manner similar to Example 1 employing Intermediate (S)-21 and Intermediate 19 (General Procedure A). $^1$H NMR (400 MHz, DMSO-d6) δ 8.72-8.62 (m, 1H), 8.54 (d, J=6.7 Hz, 1H), 8.02-7.81 (m, 4H), 7.58 (s, 2H), 7.39 (d, J=8.8 Hz, 3H), 4.90 (t, J=7.5 Hz, 1H), 3.77 (t, J=8.4 Hz, 1H), 3.48-3.09 (m, 6H), 1.30 (d, J=6.2 Hz, 3H). LC/MS: 452.1 [M+H].

Preparation of Example 35 (General Procedure B)

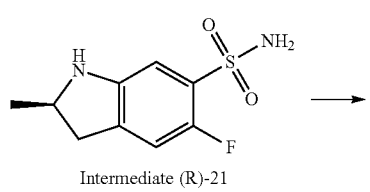

Intermediate (R)-21

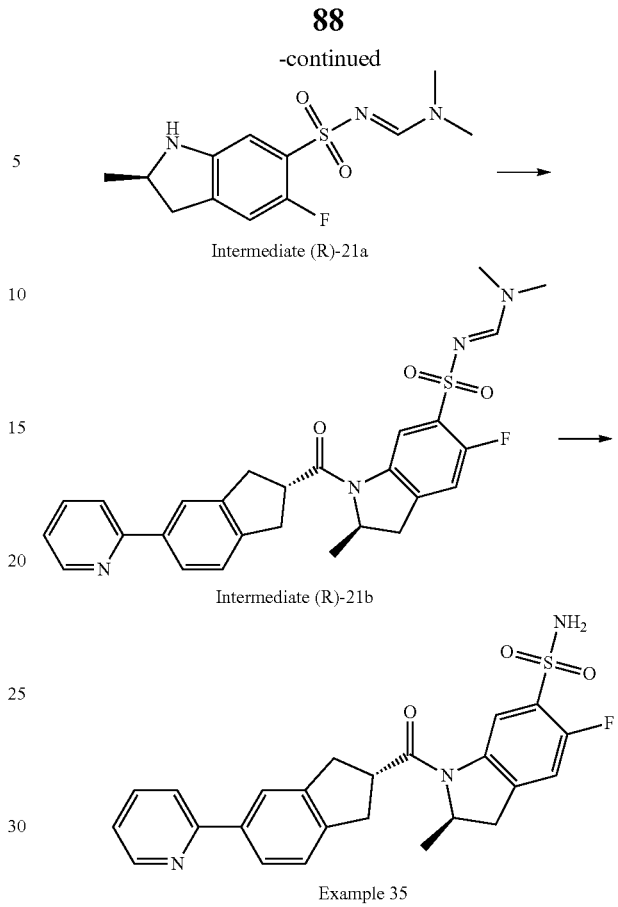

Intermediate (R)-21a

Intermediate (R)-21b

Example 35

Intermediate (R)-21 was taken up in THF (10 V) and dimethylformamide dimethyl acetal (1.2 equiv) was added at once. The solution was stirred at RT for 30 minutes and the solvent was then removed under reduced pressure to afford the crude residue Intermediate (R)-21a (LC/MS: 286.1 [M+H]) which was used directly in the next step without further purification.

Intermediate (R)-21a was taken up in acetonitrile (10 V). Intermediate 19 (1 equiv) was added, followed by TCFH (2 equiv). The suspension was placed in a RT water bath and N-methylimidazole (5 equiv) was added dropwise. The solution stirred at RT for 1 hour, at which time LC/MS analysis indicated complete conversion to Intermediate (R)-21b (LC/MS: 507.2 [M+H]). Hydrazine hydrate (50 equiv) was then added at once and allowed to stir at RT for 30 minutes, after which time water was added (5 V). The resulting precipitate was filtered and dried under reduced pressure to afford Example 35. $^1$H NMR (400 MHz, DMSO-d6) δ 8.69 (d, J=4.9 Hz, 1H), 8.54 (d, J=6.6 Hz, 1H), 8.10-7.84 (m, 4H), 7.58 (s, 2H), 7.51-7.24 (m, 3H), 4.90 (t, J=7.5 Hz, 1H), 3.77 (p, J=8.2 Hz, 1H), 3.46 (ddt, J=34.0, 17.5, 8.7 Hz, 3H), 3.20 (ddd, J=59.1, 16.3, 8.3 Hz, 2H), 2.80 (d, J=16.9 Hz, 1H), 1.30 (d, J=6.2 Hz, 3H). LC/MS: 452.1 [M+H].

Preparation of Intermediate 22

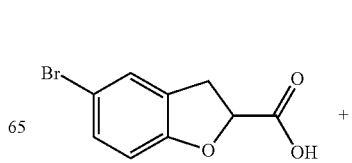

Preparation of Intermediate 23

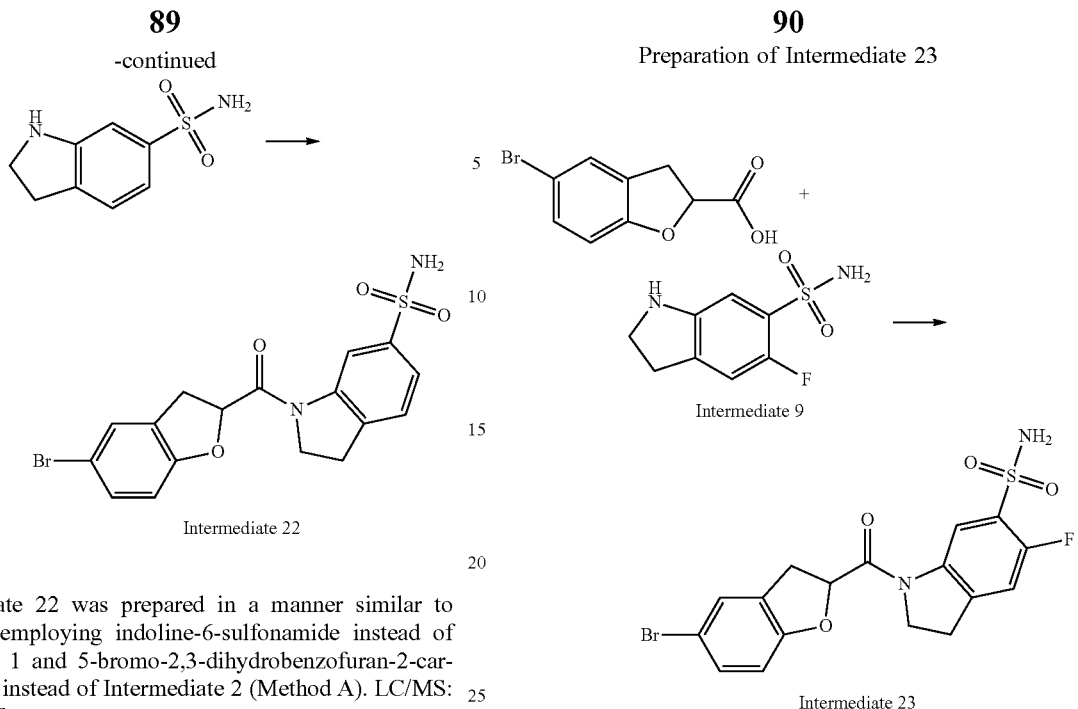

Intermediate 23 was prepared in a manner similar to Intermediate 22 employing Intermediate 9 instead of indoline-6-sulfonamide. LC/MS: 441.0 [M+H].

Intermediate 22 was prepared in a manner similar to Example 1 employing indoline-6-sulfonamide instead of Intermediate 1 and 5-bromo-2,3-dihydrobenzofuran-2-carboxylic acid instead of Intermediate 2 (Method A). LC/MS: 423.0 [M+H].

Preparation of Example 36

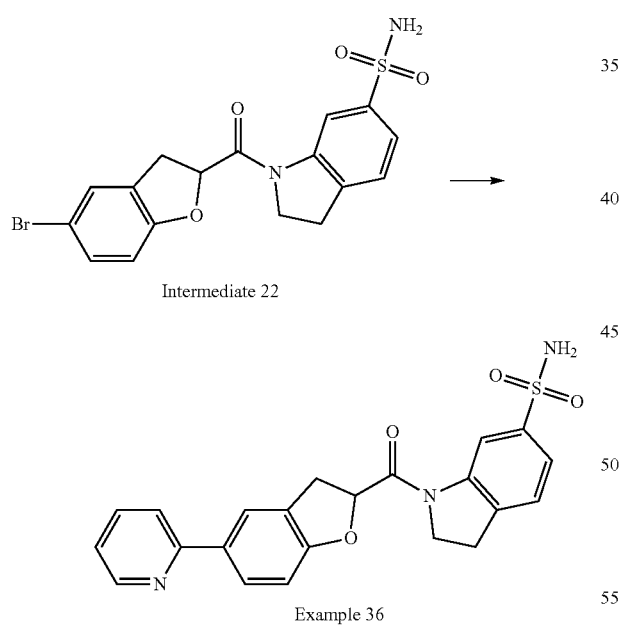

Example 36 was prepared in a manner similar to Example 71 employing Intermediate 22 instead of Intermediate 35. $^1$H NMR (400 MHz, DMSO-d6) δ 8.63 (dd, J=4.8, 1.4 Hz, 1H), 8.54 (d, J=1.7 Hz, 1H), 8.01 (d, J=1.8 Hz, 1H), 7.92 (d, J=5.6 Hz, 2H), 7.89 (d, J=2.1 Hz, 1H), 7.52 (dd, J=7.8, 1.7 Hz, 1H), 7.45 (d, J=7.8 Hz, 1H), 7.34 (t, J=5.8 Hz, 1H), 7.31 (s, 2H), 6.98 (d, J=8.4 Hz, 1H), 5.78 (dd, J=9.7, 6.5 Hz, 1H), 4.47-4.27 (m, 2H), 3.69-3.60 (m, 2H), 3.30 (t, J=8.6 Hz, 2H). LC/MS: 422.1 [M+H].

Preparation of Example 37

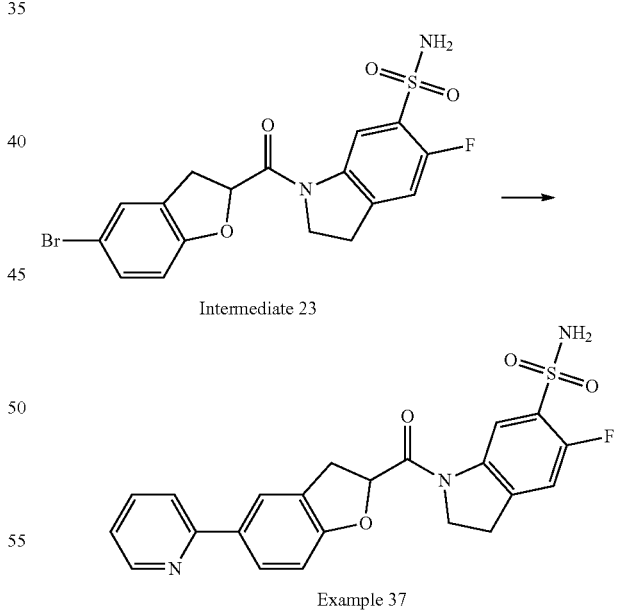

Example 37 was prepared in a manner similar to Example 71 employing Intermediate 23 instead of Intermediate 22. $^1$H NMR (400 MHz, DMSO-d6) δ 8.65 (dt, J=5.1, 1.4 Hz, 1H), 8.51 (d, J=6.7 Hz, 1H), 7.99 (dd, J=7.9, 2.8 Hz, 3H), 7.90 (dd, J=8.4, 2.0 Hz, 1H), 7.60 (s, 2H), 7.40 (t, J=6.7 Hz, 2H), 7.00 (d, J=8.4 Hz, 1H), 5.78 (dd, J=9.7, 6.5 Hz, 1H), 4.47-4.24 (m, 2H), 3.67-3.56 (m, 2H), 3.31 (t, J=8.7 Hz, 2H). LC/MS: 440.1 [M+H].

Preparation of Example 38: (R)-5-bromo-2-methyl-1-((R)-5-(pyridin-2-yl)-2,3-dihydro-1H-indene-2-carbonyl)indoline-6-sulfonamide

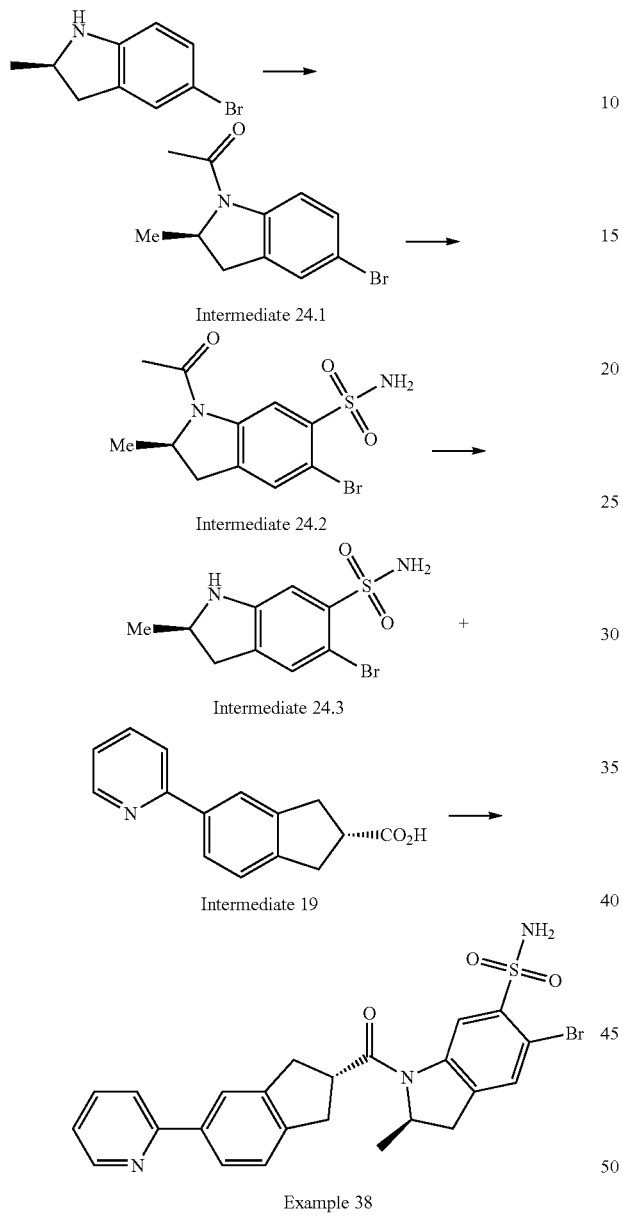

Preparation of Intermediate 25: tert-butyl ((5-fluoroindolin-6-yl)(methyl)(oxo)-16-sulfaneylidene)carbamate

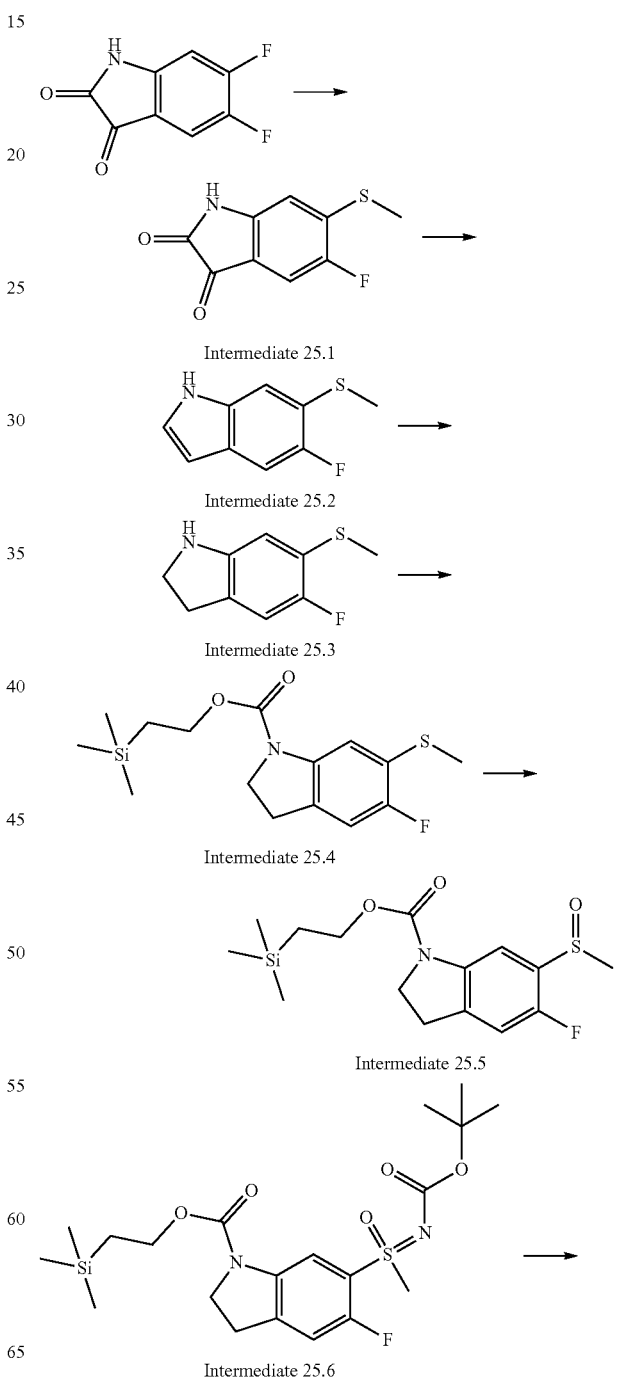

(R)-21 as starting material. $^1$H NMR (400 MHz, DMSO-d6) δ 8.80 (s, 1H), 8.69 (d, J=4.9 Hz, 1H), 8.10-7.91 (m, 3H), 7.88 (d, J=7.8 Hz, 1H), 7.73 (s, 1H), 7.50 (s, 2H), 7.45 (q, J=6.1, 4.3 Hz, 1H), 7.36 (d, J=7.9 Hz, 1H), 4.90 (p, J=6.6 Hz, 1H), 3.77 (p, J=8.3 Hz, 1H), 3.46-3.38 (m, 1H), 3.47-3.32 (m, 3H), 3.13 (dd, J=16.2, 7.6 Hz, 1H), 2.81 (d, J=16.8 Hz, 1H), 1.30 (d, J=6.3 Hz, 3H). LC/MS: 512.1 [M+H].

Intermediate 24.1 was prepared in a manner similar to Intermediate 21.2 employing (R)-5-bromo-2-methylindoline instead of Intermediate 21.1 as starting material. LC/MS: 254.0 [M+H].

Intermediate 24.2 was prepared in a manner similar to Intermediate 21.3 employing Intermediate 24.1 instead of Intermediate 21.2 as starting material. LC/MS: 333.0 [M+H].

Intermediate 24.3 was prepared in a manner similar to Intermediate 21.4 employing Intermediate 24.2 instead of Intermediate 21.3 as starting material. LC/MS: 291.0 [M+H].

Example 38 was prepared in a manner similar to Example 35 employing Intermediate 24.3 instead of Intermediate

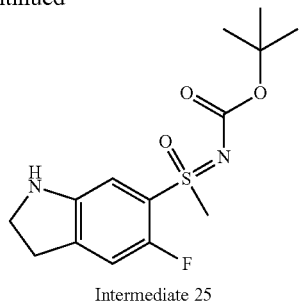

Intermediate 25

Preparation of Intermediate 25.1: To a solution of 5,6-difluoroindoline-2,3-dione (200 g, 1.09 mol) in DMF (5 V) was added sodium methanethiolate (153 g, 2.0 equiv). The solution was stirred at 80° C. for 16 hours, at which time water was added (15 V), and the mixture was extracted with EtOAc (2×600 mL). The pooled organic fractions were washed with brine and dried over sodium sulfate, filtered, and concentrated to provide Intermediate 25.1 which was used without further purification. LC/MS: 212.0 [M+H].

Preparation of Intermediate 25.2: To a solution of Intermediate 25.1 (100 g, 473 mmol) in THF (6 V) at 0° C. was added lithium aluminum hydride (35.9 g, 2.0 equiv). The mixture was warmed to RT and stirred for 16 hours, at which time the reaction was carefully quenched by sequential addition of water (38 mL), 15% aqueous sodium hydroxide (38 mL), and water (114 mL). The crude residue was extracted with EtOAc (2×300 mL), and the combined organic fractions were washed with brine, dried over sodium sulfate, filtered, and concentrated. The crude residue was purified using flash column chromatography on silica gel to afford Intermediate 25.2. LC/MS: 182.0 [M+H].

Preparation of Intermediate 25.3: To a solution of Intermediate 25.2 (26 g, 143 mmol) in acetic acid (5 V) was added sodium cyanoborohydride (27.1 g, 3.0 equiv). The mixture was allowed to stir at RT for 1 hour, at which time water was added (400 mL), and the mixture was extracted with EtOAc (2×150 mL). The combined organic fractions were washed with brine, dried over sodium sulfate, filtered and concentrated. The crude residue was purified by flash column chromatography on silica gel to afford Intermediate 25.3. LC/MS: 184.1 [M+H].

Preparation of Intermediate 25.4: To a solution of Intermediate 25.3 (20.0 g, 109 mmol) in THF (6V) was added 1-[2-(trimethylsilyl)ethoxycarbonyloxy]pyrrolidin-2,5-dione (56.6 g, 2.0 equiv) and DMAP (13.3 g, 1.0 equiv). The solution stirred at RT for 16 hours, at which time water was added (100 mL), and the residue was extracted with dichloromethane (2×50 mL). The combined organic fractions were washed with brine, dried over sodium sulfate, filtered and concentrated. The crude residue was then purified by flash column chromatography on silica gel to afford Intermediate 25.4. LC/MS: 328.1 [M+H].

Preparation of Intermediate 25.5: To a solution of Intermediate 25.4 (20.0 g, 61 mmol) in dichloromethane (6 V) at 0° C. was added m-chloroperoxybenzoic acid (13.6 g, 1.1 equiv). The solution was warmed to RT and stirred for 2 hours, at which time the reaction was filtered and the resulting filtrate was quenched with saturated sodium sulfite solution (100 mL). The resulting residue was extracted with dichloromethane (2×50 mL). The combined organic fractions were washed with brine, dried over sodium sulfate, filtered and concentrated. The crude residue was purified by flash column chromatography on silica gel to afford Intermediate 25.5. LC/MS: 344.1 [M+H].

Preparation of Intermediate 25.6: To a solution of Intermediate 25.5 (14.0 g, 40.7 mmol) in dichloromethane (6 V) was added magnesium oxide (8.21 g, 5.0 equiv), (diacetoxyiodo)benzene (19.7 g, 1.5 equiv), tert-butyl carbamate (9.55 g, 2.0 equiv), and dirhodium tetraacetate (900 mg, 0.05 equiv). The mixture was stirred at 40° C. for 16 hours, at which time water was added, and the mixture was extracted with dichloromethane (2×30 mL). The combined organic fractions were washed with brine, dried over sodium sulfate, filtered and concentrated. The crude residue was purified by flash column chromatography on silica gel to afford Intermediate 25.6. LC/MS: 459.2 [M+H].

Preparation of Intermediate 25: To a solution of Intermediate 25.6 (2.0 g, 4.4 mmol) in THF (10 V) was added tetrabutylammonium fluoride (1.0 M solution in THF, 4.8 mL, 1.1 equiv). The solution stirred at RT for 1 hour, and water was then added (10 mL). The mixture was extracted with EtOAc (2×50 mL). The combined organic fractions were washed with brine, dried over sodium sulfate, filtered, and contracted. The crude residue was purified using flash column chromatography on silica gel to afford Intermediate 25. LC/MS: 315.1 [M+H].

Preparation of Example 39 (General Procedure B): (5-fluoro-1-((R)-5-(pyridin-2-yl)-2,3-dihydro-1H-indene-2-carbonyl)indolin-6-yl)(imino)(methyl)-$\lambda^6$-sulfanone

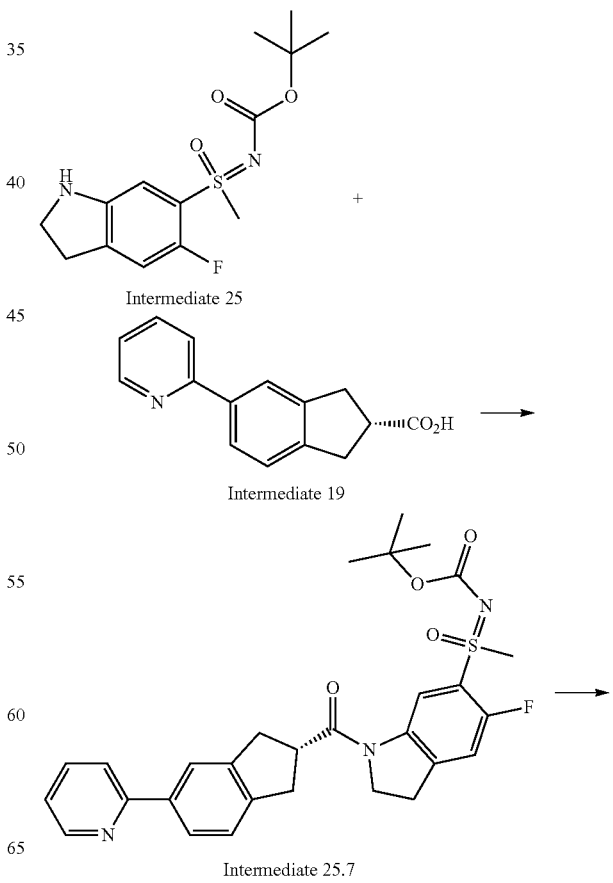

Intermediate 25

Intermediate 19

Intermediate 25.7

-continued

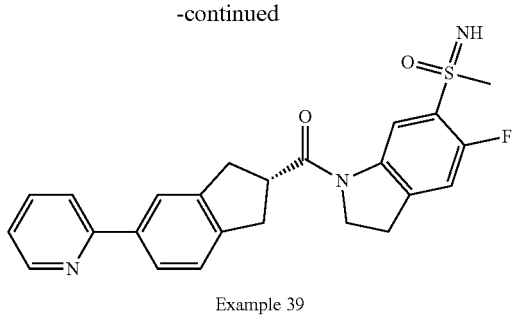

Example 39

To a suspension of Intermediate 25 (500 mg, 1.6 mmol), Intermediate 19 (381 mg, 1.0 equiv), and TCFH (535 mg, 1.2 equiv) in acetonitrile (10 V) was added N-methylimidazole (0.63 mL, 5.0 equiv). The resulting solution stirred at RT for 15 minutes, was concentrated, and purified by flash column chromatography on silica gel to afford Intermediate 25.7. LC/MS: 536.2 [M+H].

A solution of Intermediate 25.7 (980 mg, 1.8 mmol) in dichloromethane (10 V) and trifluoroacetic acid (10 V) was stirred at RT for 1 hour and then concentrated. The resulting residue was purified by reverse phase HPLC to afford Example 39. $^1$H NMR (400 MHz, DMSO-d6) δ 8.70 (d, J=5.0 Hz, 1H), 8.63 (d, J=6.6 Hz, 1H), 8.02 (d, J=4.1 Hz, 2H), 7.95 (s, 1H), 7.88 (d, J=7.9 Hz, 1H), 7.50-7.42 (m, 2H), 7.39 (d, J=7.9 Hz, 1H), 4.36 (t, J=8.6 Hz, 2H), 3.83-3.71 (m, 1H), 3.33-3.22 (m, 9H). LC/MS: 436.1 [M+H].

Preparation of Examples 40 (R)-(5-fluoro-1-((R)-5-(pyridin-2-yl)-2,3-dihydro-1H-indene-2-carbonyl)indolin-6-yl)(imino)(methyl)-16-sulfanone and 41 (S)-(5-fluoro-1-((R)-5-(pyridin-2-yl)-2,3-dihydro-1H-indene-2-carbonyl)indolin-6-yl)(imino)(methyl)-16-sulfanone

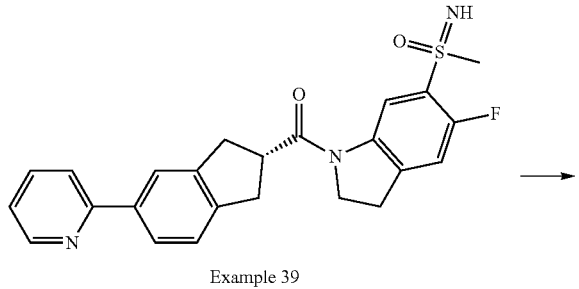

Example 39

Example 39 was subjected to chiral SFC separation using OJ-H 4.6×100 mm column, employing 50% EtOH as co-solvent. Example 40 was obtained as the first eluent. $^1$H NMR (400 MHz, DMSO-d6) δ 8.64 (dt, J=9.7, 4.0 Hz, 2H), 8.01-7.86 (m, 4H), 7.44-7.23 (m, 3H), 4.57 (s, 1H), 4.35 (t, J=8.5 Hz, 2H), 3.75 (p, J=8.2 Hz, 1H), 3.32-3.22 (m, 5H), 3.13 (s, 3H). LC/MS: 436.1 [M+H]. Example 41 was obtained as the second eluent. $^1$H NMR (400 MHz, DMSO-d6) δ 8.70-8.65 (m, 1H), 8.62 (d, J=6.7 Hz, 1H), 8.01-7.93 (m, 3H), 7.93-7.86 (m, 1H), 7.45-7.27 (m, 3H), 4.35 (t, J=8.6 Hz, 2H), 3.75 (p, J=8.1 Hz, 1H), 3.30 (p, J=7.7 Hz, 5H), 3.22 (s, 3H). LC/MS: 436.1 [M+H].

Preparation of Intermediate 26

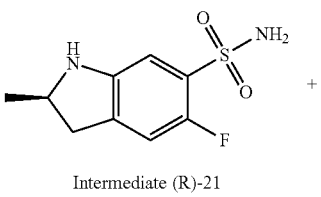

Intermediate (R)-21

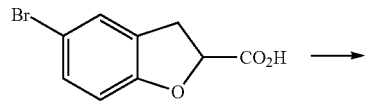

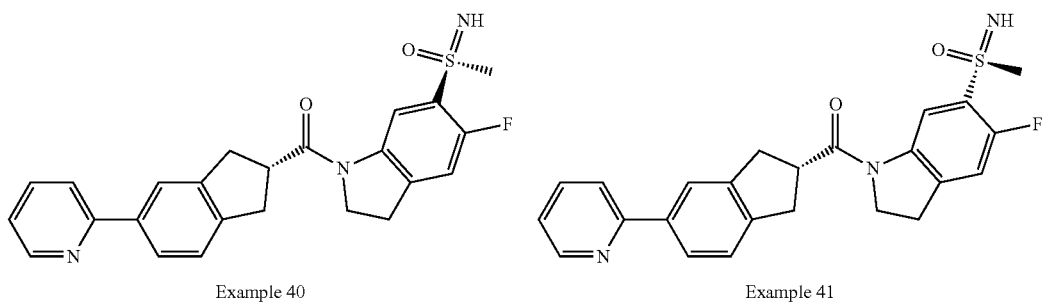

Example 40      Example 41

-continued

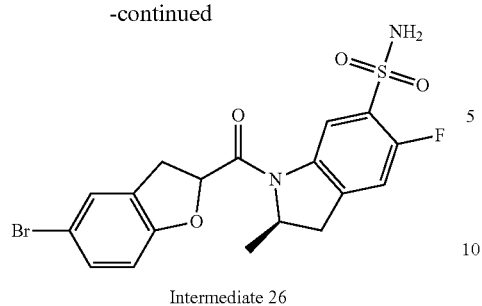

Intermediate 26

-continued

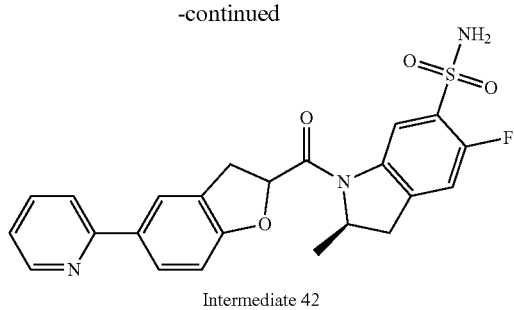

Intermediate 42

Intermediate 26 was prepared in a manner similar to Intermediate 23 employing Intermediate (R)-21 instead of Intermediate 9 as starting material. LC/MS: 455.0 [M+H].

Preparation of Example 42: (2R)-5-fluoro-2-methyl-1-(5-(pyridin-2-yl)-2,3-dihydrobenzofuran-2-carbonyl)indoline-6-sulfonamide

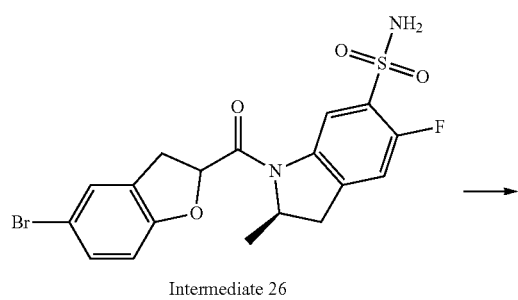

Intermediate 26

Example 42 was prepared in a manner similar to Example 36 employing Intermediate 26 instead of Intermediate 22 as starting material (General Procedure A). $^1$H NMR (400 MHz, DMSO-d6) δ 8.67 (d, J=5.0 Hz, 1H), 8.47 (d, J=6.5 Hz, 1H), 8.03 (t, J=9.0 Hz, 3H), 7.98 (s, 1H), 7.88 (d, J=8.6 Hz, 1H), 7.60 (s, 2H), 7.50-7.40 (m, 2H), 7.00 (t, J=11.4, 8.5 Hz, 1H), 5.87-5.76 (m, 1H), 5.05 (p, J=6.8 Hz, 1H), 4.90 (p, J=6.7 Hz, 1H), 3.72-3.45 (m, 3H), 2.84 (d, J=16.9 Hz, 1H), 1.36 (d, J=6.3 Hz, 2H), 1.32 (d, J=6.5 Hz, 1H). LC/MS: 454.1 [M+H].

Preparation of Examples 43 and 44

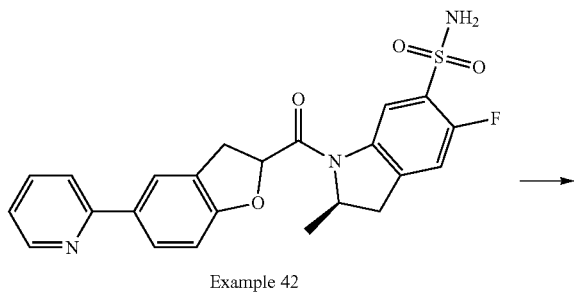

Example 42

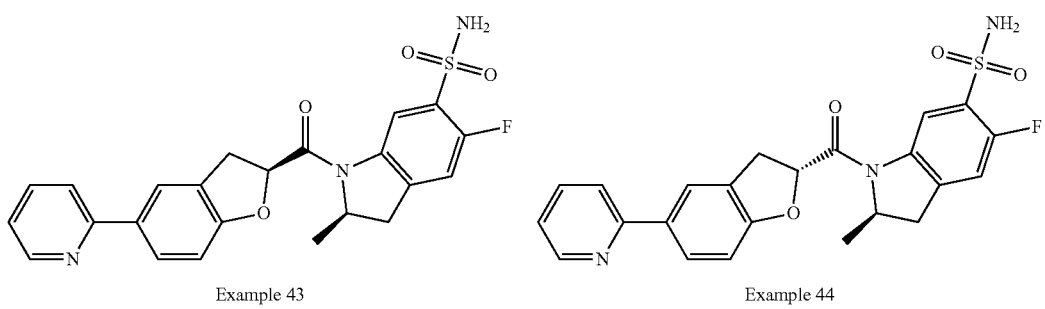

Example 43      Example 44

Example 42 was subjected to chiral SFC purification using OD-H 4.6×100 mm column employing 50% MeOH as co-solvent.

Example 43 was obtained as the first eluent. $^1$H NMR (400 MHz, DMSO-d6) δ 8.63 (dd, J=4.7, 1.5 Hz, 1H), 8.48 (d, J=6.6 Hz, 1H), 7.99 (s, 1H), 7.96-7.88 (m, 3H), 7.61 (s, 2H), 7.43 (d, J=9.7 Hz, 1H), 7.38-7.33 (m, 1H), 6.98 (d, J=8.4 Hz, 1H), 5.79 (dd, J=9.9, 6.2 Hz, 1H), 4.96-4.86 (m, 1H), 2.84 (d, J=16.9 Hz, 1H), 1.36 (d, J=6.3 Hz, 3H), 3H under water peak. LC/MS: 454.1 [M+H].

Example 44 was obtained as the second eluent. $^1$H NMR (400 MHz, DMSO-d6) δ 8.63 (dd, J=4.7, 1.6 Hz, 1H), 8.49 (d, J=6.7 Hz, 1H), 8.03 (s, 1H), 7.95-7.86 (m, 3H), 7.62 (s, 2H), 7.44 (d, J=9.7 Hz, 1H), 7.34 (ddd, J=6.7, 4.8, 1.8 Hz, 1H), 6.95 (d, J=8.3 Hz, 1H), 5.81 (dd, J=9.5, 6.6 Hz, 1H), 5.05 (t, J=7.4 Hz, 1H), 2.85 (d, J=17.0 Hz, 1H), 1.32 (d, J=6.4 Hz, 3H), 3H under water peak. LC/MS: 454.1 [M+H].

Preparation of Example 45: (R)-1-(5-(2,5-difluorophenyl)-2,3-dihydro-1H-indene-2-carbonyl)indoline-6-sulfonamide

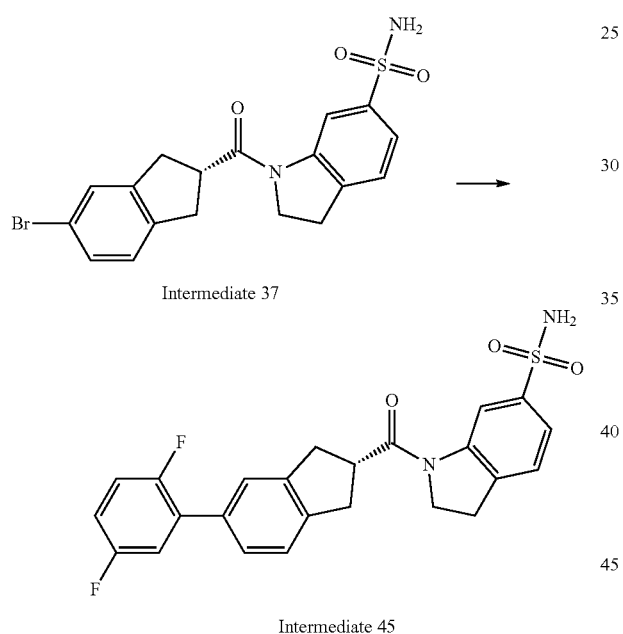

Intermediate 37

Intermediate 45

Example 45 was prepared in a manner similar to Example 71 employing Intermediate 37 instead of Intermediate 35 and 2,5-difluorophenyl boronic acid instead of phenyl boronic acid as starting material. $^1$H NMR (400 MHz, DMSO-d6) δ 8.59 (s, 1H), 7.46 (s, 1H), 7.44-7.38 (m, 2H), 7.35 (s, 4H), 7.27 (s, 2H), 4.33 (t, J=8.5 Hz, 2H), 3.75 (t, J=8.0 Hz, 1H), 6H under water peak. LC/MS: 455.0 [M+H].

Preparation of Intermediate 27

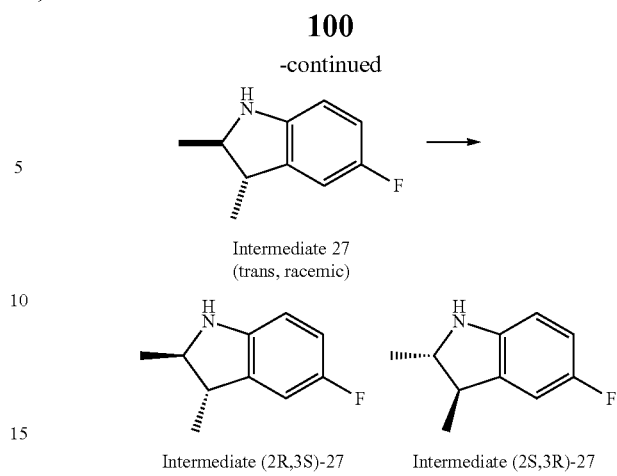

Intermediate 27 (trans, racemic)

Intermediate (2R,3S)-27    Intermediate (2S,3R)-27

To a solution of 5-fluoro-2,3-dimethyl-1H-indole (2 g, 12.3 mmol, 1 eq) in AcOH (7 V) was added NaBH$_3$CN (2 eq). The mixture was stirred at 20° C. for 3 h. The reaction mixture was concentrated to dryness and the crude product was purified by flash column chromatography on silica gel to give trans, racemic Intermediate 27. LC/MS: 166.1 [M+H].

Intermediate 27 was subjected to chiral SFC purification employing OJ-H column with 10% heptane-MTBE as co-solvent to afford Intermediate (2R,3S)-27 (first eluent, LC/MS: 166.1 [M+H]) and Intermediate (2S,3R)-27 (second eluent, LC/MS: 166.1 [M+H]).

Preparation of Example 46 (General Procedure C): (2R,3S)-5-fluoro-2,3-dimethyl-1-((R)-5-(pyridin-2-yl)-2,3-dihydro-1H-indene-2-carbonyl)indoline-6-sulfonamide

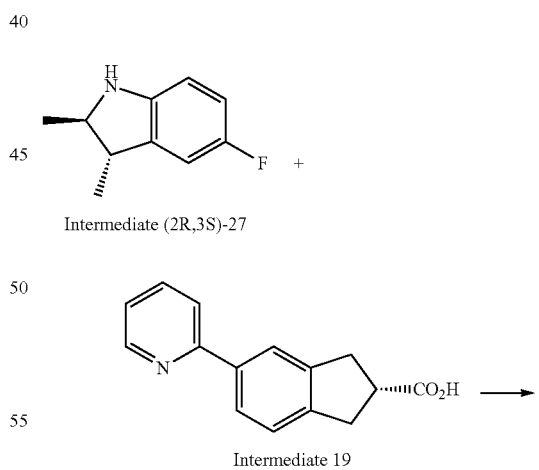

Intermediate (2R,3S)-27

Intermediate 19

Intermediate 27.1

-continued

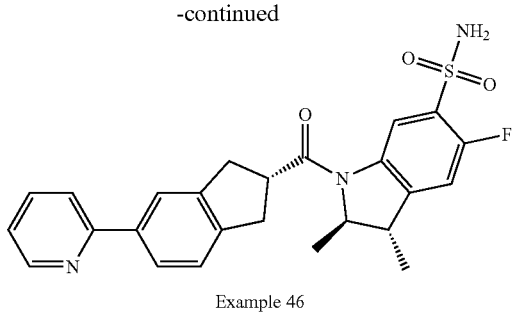

Example 46

Intermediate 27.1 was prepared in a manner similar to Example 1 employing Intermediate (2R,3S)-27 and Intermediate 19 as starting material. LC/MS: 387.2 [M+H].

Example 46 was prepared in a manner similar to Intermediate 21.3 employing Intermediate 27.1 as starting material instead of Intermediate 21.2. ¹H NMR (400 MHz, DMSO-d6) δ 8.70 (d, J=5.0 Hz, 1H), 8.54 (d, J=6.6 Hz, 1H), 8.05-7.95 (m, 3H), 7.89 (dd, J=7.9, 1.7 Hz, 1H), 7.58 (s, 2H), 7.45 (d, J=9.2 Hz, 2H), 7.37 (d, J=7.9 Hz, 1H), 4.44 (d, J=6.4 Hz, 1H), 3.74 (t, J=8.4 Hz, 1H), 3.47 (dd, J=16.0, 8.9 Hz, 2H), 3.26 (dd, J=16.0, 8.5 Hz, 1H), 3.12-3.02 (m, 2H), 1.30 (d, J=6.3 Hz, 3H), 1.25 (d, J=7.0 Hz, 3H). LC/MS: 466.2 [M+H].

Preparation of Example 47: (2S,3R)-5-fluoro-2,3-dimethyl-1-((R)-5-(pyridin-2-yl)-2,3-dihydro-1H-indene-2-carbonyl)indoline-6-sulfonamide

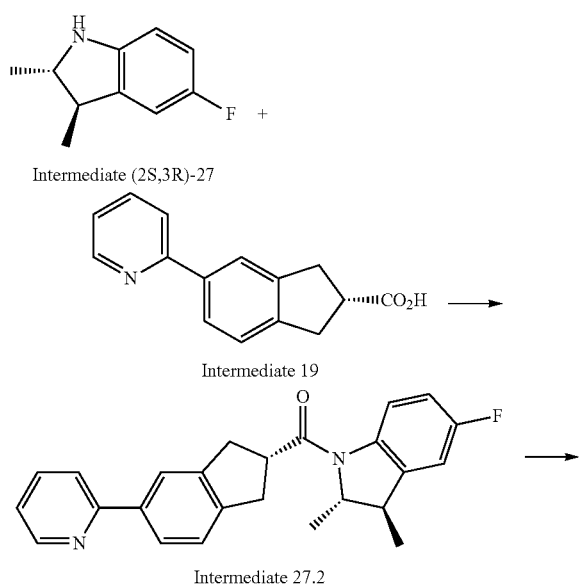

Example 47

Example 47 was synthesized in a manner similar to Example 46 employing Intermediate (2S,3R)-27 as starting material instead of Intermediate (2R,3S)-27 (General Procedure C). ¹H NMR (400 MHz, DMSO-d6) δ 8.65 (d, J=4.9 Hz, 1H), 8.54 (d, J=6.6 Hz, 1H), 7.91 (dd, J=19.6, 9.4 Hz, 4H), 7.58 (s, 2H), 7.45 (d, J=9.8 Hz, 1H), 7.41-7.30 (m, 2H), 4.44 (d, J=6.4 Hz, 1H), 3.73 (s, 1H), 3.27-2.99 (m, 5H), 1.29 (d, J=6.4 Hz, 3H), 1.25 (d, J=6.7 Hz, 3H). LC/MS: 466.2 [M+H].

Preparation of Intermediate 28

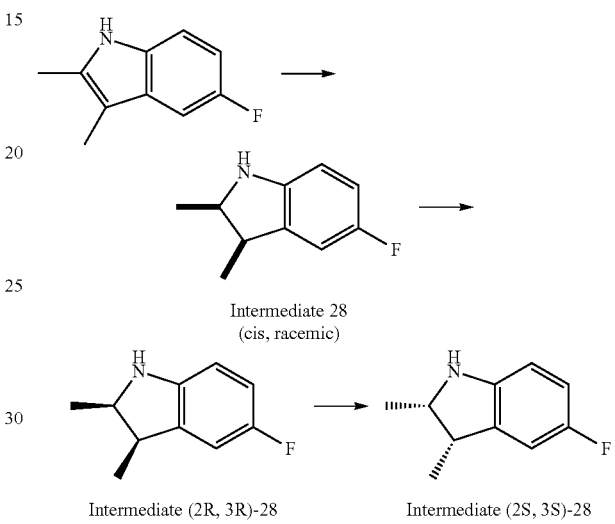

To a solution of 5-fluoro-2,3-dimethyl-1H-indole (5 g, 30.6 mmol, 1 eq) in AcOH (30 mL) and HClO₄ (30.8 g, 306.4 mmol, 18.5 mL, 10 eq) was added Pd/C (20 mol %). The mixture was degassed and purged with H₂ 3 times, and the mixture was stirred at 50° C. for 24 h under H₂ atmosphere (15 psi). After cooling to 0° C., the mixture was basified by 6 N NaOH until pH=9. The mixture was extracted with DCM (40 mL×2). The organic layer was washed with brine (30 mL), dried over Na₂SO₄ and concentrated to give crude product. The crude product was purified by flash column chromatography on silica gel to afford cis, racemic Intermediate 28. LC/MS: 166.1 [M+H].

Intermediate 28 was subjected to chiral SFC purification employing OJ-H column with 10% heptane-MTBE as co-solvent to afford Intermediate (2R,3R)-28 (first eluent, LC/MS: 166.1 [M+H]) and Intermediate (2S,3S)-28 (second eluent, LC/MS: 166.1 [M+H]).

Preparation of Example 48: (2R,3R)-5-fluoro-2,3-dimethyl-1-((R)-5-(pyridin-2-yl)-2,3-dihydro-1H-indene-2-carbonyl)indoline-6-sulfonamide

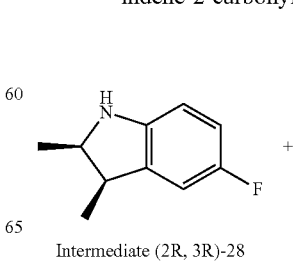

Intermediate (2R, 3R)-28

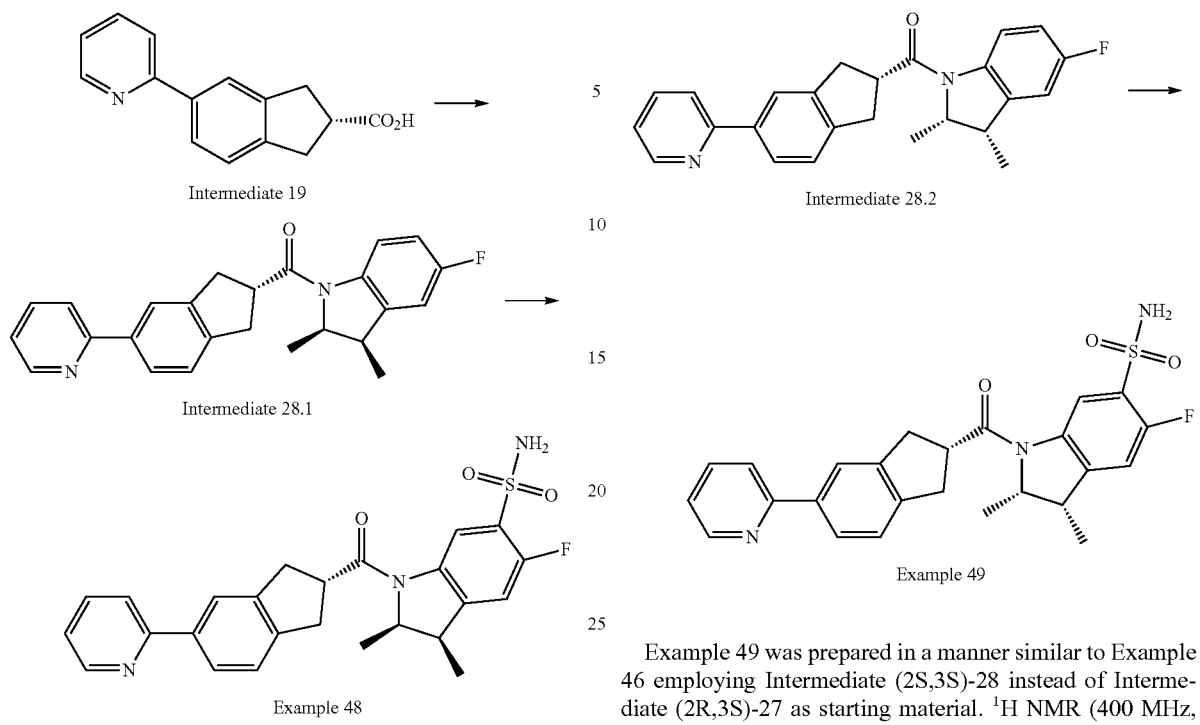

Example 48 was prepared in a manner similar to Example 46 employing Intermediate (2R,3R)-28 instead of Intermediate (2R,3S)-27 as starting material (General Procedure C). ¹H NMR (400 MHz, DMSO-d6) δ 8.73 (d, J=5.1 Hz, 1H), 8.48 (dd, J=6.6, 4.8 Hz, 1H), 8.21-8.00 (m, 2H), 7.96 (s, 1H), 7.87 (dd, J=7.9, 1.7 Hz, 1H), 7.58 (s, 2H), 7.53-7.43 (m, 1H), 7.38 (dd, J=9.1, 4.1 Hz, 2H), 4.89 (p, J=6.8 Hz, 1H), 3.76 (ddd, J=25.1, 15.6, 9.2 Hz, 2H), 3.55-3.34 (m, 2H), 3.28 (dd, J=16.0, 8.6 Hz, 1H), 3.14 (dd, J=16.4, 7.6 Hz, 1H), 1.33 (t, J=7.0 Hz, 3H), 1.14 (t, J=6.4 Hz, 3H). LC/MS: 466.2 [M+H].

Preparation of Example 49 (General Procedure C): (2S,3S)-5-fluoro-2,3-dimethyl-1-((R)-5-(pyridin-2-yl)-2,3-dihydro-1H-indene-2-carbonyl)indoline-6-sulfonamide

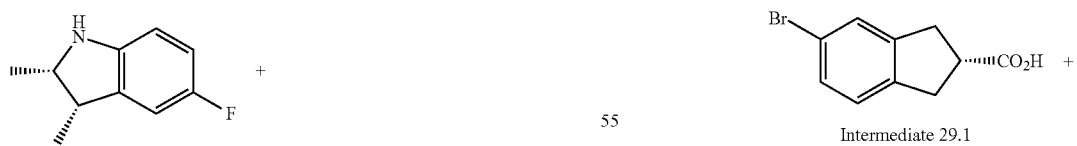

Example 49 was prepared in a manner similar to Example 46 employing Intermediate (2S,3S)-28 instead of Intermediate (2R,3S)-27 as starting material. ¹H NMR (400 MHz, DMSO-d6) δ 8.72 (d, J=5.0 Hz, 1H), 8.48 (d, J=6.5 Hz, 1H), 8.15-8.03 (m, 2H), 7.96-7.82 (m, 2H), 7.58 (s, 2H), 7.55-7.50 (m, 1H), 7.40 (dd, J=21.6, 8.8 Hz, 2H), 4.90 (t, J=7.2 Hz, 1H), 3.75 (dp, J=15.3, 7.8, 7.4 Hz, 2H), 3.45 (ddd, J=31.5, 16.2, 8.1 Hz, 2H), 3.21 (ddd, J=36.4, 16.1, 8.0 Hz, 2H), 1.32 (d, J=7.1 Hz, 3H), 1.14 (d, J=6.4 Hz, 3H). LC/MS: 466.2 [M+H].

Preparation of Intermediate 29

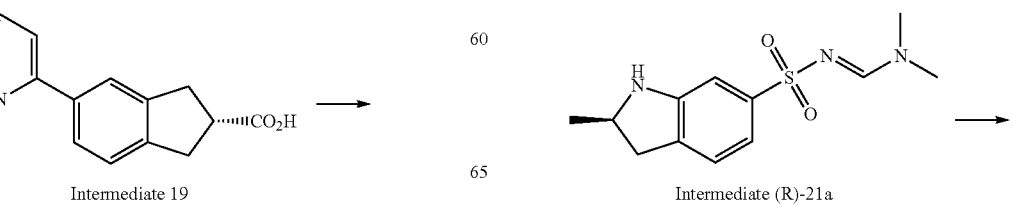

-continued

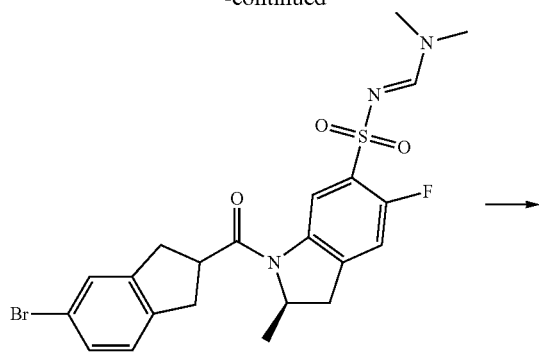

Intermediate 29.2

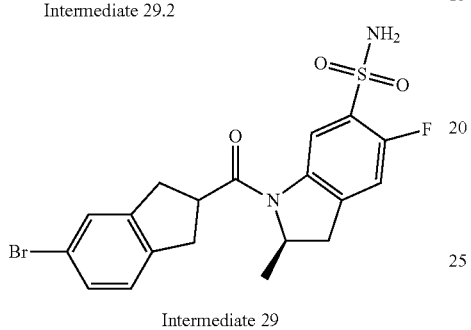

Intermediate 29

Preparation of Intermediate 29.1: 5-bromo-2,3-dihydro-1H-indene-2-carboxylic acid was subjected to chiral SFC purification employing IB column with 5% MeOH as co-solvent. The second eluent was collected to provide Intermediate 29.1. LC/MS: 263.0 [M+Na].

Preparation of Intermediate 29.2: Intermediate 29.2 was prepared in a manner similar to Intermediate (R)-21b employing Intermediate 29.1 as starting material instead of Intermediate 19. LC/MS: 508.1 [M+H].

Preparation of Intermediate 29: To a solution of Intermediate 29.2 (1.0 g, 1.98 mmol) in THF (5 V) was added hydrazine hydrate (50 equiv). The solution stirred at RT for 30 mins and was then concentrated under reduced pressure. The crude residue was purified using flash column chromatography on silica gel to afford Intermediate 29. LC/MS: 453.0 [M+H].

Preparation of Example 50: (R)-1-((R)-5-(2-chloro-5-fluorophenyl)-2,3-dihydro-1H-indene-2-carbonyl)-5-fluoro-2-methylindoline-6-sulfonamide

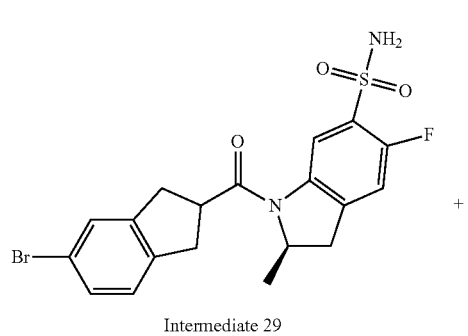

Intermediate 29

-continued

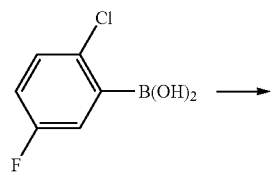

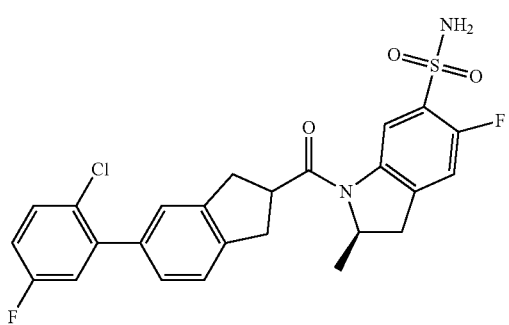

Example 50

Example 50 was prepared in a manner similar to Example 69 employing Intermediate 29 and 2-chloro-5-fluorophenyl boronic acid as starting materials. $^1$H NMR (400 MHz, DMSO-d6) δ 8.54 (d, J=6.5 Hz, 1H), 7.57 (s, 2H), 7.38 (d, J=9.8 Hz, 1H), 7.29 (t, 3H), 7.23 (d, J=10.0 Hz, 2H), 4.89 (q, J=7.7, 7.1 Hz, 1H), 3.76 (p, J=8.2 Hz, 1H), 3.51 (dd, J=16.9, 9.0 Hz, 1H), 3.23 (dd, J=15.6, 8.4 Hz, 1H), 3.11 (dd, J=16.2, 7.7 Hz, 1H), 2.79 (d, J=16.9 Hz, 1H), 1.28 (d, J=6.1 Hz, 3H). LC/MS: 503.1 [M+H].

Preparation of Example 51 (General Procedure B): (1-((R)-5-(2,5-difluorophenyl)-2,3-dihydro-1H-indene-2-carbonyl)-5-fluoroindolin-6-yl)(imino)(methyl)-λ$^6$-sulfanone

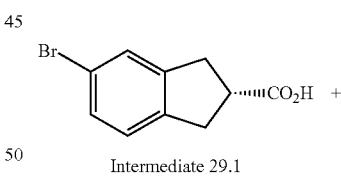

Intermediate 29.1

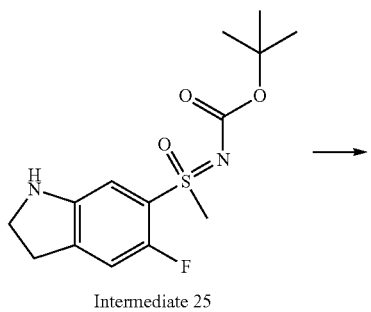

Intermediate 25

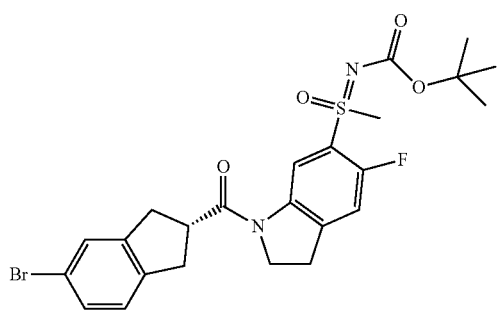

Intermediate 30.1

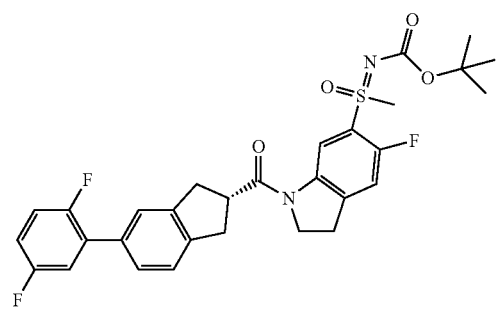

Intermediate 30.2

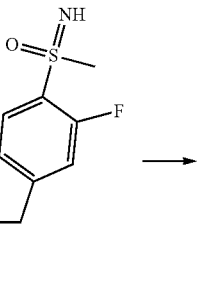

Example 51

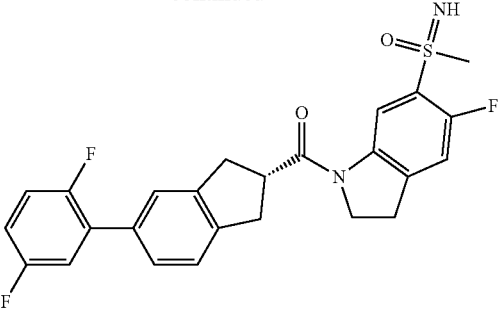

Example 51

Intermediate 30.1 was prepared in a manner similar to Intermediate 25.8 employing Intermediate 29.1 as starting material instead of Intermediate 19. LC/MS: 537.1 [IM+H].

Intermediate 30.2 was prepared in a manner similar to Example 69 employing Intermediate 30.1 and 2,5-difluorophenyl boronic acid as starting materials. LC/MS: 571.2 [M+H].

Intermediate 30.2 (106 mg, 0.19 mmol) was dissolved in dichloromethane (5 V) and trifluoroacetic acid (5 V). The solution was stirred at RT for 5 minutes and was concentrated under reduced pressure. The resulting residue was purified using reverse phase HPLC to afford Example 51. $^1$H NMR (400 MHz, DMSO-d6) δ 8.63 (d, J=6.6 Hz, 1H), 7.48-7.30 (m, 7H), 7.30-7.15 (m, 1H), 4.35 (t, J=8.6 Hz, 2H), 3.75 (p, J=7.9 Hz, 1H), 3.44-3.14 (in, 9H). LC/MS: 471.2 [M+H].

Preparation of Examples 52 and 53

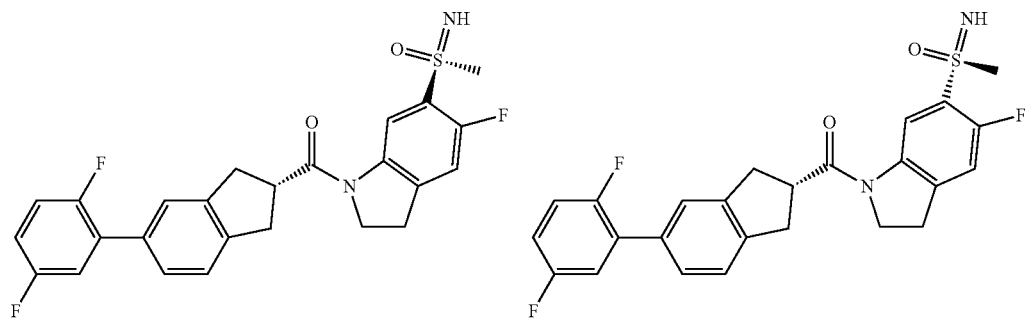

Example 52

Example 53

Example 51 was subjected to chiral SFC purification employing OJ-H column with 40% EtOH as co-solvent. Example 52 was obtained as the first eluent. ¹H NMR (400 MHz, DMSO-d6) δ 8.62 (d, J=6.7 Hz, 1H), 7.47-7.29 (m, 7H), 7.29-7.15 (m, 1H), 4.34 (t, J=8.5 Hz, 2H), 3.75 (p, J=8.0 Hz, 1H), 3.28 (q, J=7.6, 6.5 Hz, 6H), 3.15 (s, 3H). LC/MS: 471.2 [M+H].

Example 53 was obtained as the second eluent. ¹H NMR (400 MHz, DMSO-d6) δ 8.62 (d, J=6.7 Hz, 1H), 7.47-7.28 (m, 7H), 7.28-7.15 (m, 1H), 4.34 (t, J=8.6 Hz, 2H), 3.75 (p, J=8.0 Hz, 1H), 3.30-3.19 (m, 6H), 3.14 (s, 3H). LC/MS: 471.2 [M+H].

Preparation of Intermediate 31

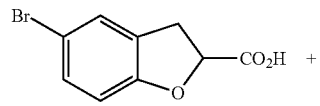

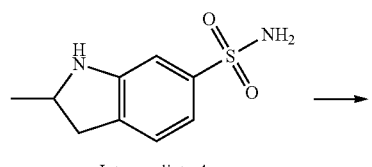

Intermediate 4

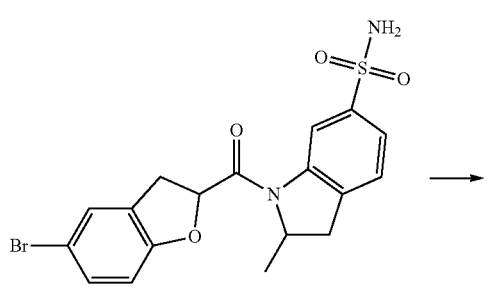

Intermediate 31.1

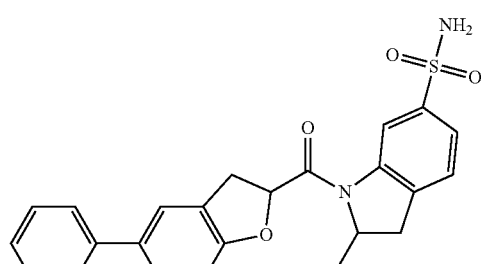

Intermediate 31

Intermediate 31.1 was prepared in a manner similar to Intermediate 22 employing Intermediate 4 as starting material instead of indoline-6-sulfonamide. LC/MS: 437.0 [M+H].

Intermediate 31 was prepared in a manner similar to Example 71 employing Intermediate 31.1 as starting material instead of Intermediate 35. LC/MS: 436.1 [M+H].

Preparation of Examples 56, and 57

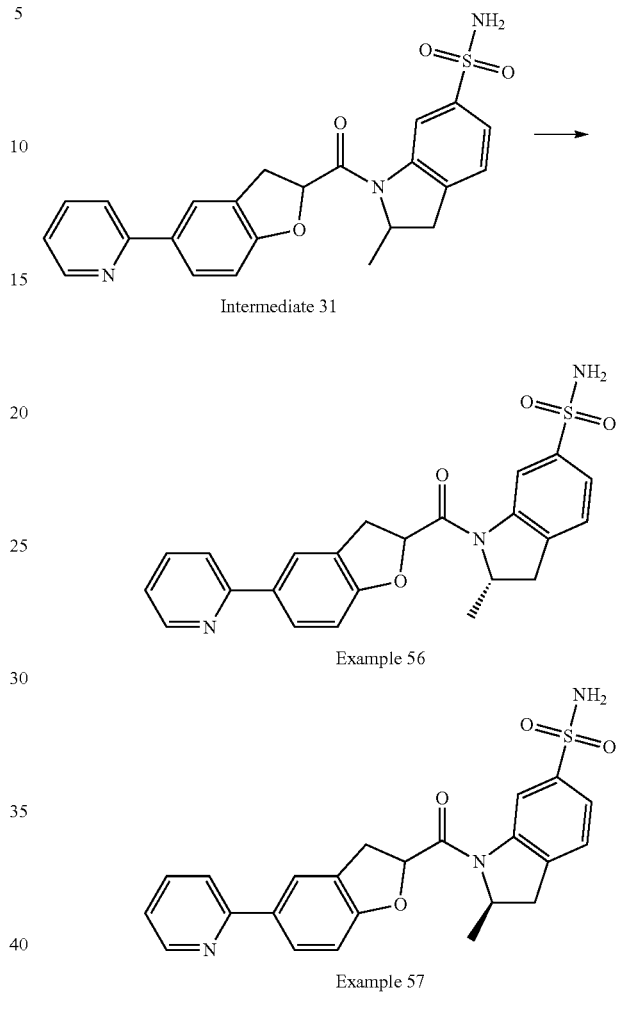

Intermediate 31 was subjected to chiral SFC purification employing OJ-H 4.6×100 mm column with 45% MeOH-DEA as co-solvent.

Example 56 was obtained as the second eluent. ¹H NMR (400 MHz, DMSO-d6) δ 8.61 (ddd, J=4.8, 1.8, 1.0 Hz, 1H), 8.52 (s, 1H), 8.00 (d, J=1.8 Hz, 1H), 7.93-7.88 (m, 1H), 7.87 (t, J=1.2 Hz, 1H), 7.83 (td, J=7.7, 1.8 Hz, 1H), 7.56 (dd, J=7.8, 1.7 Hz, 1H), 7.49 (d, J=7.8 Hz, 1H), 7.30 (s, 2H), 7.28 (ddd, 1H), 6.96 (d, J=8.4 Hz, 1H), 5.79 (dd, J=10.0, 6.2 Hz, 1H), 4.91 (p, J=6.5 Hz, 1H), 3.68 (dd, J=15.8, 9.8 Hz, 1H), 3.50 (dt, J=14.9, 6.8 Hz, 2H), 2.84 (d, J=16.6 Hz, 1H), 1.37 (d, J=6.3 Hz, 3H). LC/MS: 436.1 [M+H].

Example 57 was obtained as the first eluent. ¹H NMR (400 MHz, DMSO-d6) δ 8.61 (ddd, J=4.9, 1.8, 1.0 Hz, 1H), 8.53 (s, 1H), 8.04 (d, J=1.8 Hz, 1H), 7.93-7.88 (m, 1H), 7.87 (t, J=1.2 Hz, 1H), 7.83 (td, J=7.6, 1.8 Hz, 1H), 7.57 (dd, J=7.9, 1.7 Hz, 1H), 7.50 (d, J=7.8 Hz, 1H), 7.32 (s, 2H), 7.28 (ddd, J=7.2, 4.8, 1.3 Hz, 1H), 6.93 (d, J=8.6 Hz, 1H), 5.82 (dd, J=9.6, 6.6 Hz, 1H), 5.06 (t, J=7.5 Hz, 1H), 3.67 (dd, J=15.8, 6.5 Hz, 1H), 3.59 (dd, J=17.8, 9.4 Hz, 1H), 3.52 (d, J=8.6 Hz, 1H), 2.85 (d, J=16.4 Hz, 1H), 1.33 (d, J=6.3 Hz, 3H). LC/MS: 436.1 [M+H].

Preparation of Example 58: (R)-1-(5-(2,5-difluorophenyl)-2,3-dihydro-1H-indene-2-carbonyl)-5-fluoroindoline-6-sulfonamide

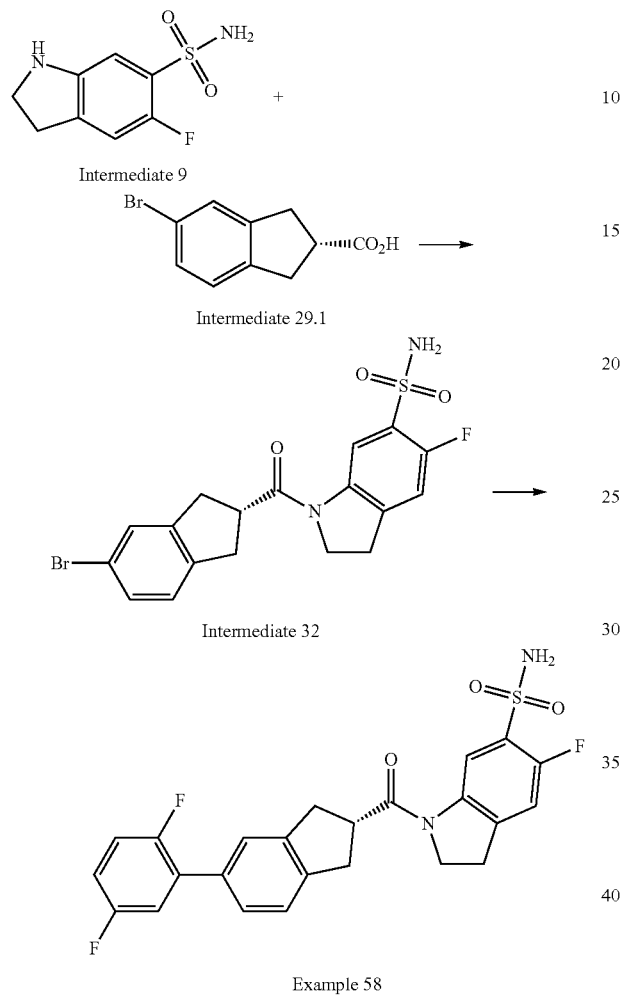

Example 58

Intermediate 32 was prepared in a manner similar to Intermediate 29 employing Intermediate 9 and Intermediate 29.1 as starting materials. LC/MS: 439.0 [M+H].

Example 58 was prepared in a manner similar to Example 50 employing Intermediate 32 and 2,5-difluorophenyl boronic acid as starting materials. $^1$H NMR (400 MHz, DMSO-d$_6$) δ 8.56 (d, J=6.7 Hz, 1H), 7.57 (s, 2H), 7.43 (s, 1H), 7.41-7.32 (m, 5H), 7.25 (dq, J=8.9, 5.1, 4.3 Hz, 1H), 4.33 (t, J=8.5 Hz, 2H), 3.73 (d, J=8.0 Hz, 1H), 6H under water peak. LC/MS: 473.1 [M+H].

Preparation of Intermediate 33

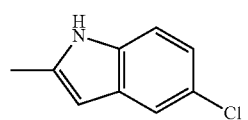

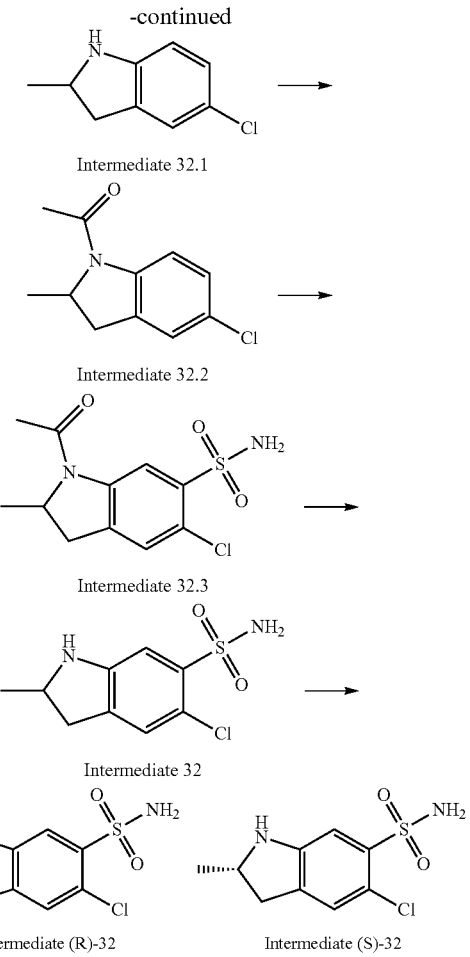

Intermediate 32 was prepared in a manner similar to Intermediate 21 employing 5-chloro-2-methylindole instead of 5-fluoro-2-methylindole as starting material. LC/MS: 247.0 [M+H].

Intermediate 32 was subjected to chiral SFC separation employing ChiralPak IG column with 60% MeOH as co-solvent.

Intermediate (R)-32 was obtained as the first eluent. LC/MS: 247.0 [M+H].

Intermediate (S)-32 was obtained as the second eluent. LC/MS: 247.0 [M+H].

Preparation of Example 59 (General Procedure B): (S)-5-chloro-2-methyl-1-((R)-5-(pyridin-2-yl)-2,3-dihydro-1H-indene-2-carbonyl)indoline-6-sulfonamide

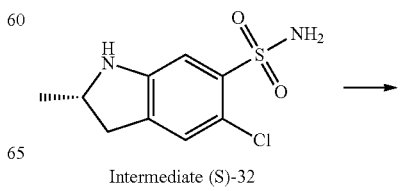

Intermediate (S)-32

113

-continued

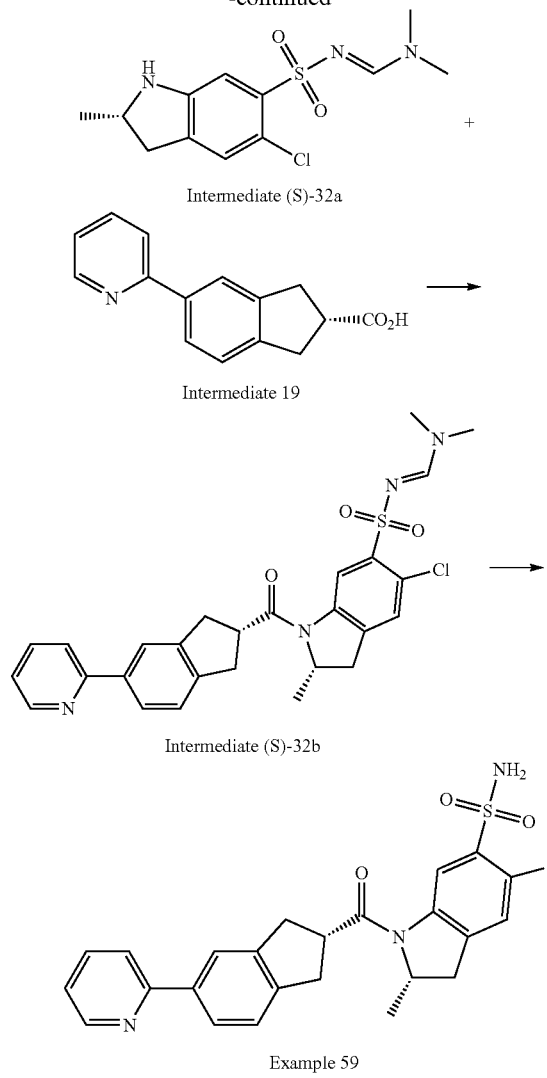

Example 59 was prepared in a manner similar to Example 35 employing Intermediate (S)-32 and Intermediate 19 as starting materials. $^1$H NMR (400 MHz, DMSO-d6) δ 8.76 (s, 1H), 8.72-8.62 (m, 1H), 8.05-7.85 (m, 4H), 7.59-7.32 (m, 5H), 4.91 (t, J=7.3 Hz, 1H), 3.53-3.06 (m, 6H), 2.81 (d, J=16.9 Hz, 1H), 1.30 (d, J=6.3 Hz, 3H). LC/MS: 468.2 [M+H].

Preparation of Example 60 (General Procedure B): (R)-5-chloro-2-methyl-1-((R)-5-(pyridin-2-yl)-2,3-dihydro-1H-indene-2-carbonyl)indoline-6-sulfonamide

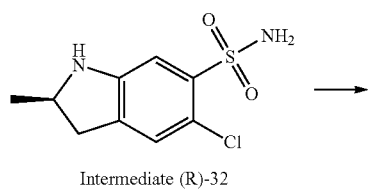

114

-continued

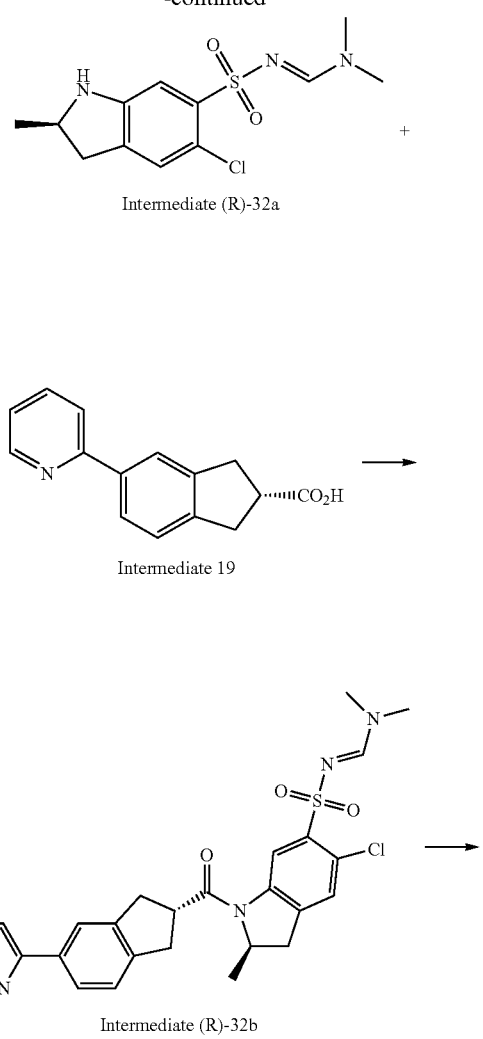

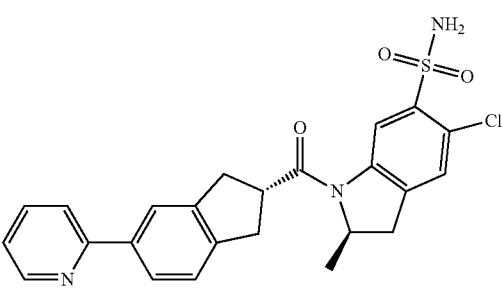

Example 60

Example 60 was prepared in a manner similar to Example 35 employing Intermediate (R)-32 and Intermediate 19 as starting materials. $^1$H NMR (400 MHz, DMSO-d6) δ 8.75 (s, 1H), 8.70 (dt, J=5.0, 1.4 Hz, 1H), 8.11-7.80 (m, 4H), 7.62-7.26 (m, 5H), 4.90 (t, J=7.5 Hz, 1H), 3.78 (p, J=8.1 Hz, 1H), 3.46 (dtd, J=22.5, 15.3, 13.7, 8.1 Hz, 3H), 3.28 (dd, J=16.1, 8.5 Hz, 1H), 3.13 (dd, J=16.3, 7.7 Hz, 1H), 2.81 (d, J=16.8 Hz, 1H), 1.30 (d, J=6.3 Hz, 3H). LC/MS: 468.2 [M+H].

Preparation of Example 61: (R)-1-((R)-5-(2,5-difluorophenyl)-2,3-dihydro-1H-indene-2-carbonyl)-5-fluoro-2-methylindoline-6-sulfonamide

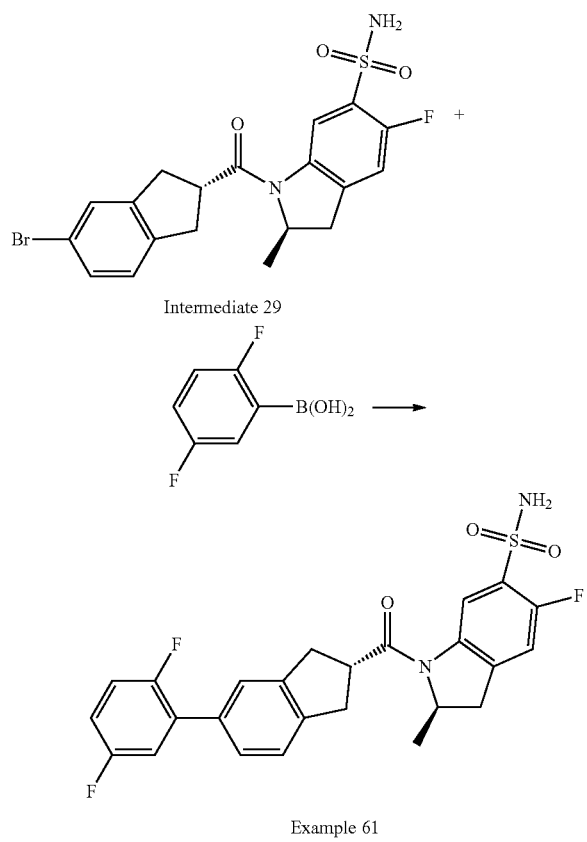

Intermediate 29

Example 61

Example 61 was prepared in a manner similar to Example 50 employing 2,5-difluorophenyl boronic acid instead of 2-chloro-5-fluorophenyl boronic acid as starting material. $^1$H NMR (400 MHz, DMSO-d6) δ 8.54 (d, J=6.7 Hz, 1H), 7.58 (s, 2H), 7.45 (s, 1H), 7.42-7.30 (m, 5H), 7.28-7.21 (m, 1H), 4.88 (q, J=7.1 Hz, 1H), 3.81-3.71 (m, 1H), 3.51 (dd, J=17.0, 8.9 Hz, 1H), 3.25 (dd, J=15.9, 8.5 Hz, 1H), 3.11 (dd, J=16.1, 7.7 Hz, 1H), 2.80 (d, J=16.9 Hz, 1H), 1.29 (d, J=6.3 Hz, 3H), 2H under water peak. LC/MS: 487.1 [M+H].

Preparation of Example 62: (R)-5-fluoro-2-methyl-1-((R)-5-(2,3,5-trifluorophenyl)-2,3-dihydro-1H-indene-2-carbonyl)indoline-6-sulfonamide

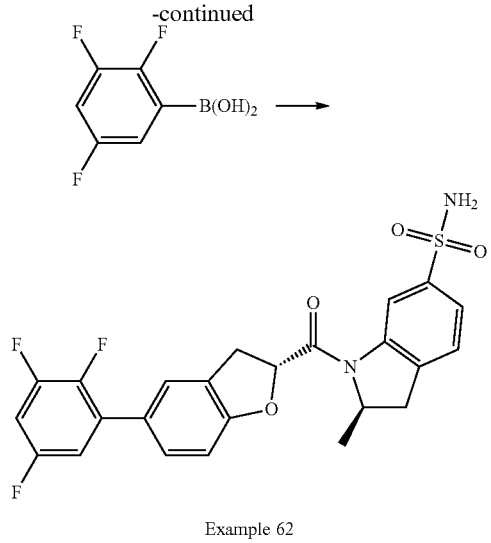

Intermediate 29

-continued

Example 62

Example 62 was prepared in a manner similar to Example 50 employing 2,3,5-trifluorophenyl boronic acid instead of 2-chloro-5-fluorophenyl boronic acid as starting material. $^1$H NMR (400 MHz, DMSO-d6) δ 8.54 (d, J=6.7 Hz, 1H), 7.58 (s, 2H), 7.54 (dd, J=9.7, 5.1 Hz, 1H), 7.40 (s, 1H), 7.36 (d, J=6.8 Hz, 2H), 7.27 (dd, J=9.2, 4.0 Hz, 2H), 4.89 (t, J=7.6 Hz, 1H), 3.77 (q, J=8.3 Hz, 1H), 3.52 (dd, J=16.8, 8.8 Hz, 1H), 3.13 (dd, J=16.1, 7.8 Hz, 1H), 2.80 (d, J=16.8 Hz, 1H), 1.29 (d, J=6.3 Hz, 3H), 3H under water peak. LC/MS: 505.1 [M+H].

Preparation of Example 63: (R)-2,5-dimethyl-1-((R)-5-(pyridin-2-yl)-2,3-dihydro-1H-indene-2-carbonyl)indoline-6-sulfonamide

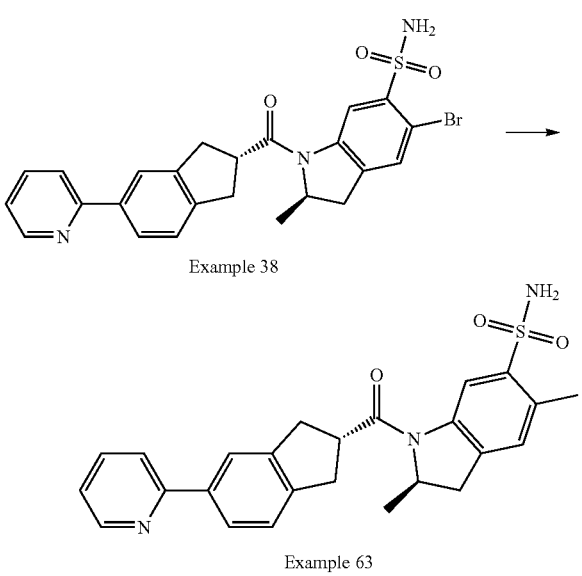

Example 38

Example 63

To a solution of Example 38 (40 mg, 0.047 mmol) in DMF (10 V) was added tetramethyltin (5 equiv). The mixture was sparged with argon for 10 minutes and then heated to 90° C. After stirring at that temperature for 1 hour, the solution was cooled to RT, filtered, and purified by reverse phase HPLC to afford Example 63.

Preparation of Intermediate 33

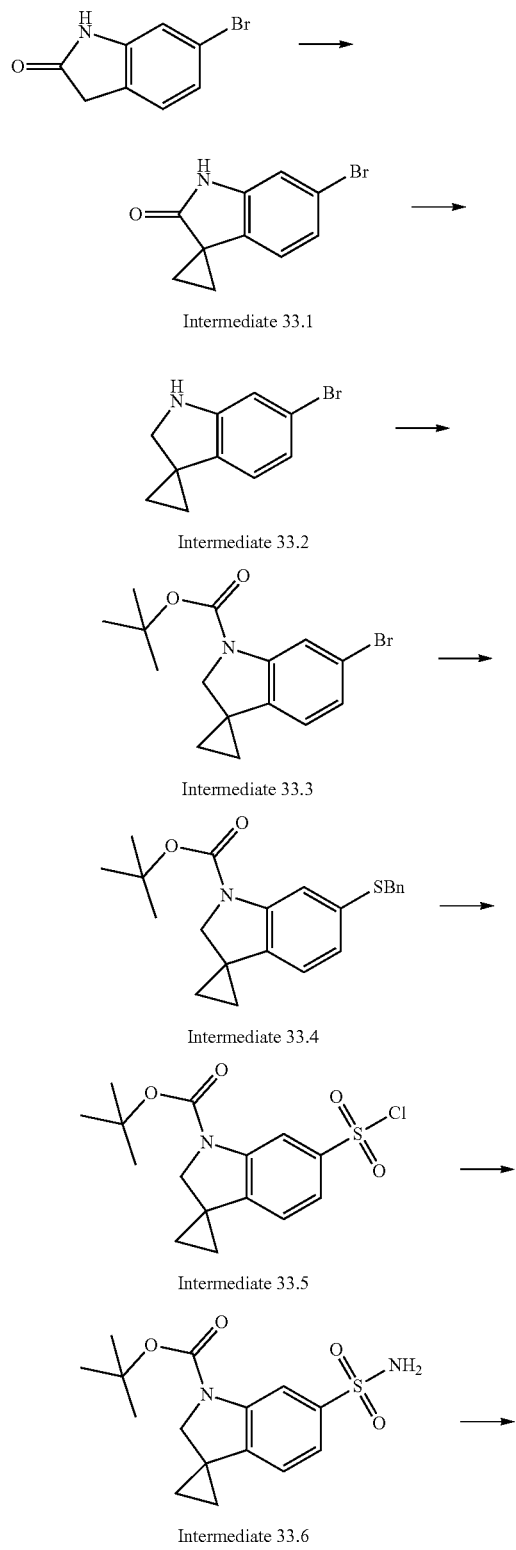

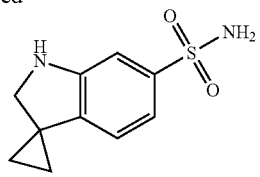

Intermediate 33

To a solution of 6-bromoindolin-2-one (10 g, 47.2 mmol, 1 eq) and diisopropylamine (10.5 g, 103.7 mmol, 14.6 mL, 2.2 eq) in THF (100 mL) at −40° C. was added n-BuLi (2.5 M in hexanes, 41.5 mL, 2.2 eq) dropwise. The mixture was stirred for 45 mins at −40° C., 1,2-dibromoethane (26.5 g, 141.4 mmol, 10.6 mL, 3 eq) was then added dropwise and stirring was continued for 16 h while the temperature was slowly raised to 20° C. The reaction mixture was poured into 2 N NH$_4$Cl (100 mL), then the mixture was extracted with Ethyl acetate (100 mL×2). The combined organic layers were washed with brine (50 mL) and dried over Na$_2$SO$_4$. The combined organic layer was concentrated to dryness to give residue. The residue was purified by reverse-MPLC (Agela C18 800 g silica, 35-65% ethanol in hexane, gradient over 30 min) to afford Intermediate 33.1. LC/MS: 238.0 [M+H].

To a solution of Intermediate 33.1 (3 g, 12.6 mmol, 1 eq) in THF (60 mL) was added LiAlH$_4$ (1.4 g, 37.8 mmol, 3 eq) at 0° C. The mixture was stirred at 60° C. for 1 h. After cooling to 0-10° C., 1.5 mL water, 1.5 mL 1 N NaOH and 4.5 mL water were added into the solution. The mixture was filtered through diatomite and the filtrate was concentrated in vacuo to afford Intermediate 33.2 (LC/MS: 224.0 [M+H]), which was utilized in the next step without further purification.

To a solution of Intermediate 32.2 (1.9 g, 8.4 mmol, 1 eq) in THF (20 mL) were added TEA (1.3 g, 12.7 mmol, 1.7 mL, 1.5 eq) and Boc$_2$O (2.7 g, 12.7 mmol, 2.9 mL, 1.5 eq). The mixture was stirred at 30° C. for 12 h. The reaction mixture was concentrated to dryness to give the crude product. The crude product was purified by flash column chromatography on silica gel to afford Intermediate 33.3 LC/MS: 324.0 [M+H].

To a solution of Intermediate 33.3 (2.6 g, 8.1 mmol, 1 eq) in dioxane (50 mL) were added BnSH (1.5 g, 12.0 mmol, 1.4 mL, 1.5 eq), DIEA (2.0 g, 16.0 mmol, 2.7 mL, 2 eq), Pd$_2$(dba)$_3$ (367.1 mg, 400.9 umol, 0.05 eq) and Xantphos (464.0 mg, 801.9 umol, 0.1 eq). The mixture was stirred at 120° C. for 12 h under argon atmosphere. The reaction mixture was concentrated to dryness to give the crude product, which was purified by flash column chromatography on silica gel to afford Intermediate 33.4. LC/MS: 368.2 [M+H].

To a solution of Intermediate 33.4 (1.5 g, 4.0 mmol, 1 eq) in AcOH (15 mL) and Water (5 mL) was added NCS (1.6 g, 12.2 mmol, 3 eq). The mixture was stirred at 20° C. for 5 h. 30 mL of water was added to the reaction, the reaction mixture was extracted with Ethyl acetate (40 mL×2). The combined organic layers were washed with brine (30 mL) and dried over Na$_2$SO$_4$. The combined organic layer was concentrated to dryness to give a crude residue, which was purified by flash column chromatography on silica gel to afford Intermediate 33.5. LC/MS: 344.1 [M+H].

A solution of Intermediate 33.5 (1.0 g, 3.0 mmol, 1 eq) in THF (10 mL) and NH$_3$·H$_2$O (5 mL, 30% purity) was stirred at 20° C. for 12 h. The reaction mixture was concentrated to remove THF. Then, 10 mL of Water was added to the reaction mixture, precipitate was formed, the precipitate was collected by filtration, the filter cake was washed with water (10 mL×2) and dried under reduced pressure to give Intermediate 33.6. LC/MS: 325.1 [M+H].

A solution of Intermediate 33.6 (880 mg, 2.7 mmol) in 4 M HCl/EtOAc (20 mL) was stirred at 20° C. for 1 h. The reaction mixture was filtered, and the filter cake was washed with EtOAc (5 mL×2) and dried under reduced pressure to give Intermediate 33. LC/MS: 225.1 [M+H].

Preparation of Example 64 (General Procedure A): (R)-1'-(5-(pyridin-2-yl)-2,3-dihydro-1H-indene-2-carbonyl)spiro[cyclopropane-1,3'-indoline]-6'-sulfonamide

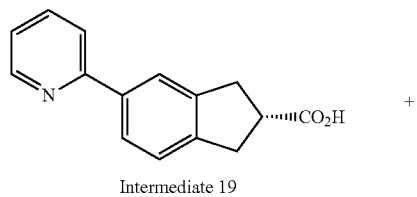

Intermediate 19

+

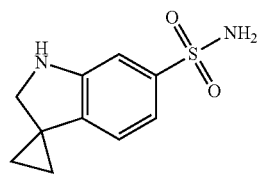

Intermediate 33

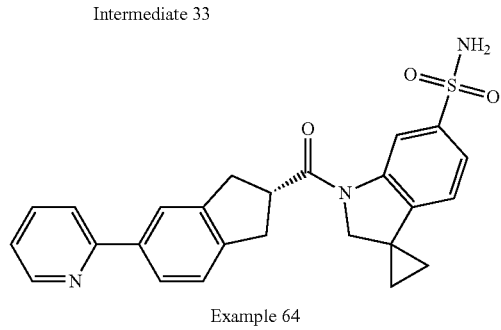

Example 64

Example 64 was prepared in a manner to Example 60 employing Intermediate 19 and Intermediate 33 as starting material. ¹H NMR (400 MHz, DMSO-d6) δ 8.65 (ddd, J=4.7, 1.9, 0.9 Hz, 1H), 8.59 (d, J=1.8 Hz, 1H), 8.01-7.81 (m, 4H), 7.45 (dd, J=7.9, 1.7 Hz, 1H), 7.41-7.30 (m, 2H), 7.26 (s, 2H), 6.99 (d, J=7.9 Hz, 1H), 4.37 (s, 2H), 3.68 (p, J=8.1 Hz, 1H), 3.42-3.20 (m, 4H), 1.33-1.09 (m, 4H). LC/MS: 446.2 [M+H].

Preparation of Intermediate 34

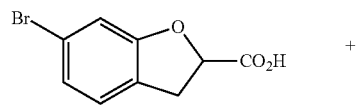 +

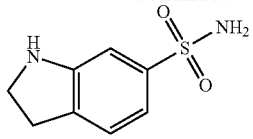

Intermediate 9

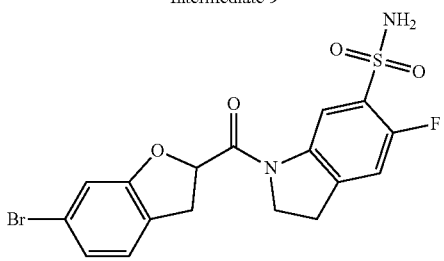

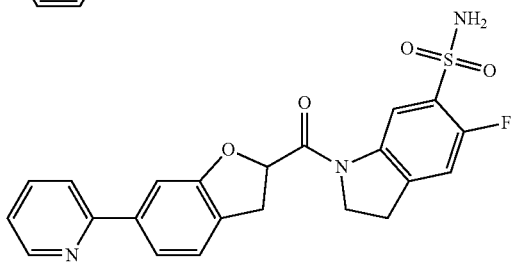

Intermediate 34

Intermediate 34 was prepared in a manner similar to Example 36 employing 6-bromo-2,3-dihydrobenzofuran-2-carboxylic acid and Intermediate 9 as starting materials. LC/MS: 440.1 [M+H].

Preparation of Example 65: (S)-5-fluoro-1-(6-(pyridin-2-yl)-2,3-dihydrobenzofuran-2-carbonyl)indoline-6-sulfonamide

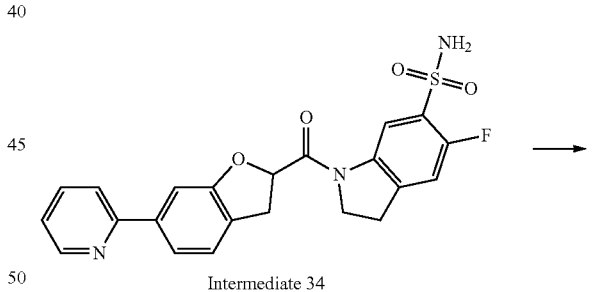

Intermediate 34

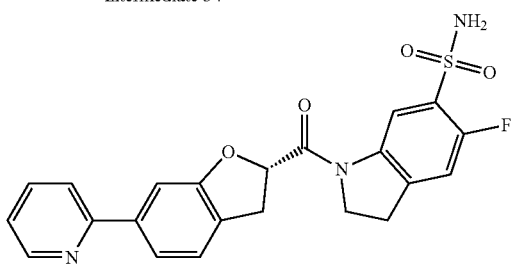

Example 65

Intermediate 34 was subjected to chiral SFC purification employing OD-H column with 50% MeOH as co-solvent. Example 65 was obtained as the first eluent. ¹H NMR (400 MHz, DMSO-d6) δ 8.68 (dt, J=4.9, 1.4 Hz, 1H), 8.51

(d, J=6.6 Hz, 1H), 8.04-7.99 (m, 1H), 7.97 (dd, J=8.1, 1.8 Hz, 1H), 7.63 (dd, J=7.8, 1.6 Hz, 1H), 7.60 (s, 2H), 7.54 (d, J=1.5 Hz, 1H), 7.44 (ddd, J=6.8, 4.9, 1.7 Hz, 1H), 7.40 (s, 1H), 7.38 (d, J=3.1 Hz, 1H), 5.75 (dd, J=9.7, 6.4 Hz, 1H), 3.66-3.51 (m, 2H), 3.31 (t, J=8.6 Hz, 2H), 2H under water peak. LC/MS: 440.1 [M+H].

Preparation of Intermediates (R)-17 and (S)-17

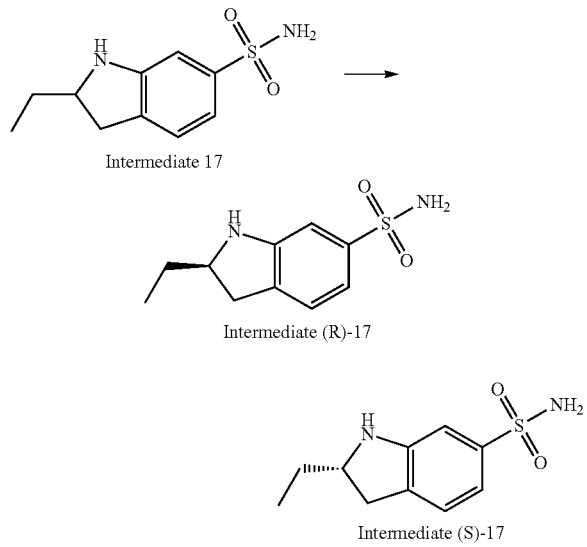

Intermediate 17 was subjected to chiral SFC purification employing ChiralPak IG column with 45% MeOH as co-solvent.

Intermediate (R)-17 was collected as the first eluent. LC/MS: 227.1 [M+H].

Intermediate (S)-17 was collected as the second eluent. LC/MS: 227.1 [M+H].

Preparation of Example 68 (General Procedure A): (R)-2-ethyl-1-((R)-5-(pyridin-2-yl)-2,3-dihydro-1H-indene-2-carbonyl)indoline-6-sulfonamide

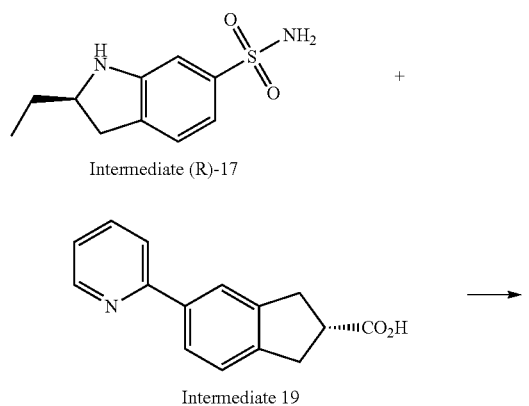

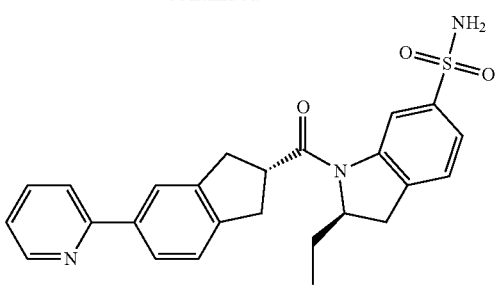

Example 68

Example 68 was prepared in a manner similar to Example 35 employing Intermediate (R)-17. ¹H NMR (400 MHz, DMSO-d6) δ 8.71 (dq, J=4.8, 1.6 Hz, 1H), 8.60-8.48 (m, 1H), 8.05 (td, J=4.6, 4.2, 1.5 Hz, 2H), 7.99-7.85 (m, 2H), 7.51 (td, J=6.8, 5.9, 2.9 Hz, 2H), 7.44 (d, J=7.9 Hz, 1H), 7.37 (d, J=7.9 Hz, 1H), 7.29 (s, 2H), 4.72 (td, J=8.5, 3.4 Hz, 1H), 3.78 (p, J=8.2 Hz, 1H), 3.55-3.34 (m, 3H), 3.26 (dt, J=17.1, 8.7 Hz, 1H), 3.13 (dd, J=16.3, 7.8 Hz, 1H), 2.96 (d, J=16.8 Hz, 1H), 1.78-1.46 (m, 2H), 0.89 (t, J=7.3 Hz, 3H). LC/MS: 448.2 [M+H].

Preparation of Intermediate 35: 1-(5-bromo-2,3-dihydro-1H-indene-2-carbonyl) indoline-6-sulfonamide

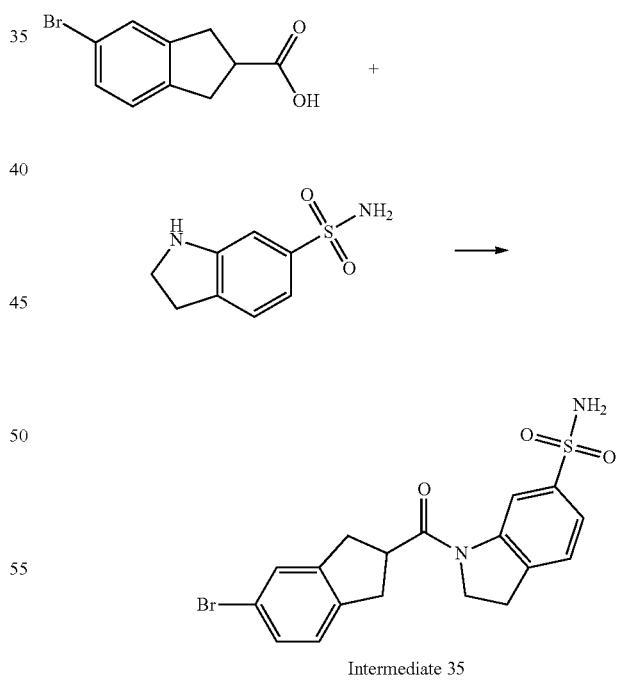

Intermediate 35 was prepared by General Procedure A using 5-bromo-2,3-dihydro-1H-indene-2-carboxylic acid and indoline-6-sulfonamide. ¹H NMR (400 MHz, DMSO-d6) δ 8.57 (d, J=1.7 Hz, 1H), 7.54-7.23 (m, 6H), 7.20 (d, J=8.1 Hz, 1H), 4.30 (t, J=8.5 Hz, 2H), 3.72 (p, J=8.0 Hz, 1H), 3.21 (dt, J=26.0, 7.5 Hz, 6H). LCMS: 420.96 [M+H].

Preparation of Example 69: 1-(5-phenyl-2,3-di-hydro-1H-indene-2-carbonyl) indoline-6-sulfonamide

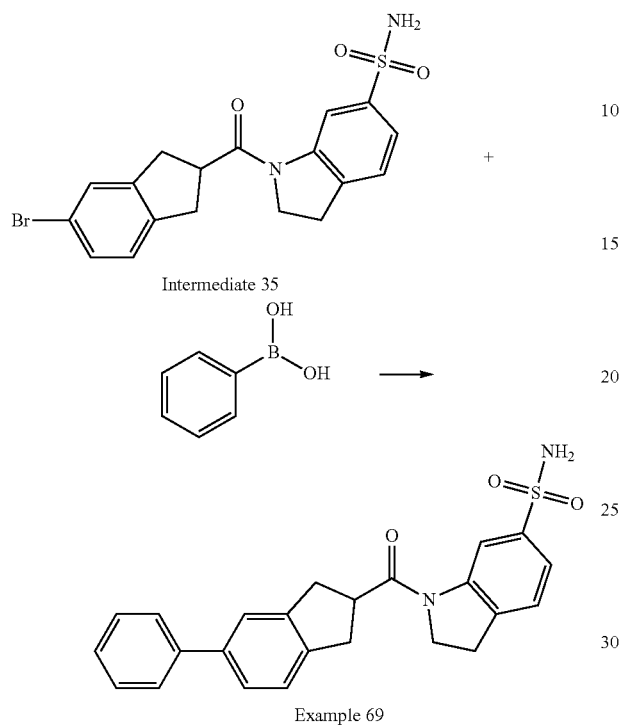

Example 69

To a stirred solution of Intermediate 35 (30 mg, 0.071 mmol) in DMF (1 ml) and water (0.2 ml) was added phenylboronic acid (10.5 mg, 1.2 equiv), tetrakis(triphenylphosphine)palladium(0) (12.3 mg, 0.15 equiv), potassium carbonate (24.6 mg, 2.5 equiv). The mixture was purged with argon and then heated to 90° C. Upon completion of the reaction (judged by LCMS). The mixture was allowed to cool to RT. The mixture was diluted with EtOAc (10V) and water (10V). The organic layer was dried ($MgSO_4$) and evaporated in vacuo to obtain the crude. The crude residue was purified by reverse phase HPLC to give Example 69. $^1$H NMR (400 MHz, DMSO-d6) δ 8.60 (d, J=1.6 Hz, 1H), 7.68-7.59 (m, 2H), 7.55-7.20 (m, 10H), 4.34 (t, J=8.5 Hz, 2H), 3.75 (p, J=8.0 Hz, 1H), 3.33-3.20 (m, 6H). LCMS: 419.06 [M+H].

Preparation of Example 70: 1-(5-(2-fluorophenyl)-2,3-dihydro-1H-indene-2-carbonyl) indoline-6-sulfonamide

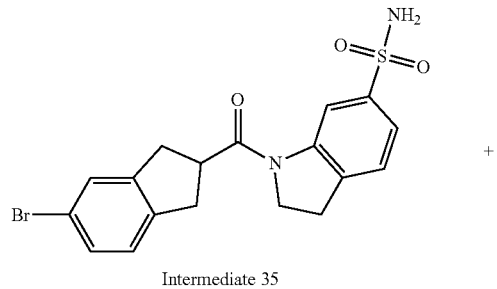

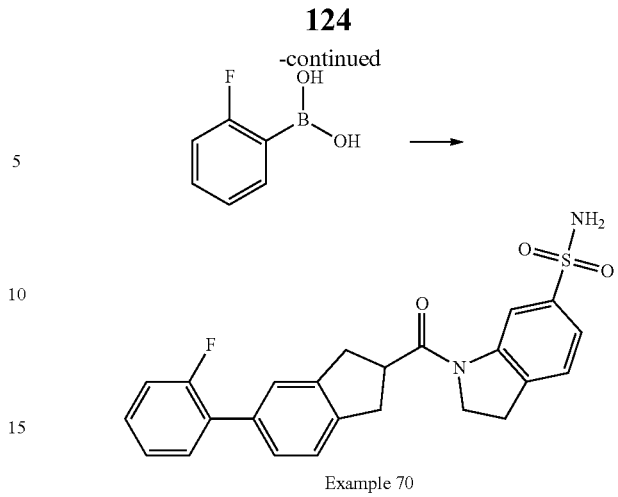

Example 70

Example 70 was prepared in a manner similar to Example 69 utilizing (2-fluorophenyl) boronic acid as starting material instead of phenylboronic acid. $^1$H NMR (400 MHz, DMSO-$d_6$) δ 8.60 (d, J=1.6 Hz, 1H), 7.59-7.19 (m, 11H), 4.34 (t, J=8.5 Hz, 2H), 3.75 (q, J=8.1 Hz, 1H), 3.41-3.12 (m, 6H). LCMS: 437.04 [M+H].

Preparation of Example 71: 1-(5-(pyridin-2-yl)-2,3-dihydro-1H-indene-2-carbonyl) indoline-6-sulfonamide

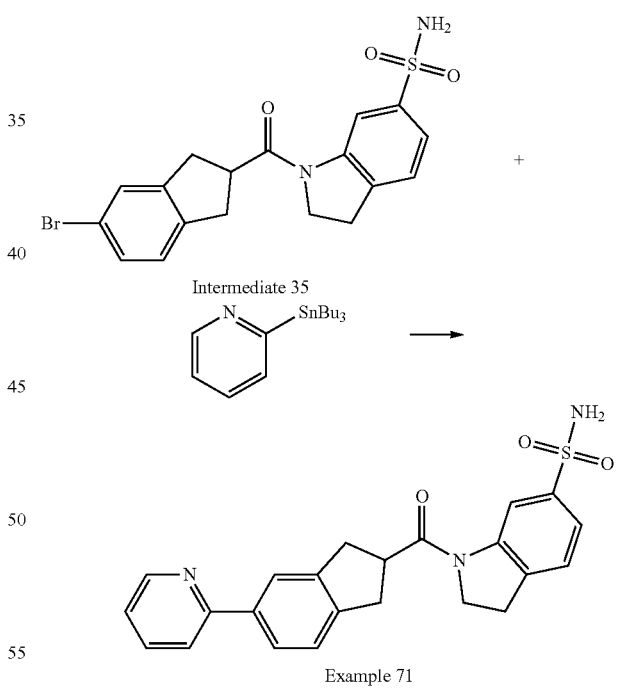

Example 71

To a stirred suspension of Intermediate 35 (30 mg, 0.071 mmol) in 1,4-dioxane (1 ml) was added tributyl(2-pyridyl) stannane (41.8 mg, 1.6 equiv), bis(tri-t-butylphosphine)palladium (0) (3.6 mg, 0.1 equiv). The mixture was purged with argon and then heated to 90° C. Upon completion of the reaction (judged by LCMS). The mixture was allowed to cool to RT. The mixture was diluted with EtOAc (10V) and water (10V). The organic layer was dried ($MgSO_4$) and evaporated in vacuo to obtain the crude. The crude residue was purified by reverse phase HPLC to give Example 71. $^1$H NMR (400 MHz, DMSO-d6) δ 8.67 (d, J=4.9 Hz, 1H), 8.60

(s, 1H), 8.02-7.82 (m, 4H), 7.55-7.33 (m, 4H), 7.28 (s, 2H), 4.35 (t, J=8.5 Hz, 2H), 3.76 (q, J=8.1 Hz, 1H), 3.35-3.22 (m, 6H). LCMS: 420.19 [M+H].

The following Examples in Table 1E were prepared in a manner similar to Example 71 utilizing appropriate aryl stannanes instead of tributyl(2-pyridyl)stannane as starting material.

TABLE 1E

| Example | Structure | LC/MS | ¹H-NMR |
|---|---|---|---|
| 72 | | 451.13 [M + H] | ¹H NMR (400 MHz, DMSO-d6) δ 8.80 (s, 1H), 8.60 (d, J = 1.7 Hz, 1H), 8.24 (s, 1H), 8.02 (d, J = 1.6 Hz, 1H), 7.96 (dd, J = 7.9, 1.6 Hz, 1H), 7.48 (dd, J = 7.8, 1.8 Hz, 1H), 7.41 (t, J = 8.0 Hz, 2H), 7.28 (s, 2H), 4.35 (t, J = 8.5 Hz, 2H), 4.02 (s, 3H), 3.77 (p, J = 8.1 Hz, 1H), 3.30 (tt, J = 16.2, 8.5 Hz, 6H). |
| 73 | | 439.09 [M + H] | ¹H NMR (400 MHz, DMSO-d6) δ 8.73 (dd, J = 4.9, 2.5 Hz, 1H), 8.60 (d, J = 1.7 Hz, 1H), 8.33 (t, J = 2.2 Hz, 1H), 7.86 (s, 1H), 7.82 (dd, J = 7.9, 1.8 Hz, 1H), 7.52-7.37 (m, 3H), 7.28 (s, 2H), 4.35 (t, J = 8.5 Hz, 2H), 3.77 (q, J = 8.0 Hz, 1H), 3.33-3.22 (m, 6H). |
| 74 | | 421.13 [M + H] | ¹H NMR (400 MHz, DMSO-d6) δ 9.23 (d, J = 1.5 Hz, 1H), 8.70 (t, J = 2.0 Hz, 1H), 8.59 (t, J = 2.4 Hz, 2H), 8.02 (s, 1H), 7.96 (dd, J = 8.0, 1.6 Hz, 1H), 7.48 (dd, J = 7.8, 1.7 Hz, 1H), 7.41 (dd, J = 7.9, 3.9 Hz, 2H), 7.28 (s, 2H), 4.35 (t, J = 8.5 Hz, 2H), 3.78 (p, J = 7.9 Hz, 1H), 3.28 (dd, J = 16.4, 8.1 Hz, 6H). |
| 75 | | 438.11 [M + H] | ¹H NMR (400 MHz, DMSO-d6) δ 8.60 (s, 1H), 8.06 (q, J = 8.1 Hz, 1H), 7.91 (dd, J = 18.4, 8.3 Hz, 3H), 7.51-7.34 (m, 3H), 7.28 (s, 2H), 7.11 (dd, J = 8.0, 2.9 Hz, 1H), 4.35 (t, J = 8.4 Hz, 2H), 3.84-3.69 (m, 1H), 3.28 (d, J = 10.5 Hz, 6H). |
| 76 | | 438.17 [M + H] | ¹H NMR (400 MHz, DMSO-d6) δ 8.60 (d, J = 1.7 Hz, 1H), 8.54 (dd, J = 4.1, 2.0 Hz, 1H), 7.90-7.68 (m, 3H), 7.53-7.34 (m, 4H), 7.28 (s, 2H), 4.35 (t, J = 8.5 Hz, 2H), 3.76 (q, J = 8.2 Hz, 1H), 3.30 (dq, J = 18.0, 8.8, 8.4 Hz, 6H). |

TABLE 1E-continued

| Example | Structure | LC/MS | ¹H-NMR |
|---------|-----------|-------|--------|
| 77 | | 450.19 [M + H] | ¹H NMR (400 MHz, DMSO-d6) δ 8.60 (d, J = 1.7 Hz, 1H), 7.97 (s, 1H), 7.91 (dd, J = 7.9, 1.6 Hz, 1H), 7.76 (t, J = 7.8 Hz, 1H), 7.53 (d, J = 7.5 Hz, 1H), 7.48 (dd, J = 7.8, 1.7 Hz, 1H), 7.41 (d, J = 7.9 Hz, 1H), 7.34 (d, J = 7.9 Hz, 1H), 7.28 (s, 2H), 6.75 (d, J = 8.2 Hz, 1H), 4.35 (t, J = 8.5 Hz, 2H), 3.96 (s, 3H), 3.76 (t, J = 8.0 Hz, 1H), 3.41-3.17 (m, 6H). |

Preparation of Example 78: 1-(5-(1H-pyrazol-1-yl)-2,3-dihydro-1H-indene-2-carbonyl)indoline-6-sulfonamide Preparation of Example 79: 1-(5-(1H-1,2,4-triazol-1-yl)-2,3-dihydro-1H-indene-2-carbonyl)indoline-6-sulfonamide

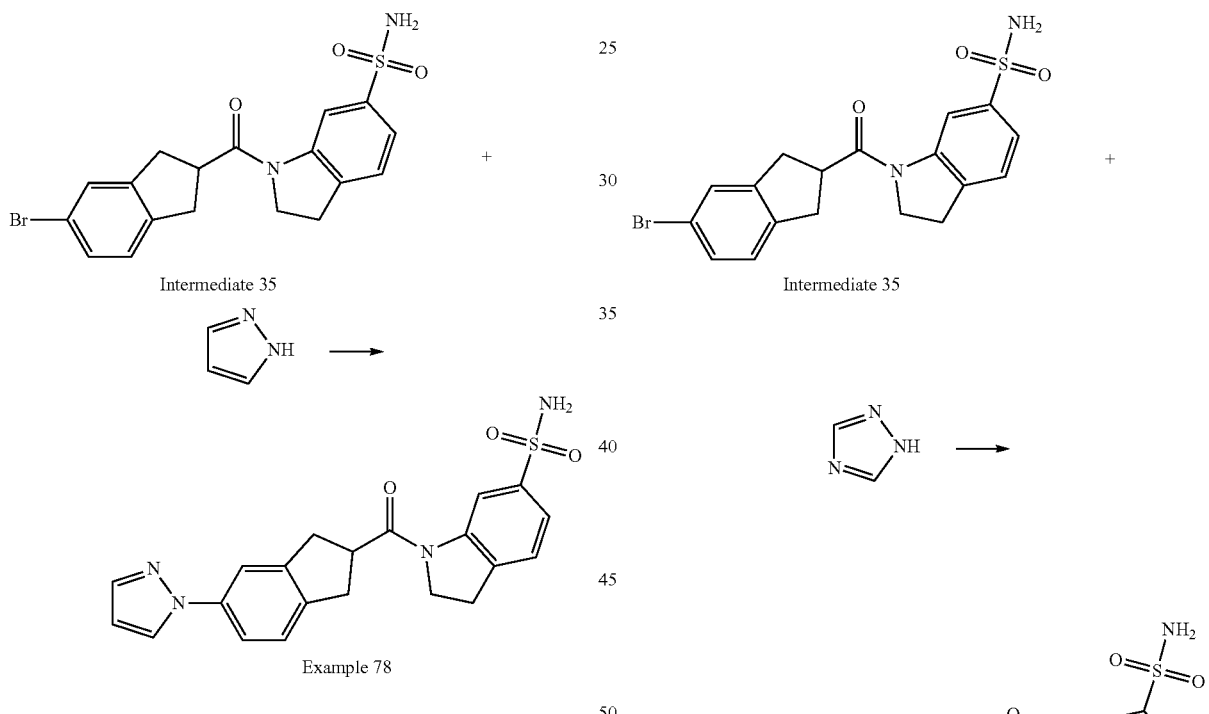

To a stirred solution of Intermediate 35 (50 mg, 0.12 mmol) in DMF (1 ml) was added 1H-pyrazole (16.2 mg, 2 equiv), copper (I) iodide (45.2 mg, 2.0 equiv), trans-N,N'-Dimethyl-1,2-cyclohexanediamine (67.5 mg, 2.0 equiv), K₂CO₃ (29.4 mg, 4.0 equiv). The mixture was purged with argon and then heated at 105° C. overnight. The mixture was then allowed to cool to RT, diluted with EtOAc (10 V) and H₂O (10 V). The organic layer was dried (MgSO₄) and evaporated in vacuo to obtain the crude. The crude residue was purified by reverse phase HPLC to give Example 78. ¹H NMR (400 MHz, DMSO-d6) δ 8.60 (d, J=1.6 Hz, 1H), 8.44 (d, J=2.5 Hz, 1H), 7.71 (t, J=2.7 Hz, 2H), 7.63 (dd, J=8.2, 2.1 Hz, 1H), 7.48 (dd, J=7.9, 1.7 Hz, 1H), 7.42 (d, J=7.8 Hz, 1H), 7.34 (d, J=8.2 Hz, 1H), 7.28 (s, 2H), 6.52 (t, J=2.1 Hz, 1H), 4.34 (t, J=8.5 Hz, 2H), 3.77 (p, J=8.1 Hz, 1H), 3.29-3.13 (m, 6H). LCMS: 409.21 [M+H].

Example 79 was prepared in a manner similar to Example 78 utilizing 1H-1,2,4-triazole as starting material instead of 1H-pyrazole. ¹H NMR (400 MHz, DMSO-d6) δ 9.24 (s, 1H), 8.59 (s, 1H), 8.22 (s, 1H), 7.73 (d, J=2.0 Hz, 1H), 7.65 (dd, J=8.1, 2.0 Hz, 1H), 7.48 (dd, J=7.9, 1.7 Hz, 1H), 7.41 (dd, J=8.0, 3.2 Hz, 2H), 7.28 (s, 2H), 4.34 (t, J=8.5 Hz, 2H), 3.78 (p, J=7.9 Hz, 1H), 3.36-3.14 (m, 6H). LCMS: 410.13 [M+H].

Preparation of Example 80: (S)-1-(5-(pyridin-2-yl)-2,3-dihydro-1H-indene-2-carbonyl)indoline-6-sulfonamide, and Example 81: (R)-1-(5-(pyridin-2-yl)-2,3-dihydro-1H-indene-2-carbonyl)indoline-6-sulfonamide

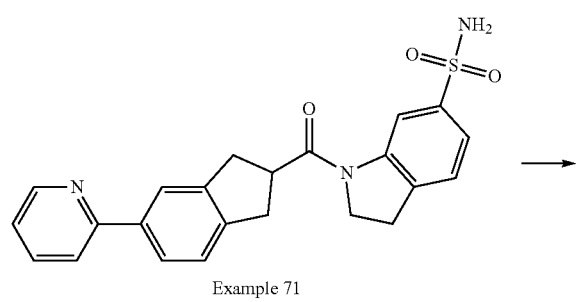

Example 71

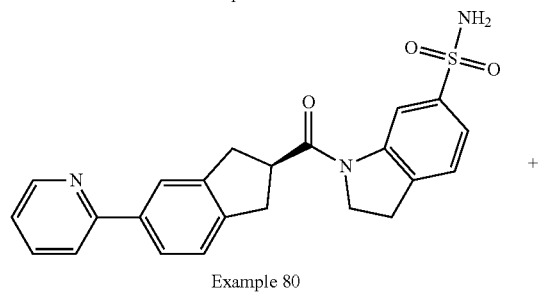

Example 80

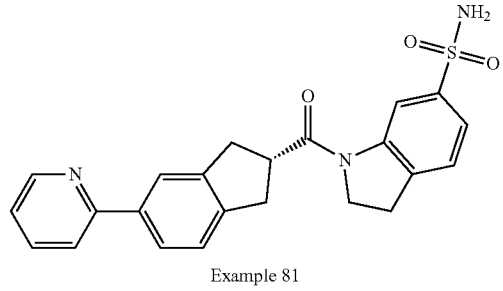

Example 81

These two single isomers were prepared by separating the racemic mixture Example 71 by SFC using CCO-F2 column, 50% MeOH with $NH_3$. The first peak was assigned as Example 80 and the second peak was assigned as Example 81.

Preparation of Example 82: (S)-1-(5-(2-fluorophenyl)-2,3-dihydro-1H-indene-2-carbonyl)indoline-6-sulfonamide, and Example 83: (R)-1-(5-(2-fluorophenyl)-2,3-dihydro-1H-indene-2-carbonyl)indoline-6-sulfonamide

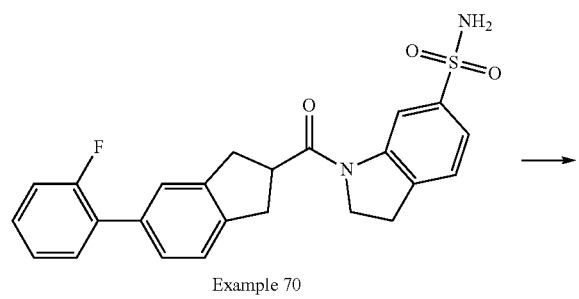

Example 70

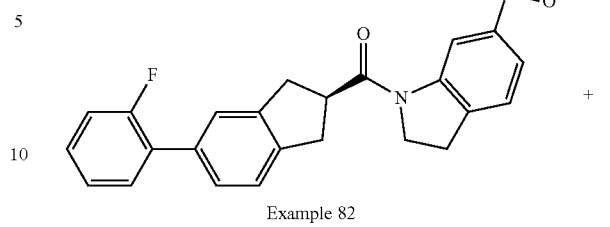

Example 82

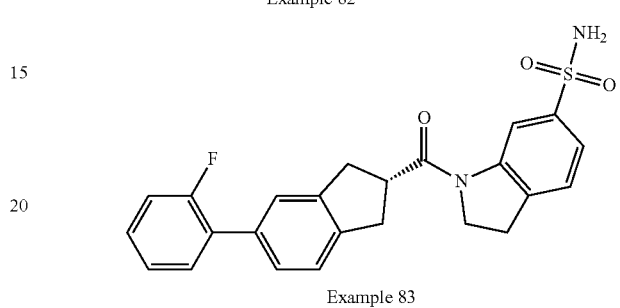

Example 83

These two single isomers were prepared by separating the racemic mixture Example 70 by SFC using CCO-F2 column, 50% MeOH. The first peak was assigned as Example 82 and the second peak was assigned as Example 83.

Preparation of Example 85: (R)-1-(5-(6-fluoropyridin-2-yl)-2,3-dihydro-1H-indene-2-carbonyl)indoline-6-sulfonamide

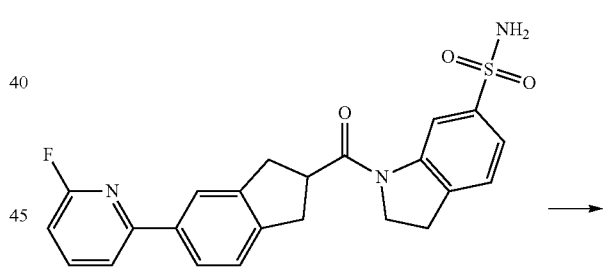

Example 75

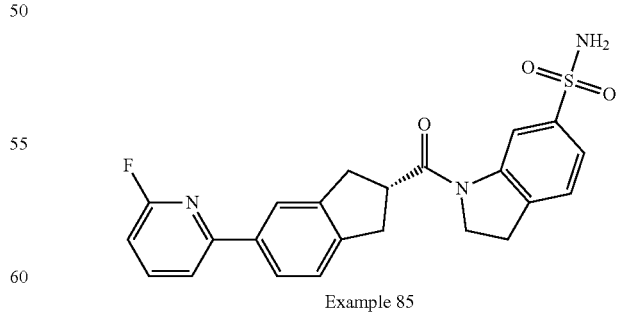

Example 85

These two single isomers were prepared by separating the racemic mixture Example 75 by SFC using CCO-F2 column, 50% MeOH. The second peak fraction was assigned as Example 85.

Preparation of Intermediates 36: (S)-1-(5-bromo-2,3-dihydro-1H-indene-2-carbonyl)indoline-6-sulfonamide, and Intermediate 37: (R)-1-(5-bromo-2,3-dihydro-1H-indene-2-carbonyl)indoline-6-sulfonamide Preparation of Example 86: (S)-1-(5-(pyrazin-2-yl)-2,3-dihydro-1H-indene-2-carbonyl)indoline-6-sulfonamide, and Example 87: (R)-1-(5-(pyrazin-2-yl)-2,3-dihydro-1H-indene-2-carbonyl)indoline-6-sulfonamide

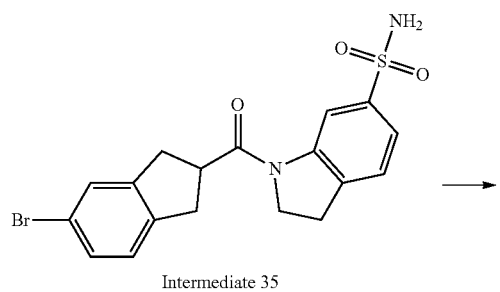

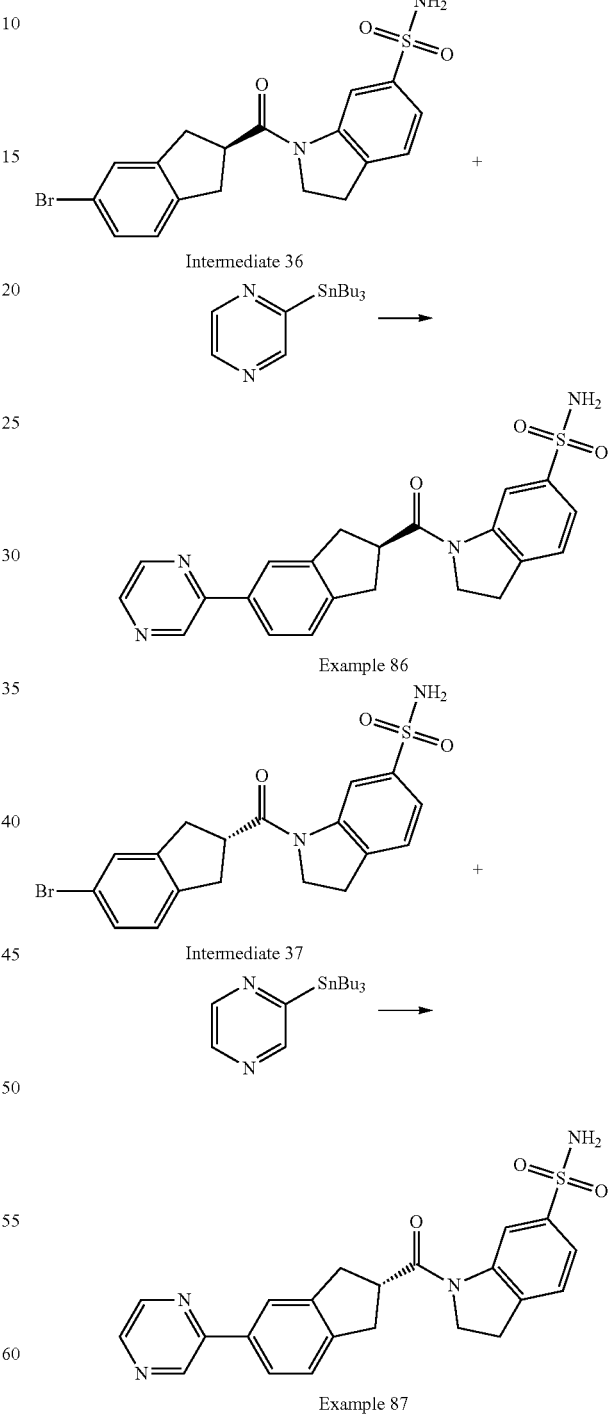

These two single isomers were prepared by separating the racemic mixture Intermediate 35 by SFC using IB column, 30% MeOH with DEA. The first peak was assigned as Intermediate 36 and the second peak was assigned as Intermediate 37. The absolute stereochemistry of Intermediate 37 was confirmed by coupling with tributyl(2-pyridyl)stannane using the same procedure as Example 71. The product was co-eluted with Example 81 using chiral separation condition for Example 71.

Examples 86 and 87 were prepared from enantiopure Intermediate 36 and Intermediate 37 using the same procedure as for Example 71.

Preparation of Example 88: (S)-1-(5-(3-fluoropyridin-2-yl)-2,3-dihydro-1H-indene-2-carbonyl)indoline-6-sulfonamide, and Example 89: (R)-1-(5-(3-fluoropyridin-2-yl)-2,3-dihydro-1H-indene-2-carbonyl)indoline-6-sulfonamide

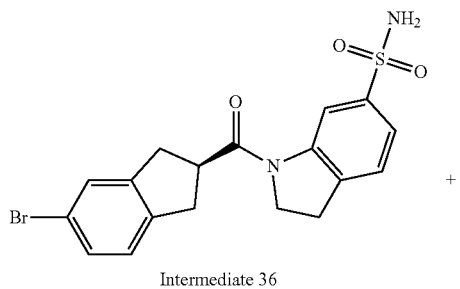

Intermediate 36

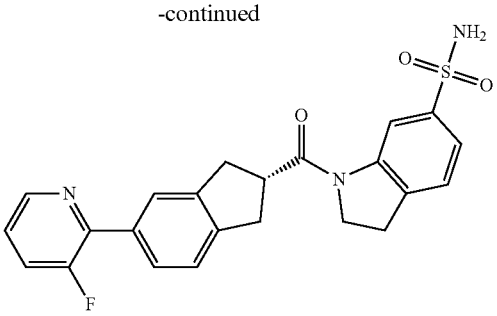

Example 89

Examples 88 and 89 were prepared from enantiopure Intermediates 36 and 37, respectively, using the same procedure as Example 71.

Preparation of Example 90: (R)-1-(5-(6-methylpyridin-2-yl)-2,3-dihydro-1H-indene-2-carbonyl)indoline-6-sulfonamide

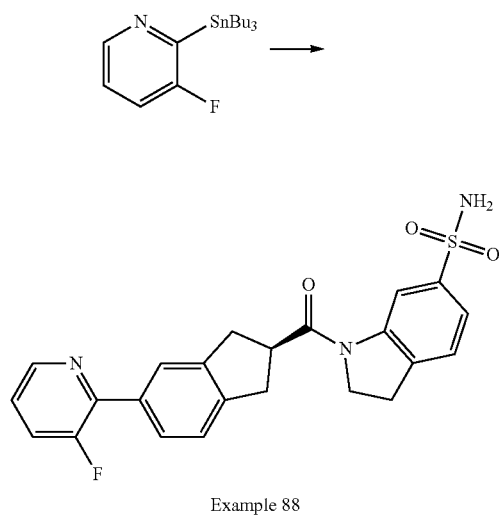

Example 88

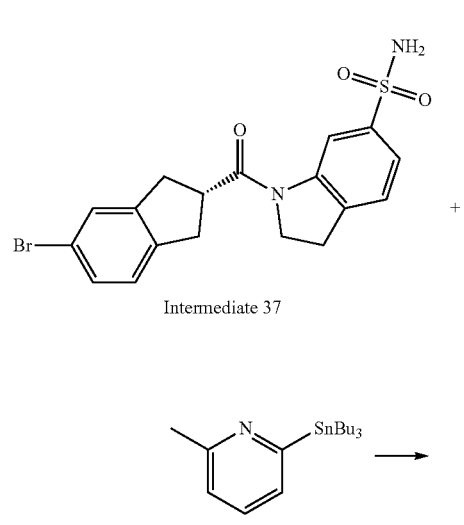

Intermediate 37

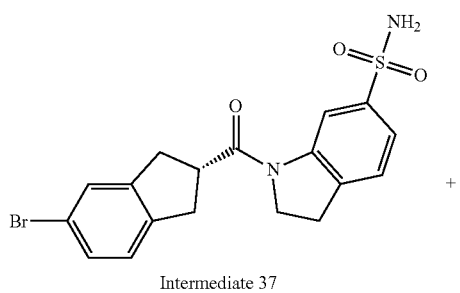

Intermediate 37

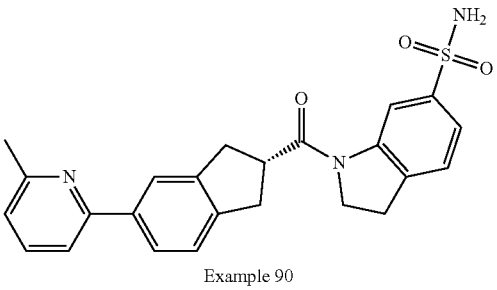

Example 90

Example 90 was prepared in a manner similar to Example 71 utilizing Intermediate 37 and 2-methyl-6-(tributylstannyl) pyridine as starting materials. $^1$H NMR (400 MHz, DMSO-d6) δ 8.60 (d, J=1.7 Hz, 1H), 8.04-7.73 (m, 3H), 7.56-7.19 (m, 7H), 4.35 (t, J=8.5 Hz, 2H), 3.76 (q, J=8.1 Hz, 1H), 3.26 (d, J=8.5 Hz, 6H), 2.59 (s, 3H). LCMS: 434.280 [M+H].

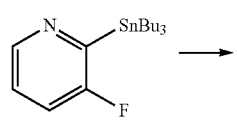

Preparation of Example 91: (R)-1-(5-(1H-pyrazol-1-yl)-2,3-dihydro-1H-indene-2-carbonyl)indoline-6-sulfonamide

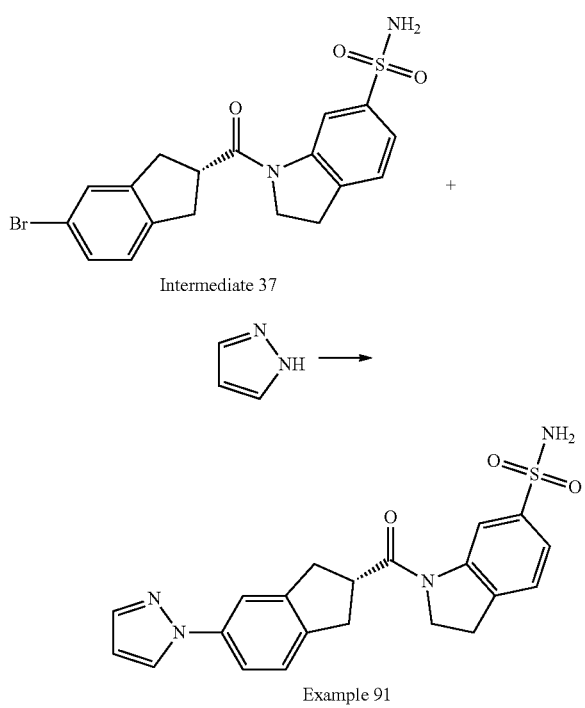

Intermediate 37

Example 91

Example 91 was prepared in a manner similar to Example 78 utilizing Intermediate 37 instead of Intermediate 35.

Preparation of Intermediates 38 and its Diastereoisomers (38.3 and 38.4)

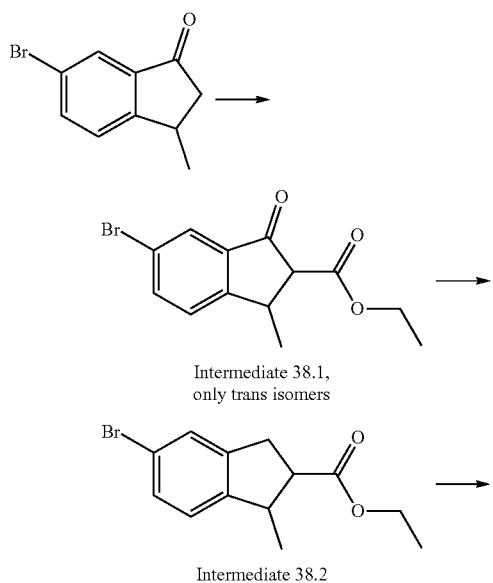

Intermediate 38.1, only trans isomers

Intermediate 38.2

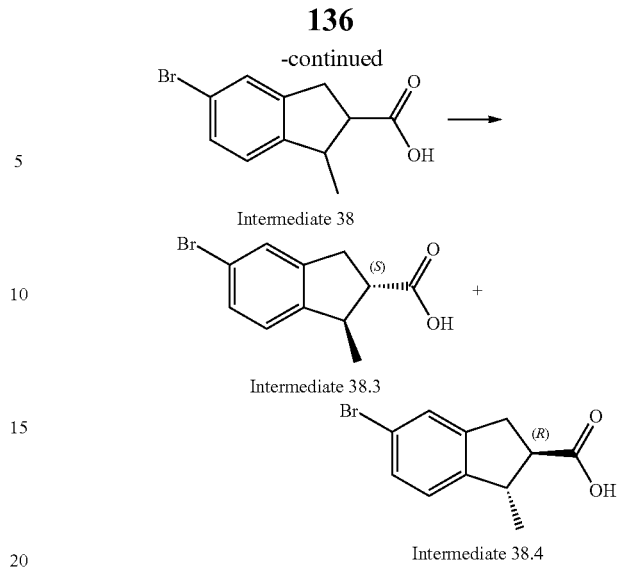

Intermediate 38

Intermediate 38.3

Intermediate 38.4

Preparation of Intermediate 38.1: To a stirring suspension of sodium hydride (0.68 g, 60% dispersion in oil, 2 equiv) in Me-THF (15 ml) at 0° C. was charged with diethyl carbonate (3.2 ml, 3 equiv). 6-bromo-3-methyl-2,3-dihydro-1H-inden-1-one (2.0 g, 8.9 mmol) in Me-THF (5 ml) was added dropwise to the mixture. The resulting mixture was continued to stir at 0° C. until gas evolution subsided. The reaction mixture was then slowly brought up to 70° C. Upon completion of the reaction, the reaction mixture was then allowed to cool to room temperature and then diluted with EtOAc (8 V). The resulting mixture was further cooled at 0° C., to which aqueous HCl (3 N, 10 ml) was added dropwise. The aqueous layer was extracted with EtOAc (2×5V). The combined organic layer was washed with brine, dried over $Mg_2SO_4$, filtered and concentrated in vacuo. The residue was purified by silica gel chromatography to give Intermediate 38.1 (1.7 g, 64% yield).

Preparation of Intermediate 38.2: Triethylsilane (4V) and trifluoroacetic acid (5V) were added to ethyl 5-bromo-1-methyl-3-oxo-2,3-dihydro-1H-indene-2-carboxylate (1.7 g, 5.7 mmol). The reaction mixture was stirred at RT for 5 days. The mixture was then concentrated to dryness and the resulting residue was purified by silica gel chromatography to provide Intermediate 38.2 (1.1 g. 69%). $^1$H NMR (400 MHz, Chloroform-d) δ 7.37-7.31 (m, 2H), 7.09-6.95 (m, 1H), 4.22 (qd, J=7.2, 1.5 Hz, 2H), 3.52-3.31 (m, 1H), 3.26-3.06 (m, 2H), 2.86 (q, J=9.1 Hz, 1H), 1.40 (d, J=6.8 Hz, 3H), 1.32 (t, J=7.1 Hz, 3H).

Preparation of Intermediate 38: Ethyl 5-bromo-1-methyl-2,3-dihydro-1H-indene-2-carboxylate was (1.1 g, 3.9 mmol) was dissolved in THF (8 ml) and treated with 2 N NaOH (aq, 6 ml). The mixture was left stirring at RT. Upon completion of the reaction. 2 N HCl (aq) was added to adjust pH to 5. EtOAc (2×5V) was added to extract the mixture. The organic layer was combined, dried over dried over $Mg_2SO_4$, filtered and concentrated in vacuo to give Intermediate 38 as crude. LCMS: 253.620 [M−H].

Preparation of Intermediates 38.3 and 38.4: These two single isomers were prepared by separating the racemic mixture Intermediate 38 by SFC using IG column, 10% MeOH with DEA. The first peak was assigned as Intermediate 38.3 and the second peak was assigned as Intermediate 38.4. The absolute stereochemistry of these two compounds were confirmed by biochemical activity of the compounds synthesized from these two isomers.

Preparation of Example 92: 1-(5-(pyridin-2-yl)-2,3-dihydro-1H-indene-2-carbonyl) indoline-6-sulfonamide

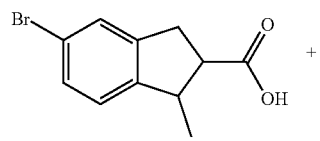

Intermediate 38

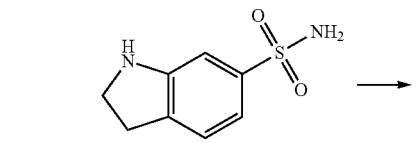

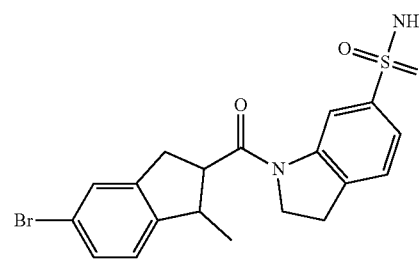

Intermediate 39

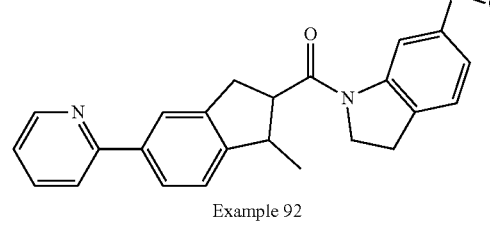

Example 92

Intermediate 39 was prepared in a manner similar to Example 1 utilizing indoline-6-sulfonamide and Intermediate 38. LCMS: 435.012 [M+H].

Example 92 was prepared in a manner similar to Example 71 utilizing Intermediate 39 instead of Intermediate 35 as starting material. $^1$H NMR (400 MHz, DMSO-d6) δ 8.66 (dd, J=8.3, 3.3 Hz, 2H), 8.06-7.82 (m, 4H), 7.56-7.32 (m, 4H), 7.29 (s, 2H), 4.44-4.26 (m, 2H), 3.67 (q, J=7.0 Hz, 1H), 332-3.19 (m, 4H), 3.08 (dd, J=15.0, 8.0 Hz, 1H), 1.37 (d, J=6.9 Hz, 3H). LCMS: 434.259 [M+H].

Preparation of Example 93: 1-((1S,2R)-1-methyl-5-(pyridin-2-yl)-2,3-dihydro-1H-indene-2-carbonyl) indoline-6-sulfonamide, and Example 94: 1-((1R,2S)-1-methyl-5-(pyridin-2-yl)-2,3-dihydro-1H-indene-2-carbonyl)indoline-6-sulfonamide

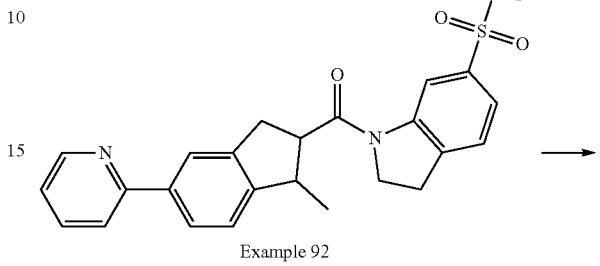

Example 92

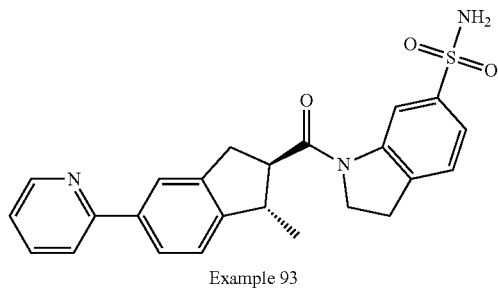

Example 93

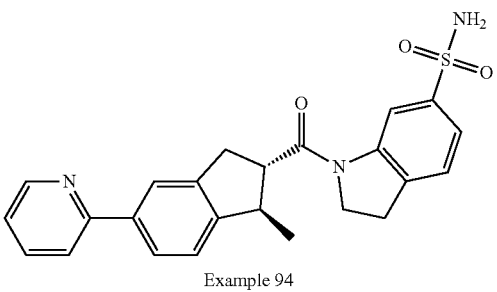

Example 94

These two single isomers were prepared by separating the racemic mixture Example 92 by SFC using CCO-F2 column, 50% EtOH with TFA. The first peak was assigned as Example 93 and the second peak was assigned as Example 94. The absolute stereochemistry of the two compounds was confirmed by their biochemical activity.

Example 93: $^1$H NMR (400 MHz, DMSO-d6) δ 8.66 (dd, J=8.3, 3.2 Hz, 2H), 7.94 (t, J=7.2 Hz, 4H), 7.49 (dd, J=7.8, 1.7 Hz, 1H), 7.46-7.33 (m, 3H), 7.29 (s, 2H), 4.48-4.26 (m, 2H), 3.67 (q, J=7.4 Hz, 1H), 3.33-3.18 (m, 4H), 3.08 (dd, J=15.0, 8.0 Hz, 1H), 1.38 (d, J=6.9 Hz, 3H). LCMS: 434.288 [M+H].

Example 94: $^1$H NMR (400 MHz, DMSO-d6) δ 8.66 (dd, J=9.3, 3.3 Hz, 2H), 8.02-7.87 (m, 4H), 7.49 (dd, J=7.8, 1.7 Hz, 1H), 7.46-7.33 (m, 3H), 7.29 (s, 2H), 4.49-4.21 (m, 2H), 3.69 (q, J=7.1 Hz, 1H), 3.32-3.20 (m, 4H), 3.08 (dd, J=15.0, 8.0 Hz, 1H), 1.37 (d, J=6.9 Hz, 3H). LCMS: 434.278 [M+H].

Preparation of Intermediates 40: 6-bromo-1-methyl-2,3-dihydro-1H-indene-2-carboxylic acid

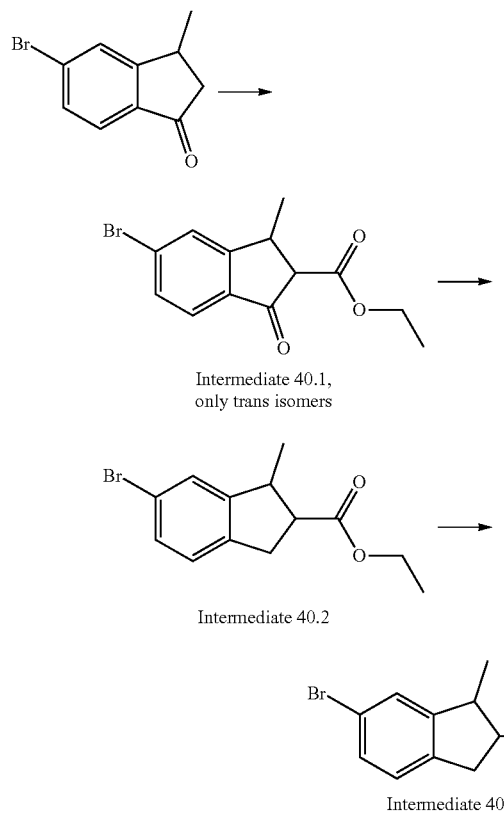

Intermediate 40.1, only trans isomers

Intermediate 40.2

Intermediate 40

Intermediate 40 was prepared in a manner similar to Intermediate 38 utilizing 5-bromo-3-methyl-2,3-dihydro-1H-inden-1-one instead of 6-bromo-3-methyl-2,3-dihydro-1H-inden-1-one. LCMS: 253.620 [M−H].

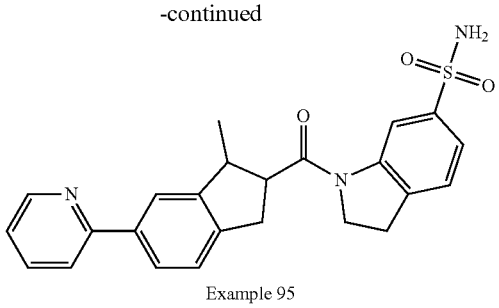

Example 95

Preparation of Example 95: 1-(1-methyl-6-(pyridin-2-yl)-2,3-dihydro-1H-indene-2-carbonyl) indoline-6-sulfonamide Example 95 was prepared in a manner similar to Example 92 utilizing Intermediate 40 instead of Intermediate 38 as starting material. $^1$H NMR (400 MHz, DMSO-d6) δ 8.70 (d, J=4.9 Hz, 1H), 8.65 (s, 1H), 8.10-7.83 (m, 4H), 7.54-7.33 (m, 4H), 7.29 (s, 2H), 4.35 (td, J=9.0, 6.0 Hz, 2H), 3.70 (t, J=7.1 Hz, 1H), 3.42-3.22 (m, 4H), 3.06 (dd, J=14.5, 7.1 Hz, 1H), 1.41 (d, J=6.9 Hz, 3H). LCMS: 434.280 [M+H].

Preparation of Example 96: 5-fluoro-1-(1-methyl-5-(pyridin-2-yl)-2,3-dihydro-1H-indene-2-carbonyl) indoline-6-sulfonamide

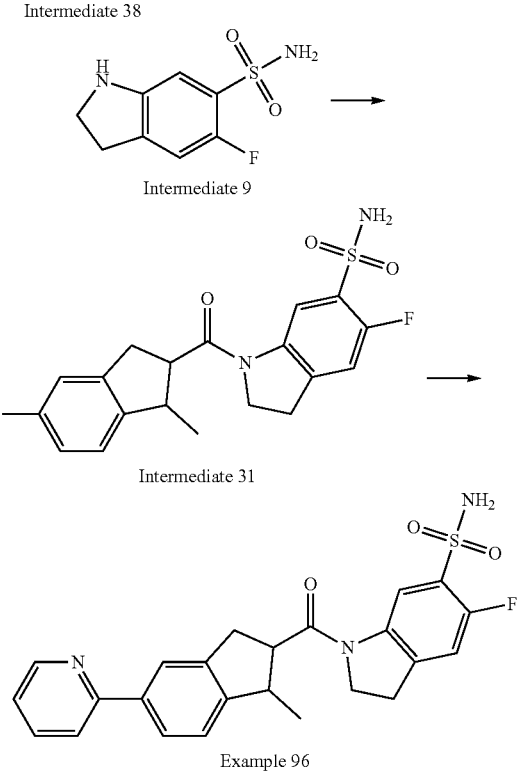

Intermediate 38

Intermediate 9

Intermediate 31

Example 96

Example 96 was prepared in a manner similar to Example 92 utilizing Intermediate 9 instead of indoline-6-sulfonamide as starting material. ¹H NMR (400 MHz, DMSO-d6) δ 8.66 (d, J=4.8 Hz, 1H), 8.62 (d, J=6.7 Hz, 1H), 8.05-7.84 (m, 4H), 7.58 (s, 2H), 7.36 (dd, J=11.5, 8.2 Hz, 3H), 4.42-4.26 (m, 2H), 3.65 (q, J=7.3 Hz, 1H), 3.35-3.20 (m, 4H), 3.06 (dd, J=15.0, 8.0 Hz, 1H), 1.36 (d, J=6.9 Hz, 3H). LCMS: 452.301[M+1].

Preparation of Example 97: 5-fluoro-1-((1R,2S)-1-methyl-5-(pyridin-2-yl)-2,3-dihydro-1H-indene-2-carbonyl)indoline-6-sulfonamide, and Example 98: 5-fluoro-1-((1S,2R)-1-methyl-5-(pyridin-2-yl)-2,3-dihydro-1H-indene-2-carbonyl)indoline-6-sulfonamide

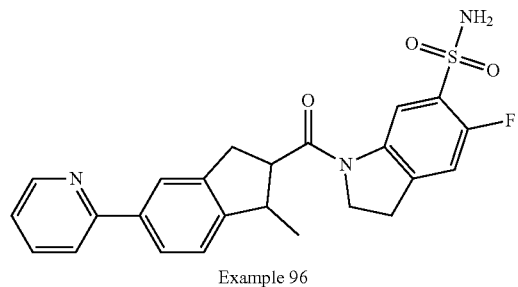

Example 96

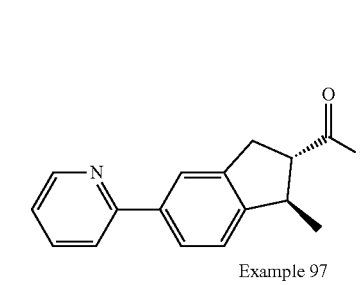

Example 97

+

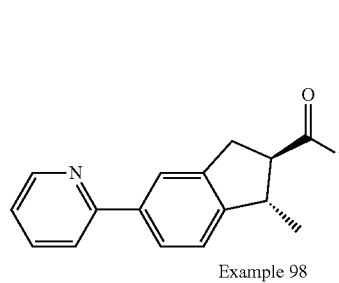

Example 98

These two single isomers were prepared by separating the racemic mixture Example 96 by SFC using CCO-F2 column, 50% MeOH. The second peak was assigned as Example 97 and the first peak was assigned as Example 98. The absolute stereochemistry of the two compounds was confirmed by their biochemical activity.

Example 97: ¹H NMR (400 MHz, DMSO-d6) δ 8.71-8.64 (m, 1H), 8.62 (d, J=6.7 Hz, 1H), 8.00-7.83 (m, 4H), 7.58 (s, 2H), 7.42-7.27 (m, 3H), 4.35 (td, J=9.2, 6.5 Hz, 2H), 3.65 (q, J=7.1 Hz, 1H), 3.32-3.23 (m, 4H), 3.06 (dd, J=15.0, 8.1 Hz, 1H), 1.36 (d, J=6.9 Hz, 3H). LCMS: 452.206 [M+H].

Example 98: ¹H NMR (400 MHz, DMSO-d6) δ 8.71-8.63 (m, 1H), 8.62 (d, J=6.6 Hz, 1H), 8.04-7.85 (m, 4H), 7.58 (s, 2H), 7.36 (dt, J=8.2, 4.2 Hz, 3H), 4.44-4.23 (m, 2H), 3.66 (t, J=7.2 Hz, 1H), 3.32-3.21 (m, 4H), 3.06 (dd, J=14.9, 8.1 Hz, 1H), 1.36 (d, J=6.9 Hz, 3H). LCMS: 452.212 [M+H].

Preparation of Example 99: 5-fluoro-1-(1-methyl-5-(6-methylpyridin-2-yl)-2,3-dihydro-1H-indene-2-carbonyl) indoline-6-sulfonamide

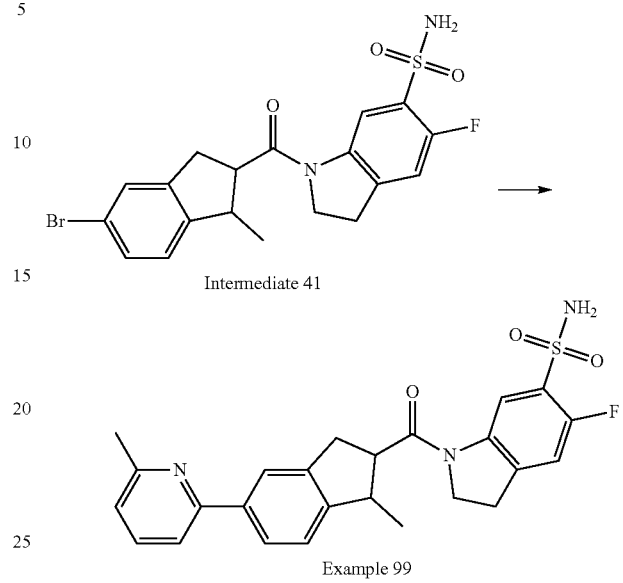

Example 99 was prepared in a manner similar to Example 71 utilizing Intermediate 41, 2-methyl-6-(tributylstannyl) pyridine instead of Intermediate 35, 2-(tributylstannyl)pyridine as starting materials. ¹H NMR (400 MHz, DMSO-d6) δ 8.62 (d, J=6.7 Hz, 1H), 8.03-7.74 (m, 4H), 7.58 (s, 2H), 7.42-7.21 (m, 3H), 4.46-4.22 (m, 2H), 3.65 (q, J=7.1 Hz, 1H), 3.32-3.15 (m, 4H), 3.07 (dd, J=15.1, 8.0 Hz, 1H), 2.59 (s, 3H), 1.37 (d, J=6.9 Hz, 3H). LCMS: 466.196 [M+H].

Preparation of Example 100: 5-fluoro-1-(1-methyl-5-(6-methylpyridin-2-yl)-2,3-dihydro-1H-indene-2-carbonyl) indoline-6-sulfonamide

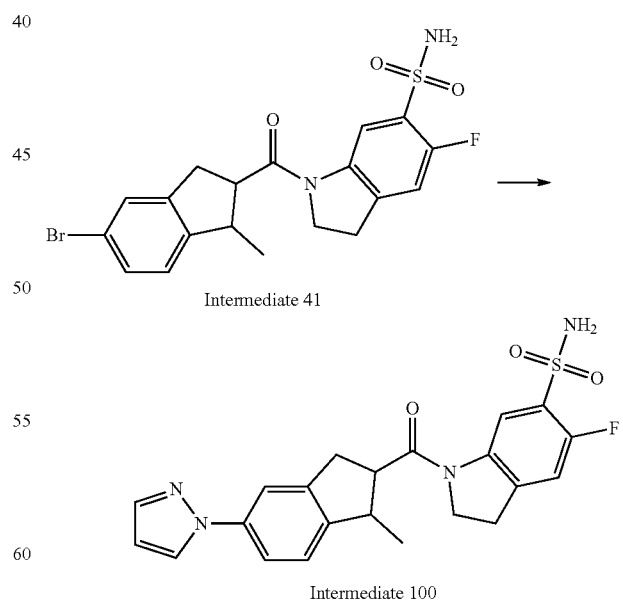

Example 100 was prepared in a manner similar to Example 78 utilizing Intermediate 41, instead of Intermediate 35 as starting materials. ¹H NMR (400 MHz, DMSO-d6) δ 8.61 (d, J=6.7 Hz, 1H), 8.44 (d, J=2.5 Hz, 1H), 7.72 (d, J=1.7 Hz, 1H), 7.67 (d, J=8.2 Hz, 2H), 7.58 (s, 2H), 7.34

(dd, J=12.6, 8.8 Hz, 2H), 6.52 (t, J=2.2 Hz, 1H), 4.34 (td, J=9.0, 4.6 Hz, 2H), 3.88-3.51 (m, 1H), 3.44-3.20 (m, 4H), 3.06 (dd, J=14.8, 7.5 Hz, 1H), 1.35 (d, J=6.9 Hz, 3H). LCMS: 441.181 [M+H].

Preparation of Example 101: 3-methyl-1-((1S,2R)-1-methyl-5-(pyridin-2-yl)-2,3-dihydro-1H-indene-2-carbonyl)indoline-6-sulfonamide

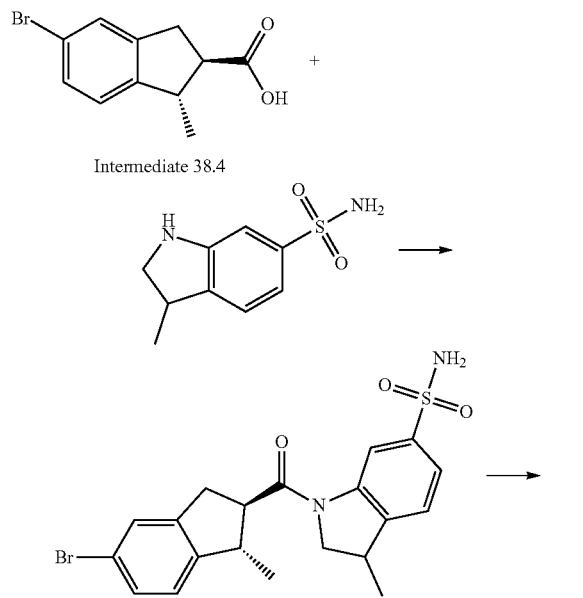

Example 101

Example 101 was prepared in a manner similar to Example 92 utilizing Intermediate 38.4, 3-methylindoline-6-sulfonamide instead of Intermediate 38, indoline-6-sulfonamide as starting materials. ¹H NMR (400 MHz, DMSO-d6) δ 8.70 (d, J=5.0 Hz, 1H), 8.63 (s, 1H), 8.04 (d, J=4.2 Hz, 2H), 7.92 (d, J=6.1 Hz, 2H), 7.61-7.42 (m, 3H), 7.39 (d, J=8.3 Hz, 1H), 7.30 (s, 2H), 4.55 (q, J=10.2 Hz, 1H), 3.77-3.52 (m, 3H), 3.49-3.23 (m, 2H), 3.09 (ddd, J=14.0, 7.7, 5.3 Hz, 1H), 1.44-1.31 (m, 6H). LCMS: 448.225 [M+H].

Preparation of Example 102: 3-methyl-1-((1R,2S)-1-methyl-5-(pyridin-2-yl)-2,3-dihydro-1H-indene-2-carbonyl) indoline-6-sulfonamide

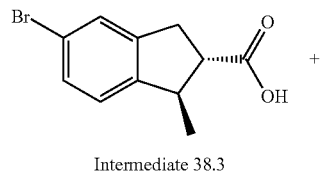

Intermediate 38.3

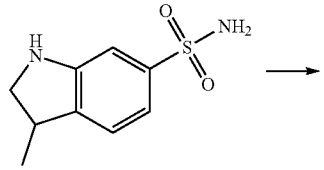

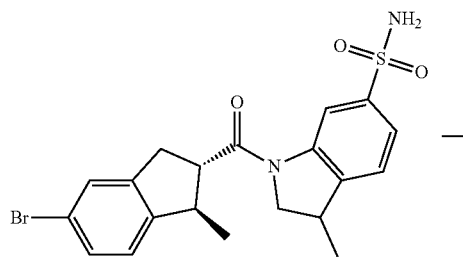

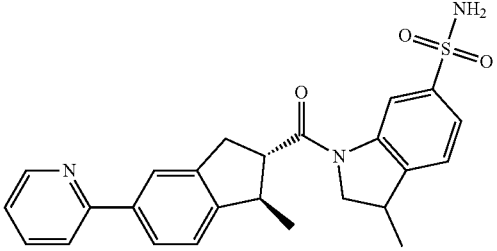

Example 102

Example 102 was prepared in a manner similar to Example 92 utilizing Intermediate 38.3 and 3-methylindoline-6-sulfonamide instead of indoline-6-sulfonamide as starting materials. ¹H NMR (400 MHz, DMSO-d6) δ 8.70 (dt, J=5.0, 1.4 Hz, 1H), 8.63 (d, J=1.7 Hz, 1H), 8.01 (dd, J=4.8, 1.9 Hz, 2H), 7.92 (dd, J=5.7, 1.9 Hz, 2H), 7.53 (dd, J=7.8, 1.7 Hz, 1H), 7.46 (d, J=7.5 Hz, 2H), 7.38 (d, J=8.3 Hz, 1H), 7.30 (s, 2H), 4.54 (t, J=10.2 Hz, 1H), 3.97-3.80 (m, 1H), 3.68 (p, J=7.4 Hz, 1H), 3.64-3.55 (m, 1H), 3.43 (dd, J=15.2, 8.3 Hz, 1H), 3.37-3.27 (m, 1H), 3.09 (ddd, J=14.2, 7.9, 5.4 Hz, 1H), 1.46-1.31 (m, 6H). LCMS: 448.177 [M+H].

Preparation of Example 103: 5-fluoro-3-methyl-1-((1R,2S)-1-methyl-5-(pyridin-2-yl)-2,3-dihydro-1H-indene-2-carbonyl) indoline-6-sulfonamide

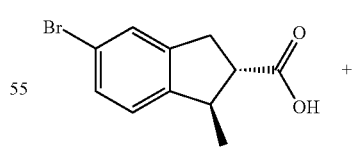

Intermediate 38.3

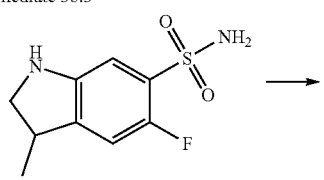

Intermediate 42

-continued

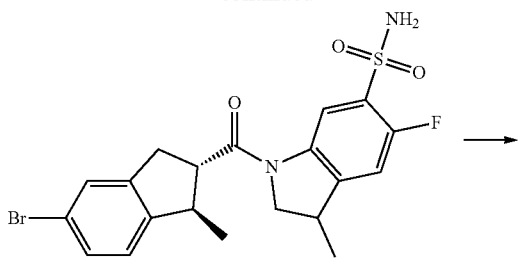

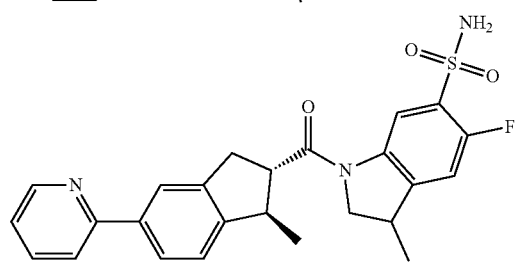

Example 103

Example 103 was prepared in a manner similar to Example 92 except utilizing Intermediate 38.3 and Intermediate 42 as starting materials. $^1$H NMR (400 MHz, DMSO-d6) δ 8.71 (d, J=5.0 Hz, 1H), 8.60 (d, J=6.6 Hz, 1H), 8.06 (d, J=4.3 Hz, 2H), 7.97-7.86 (m, 2H), 7.58 (s, 2H), 7.50 (q, J=4.8 Hz, 1H), 7.40 (t, J=9.9 Hz, 2H), 4.54 (q, J=9.8 Hz, 1H), 3.87 (td, J=10.4, 6.9 Hz, 1H), 3.63 (dt, J=27.4, 7.3 Hz, 2H), 3.48-3.22 (m, 2H), 3.08 (ddd, J=15.0, 7.9, 4.6 Hz, 1H), 1.36 (td, J=7.1, 1.8 Hz, 6H). LCMS: 466.220 [M+H].

Preparation of Intermediate 42:
5-fluoro-3-methylindoline-6-sulfonamide

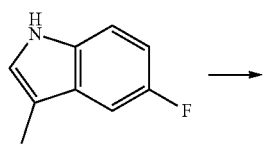

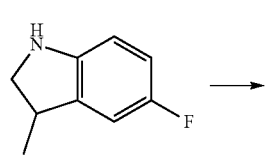

Intermediate 42.1

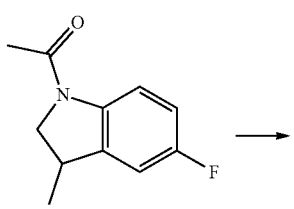

Intermediate 42.2

-continued

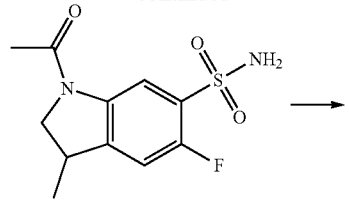

Intermediate 42.3

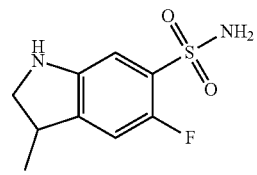

Intermediate 42

Preparation of Intermediate 42.1: 5-fluoro-3-methyl-1H-indole (1.5 g, 10 mmol) was dissolved in acetic acid (5V). NaBH$_3$CN (632 mg, 3 eq) was added into the reaction flask portion-wise while maintaining the temperature below 10° C. The resulting solution was warmed to RT and stirred for 3 h. After which, the solution was diluted with ice-cold water and neutralized with 2 N NaOH until the pH of the solution rose between 5-6. The reaction mixture was extracted with EtOAc (4×20V). The combined organic layers were washed with brine and dried over MgSO$_4$. The crude will be used directly to the next step.

Preparation of Intermediate 42.2: 5-fluoro-3-methyl-indoline (10 mmol, crude) was dissolved in dichloromethane (10V) and added triethylamine (2.8 ml, 3 eq), and acetyl chloride (0.78 ml, 1 eq) at 0° C. The reaction was stirred at 0° C. for 15 min, at which time the reaction was quenched with sodium bicarbonate (sat. aq) and extracted with EtOAc (3×10V). The organic layer was dried (MgSO$_4$) and concentrated in vacuo. The residue was purified by column chromatography on silica gel to give the product as a white solid, 1.72 g, 90% yield over 2 steps. $^1$H NMR (400 MHz, Chloroform-d) δ 8.17 (dd, J=8.8, 4.9 Hz, 1H), 6.96-6.79 (m, 2H), 4.26 (t, J=9.8 Hz, 1H), 3.63 (dd, J=10.2, 6.8 Hz, 1H), 3.57-3.43 (m, 1H), 1.38 (d, J=6.9 Hz, 3H). LCMS: 194.014 [M+H].

Preparation of Intermediate 42.3: 1-(5-fluoro-3-methyl-indolin-1-yl)ethanone (0.5 g, 2.6 mmol) was taken up in dichloroethane (5 V) and chlorosulfonic acid (10 V). The reaction was sealed and warmed to 65° C. overnight, after which time the reaction was carefully poured onto ice. Following extraction with EtOAc (2×10V), the combined organic layers were dried (MgSO$_4$) and concentrated in vacuo. The crude was dissolved in 1,4-dioxane (4V), a solution of concentrated ammonium hydroxide was added, and the mixture stirred at RT for 1 h. The volatiles were evaporated in vacuo and diluted hydrochloric acid was added. The white solids were collected by filtration. Washed the solids with water and minimum amount of dichloromethane, the solids were further dried on 1 yo. 0.57 g, 81% yield over 2 steps. $^1$H NMR (400 MHz, DMSO-d6) δ 8.46 (d, J=6.6 Hz, 1H), 7.56 (s, 2H), 7.36 (d, J=9.7 Hz, 1H), 4.33 (t, J=10.0 Hz, 1H), 3.70 (dd, J=10.3, 6.8 Hz, 1H), 3.53 (dt, J=9.5, 6.9 Hz, 1H), 2.17 (s, 3H), 1.31 (d, J=6.9 Hz, 3H). LCMS: 272.956 [M+H].

Preparation of Intermediate 42: 1-acetyl-5-fluoro-2-methyl-indoline-6-sulfonamide (0.57 g, 2.1 mmol) was dissolved in 2 N NaOH (aq, 6 ml, 6 eq). The mixture was heated at 100° C. for 3 hours. The reaction was cooled, and the pH was adjusted to 7 with acetic acid. The resulting precipitates were collected by filtration. The solids were washed with water, dried on 1 yo. Off-white powder, 0.42 g, 88% yield. $^1$H NMR (400 MHz, DMSO-d6) δ 7.38 (s, 2H), 7.07 (d, J=9.9 Hz, 1H), 6.80 (d, J=5.9 Hz, 1H), 5.71 (s, 1H), 3.62 (td, J=9.0, 1.4 Hz, 1H), 3.33-3.23 (m, 1H), 3.03 (td, J=8.6, 2.6 Hz, 1H), 1.24 (d, J=6.8 Hz, 3H). LCMS: 231.034 [M+H].

Example 103 was prepared in a manner similar to Example 92 utilizing Intermediate 38.3, Intermediate 42 instead of Intermediate 38, indoline-6-sulfonamide as starting materials. ¹H NMR (400 MHz, DMSO-d6) δ 8.71 (d, J=5.0 Hz, 1H), 8.60 (d, J=6.6 Hz, 1H), 8.06 (d, J=4.3 Hz, 2H), 7.97-7.86 (m, 2H), 7.58 (s, 2H), 7.50 (q, J=4.8 Hz, 1H), 7.40 (t, J=9.9 Hz, 2H), 4.54 (q, J=9.8 Hz, 1H), 3.87 (td, J=10.4, 6.9 Hz, 1H), 3.63 (dt, J=27.4, 7.3 Hz, 2H), 3.48-3.22 (m, 2H), 3.08 (ddd, J=15.0, 7.9, 4.6 Hz, 1H), 1.36 (td, J=7.1, 1.8 Hz, 6H). LCMS: 466.220 [M+H].

Preparation of Example 104: (R)-5-fluoro-3-methyl-1-((1R,2S)-1-methyl-5-(pyridin-2-yl)-2,3-dihydro-1H-indene-2-carbonyl)indoline-6-sulfonamide, and Example 105: (S)-5-fluoro-3-methyl-1-((1R,2S)-1-methyl-5-(pyridin-2-yl)-2,3-dihydro-1H-indene-2-carbonyl)indoline-6-sulfonamide

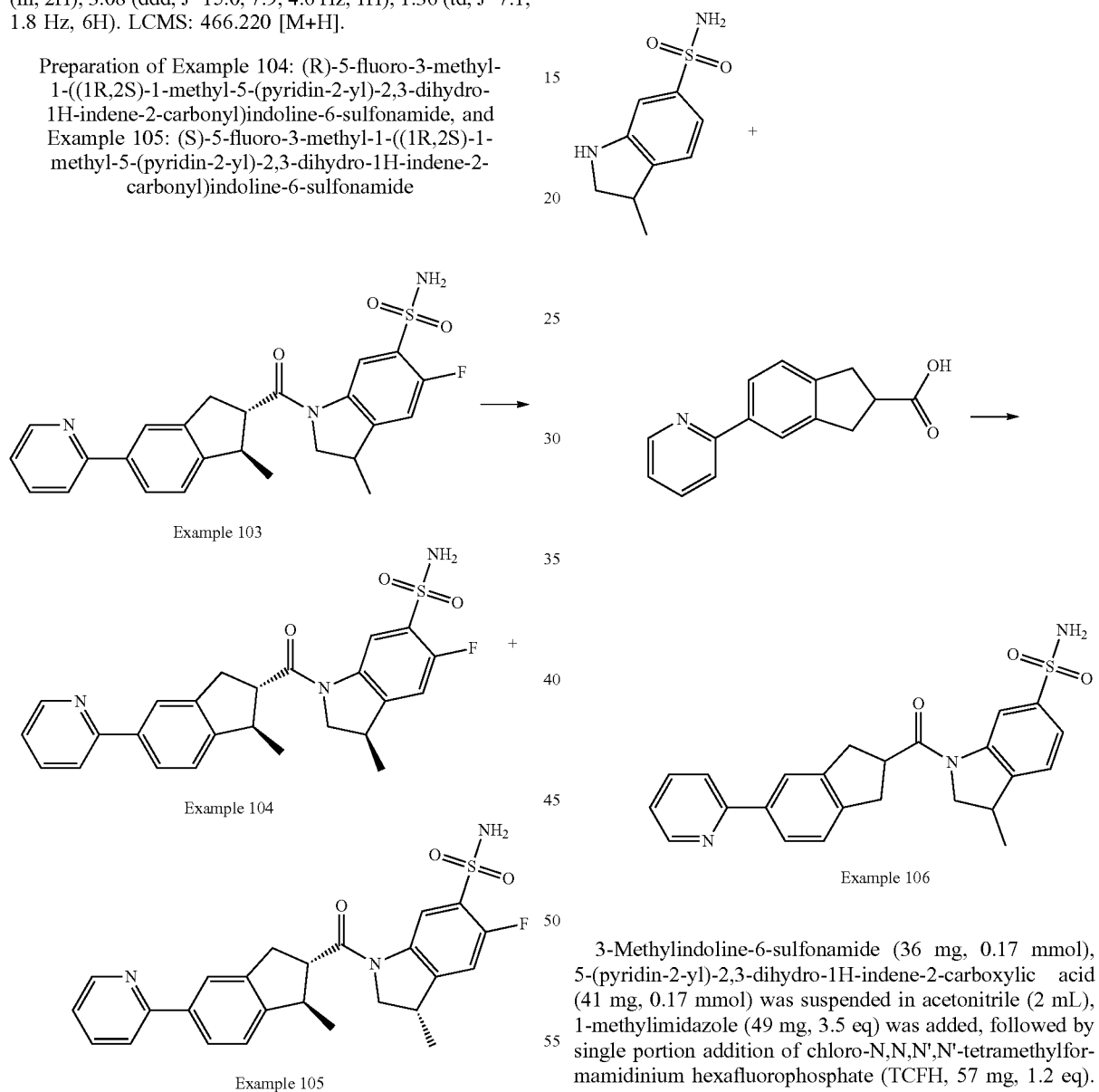

Example 103

Example 104

Example 105

These two single isomers were prepared by separating the racemic mixture Example 103 by SFC using CCO-F2 column, 35% MeOH. The first peak was assigned as Example 104 and the second peak was assigned as Example 105.

Example 104: ¹H NMR (400 MHz, DMSO-d6) δ 8.66 (d, J=4.9 Hz, 1H), 8.60 (d, J=6.6 Hz, 1H), 7.94 (q, J=6.8, 5.7 Hz, 4H), 7.58 (s, 2H), 7.45-7.29 (m, 3H), 4.56 (t, J=9.9 Hz, 1H), 3.86 (dd, J=10.3, 7.0 Hz, 1H), 3.63 (dq, J=15.9, 7.4 Hz, 2H), 3.34-3.22 (m, 2H), 3.16-2.97 (m, 1H), 1.36 (t, J=6.2 Hz, 6H). LCMS: 466.24 [M+H].

Example 105: ¹H NMR (400 MHz, DMSO-d6) δ 8.66 (d, J=4.9 Hz, 1H), 8.60 (d, J=6.6 Hz, 1H), 8.03-7.80 (m, 4H), 7.58 (s, 2H), 7.48-7.29 (m, 3H), 4.53 (t, J=10.0 Hz, 1H), 3.89 (dd, J=10.4, 6.9 Hz, 1H), 3.64 (dp, J=16.2, 7.3 Hz, 2H), 3.34-3.22 (m, 2H), 3.07 (dd, J=14.9, 7.9 Hz, 1H), 1.36 (t, J=6.2 Hz, 6H). LCMS: 466.23 [M+H].

Preparation of Example 106: 3-Methyl-1-[5-(2-pyridyl)indane-2-carbonyl]indoline-6-sulfonamide Example 106

3-Methylindoline-6-sulfonamide (36 mg, 0.17 mmol), 5-(pyridin-2-yl)-2,3-dihydro-1H-indene-2-carboxylic acid (41 mg, 0.17 mmol) was suspended in acetonitrile (2 mL), 1-methylimidazole (49 mg, 3.5 eq) was added, followed by single portion addition of chloro-N,N,N',N'-tetramethylformamidinium hexafluorophosphate (TCFH, 57 mg, 1.2 eq). The reaction mixture stirred overnight at room temperature, after which time the solvent was removed under reduced pressure. The crude residue was purified with reverse phase HPLC to give the product. ¹H NMR (400 MHz, DMSO-d₆) δ 8.71 (d, J=5.0 Hz, 1H), 8.58 (d, J=1.7 Hz, 1H), 8.06 (d, J=3.7 Hz, 2H), 7.94 (s, 1H), 7.88 (dd, J=7.9, 1.7 Hz, 1H), 7.51 (dt, J=8.6, 2.7 Hz, 2H), 7.40 (d, J=7.9 Hz, 1H), 7.29 (s, 2H), 4.54 (m, 1H), 3.88 (m, 1H), 3.77 (t, J=8.0 Hz, 1H), 3.66-3.54 (m, 2H), 3.33 (m, 3H), 1.35 (d, J=6.9 Hz, 3H). LCMS: 434.43 [M+H].

Preparation of Example 107: (R)-3-methyl-1-((R)-5-(pyridin-2-yl)-2,3-dihydro-1H-indene-2-carbonyl)indoline-6-sulfonamide, and Example 108: (S)-3-methyl-1-((R)-5-(pyridin-2-yl)-2,3-dihydro-1H-indene-2-carbonyl)indoline-6-sulfonamide

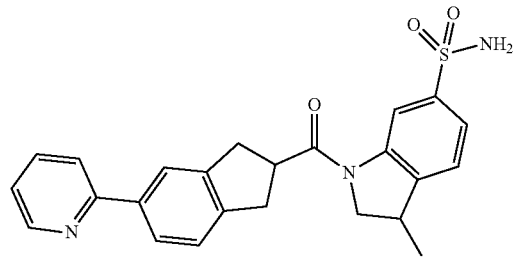

Example 106

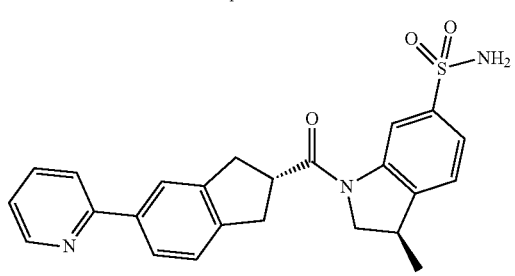

Example 107

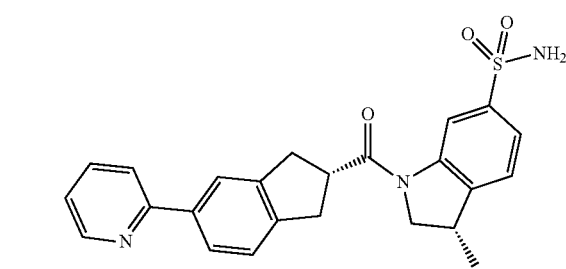

Example 108

Chiral separation of Example 106 afforded 4 fractions. Example 107 was obtained from the 3$^{rd}$ fraction and Example 108 was obtained from the 4$^{th}$ fraction. The NMRs of these two compounds were the same as that of Example 106.

Preparation of Example 109: 3-Methyl-1-[5-(2-pyridyl)indane-2-carbonyl]indoline-6-sulfonamide

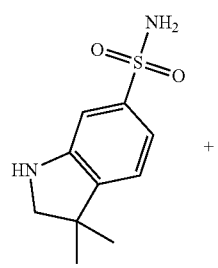

+

-continued

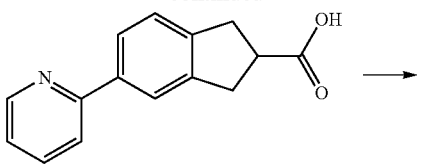

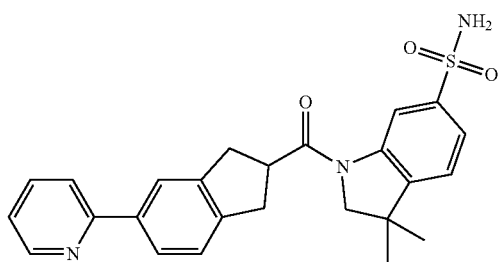

Example 109

3,3-Dimethylindoline-6-sulfonamide (66 mg, 0.25 mmol), 5-(pyridin-2-yl)-2,3-dihydro-1H-indene-2-carboxylic acid (60 mg, 0.25 mmol) was suspended in acetonitrile (2.5 mL), 1-Methylimidazole (72 mg, 3.5 eq) was added, followed by single portion addition of chloro-N,N,N',N'-tetramethylformamidinium hexafluorophosphate (TCFH, 84 mg, 1.2 eq). The reaction mixture stirred overnight at room temperature, after which time the solvent was removed under reduced pressure. The crude residue was purified with reverse phase HPLC to give Example 109. $^1$H NMR (400 MHz, Methanol-d4) δ 8.82-8.75 (m, 1H), 8.70 (d, J=1.7 Hz, 1H), 8.54 (td, J=8.0, 1.6 Hz, 1H), 8.30 (d, J=8.2 Hz, 1H), 7.91 (ddd, J=7.3, 5.8, 1.1 Hz, 1H), 7.84 (d, J=1.7 Hz, 1H), 7.78 (dd, J=7.9, 1.8 Hz, 1H), 7.67 (dd, J=7.9, 1.7 Hz, 1H), 7.55 (d, J=7.9 Hz, 1H), 7.43 (d, J=7.9 Hz, 1H), 4.15 (s, 2H), 3.95-3.81 (m, 1H), 3.56-3.39 (m, 4H), 1.46 (s, 6H). LCMS: 448.32 [M+H].

Preparation of Example 110: 5-Bromo-1-(5-(pyridin-2-yl)-2,3-dihydro-1H-indene-2-carbonyl)indoline-6-sulfonamide

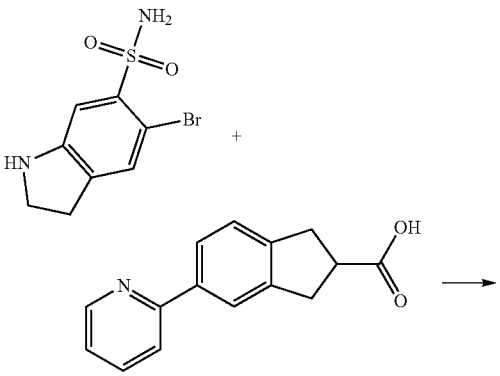

151
-continued

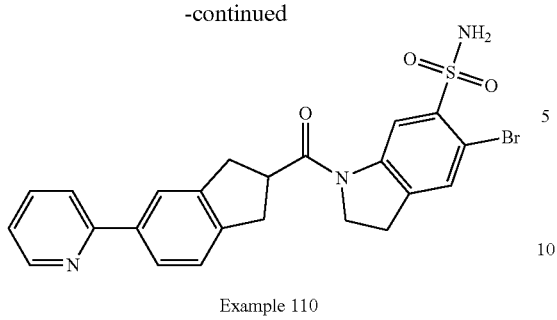

Example 110

Example 110 was prepared in a manner similar to Example 106 utilizing 5-bromoindoline-6-sulfonamide and 5-(pyridin-2-yl)-2,3-dihydro-1H-indene-2-carboxylic acid as starting materials. $^1$H NMR (400 MHz, Methanol-d4) δ 8.95 (s, 1H), 8.80 (dd, J=6.0, 1.5 Hz, 1H), 8.67 (td, J=8.0, 1.6 Hz, 1H), 8.39 (dd, J=8.2, 1.1 Hz, 1H), 8.02 (m, 1H), 7.83 (d, J=1.8 Hz, 1H), 7.77 (dd, J=7.9, 1.8 Hz, 1H), 7.68 (s, 1H), 7.57 (d, J=7.9 Hz, 1H), 4.41 (m, 3H), 3.92-3.81 (m, 1H), 3.46 (m, 5H). 445.31 [M+H].

Preparation of Example 111: 5-Methoxy-1-[5-(2-pyridyl)indane-2-carbonyl]indoline-6-sulfonamide

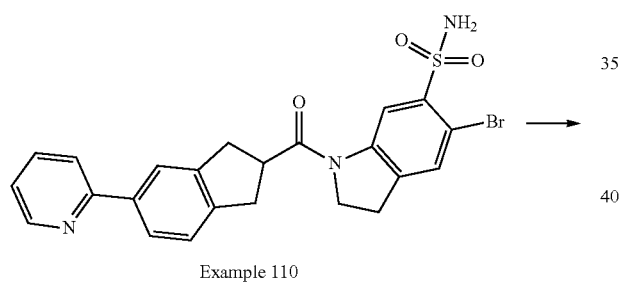

Example 110

152
-continued

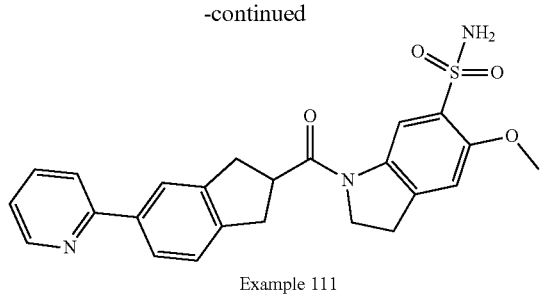

Example 111

To a solution of 5-bromo-1-[5-(2-pyridyl)indane-2-carbonyl]indoline-6-sulfonamide Example 110 (80 mg, 0.16 mmol) in MeOH (1.5 mL) were added copper iodide (31 mg, 1 eq) and 25% sodium methoxide methanol solution (73 uL, 2 eq) followed by heating at 70° C. for 12 h. The reaction mixture was filtered and concentrated. The crude residue was purified with reverse phase HPLC to give the product. $^1$H NMR (400 MHz, Methanol-d4) δ 8.79 (s, 1H), 8.71-8.59 (m, 2H), 8.38 (t, J=6.6 Hz, 1H), 8.01 (t, J=6.8 Hz, 1H), 7.82 (s, 1H), 7.75 (m, 1H), 7.55 (t, J=6.9 Hz, 1H), 7.18 (s, 1H), 4.37 (m, 1H), 3.98 (s, 3H), 3.90-3.78 (m, 2H), 3.73 (s, 2H), 3.54-3.38 (m, 4H). LCMS: 450.31 [M+H].

Preparation of Intermediate 43: (2-Ethyl-5-fluoro-indolin-1-yl)-[(2R)-5-(2-pyridyl)indan-2-yl]methanone

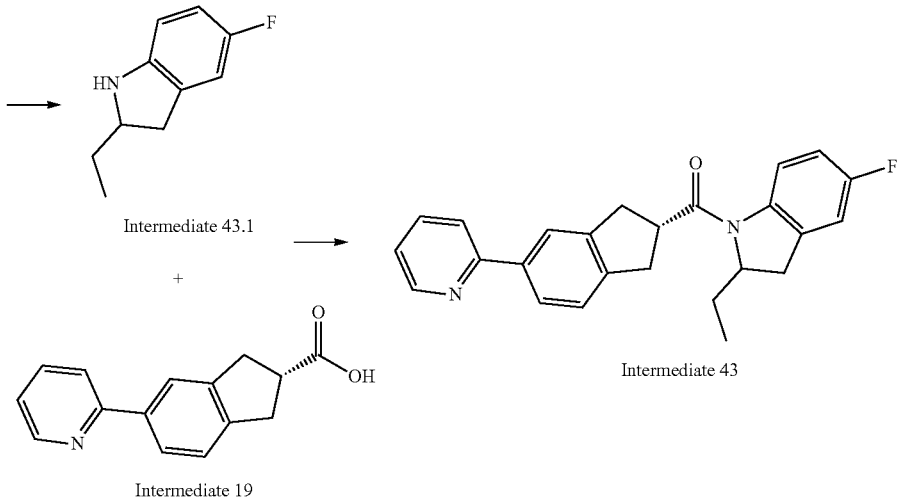

Preparation of Intermediate 43.1 (2-ethyl-5-fluoro-indoline): Add sodium cyanoborohydride (776 mg, 12 mmol) portion-wise to a solution of 2-ethyl-5-fluoro-1H-indole (1 g, 6.2 mmol) in glacial acetic acid (5 mL) at 0° C. The mixture was stirred for 2 hours at room temperature. After cooling in an ice bath, dilute the reaction mixture with water (15 mL). Basify the reaction mixture with 40% aqueous NaOH. Extract the reaction mixture with DCM (2×15 mL). The organic extracts were dried, filtered, and concentrated. The residue was purified by flash chromatography to afford Intermediate 43.1. LC/MS: 166.00 [M+H].

Intermediate 43 was prepared by Method A utilizing 2-ethyl-5-fluoro-indoline Intermediate 43.1, (R)-5-(pyridin-2-yl)-2,3-dihydro-1H-indene-2-carboxylic acid Intermediate 19 as starting materials. LC/MS: 387.32 [M+H].

Preparation of Example 112: 2-Ethyl-5-fluoro-1-[(2R)-5-(2-pyridyl)indane-2-carbonyl]indoline-6-sulfonamide

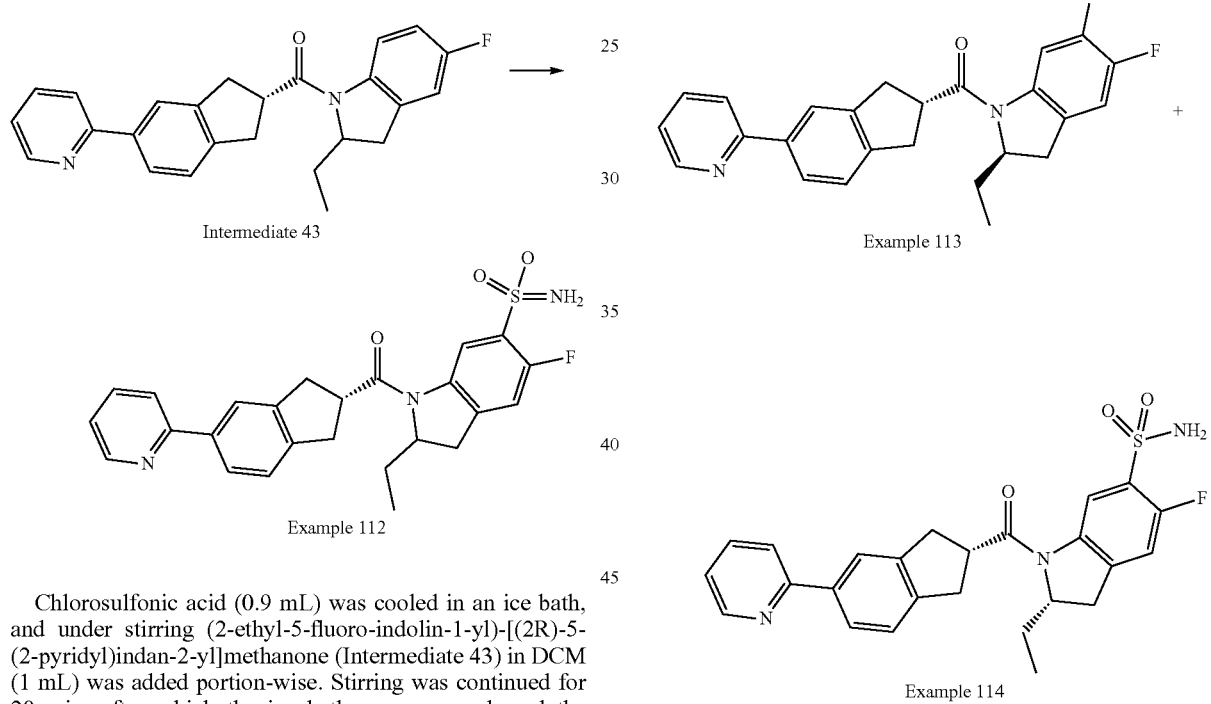

Chlorosulfonic acid (0.9 mL) was cooled in an ice bath, and under stirring (2-ethyl-5-fluoro-indolin-1-yl)-[(2R)-5-(2-pyridyl)indan-2-yl]methanone (Intermediate 43) in DCM (1 mL) was added portion-wise. Stirring was continued for 20 min. after which the ice bath was removed, and the mixture was heated to 70° C. for 1 hour. After cooling to room temperature, the mixture was cautiously poured into ice water and extracted twice with DCM. The combined organic layers were dried over Na$_2$SO$_4$ and evaporated to dryness to give the crude intermediate. The cruse intermediate was then taken up in dioxane (1.5 mL) and 28% NH$_4$OH (1.5 mL) and stirred at RT for 10 min. Reaction completed. The mixture was concentrated. To the residue was added sat. NaHCO$_3$ and extracted with EtOAc twice. The organic phase was dried over Na$_2$SO$_4$ and concentrated. The residue was purified by flash chromatography to afford the title compound. $^1$H NMR (400 MHz, DMSO-d$_6$) δ 8.72-8.61 (m, 1H), 8.51 (m, 1H), 8.06-7.77 (m, 4H), 7.57 (s, 2H), 7.44 (d, J=9.6 Hz, 1H), 7.41-7.25 (m, 2H), 4.44 (q, J=6.3 Hz, 1H), 3.73 (p, J=8.3 Hz, 2H), 3.45 (m, 2H), 3.30-3.17 (m, 1H), 3.07 (m, 2H), 1.38-1.19 (m, 5H). LC/MS: 466.35 [M+1].

Preparation of Example 113: (R)-2-Ethyl-1-((R)-5-(pyridin-2-yl)-2,3-dihydro-1H-indene-2-carbonyl) indoline-6-sulfonamide, and Example 114: (S)-2-ethyl-1-((R)-5-(pyridin-2-yl)-2,3-dihydro-1H-indene-2-carbonyl)indoline-6-sulfonamide Chiral separation of Example 112 afforded 2 fractions. Example 113 was obtained from the first fraction and Example 114 from the second fraction. Example 113: $^1$H NMR (400 MHz, DMSO-d$_6$) δ 8.65 (ddd, J=4.9, 3.0, 2.0 Hz, 1H), 8.54 (d, J=6.6 Hz, 1H), 8.48 (d, J=6.5 Hz, OH), 8.05-7.79 (m, 4H), 7.56 (s, 2H), 7.44 (d, J=9.6 Hz, 1H), 7.40-7.27 (m, 2H), 4.98-4.82 (m, OH), 4.44 (q, J=6.4 Hz, 1H), 4.09 (d, J=5.3 Hz, OH), 3.74 (q, J=8.5 Hz, 1H), 3.45 (dd, J=16.1, 8.5 Hz, 2H), 3.27-2.94 (m, 2H), 1.43-1.19 (m, 5H), 1.14 (d, J=6.4 Hz, 1H). Example 114: $^1$H NMR (400 MHz, DMSO-d$_6$) δ 8.64 (ddd, J=4.8, 1.9, 1.0 Hz, 1H), 8.51 (dd, J=23.5, 6.6 Hz, 1H), 7.97-7.79 (m, 4H), 7.55 (m, 2H), 7.44 (m, 2H), 7.40-7.23 (m, 1H), 4.44 (q, J=6.4 Hz, 1H), 3.74 (dd, J=16.6, 8.5 Hz, 2H), 3.45 (m, 3H), 3.18-2.92 (m, 2H), 1.39-1.15 (m, 5H). LCMS: 466.39 [M+H].

Preparation of Intermediate 45:1-(6-bromo-2,3-di-hydrobenzofuran-2-carbonyl)indoline-6-sulfonamide

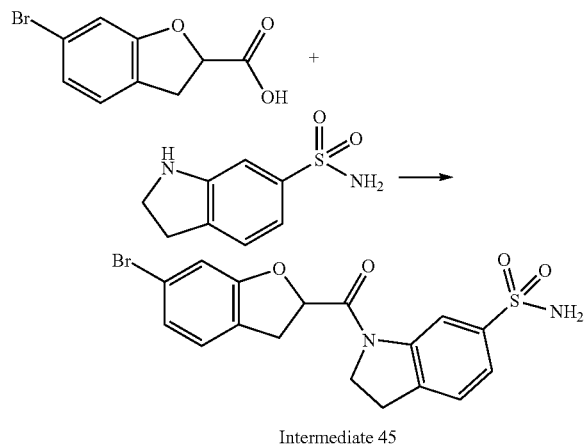

Intermediate 45

Indoline-6-sulfonamide (63 mg, 0.32 mmol) and 6-bromo-2,3-dihydrobenzofuran-2-carboxylic acid (78 mg, 1 eq) were combined in acetonitrile (3.5 mL). 1-methylimidazole (89 μL, 3.5 eq) and N-tetramethylformamidinium hexafluorophosphate (134 mg, 1.5 eq) were added to the solution and stirred for 30 minutes. Silica gel was added to the crude mixture and the solvent was removed in vacuo. The resulting residue was then purified via flash chromatography (0-50% methanol and dichloromethane on silica gel). Solvent was removed, yielding a clear oil that was then taken up in acetonitrile and concentrated to obtain Intermediate 45. LC/MS: 422.8 [M+H].

Preparation of Example 115: 1-(6-(pyridin-2-yl)-2,3-dihydrobenzofuran-2-carbonyl)indoline-6-sulfonamide

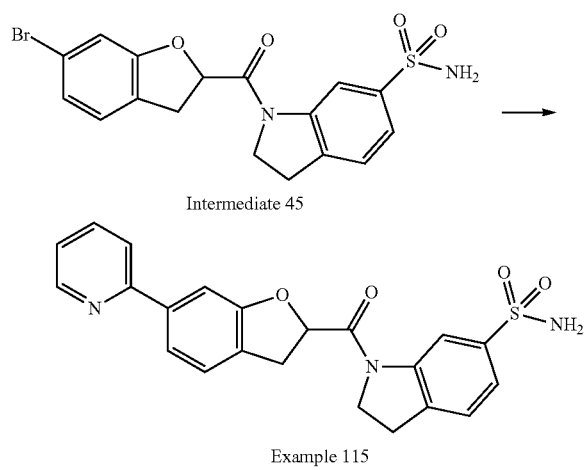

Intermediate 45

Example 115

Intermediate 45 (73.3 mg, 0.173 mmol) was taken up in dioxane (2 mL) and combined with bis(tri-tert-butylphosphine)palladium(0) (8.85 mg, 0.1 eq), followed by 2-(tributylstannyl)pyridine (63.8 mg, 1 eq). The mixture was stirred at 95° C. for an hour and the crude was then purified via reverse-phase HPLC. The collected fractions were lyophilized to obtain Example 115. $^1$H NMR (400 MHz, DMSO-d6) δ 8.67-8.63 (m, 1H), 8.54 (d, J=1.6 Hz, 1H), 7.96 (d, J=8.0 Hz, 1H), 7.92-7.87 (m, 1H), 7.66-7.62 (m, 1H), 7.55 (d, J=1.5 Hz, 1H), 7.54-7.50 (m, 1H), 7.45 (d, J=8.0 Hz, 1H), 7.37 (d, J=7.6 Hz, 2H), 7.30 (s, 2H), 5.76 (dd, J=9.6, 6.5 Hz, 1H), 4.43 (d, J=9.1 Hz, 1H), 4.32 (q, J=9.1 Hz, 1H), 6H under water peak. LC/MS: 422.2 [M+H].

Preparation of Intermediate 46:1-(6-bromo-2,3-di-hydrobenzofuran-2-carbonyl)-5-fluoroindoline-6-sulfonamide

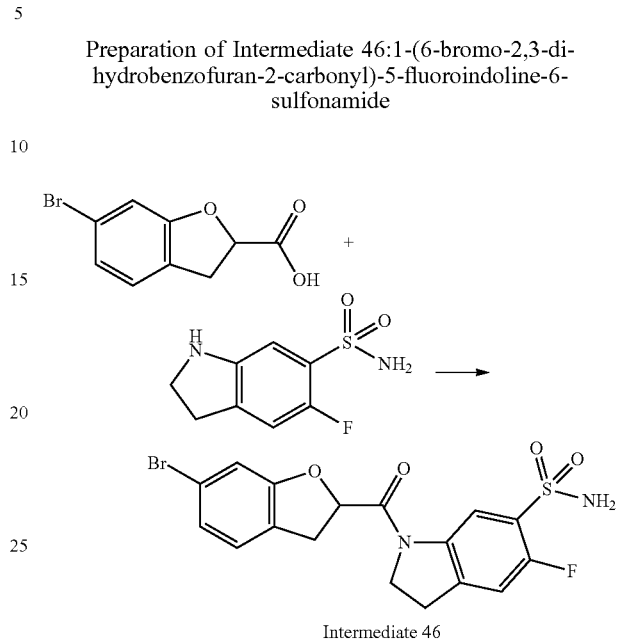

Intermediate 46

Preparation of Intermediate 46 involved the same method toward Intermediate 45 with 5-fluoroindoline-6-sulfonamide substituting starting material indoline-6-sulfonamide. LC/MS: 440.6 [M+H].

Preparation of Example 116: 5-fluoro-1-(6-(pyridin-2-yl)-2,3-dihydrobenzofuran-2-carbonyl)indoline-6-sulfonamide

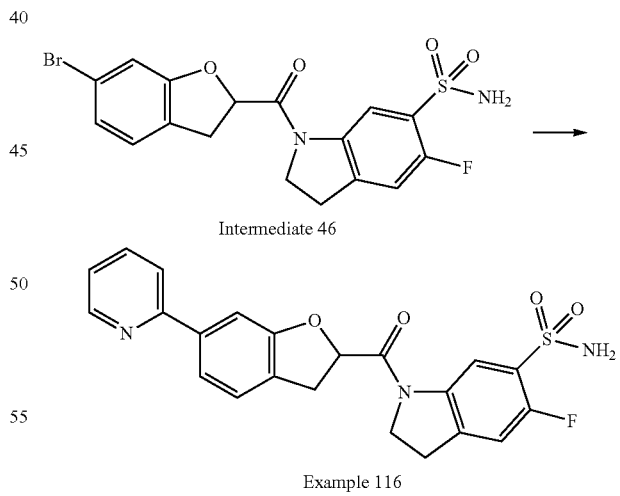

Intermediate 46

Example 116

Example 116 was prepared similarly to Example 115 with Intermediate 46 instead of Intermediate 45 and a reaction time of 48 h. $^1$H NMR (400 MHz, DMSO-d6) δ 8.67 (d, J=4.9 Hz, 1H), 8.51 (d, J=6.6 Hz, 1H), 7.99 (d, J=7.9 Hz, 1H), 7.94 (dd, J=8.3, 6.6 Hz, 1H), 7.64 (dd, J=7.8, 1.6 Hz, 1H), 7.60 (s, 2H), 7.55 (d, J=1.5 Hz, 1H), 7.40 (d, J=3.7 Hz, 2H), 7.38 (s, 1H), 5.75 (dd, J=9.6, 6.5 Hz, 1H), 4.42 (dd, J=18.0, 9.1 Hz, 1H), 4.32 (dd, J=9.3 Hz, 1H), 3.58 (t, J=8.8 Hz, 2H), 3.31 (t, J=8.6 Hz, 2H). LC/MS: 440.0 [M+H].

Preparation of Intermediate 47: 1-((2R)-5-bromoindane-2-carbonyl)-2-methyl-indoline-6-sulfonamide

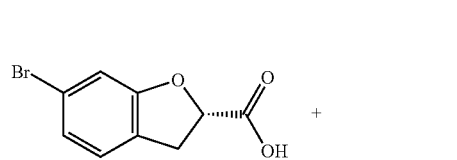

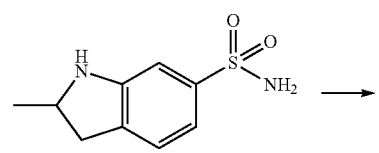

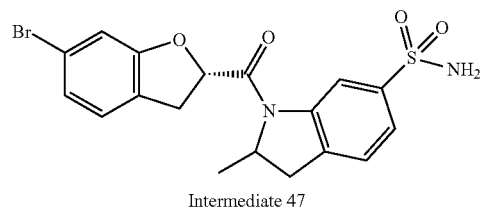

Intermediate 47

Intermediate 47 was prepared using a similar procedure toward Intermediate 45 with (2R)-5-bromoindane-2-carboxylic acid and 2-methylindoline-6-sulfonamide as starting materials. The reaction mixture stirred overnight and was then purified via reverse-phase HPLC. The resulting desired fractions were combined and lyophilized to afford Intermediate 47. LC/MS: 435.0 [M+H].

Preparation of Example 117: 1-((2R)-5-(2,5-difluorophenyl)indane-2-carbonyl)-2-methyl-indoline-6-sulfonamide

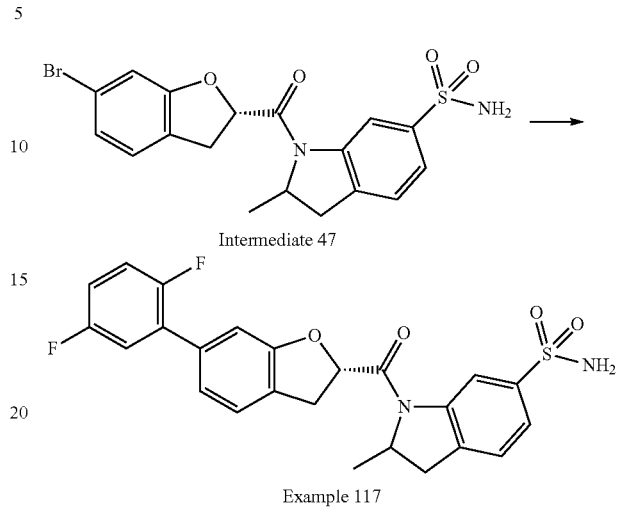

Intermediate 47 (42 mg, 0.096 mmol) was dissolved in a solution of 9:1 dioxane:water (1 mL), then combined with (2,5-difluorophenyl)boronic acid (30 mg, 2 eq), (1,1'-bis(diphenylphosphino)ferrocene)-dichloropalladium(II) (27 mg, 0.4 eq), and potassium carbonate (40 mg, 3 eq). The reaction mixture was purged with nitrogen gas before stirring at 95° C. for 4 h. The crude was then purified via reverse-phase HPLC and lyophilized, affording Example 117. $^1$H NMR (400 MHz, DMSO-d$_6$) δ 8.57 (s, 1H), 7.51 (dd, J=7.9, 1.6 Hz, 1H), 7.45 (d, J=6.9 Hz, 1H), 7.41-7.32 (m, 3H), 7.28 (s, 2H), 4.93-4.83 (m, 1H), 3.82-3.70 (m, 1H), 2.79 (d, J=16.6 Hz, 1H), 2.70-2.30 (m, 1H), 1.29 (d, J=6.3 Hz, 3H), 4H under water peak. LC/MS: 440.0 [M+H].

Preparation of Example 118: (R)-1-((R)-5-(2,5-difluorophenyl)-2,3-dihydro-1H-indene-2-carbonyl)-2-methylindoline-6-sulfonamide, and Example 119: (S)-1-((R)-5-(2,5-difluorophenyl)-2,3-dihydro-1H-indene-2-carbonyl)-2-methylindoline-6-sulfonamide

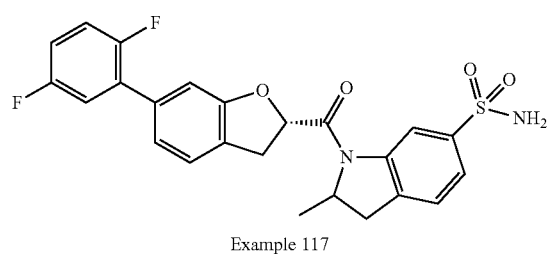

Example 117

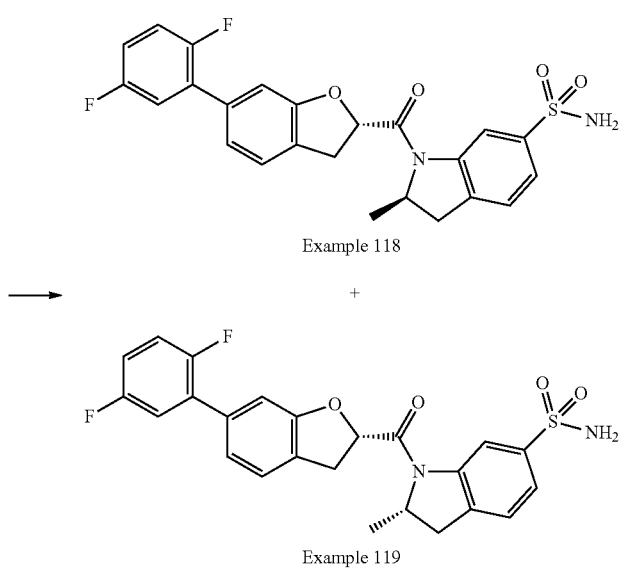

Example 118

+

Example 119

Example 118 was obtained from the racemic Example 117 via chiral SFC separation (45% isopropyl alcohol and ammonia on an AD-H 4.6×100 mm column) with a retention time of 3.54 minutes. $^1$H NMR (400 MHz, DMSO-d$_6$) δ 8.58 (s, 1H), 7.54-7.50 (m, 1H), 7.46 (d, J=5.7 Hz, 1H), 7.42-7.31 (m, 4H), 7.29 (s, 1H), 7.10 (s, 4H), 4.89 (t, J=7.4 Hz, 1H), 3.83-3.72 (m, 1H), 2.80 (d, J=16.6 Hz, 1H), 1.30 (d, J=6.3 Hz, 3H), 5H under water peak. LC/MS: 440.0 [M+H].

Examples 119 was obtained from the racemic Example 117 via chiral SFC separation (45% isopropyl alcohol and ammonia on an AD-H 4.6×100 mm column) with a retention time of 5.12 minutes. $^1$H NMR (400 MHz, DMSO-d$_6$) δ 8.58 (s, 1H), 7.52 (dd, J=7.9, 1.6 Hz, 1H), 7.45 (d, J=7.7 Hz, 1H), 7.41 (s, 1H), 7.37 (d, J=6.7 Hz, 4H), 7.29 (s, 2H), 4.89 (t, 1H), 3.83-3.72 (m, 1H), 2.80 (d, J=16.6 Hz, 1H), 1.30 (d, J=6.3 Hz, 3H), 5H under water peak. LC/MS: 440.0 [M+H].

Preparation of Intermediate 48: 1-(5-bromo-2,3-dihydrobenzofuran-2-carbonyl)-2-methylindoline-6-sulfonamide

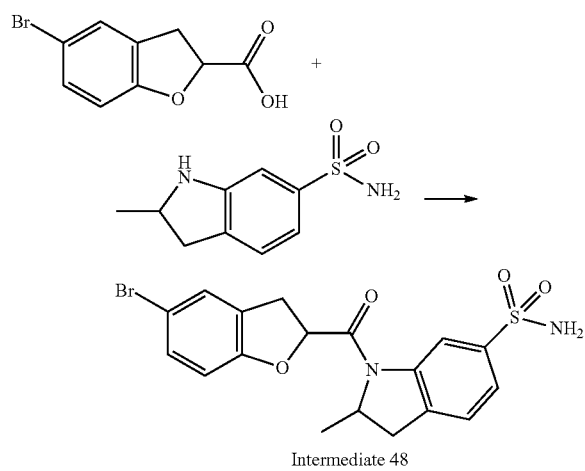

Intermediate 48

Intermediate 48 was obtained using the same method as that of Intermediate 45 with 5-bromo-2,3-dihydrobenzofuran-2-carboxylic acid and 2-methylindoline-6-sulfonamide as the reactants. The crude was purified using reverse-phase HPLC and then lyophilized to achieve Intermediate 48. LC/MS: 437.0 [M+H].

Preparation of Example 120: 1-(5-(2,5-difluorophenyl)-2,3-dihydrobenzofuran-2-carbonyl)-2-methylindoline-6-sulfonamide

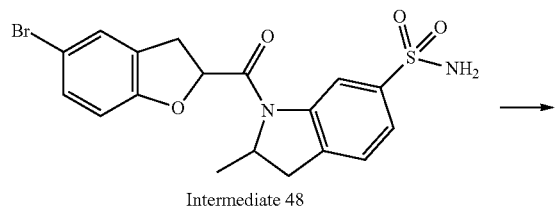

Intermediate 48

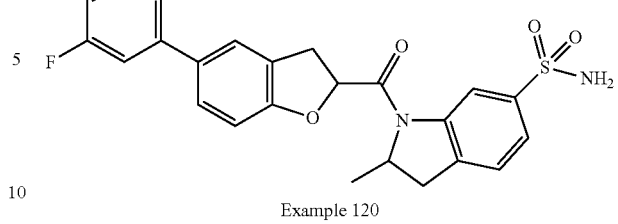

Example 120

Preparation of Example 120 utilized the same procedure for that of Example 117 with Intermediate 48 substituting Intermediate 47. $^1$H NMR (400 MHz, DMSO-d6) δ 8.52 (s, 1H), 7.56 (t, J=6.9 Hz, 1H), 7.50 (s, 1H), 7.47 (s, OH), 7.40-7.34 (m, 1H), 7.31 (d, J=7.3 Hz, 1H), 7.25-7.17 (m, 1H), 6.96 (t, J=9.5 Hz, 1H), 5.85-5.75 (m, 1H), 5.10-4.84 (m, 1H), 3.74-3.42 (m, 3H), 2.84 (d, J=16.3 Hz, 1H), 1.36 (d, J=6.3 Hz, 1H), 1.32 (d, J=6.5 Hz, 2H). LC/MS: 471.0 [M+H].

Preparation of Example 123: (R)-1-((R)-5-(2,5-difluorophenyl)-2,3-dihydrobenzofuran-2-carbonyl)-2-methylindoline-6-sulfonamide

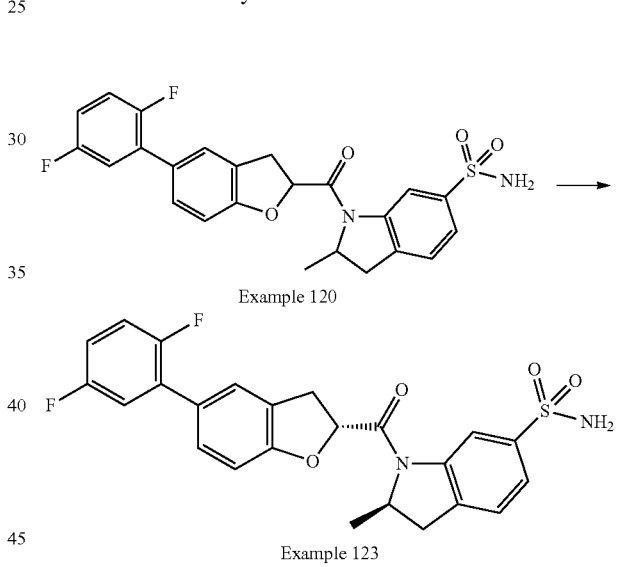

Example 120

Example 123

Example 123 was obtained from the racemic Example 120 via chiral SFC separation (25% ethanol and ammonia on an OJ-H 4.6×100 mm column) with a retention time of 13.05 minutes. $^1$H NMR (400 MHz, DMSO-d$_6$) δ 8.52 (s, 1H), 7.59-7.54 (m, 1H), 7.50 (d, J=6.4 Hz, 2H), 7.39-7.34 (m, 3H), 7.32 (s, 2H), 7.22 (td, J=8.7, 8.2, 4.0 Hz, 1H), 6.94 (d, J=8.5 Hz, 1H), 5.81 (dd, J=9.6, 6.6 Hz, 1H), 5.04 (d, J=7.9 Hz, 1H), 1.32 (d, J=6.4 Hz, 3H), 3H under water peak. LC/MS: 471.0 [M+H].

Preparation of Intermediate 60: 5-fluoro-2-(fluoromethyl)indoline-6-sulfonamide

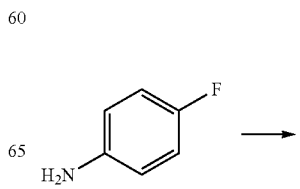

-continued

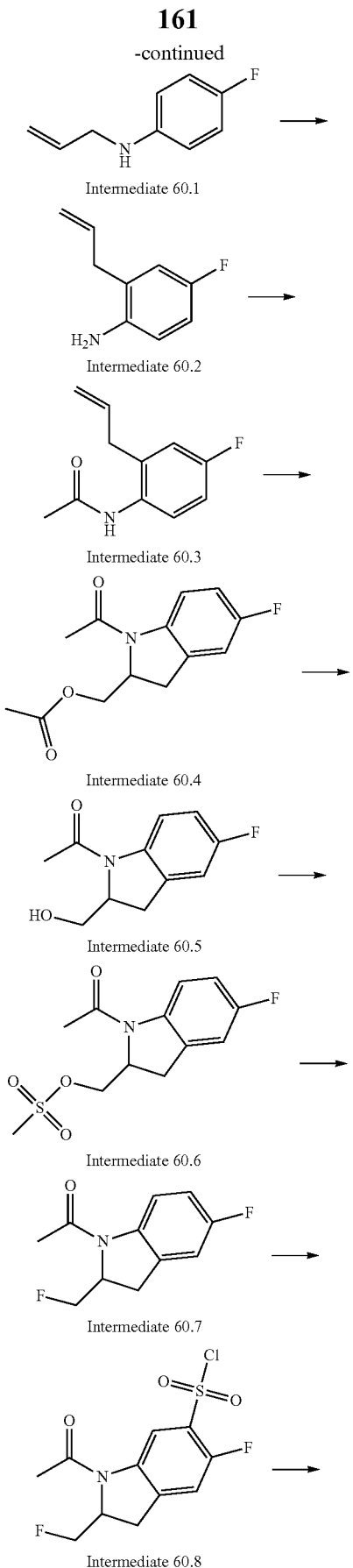

Intermediate 60.1

Intermediate 60.2

Intermediate 60.3

Intermediate 60.4

Intermediate 60.5

Intermediate 60.6

Intermediate 60.7

Intermediate 60.8

-continued

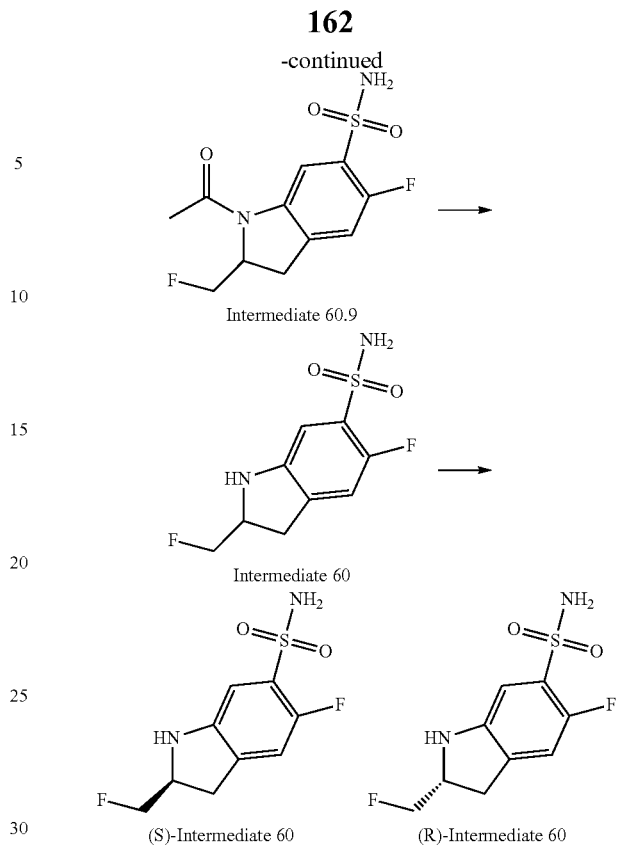

Intermediate 60.9

Intermediate 60

(S)-Intermediate 60    (R)-Intermediate 60

Preparation of Intermediate 60.1
(N-allyl-4-fluoroaniline)

A solution of 4-fluoroaniline (50 g, 449.9 mmol, 43.10 mL, 1 eq) in DMF (500 mL) was added 3-bromoprop-1-ene (48.9 g, 404.9 mmol, 0.9 eq) and $K_2CO_3$ (93.2 g, 674.9 mmol, 1.5 eq). The reaction mixture was stirred at 20° C. for 12 h. The reaction mixture was quenched by water (500 mL), extracted with ethyl acetate (1000 mL*2). The combined organics were washed with brine (1500 mL), dried over $Na_2SO_4$, filtered and concentrated under reduced pressure to give a residue. The residue was purified by flash column chromatography on silica gel (eluted with 0-20% ethyl acetate in petroleum ether) to afford Intermediate 60.1. LC/MS: 152.1 [M+H].

Preparation of Intermediate 60.2
(2-allyl-4-fluoroaniline)

To a solution of Intermediate 60.1 (20 g, 132.3 mmol, 1 eq) in m-xylene (150 mL) was added $BF_3 \cdot Et_2O$ (56.3 g, 396.8 mmol, 48.9 mL, 3 eq) and the reaction mixture was stirred at 170° C. for 2 h. After cooling down to room temperature, the reaction mixture was treated by 2 M NaOH until pH=7, and extracted with EtOAc (1 L×2). The combined organics were washed with brine (1.5 L), dried over $Na_2SO_4$, filtered and concentrated under reduced pressure to give a residue. The residue was purified by flash column chromatography using silica gel (eulted with 0-20% ethyl acetate in petroleum ether) to afford Intermediate 60.2. LC/MS: 152.1 [M+H].

Preparation of Intermediate 60.3
(N-(2-allyl-4-fluorophenyl)acetamide)

To a solution of Intermediate 60.2 (15 g, 99.2 mmol, 1 eq) in DCM (200 mL) was added $Ac_2O$ (30.3 g, 297.6 mmol, 27.8 mL, 3 eq). The mixture was stirred at 20° C. for 12 h. Water was added (150 mL), and the reaction mixture was extracted with DCM (150 mL*2). The combined organic layers were washed with brine (150 mL) and dried over $Na_2SO_4$. The combined organic layer was concentrated to dryness to give Intermediate 60.3 which was used directly without purification. LC/MS: 194.1 [M+H].

Preparation of Intermediate 60.4 ((1-acetyl-5-fluoroindolin-2-yl)methyl acetate

To a solution of Intermediate 60.3 (20 g, 103.5 mmol, 1 eq) in AcOH (300 mL) and $Ac_2O$ (40 mL) were added $Pd(CH_3CN)_2Cl_2$ (1.3 g, 5.1 mmol, 0.05 eq), and $Cu(NO_3)_2*3H_2O$ (1.2 g, 5.1 mmol, 0.05 eq). The reaction mixture was degassed and purged with $O_2$ 3 times, and was then stirred at 25° C. for 15 h under $O_2$ atmosphere (15 psi). The reaction mixture was concentrated to dryness. Dichloromethane (200 mL) was then added, and the resulting mixture was washed with saturated $NaHCO_3$ (200 mL). The aqueous layer was extracted with dichloromethane (2*200 mL) and the combined organic layer was dried over $Na_2SO_4$. The solvent was removed under reduced pressure. The crude product was purified by flash column chromatography using silica gel (eluted with 10-50% ethyl acetate in petroleum ether) to afford Intermediate 60.4. LC/MS: 252.1 [M+H].

Preparation of Intermediate 60.5 (1-(5-fluoro-2-(hydroxymethyl)indolin-1-yl)ethan-1-one)

To a solution of Intermediate 60.4 (7.4 g, 29.4 mmol, 1 eq) in MeOH (70 mL) was added $LiOH \cdot H_2O$ (1 M, 35.3 mL, 1.2 eq). The mixture was stirred at 0° C. for 1 h. The mixture was acidified by 2 M HCl until pH=3. The reaction mixture was filtered and the filter cake was washed with water (10 mL*2) and dried under reduced pressure to give Intermediate 60.5. LC/MS: 210.1 [M+H].

Preparation of Intermediate 60.6 ((1-acetyl-5-fluoroindolin-2-yl)methyl methanesulfonate)

To a solution of Intermediate 60.5 (3 g, 14.3 mmol, 1 eq) in DCM (40 mL) was added DIPEA (7.4 g, 57.3 mmol, 9.9 mL, 4 eq) and methylsulfonyl methanesulfonate (5.0 g, 28.6 mmol, 2 eq). The mixture was stirred at 20° C. for 2 h. The reaction mixture was concentrated and was then purified by flash column chromatagoraphy using silica gel (eluted with 10-50% ethyl acetate in petroleum ether) to afford Intermediate 60.6. LC/MS: 288.1 [M+H].

Preparation of Intermediate 60.7 (1-(5-fluoro-2-(fluoromethyl)indolin-1-yl)ethan-1-one)

A solution of Intermediate 60.6 (2.5 g, 8.7 mmol, 1 eq) in TBAF (1 M, 43.5 mL, 5 eq) (THF solution) was stirred at 70° C. for 36 h. Water (30 mL) was added to the reaction and the resulting mixture was extracted with Ethyl acetate (30 mL*2). The combined organic layers were washed with brine (20 mL) and dried over $Na_2SO_4$. The combined organic layers were concentrated to dryness to give residue. The crude product was purified by flash column chromatography using silica gel (eluted with 0-30% ethyl acetate in petroleum ether) to afford Intermediate 60.7. LC/MS: 212.1 [M+H].

Preparation of Intermediate 60.8 (1-acetyl-5-fluoro-2-(fluoromethyl)indoline-6-sulfonyl chloride)

A solution of $HSO_3C_1$ (2 mL) was cooled to 5° C. Then Intermediate 60.7 (600 mg, 2.8 mmol, 1 eq) was added to the mixture in 3 portions. Then the reaction mixture was stirred at 50° C. for 5 h. After cooling to 20° C., the mixture was poured into ice water (20 mL), then the mixture was extracted with DCM (30 mL*2). The combined organic layers were washed with brine (20 mL) and dried over $Na_2SO_4$. The combined organic layer was concentrated to dryness to give Intermediate 60.8 which was used in the next step without further purification. LC/MS: 310.0 [M+H].

Preparation of Intermediate 60.9 (1-acetyl-5-fluoro-2-(fluoromethyl)indoline-6-sulfonamide)

To a solution of Intermediate 60.8 (750 mg, 2.4 mmol, 1 eq) in THF (8 mL) was added $NH_3 \cdot H_2O$ (4 mL, 30% w/v). The mixture was stirred at 20° C. for 12 h and was then concentrated under reduced pressure to give Intermediate 60.9 which was used in the next step without further purification. LC/MS: 291.1 [M+H].

Preparation of Intermediate 60 (5-fluoro-2-(fluoromethyl)indoline-6-sulfonamide)

To a solution of Intermediate 60.9 (650 mg, 2.2 mmol, 1 eq) in EtOH (7 mL) was added HCl (12 M, 1.3 mL, 7 eq). The mixture was stirred at 80° C. for 2 h. The reaction mixture was concentrated to dryness and then dissolved in water (20 mL). The mixture was rendered basic by ammonia (3 mL), and extracted with ethyl acetate (20 mL*2). The combined organic layers were washed with brine (15 mL) and dried over $Na_2SO_4$. The combined organic layer was concentrated to dryness to give Intermediate 60. LC/MS: 249.0 [M+H].

Intermediate 60 was subjected to chiral SFC separation using DAICEL CHIRALPAK IF (250 mm*30 mm, 10 μm) column; mobile phase: [0.1% $NH_3$ MEOH]; B %: 40%-40%, 5 min). (S)-Intermediate 60 was obtained as the first eluent and (R)-Intermediate 60 was obtained as the second eluent.

Preparation of Example 125: (S)-5-fluoro-2-(fluoromethyl)-1-((R)-5-(pyridin-2-yl)-2,3-dihydro-1H-indene-2-carbonyl)indoline-6-sulfonamide

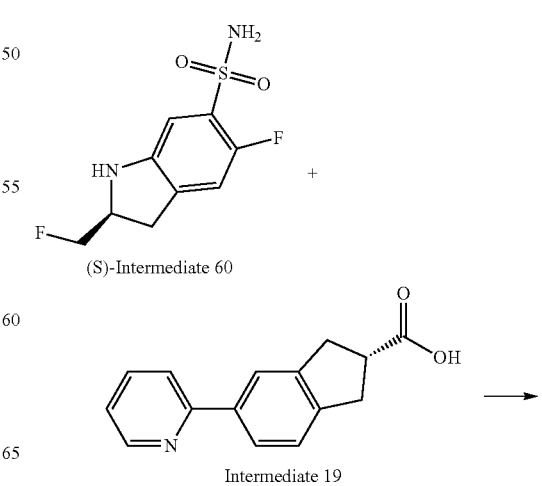

(S)-Intermediate 60

Intermediate 19

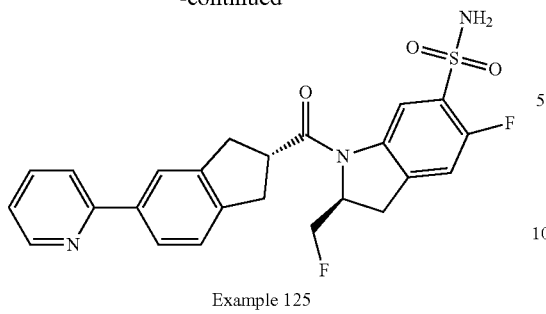

Example 125

Example 125 was prepared in a manner similar to Example 35 employing (S)-Intermediate 60 and Intermediate 19 (General Procedure B). $^1$H NMR (400 MHz, DMSO-d6) δ 8.68 (d, J=4.9 Hz, 1H), 8.52 (d, J=6.6 Hz, 1H), 8.05-7.94 (m, 2H), 7.94-7.83 (m, 2H), 7.59 (s, 2H), 7.42 (ddd, J=20.6, 8.9, 6.3 Hz, 3H), 5.28-5.07 (m, 1H), 4.75-4.33 (m, 2H), 3.83 (p, J=8.0 Hz, 1H), 3.76-3.06 (m, 5H), 2.99 (d, J=17.3 Hz, 1H). LC/MS: 470.2 [M+H].

Preparation of Example 126: (R)-5-fluoro-2-(fluoromethyl)-1-((R)-5-(pyridin-2-yl)-2,3-dihydro-1H-indene-2-carbonyl)indoline-6-sulfonamide

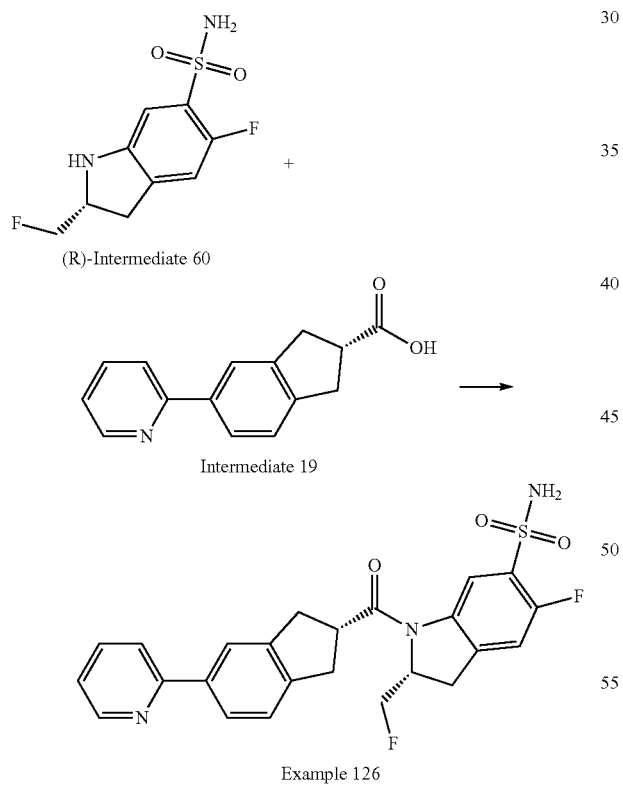

Example 126

Example 126 was prepared in a manner similar to Example 35 employing (R)-Intermediate 60 and Intermediate 19 (General Procedure B). $^1$H NMR (400 MHz, DMSO-d6) δ 8.70 (dd, J=5.0, 1.5 Hz, 1H), 8.51 (d, J=6.6 Hz, 1H), 8.09-7.98 (m, 2H), 7.96 (s, 1H), 7.88 (dd, J=7.9, 1.7 Hz, 1H), 7.60 (s, 2H), 7.48 (td, J=5.1, 3.4 Hz, 1H), 7.37 (t, J=9.5 Hz, 2H), 5.17 (dt, J=18.9, 7.9 Hz, 1H), 4.80-4.35 (m, 2H), 3.83 (p, J=8.3 Hz, 1H), 3.53-3.31 (m, 3H), 3.24 (dd, J=16.1, 8.4 Hz, 1H), 3.09 (dd, J=16.2, 7.8 Hz, 1H), 2.99 (d, J=17.3 Hz, 1H). LC/MS: 470.2 [M+H].

Preparation of Intermediate 50 (2-(difluoromethyl)-5-fluoroindoline-6-sulfonamide)

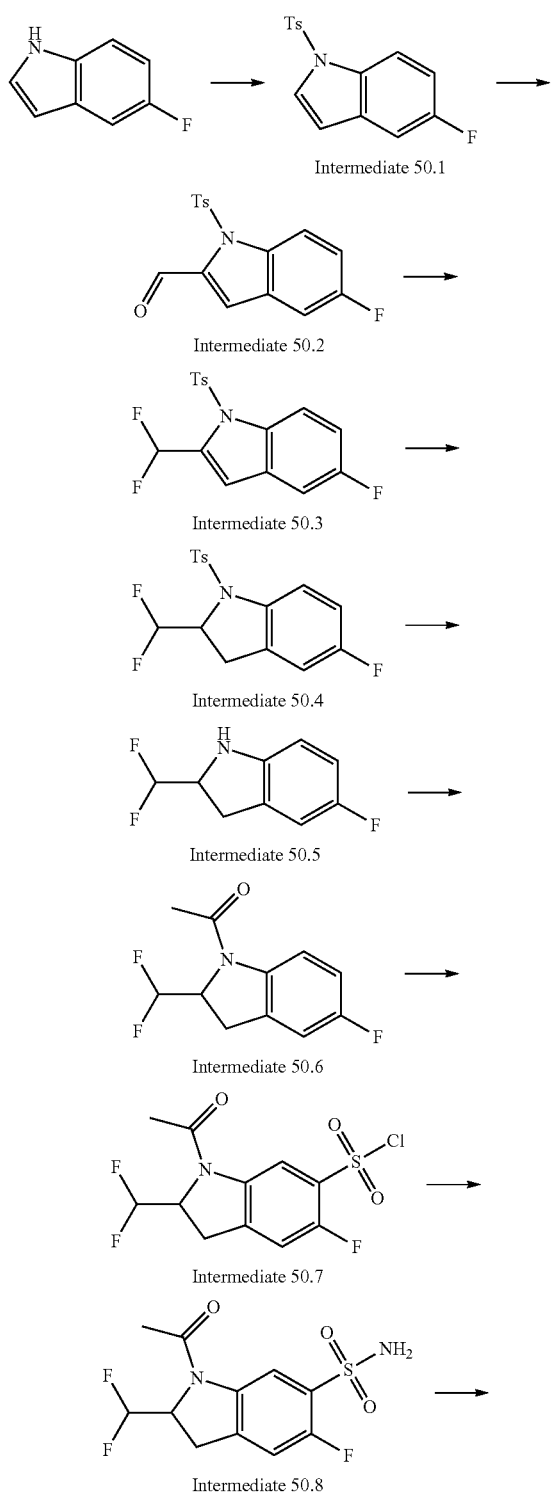

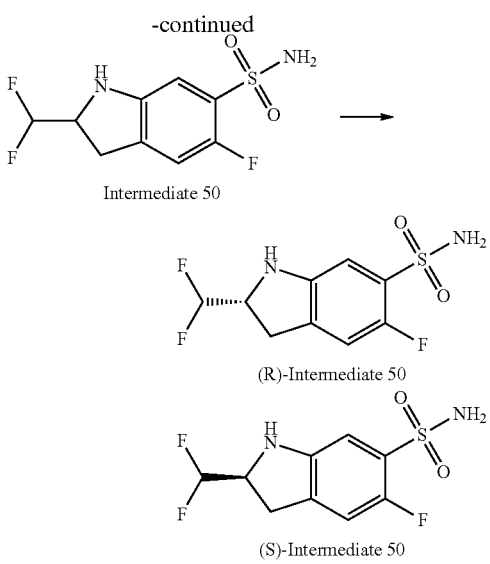

Intermediate 50

(R)-Intermediate 50

(S)-Intermediate 50

Preparation of Intermediate 50.1
(5-fluoro-1-tosyl-1H-indole)

To a solution of 5-fluoro-1H-indole (50 g, 369.9 mmol, 1 eq) in THF (600 mL) was added NaH (19.2 g, 480.9 mmol, 60% purity, 1.3 eq) at 0° C. under $N_2$. The mixture was stirred at 20° C. for 2 h. Then the mixture was cooled to 0° C. and added 4-methylbenzenesulfonyl chloride (84.6 g, 443.9 mmol, 1.2 eq) in portions. The mixture was warmed to 20° C. and stirred at 20° C. for 14 h. Then the residue was added to water (500 mL), the solid was collected by filtration, washed with water (50 mL*3), petroleum ether (50 mL*3) and dried under reduced pressure to give Intermediate 50.1. LC/MS: 290.1 [M+H].

Preparation of Intermediate 50.2
(5-fluoro-1-tosyl-1H-indole-2-carbaldehyde)

To a solution of Intermediate 50.1 (50 g, 172.8 mmol, 1 eq) in THF (500 mL) was added n-BuLi (2.5 M, 96.78 mL, 1.4 eq) at −70° C. under $N_2$ atmosphere. The mixture was stirred at −70° C. for 1 hr. Then DMF (25.90 g, 354.27 mmol, 27.26 mL, 2.05 eq) was added to the mixture and stirred at −70° C. for 0.5 hr. The mixture was quenched by saturated $NH_4Cl$ aqueous solution (500 mL), and extracted with ethyl acetate (500 mL*3). The combined organics were washed with brine (200 mL), dried over $Na_2SO_4$, filtered and concentrated under reduced pressure to give a residue. The solid was triturated by 1000 mL petroleum ether, and the solid was collected by filtration, rinsed with petroleum ether (50 mL*3) and dried under reduced pressure to give Intermediate 50.2. LC/MS: 318.1 [M+H].

Preparation of Intermediate 50.3 (2-(difluoromethyl)-5-fluoro-1-tosyl-1H-indole)

To a solution of Intermediate 50.2 (58 g, 182.7 mmol, 1 eq) in DCM (580 mL) was added DAST (58.92 g, 365.55 mmol, 48.30 mL, 2 eq) dropwise at −70° C. under $N_2$ atmosphere. Then the mixture was warmed to 20° C. for 16 h. The mixture was cooled to 0° C. and quenched by water (500 mL), extracted with DCM (500 mL*3). The combined organics were washed with brine (300 mL), dried over $Na_2SO_4$, filtered and concentrated under reduced pressure and the resulting residue was purified by flash column chromatography using silica gel (eluted with 5-10% EtOAc in petroleum ether) to give Intermediate 50.3. LC/MS: 340.1 [M+H].

Preparation of Intermediate 50.4
(2-(difluoromethyl)-5-fluoro-1-tosylindoline)

To a suspension of Pd/C (8 g, 10% purity, 1.00 eq) in EtOAc (500 mL) was added Intermediate 50.3 (14.5 g, 42.73 mmol, 1 eq). The suspension was degassed and purged with $H_2$ 3 times. The mixture was stirred under $H_2$ (30 Psi) at 60° C. for 2 h, at which time it was filtered through a pad of celite and the celite was rinsed with ethyl acetate (100 mL*3). The filtrate was concentrated under reduced pressure to give Intermediate 50.4. LC/MS: 342.1 [M+H].

Preparation of Intermediate 50.5
(2-(difluoromethyl)-5-fluoroindoline)

To a solution of Intermediate 50.4 (16.3 g, 47.75 mmol, 1 eq) in MeOH (300 mL) was added Mg (11.61 g, 477.52 mmol, 10 eq) in portions. Then the mixture was stirred at 20° C. for 4 h. The reaction was quenched by saturated $NH_4Cl$ aqueous solution (100 mL), diluted with water (300 mL) and EtOAc (300 mL). The resultant mixture was filtered and the filter cake was rinsed with EtOAc (50 mL*3). Then the combined filtrates were extracted with ethyl acetate (200 mL*3). The combined organics were washed with brine (150 mL), dried over $Na_2SO_4$, filtered and concentrated under reduced pressure to give Intermediate 50.5 which was used directly in the next step without further purification. LC/MS: 188.0 [M+H].

Preparation of Intermediate 50.6 (1-(2-(difluoromethyl)-5-fluoroindolin-1-yl)ethan-1-one)

To a solution of Intermediate 50.5 (17 g, 90.83 mmol, 1 eq) in DCM (200 mL) was added acetyl chloride (10.69 g, 136.25 mmol, 9.72 mL, 1.5 eq) and TEA (27.57 g, 272.49 mmol, 37.93 mL, 3 eq). The mixture was stirred at 20° C. for 16 h. The reaction was quenched by water (200 mL), extracted with DCM (200 mL*3). The combined organics were washed with brine (100 mL), dried over $Na_2SO_4$, filtered and concentrated under reduced pressure. The residue was then purified with flash column chromatography using silica gel (eluted with 10-15% EtOAc in petroleum ether) to give Intermediate 50.6. LC/MS: 230.0 [M+H].

Preparation of Intermediate 50.7 (1-acetyl-2-(difluoromethyl)-5-fluoroindoline-6-sulfonyl chloride)

A solution of Intermediate 50.6 (10 g, 43.63 mmol, 1 eq) in $HSO_3C_1$ (105.00 g, 901.10 mmol, 60 mL, 20.65 eq) was stirred at 55° C. for 5 h. The reaction mixture was cooled to room temperature and slowly quenched by ice water (300 mL), and extracted with ethyl acetate (100 mL*3). The combined organic phase was washed with saturated $NaHCO_3$ aqueous solution (200 mL*2) and brine (200 mL), dried over $Na_2SO_4$, filtered and concentrated under reduced pressure. The resulting residue was purified using flashing column chromatography on silica gel (eluted with 40-50% EtOAc in petroleum ether) to give Intermediate 50.7. LC/MS: 328.0 [M+H].

Preparation of Intermediate 50.8 (1-acetyl-2-(difluoromethyl)-5-fluoroindoline-6-sulfonamide)

A mixture of Intermediate 50.7 (4.5 g, 13.73 mmol, 1 eq) and NH$_3$·H$_2$O (16.04 g, 137.32 mmol, 17.63 mL, 30% purity, 10 eq) in THF (40 mL) was stirred at 20° C. for 1 hr. The reaction was concentrated under reduce pressure to give Intermediate 50.8 which was used directly in the next step without purification. LC/MS: 309.0 [M+H].

Preparation of Intermediate 50 (2-(difluoromethyl)-5-fluoroindoline-6-sulfonamide)

A mixture of Intermediate 50.8 (5 g, 16.22 mmol, 1 eq) and HCl (12 M, 9.46 mL, 7 eq) in EtOH (50 mL) was stirred at 80° C. for 6 h. The mixture was cooled to 20° C., and concentrated under reduce pressure to give a residue. The residue was dissolved in water (30 mL), adjusted pH=9 by adding K$_2$CO$_3$ slowly at 0° C. The mixture was extracted with ethyl acetate (20 mL*3). The combined organics were washed with brine (15 mL), dried over Na$_2$SO$_4$, filtered and concentrated under reduced pressure to give Intermediate 50. LC/MS: 267.1 [M+H].

Intermediate 50 was subjected to chiral SFC separation using DAICEL CHIRALPAK IG (250 mm*50 mm, 10 μm) column; mobile phase: [0.1% NH$_3$ MEOH]; B %: 40%-40%, 5 min). (R)-Intermediate 50 was obtained as the first eluent and (S)-Intermediate 50 was obtained as the second eluent.

Preparation of Example 127 ((R)-2-(difluoromethyl)-5-fluoro-1-((R)-5-(pyridin-2-yl)-2,3-dihydro-1H-indene-2-carbonyl)indoline-6-sulfonamide)

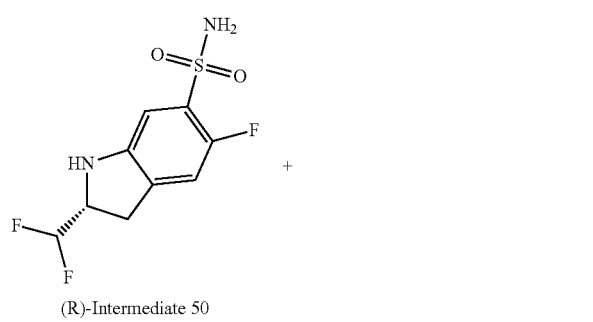

(R)-Intermediate 50

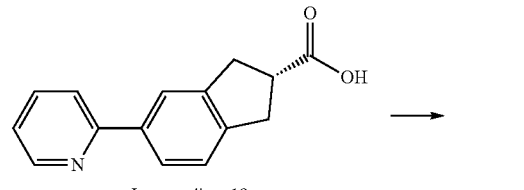

Intermediate 19

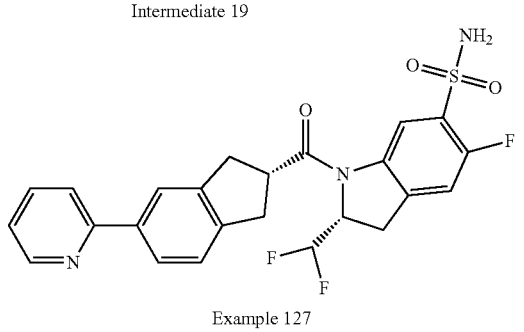

Example 127

Example 127 was prepared in a manner similar to Example 35 employing (R)-Intermediate 50 and Intermediate 19 (General Procedure B). $^1$H NMR (400 MHz, DMSO-d$_6$) δ 8.70 (dt, J=5.0, 1.4 Hz, 1H), 8.48 (d, J=6.5 Hz, 1H), 8.08-8.02 (m, 2H), 7.92-7.86 (m, 2H), 7.62 (s, 2H), 7.49 (td, J=5.2, 3.2 Hz, 1H), 7.45-7.40 (m, 2H), 5.33 (q, J=11.8 Hz, 1H), 3.85 (p, J=8.2 Hz, 1H), 3.61 (dd, J=17.6, 9.7 Hz, 1H), 3.49 (dd, J=15.9, 8.8 Hz, 1H), 3.39 (dd, J=16.2, 7.4 Hz, 1H), 3.29-3.16 (m, 2H), 3.10 (dd, J=15.8, 7.7 Hz, 1H), 2.70 (s, 1H). LC/MS: 488.1 [M+H].

Preparation of Example 128: (S)-2-(difluoromethyl)-5-fluoro-1-((R)-5-(pyridin-2-yl)-2,3-dihydro-1H-indene-2-carbonyl)indoline-6-sulfonamide

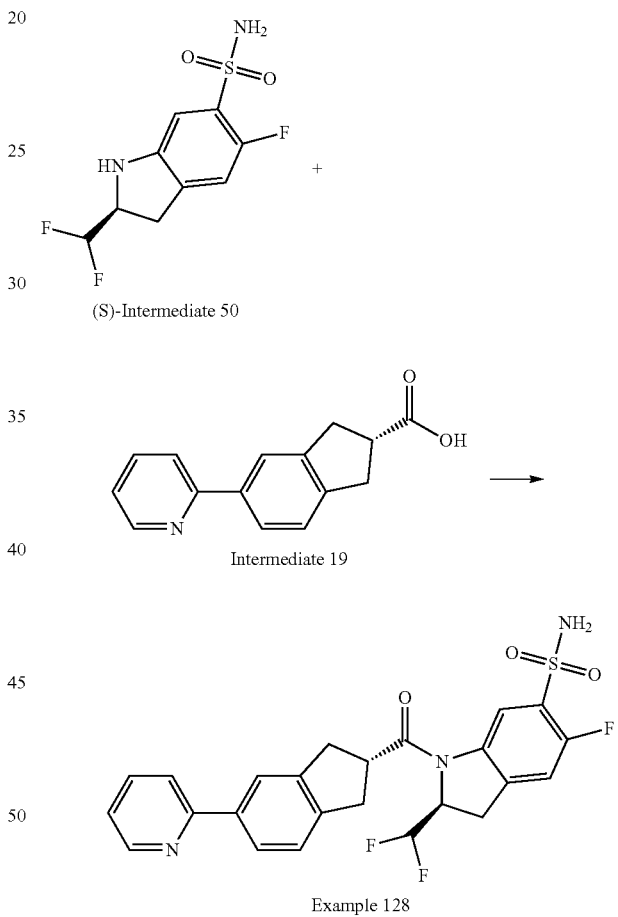

Example 128 was prepared in a manner similar to Example 35 employing (S)-Intermediate 50 and Intermediate 19 (General Procedure B). $^1$H NMR (400 MHz, DMSO-d$_6$) δ 8.72 (dt, J=5.2, 1.4 Hz, 1H), 8.47 (d, J=6.6 Hz, 1H), 8.12-8.06 (m, 2H), 7.96 (s, 1H), 7.87 (dd, J=7.9, 1.7 Hz, 1H), 7.62 (s, 2H), 7.52 (td, J=5.5, 2.6 Hz, 1H), 7.39 (dd, J=17.9, 8.8 Hz, 2H), 5.33 (q, J=11.9 Hz, 1H), 5.14 (s, 1H), 3.85 (p, J=8.3 Hz, 1H), 3.60 (dd, J=17.6, 9.7 Hz, 1H), 3.45 (ddd, J=22.6, 16.1, 8.1 Hz, 2H), 3.32-3.14 (m, 2H), 3.08 (dd, J=16.3, 7.7 Hz, 1H). LC/MS: 488.1 [M+H].

Preparation of Example 129: (R)-1-(5-(pyrimidin-4-yl)-2,3-dihydro-1H-indene-2-carbonyl)indoline-6-sulfonamide

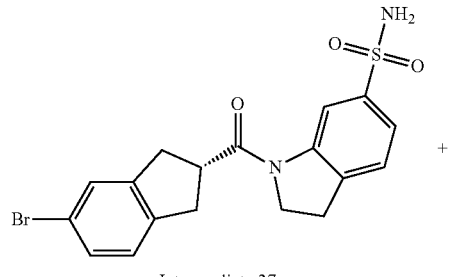

Intermediate 37

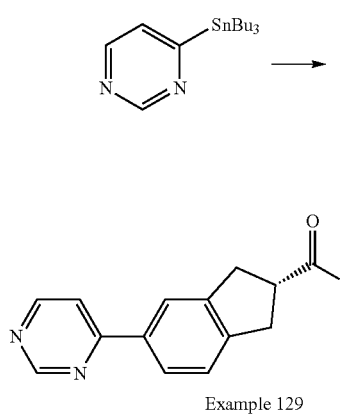

Example 129

Example 129 was prepared in a manner similar to Example 71 employing Intermediate 37 and 4-(tributylstannyl)pyrimidine. $^1$H NMR (400 MHz, DMSO-d6) δ 9.22 (d, J=1.3 Hz, 1H), 8.84 (d, J=5.4 Hz, 1H), 8.59 (d, J=1.7 Hz, 1H), 8.16-7.96 (m, 3H), 7.45 (ddd, J=24.9, 7.8, 2.3 Hz, 3H), 7.28 (s, 2H), 4.35 (t, J=8.5 Hz, 2H), 3.78 (p, J=8.0 Hz, 1H), 3.37-3.12 (m, 6H). LC/MS: 421.1 [M+H].

Preparation of Example 130: (R)-1-(5-(pyridin-3-yl)-2,3-dihydro-1H-indene-2-carbonyl)indoline-6-sulfonamide

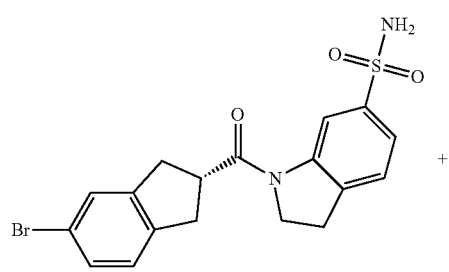

Intermediate 37

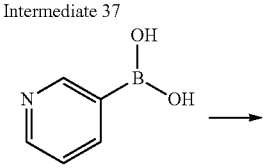

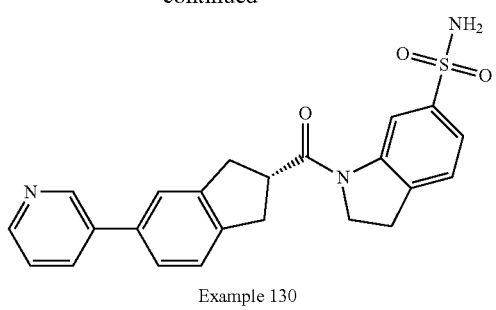

Example 130

Example 130 was prepared in a manner similar to Example 69 employing Intermediate 37 and pyridin-3-yl-boronic acid. $^1$H NMR (400 MHz, DMSO-d6) δ 8.99 (d, J=2.2 Hz, 1H), 8.66 (dd, J=5.1, 1.5 Hz, 1H), 8.59 (d, J=1.7 Hz, 1H), 8.32 (dt, J=8.1, 1.9 Hz, 1H), 7.76-7.61 (m, 2H), 7.61-7.52 (m, 1H), 7.48 (dd, J=7.8, 1.8 Hz, 1H), 7.41 (t, J=7.4 Hz, 2H), 7.28 (s, 2H), 4.35 (t, J=8.5 Hz, 2H), 3.77 (p, J=8.0 Hz, 1H), 3.39-3.20 (m, 6H). LC/MS: 420.2 [M+H].

Preparation of Example 131: (R)-1-(5-(pyridin-4-yl)-2,3-dihydro-1H-indene-2-carbonyl)indoline-6-sulfonamide

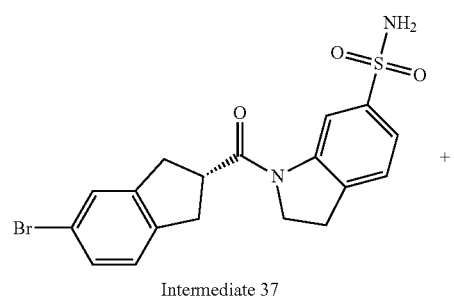

Intermediate 37

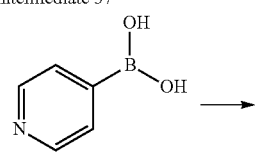

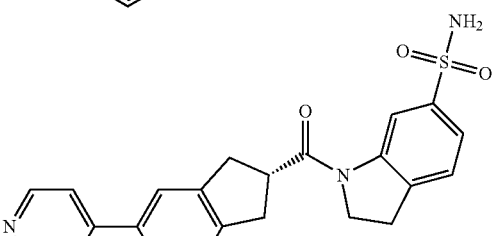

Example 131

Example 131 was prepared in a manner similar to Example 69 employing Intermediate 37 and pyridin-4-yl-boronic acid. $^1$H NMR (400 MHz, DMSO-d6) δ 8.84-8.70 (m, 2H), 8.59 (d, J=1.7 Hz, 1H), 8.04 (d, J=5.6 Hz, 2H), 7.81 (s, 1H), 7.73 (dd, J=7.9, 1.8 Hz, 1H), 7.53-7.36 (m, 3H), 7.28 (s, 2H), 4.34 (t, J=8.5 Hz, 2H), 3.78 (p, J=7.9 Hz, 1H), 3.31-3.12 (m, 6H). LC/MS: 420.2 [M+H].

Preparation of Example 132: (R)-1-(5-(quinolin-2-yl)-2,3-dihydro-1H-indene-2-carbonyl)indoline-6-sulfonamide

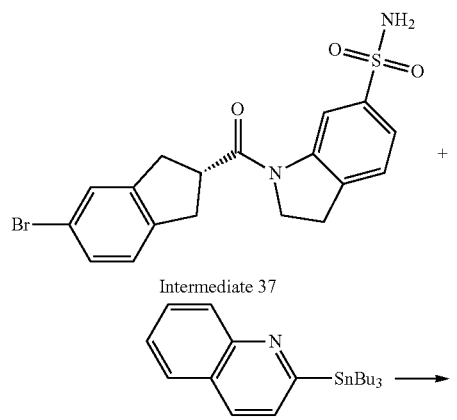

Example 132 was prepared in a manner similar to Example 71 employing Intermediate 37 and 2-(tributylstannyl)quinoline. $^1$H NMR (400 MHz, DMSO-d6) δ 8.61 (d, J=1.7 Hz, 1H), 8.50 (d, J=8.7 Hz, 1H), 8.17 (dd, J=5.1, 3.6 Hz, 2H), 8.10 (dd, J=7.8, 1.7 Hz, 2H), 8.03 (dd, J=8.2, 1.4 Hz, 1H), 7.81 (ddd, J=8.5, 6.9, 1.5 Hz, 1H), 7.62 (ddd, J=8.1, 6.8, 1.2 Hz, 1H), 7.56-7.37 (m, 3H), 7.29 (s, 2H), 4.36 (t, J=8.5 Hz, 2H), 3.80 (p, J=8.1 Hz, 1H), 3.43-3.23 (m, 6H). LC/MS: 470.3 [M+H].

Preparation of Example 133: (R)-1-(5-(pyrimidin-2-yl)-2,3-dihydro-1H-indene-2-carbonyl)indoline-6-sulfonamide

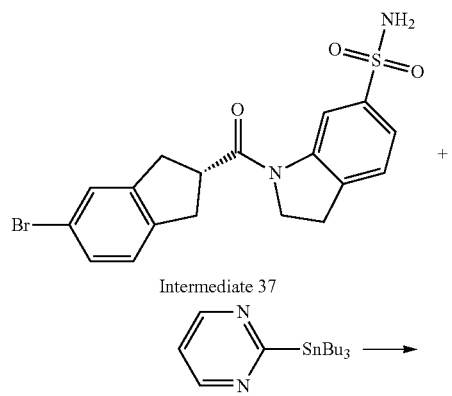

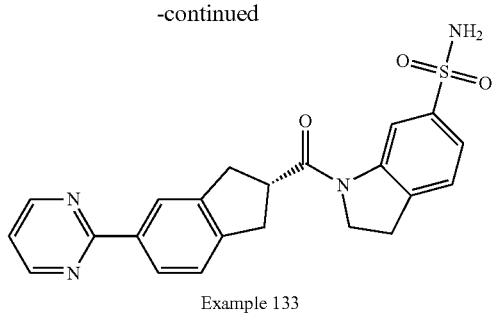

Example 133 was prepared in a manner similar to Example 71 employing Intermediate 37 and 2-(tributylstannyl)pyrimidine. $^1$H NMR (400 MHz, DMSO-d6) δ 8.89 (d, J=4.8 Hz, 2H), 8.60 (d, J=1.7 Hz, 1H), 8.32-8.17 (m, 2H), 7.56-7.34 (m, 4H), 7.28 (s, 2H), 4.35 (t, J=8.5 Hz, 2H), 3.78 (p, J=8.1 Hz, 1H), 3.42-3.18 (m, 6H). LC/MS: 421.1 [M+H].

Preparation of Example 134: (R)-1-(5-(naphthalen-1-yl)-2,3-dihydro-1H-indene-2-carbonyl)indoline-6-sulfonamide

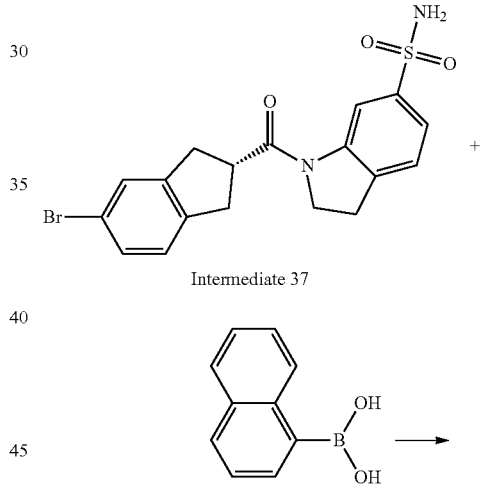

Example 134 was prepared in a manner similar to Example 69 employing Intermediate 37 and naphthalen-1-ylboronic acid. $^1$H NMR (400 MHz, DMSO-d6) δ 8.63 (d, J=1.7 Hz, 1H), 8.00 (dd, J=8.0, 1.5 Hz, 1H), 7.95 (d, J=8.2 Hz, 1H), 7.84 (d, J=8.3 Hz, 1H), 7.65-7.19 (m, 11H), 4.36 (t, J=8.5 Hz, 2H), 3.80 (p, J=8.1 Hz, 1H), 3.41-3.21 (m, 6H). LC/MS: 469.1 [M+H].

Preparation of Example 135: (R)-1-(5-(naphthalen-2-yl)-2,3-dihydro-1H-indene-2-carbonyl)indoline-6-sulfonamide

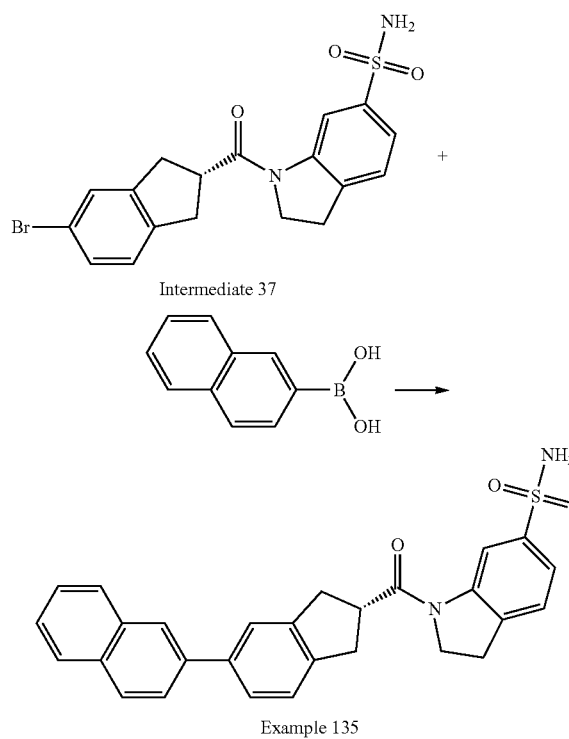

Intermediate 37

Example 135

Example 135 was prepared in a manner similar to Example 69 employing Intermediate 37 and naphthalen-2-ylboronic acid. $^1$H NMR (400 MHz, DMSO-d6) δ 8.61 (d, J=1.7 Hz, 1H), 8.20 (d, J=1.8 Hz, 1H), 8.04-7.98 (m, 2H), 7.94 (dd, J=7.4, 1.9 Hz, 1H), 7.84 (dd, J=8.6, 1.9 Hz, 1H), 7.69 (d, J=1.7 Hz, 1H), 7.62 (dd, J=7.8, 1.7 Hz, 1H), 7.59-7.32 (m, 5H), 7.29 (s, 2H), 4.36 (t, J=8.5 Hz, 2H), 3.78 (p, J=8.1 Hz, 1H), 3.39-3.17 (m, 6H). LC/MS: 469.1 [M+H].

Preparation of Intermediate 51 (5-fluoro-1-(6-fluoro-5-(pyridin-2-yl)-2,3-dihydrobenzofuran-2-carbonyl)-3-methylindoline-6-sulfonamide)

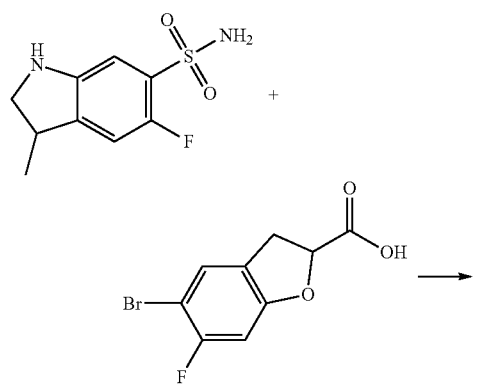

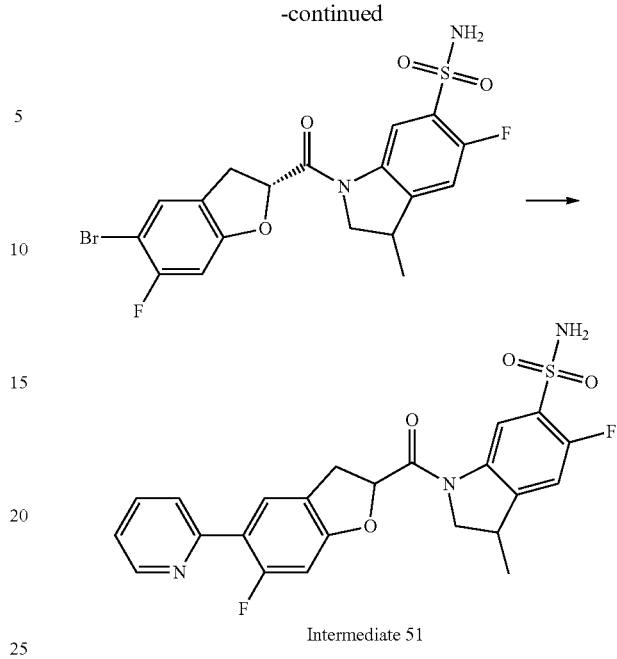

Intermediate 51

Intermediate 51 was prepared in a manner similar to Example 101 employing 5-fluoro-3-methylindoline-6-sulfonamide and 5-bromo-6-fluoro-2,3-dihydrobenzofuran-2-carboxylic acid (General Procedure B). LC/MS: (General Procedure B). LC/MS: 472.2 [M+H].

Preparation of Example 136 and Example 137 ((S)-5-fluoro-1-((R)-6-fluoro-5-(pyridin-2-yl)-2,3-dihydrobenzofuran-2-carbonyl)-3-methylindoline-6-sulfonamide); (R)-5-fluoro-1-((R)-6-fluoro-5-(pyridin-2-yl)-2,3-dihydrobenzofuran-2-carbonyl)-3-methylindoline-6-sulfonamide

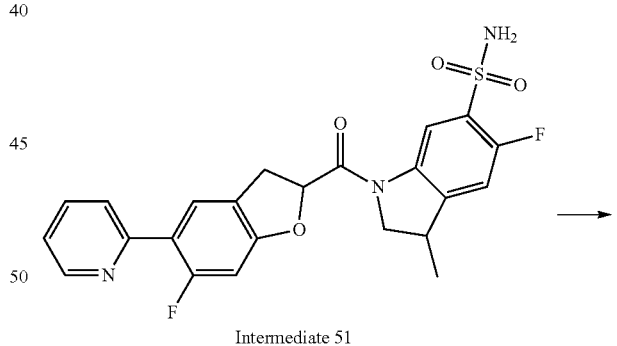

Intermediate 51

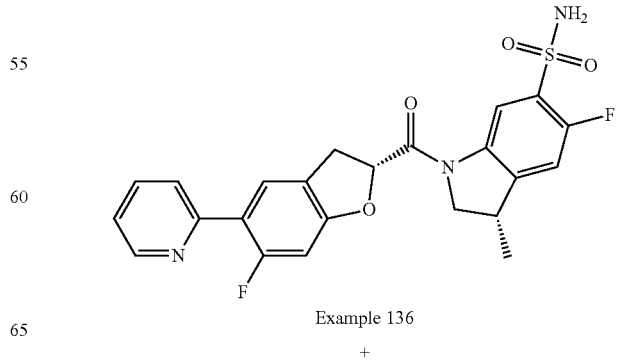

Example 136

+

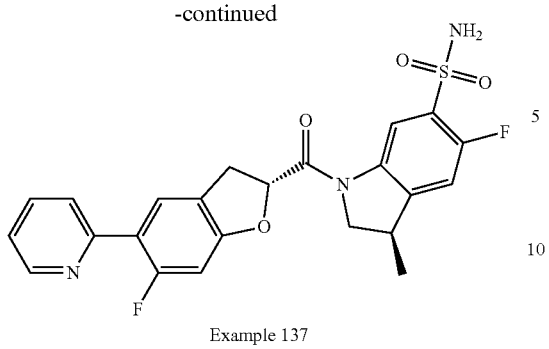

Example 137

Intermediate 51 was subjected to chiral SFC separation using AD-H column (250×21 mm 5 um) using 45% EtOH as co-eluent.

The third eluent was collected and concentrated to provide Example 136. $^1$H NMR (400 MHz, DMSO-d6) δ 8.68 (dd, J=5.0, 1.9 Hz, 1H), 8.49 (d, J=6.6 Hz, 1H), 7.88 (td, J=7.7, 1.9 Hz, 1H), 7.81 (d, J=8.0 Hz, 1H), 7.77-7.68 (m, 1H), 7.61 (s, 2H), 7.45 (d, J=9.7 Hz, 1H), 7.36 (ddd, J=7.5, 4.8, 1.1 Hz, 1H), 6.93 (d, J=11.8 Hz, 1H), 5.83 (dd, J=10.0, 6.1 Hz, 1H), 4.48 (t, J=9.9 Hz, 1H), 3.93 (dd, J=10.4, 6.8 Hz, 1H), 3.70-3.48 (m, 3H), 1.36 (d, J=6.9 Hz, 3H). LC/MS: 472.2 [M+H].

The fourth eluent was collected and concentrated to provide Example 137. $^1$H NMR (400 MHz, DMSO-d6) δ 8.74-8.67 (m, 1H), 8.49 (d, J=6.6 Hz, 1H), 7.91 (td, J=7.7, 1.9 Hz, 1H), 7.81 (d, J=8.0 Hz, 1H), 7.74 (dd, J=8.0, 2.3 Hz, 1H), 7.61 (s, 2H), 7.45 (d, J=9.6 Hz, 1H), 7.38 (ddd, J=7.5, 4.8, 1.2 Hz, 1H), 6.93 (d, J=11.8 Hz, 1H), 5.83 (dd, J=10.0, 6.1 Hz, 1H), 4.58 (t, J=9.9 Hz, 1H), 3.83 (dd, J=10.3, 7.0 Hz, 1H), 3.74-3.54 (m, 3H), 1.36 (d, J=6.9 Hz, 3H). LC/MS: 472.2 [M+H].

Preparation of Intermediate 52 (5-fluoro-3-(trifluoromethyl)indoline-6-sulfonamide)

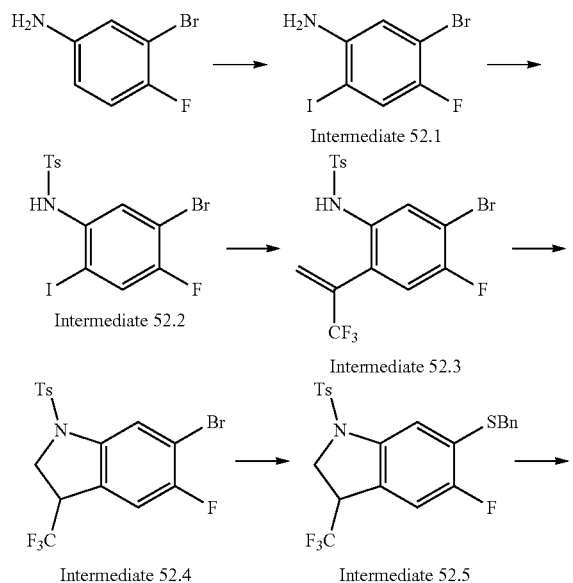

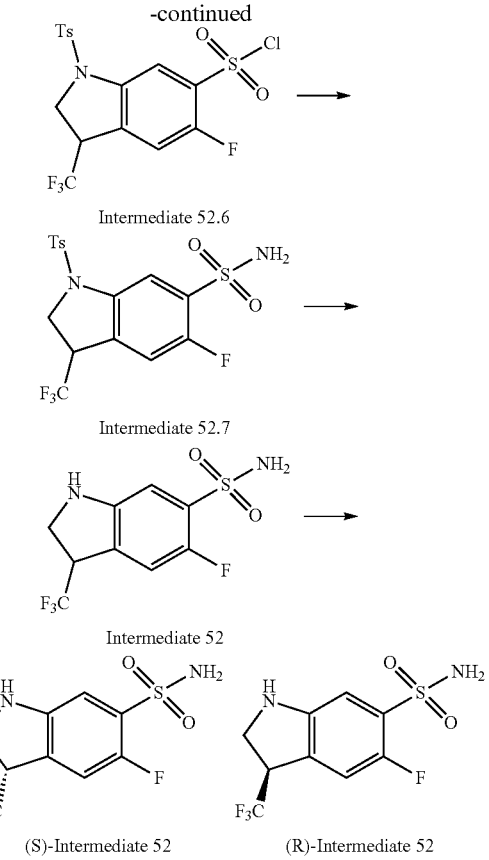

Preparation of Intermediate 52.1 (5-bromo-4-fluoro-2-iodoaniline): To a solution of 3-bromo-4-fluoroaniline (25 g, 131.6 mmol, 1 eq) in Acetic acid (130 mL) was added NIS (31.1 g, 138.1 mmol, 1.1 eq) in portions. The mixture was stirred at 20° C. for 2 hr. The mixture was concentrated under reduce pressure and the resulting residue was dissolved in EtOAc (200 mL), washed with saturated sodium carbonate (100 mL), brine (50 mL), dried over Na$_2$SO$_4$, filtered and concentrated under reduced pressure. The resulting residue was purified using flash column chromatography over silica gel (eluted with 10-20% EtOAc in petroleum ether) to afford Intermediate 52.1. LC/MS: 315.9 [M+H].

Preparation of Intermediate 52.2 (N-(5-bromo-4-fluoro-2-iodophenyl)-4-methylbenzenesulfonamide): To a solution of Intermediate 52.1 (25.3 g, 80.1 mmol, 1 eq) and Pyridine (15.8 g, 200.4 mmol, 16.18 mL, 2.5 eq) in DCM (300 mL) was added 4-methylbenzenesulfonyl chloride (30.5 g, 160.3 mmol, 2 eq). The mixture was stirred at 20° C. for 16 hr. The reaction was quenched by water (300 mL), extracted with DCM (300 mL*3). The combined organics were washed with brine (150 mL), dried over Na$_2$SO$_4$, filtered and concentrated under reduced pressure and the resulting residue was purified by flash column chromatography over silica gel (eluted with 5% EtOAc in petroleum ether) to afford Intermediate 52.2. LC/MS: 469.9 [M+H].

Preparation of Intermediate 52.3 (N-(5-bromo-4-fluoro-2-(3,3,3-trifluoroprop-1-en-2-yl)phenyl)-4-methylbenzenesulfonamide): To a solution of Intermediate 52.2 (23.1 g, 49.1 mmol, 1 eq) and toluene (280 mL) in H$_2$O (70 mL) were added 4,4,6-trimethyl-2-[1-(trifluoromethyl)vinyl]-1,3,2-dioxaborinane (12 g, 54.05 mmol, 1.1 eq), Pd(dppf)Cl$_2$·CH$_2$Cl$_2$ (2.0 g, 2.4 mmol, 0.05 eq) and Cs$_2$CO$_3$ (48.0 g, 147.4 mmol, 3 eq). The mixture was degassed and purged with N₂ three times. The mixture was heated to 90° C., stirred for 16 h under N₂ atmosphere. The reaction was cooled to 20° C. and diluted with water (200 mL), filtered and the filter cake was rinsed with EtOAc (50 mL*3). Then the combined filtrates were extracted with EtOAc (200 mL*3). The combined organics were washed with brine (50 mL), dried over Na₂SO₄, filtered and concentrated under reduced pressure and the resulting residue was purified by flash column chromatography over silica gel (eluted with 5% EtOAc in petroleum ether) to afford Intermediate 52.3. LC/MS: 438.0 [M+H].

Preparation of Intermediate 52.4 (6-bromo-5-fluoro-1-tosyl-3-(trifluoromethyl)indoline): To a solution of Intermediate 52.3 (8.3 g, 18.9 mmol, 1 eq) in DMF (80 mL) was added DBU (864.9 mg, 5.6 mmol, 856.4 uL, 0.3 eq), and the mixture was stirred at 120° C. for 1 hr. The reaction was cooled to 20° C. and quenched by water (100 mL), and extracted with ethyl acetate (150 mL*3). The combined organics were washed with water (100 mL*3), brine (100 mL), dried over Na₂SO₄, filtered and concentrated under reduced pressure. The resulting residue was purified by flash column chromatography over silica gel (eluted with 7% EtOAc in petroleum ether) to afford Intermediate 52.4. LC/MS: 438.0 [M+H].

Preparation of Intermediate 52.5 (6-(benzylthio)-5-fluoro-1-tosyl-3-(trifluoromethyl)indoline): To a solution of Intermediate 52.4 (6.2 g, 14.3 mmol, 1 eq) in dioxane (80 mL) were added Pd₂(dba)₃ (524.0 mg, 572.3 umol, 0.04 eq), Xantphos (662.2 mg, 1.1 mmol, 0.08 eq), DIEA (3.7 g, 28.6 mmol, 4.9 mL, 2 eq) and BnSH (1.8 g, 15.0 mmol, 1.7 mL, 1.05 eq). The mixture was degassed, purged with N₂ three times. The mixture was heated to 100° C., stirred for 16 h under N₂ atmosphere. The reaction mixture was cooled to room temperature and quenched by water (80 mL), and extracted with ethyl acetate (100 mL*3). The combined organics were washed with brine (50 mL), dried over Na₂SO₄, filtered and concentrated under reduced pressure. The resulting residue was purified by flash column chromatography over silica gel (eluted with 10% EtOAc in petroleum ether) to afford Intermediate 52.5. LC/MS: 482.1 [M+H].

Preparation of Intermediate 52.6 (5-fluoro-1-tosyl-3-(trifluoromethyl)indoline-6-sulfonyl chloride): To a solution of Intermediate 52.5 (5.5 g, 11.4 mmol, 1 eq) in AcOH (60 mL) and H₂O (20 mL) was added NCS (4.6 g, 34.4 mmol, 3 eq) in portions. The mixture was stirred at 20° C. for 16 hr. The reaction was quenched by water (50 mL), extracted with ethyl acetate (50 mL*3). The combined organics were washed with brine (30 mL), dried over Na₂SO₄, filtered and concentrated under reduced pressure. The resulting residue was purified by flash column chromatography over silica gel (eluted with 15% EtOAc in petroleum ether) to afford Intermediate 52.6. LC/MS: 458.0 [M+H].

Preparation of Intermediate 52.7 (5-fluoro-1-tosyl-3-(trifluoromethyl)indoline-6-sulfonamide): A solution of Intermediate 52.6 (4.5 g, 9.8 mmol, 1 eq) and NH₃·H₂O (22.9 g, 196.5 mmol, 25.2 mL, 30% purity, 20 eq) in THF (45 mL) was stirred at 20° C. for 2 hr. The mixture was concentrated under reduce pressure to give Intermediate 52.7 which was used in the next step without purification. LC/MS: 439.0 [M+H].

Preparation of Intermediate 52 (5-fluoro-3-(trifluoromethyl)indoline-6-sulfonamide): A mixture of Mg (6.2 g, 256.1 mmol, 31.2 eq) in MeOH (280 mL) was stirred at 20° C. until H₂ formation was observed. Then a solution of Intermediate 52.7 (3.6 g, 8.2 mmol, 1 eq) in MeOH (35 mL) was added to the mixture dropwise. The mixture was stirred at 20° C. for 3 hr. The reaction was quenched by saturated NH₄Cl aqueous solution (300 mL), and extracted with DCM (300 mL*5). The combined organics were washed with brine (100 mL), dried over Na₂SO₄, filtered and concentrated under reduced pressure. The resulting residue was purified by flash column chromatography over silica gel (eluted with 40% EtOAc in petroleum ether) to afford Intermediate 52. LC/MS: 285.0 [M+H].

Intermediate 52 was subjected to chiral SFC separation using ChiralPak IH, 250*30 mm, 10 um. Mobile Phase 33% MeOH with 0.1% NH₃. The first eluent was collected and concentrated to afford (S)-Intermediate 52. LC/MS: 285.0 [M+H]. The second eluent was collected and concentrated to afford (R)-Intermediate 52. LC/MS: 285.0 [M+H].

Preparation of Example 138 (S)-5-fluoro-1-((1R,2S)-1-methyl-5-(pyridin-2-yl)-2,3-dihydro-1H-indene-2-carbonyl)-3-(trifluoromethyl)indoline-6-sulfonamide

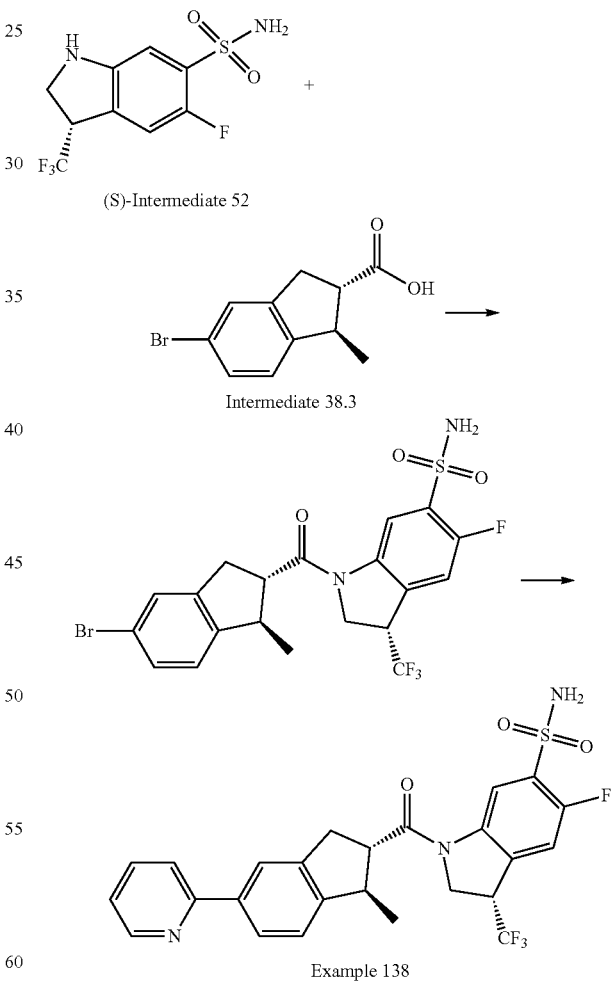

Example 138 was prepared in a manner similar to Example 92 employing (S)-Intermediate 52 and Intermediate 38.3 as starting materials. ¹H NMR (400 MHz, DMSO-d6) δ 8.70 (ddd, J=6.7, 4.2, 2.8 Hz, 2H), 8.03 (d, J=4.2 Hz, 2H), 7.93 (d, J=8.3 Hz, 2H), 7.73 (s, 2H), 7.61-7.43 (m, 2H), 7.38 (d, J=7.8 Hz, 1H), 4.86-4.40 (m, 3H), 3.74-3.61 (m, 1H), 3.51-3.34 (m, 2H), 3.07 (dd, J=14.7, 7.1 Hz, 1H), 1.38 (d, J=6.9 Hz, 3H). LC/MS: 520.2 [M+H].

Preparation of Example 139 (R)-5-fluoro-1-((1R, 2S)-1-methyl-5-(pyridin-2-yl)-2,3-dihydro-1H-indene-2-carbonyl)-3-(trifluoromethyl)indoline-6-sulfonamide

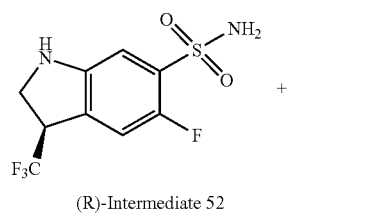

(R)-Intermediate 52

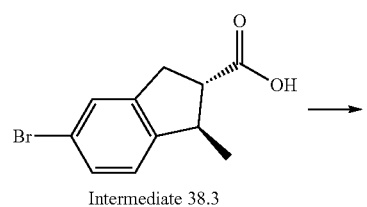

Intermediate 38.3

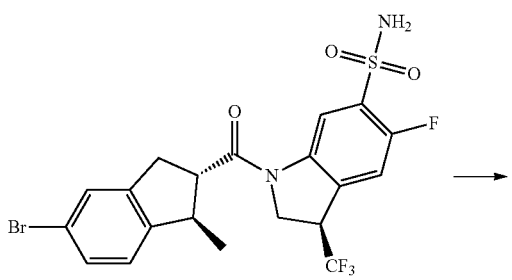

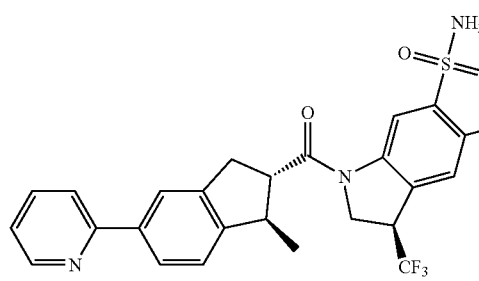

Example 139

Example 139 was prepared in a manner similar to Example 92 employing (R)-Intermediate 52 and Intermediate 38.3 as starting materials. ¹H NMR (400 MHz, DMSO-d6) δ 8.75-8.65 (m, 2H), 8.02 (d, J=3.8 Hz, 2H), 7.96-7.88 (m, 2H), 7.73 (s, 2H), 7.61-7.32 (m, 3H), 4.81-4.43 (m, 3H), 3.74-3.61 (m, 1H)(m, 1H), 3.50-3.36 (m, 2H), 3.09 (tt, J=12.0, 5.2 Hz, 1H), 1.38 (d, J=6.9 Hz, 3H). LC/MS: 520.2 [M+H].

Preparation of Intermediate 53: (S)-5-(pyridin-2-yl)-2,3-dihydro-1H-indene-2-carboxylic acid

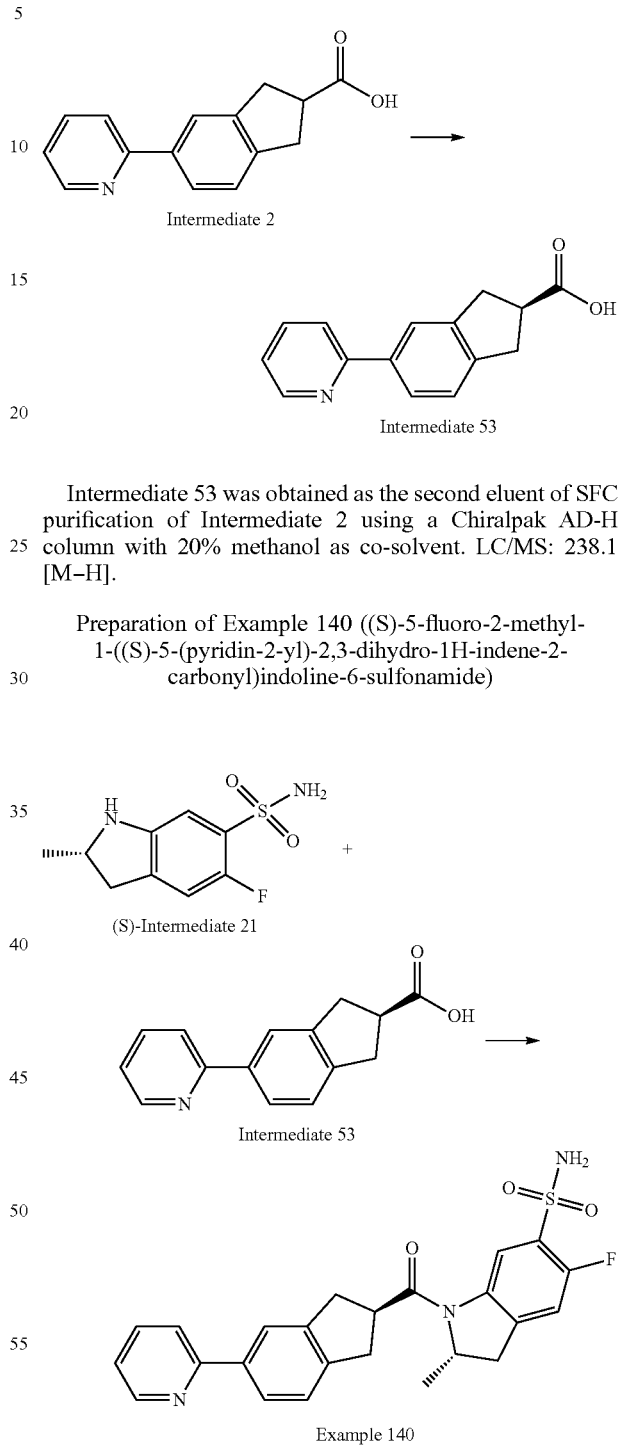

Intermediate 53 was obtained as the second eluent of SFC purification of Intermediate 2 using a Chiralpak AD-H column with 20% methanol as co-solvent. LC/MS: 238.1 [M−H].

Preparation of Example 140 ((S)-5-fluoro-2-methyl-1-((S)-5-(pyridin-2-yl)-2,3-dihydro-1H-indene-2-carbonyl)indoline-6-sulfonamide)

Example 140 was prepared in a manner similar to Example 35 employing (S)-Intermediate 21 and Intermediate 53 (General Procedure B). ¹H NMR (400 MHz, DMSO-d₆) δ 8.71 (d, J=5.0 Hz, 1H), 8.54 (d, J=6.6 Hz, 1H), 8.05 (s, 1H), 7.92 (s, 1H), 7.88 (d, J=8.2 Hz, 1H), 7.58 (s, 2H), 7.50 (td, J=5.4, 2.6 Hz, 1H), 7.40 (dd, J=12.5, 8.8 Hz, 2H), 4.90 (p, J=6.6 Hz, 1H), 3.56-3.35 (m, 3H), 3.26 (dd, J=16.4, 8.5

Hz, 1H), 3.15 (dd, J=15.9, 7.6 Hz, 1H), 2.81 (d, J=16.9 Hz, 1H), 1.30 (d, J=6.2 Hz, 3H). LC/MS: 452.0 [M+H].

Preparation of Example 141 ((R)-5-fluoro-2-methyl-1-((S)-5-(pyridin-2-yl)-2,3-dihydro-1H-indene-2-carbonyl)indoline-6-sulfonamide)

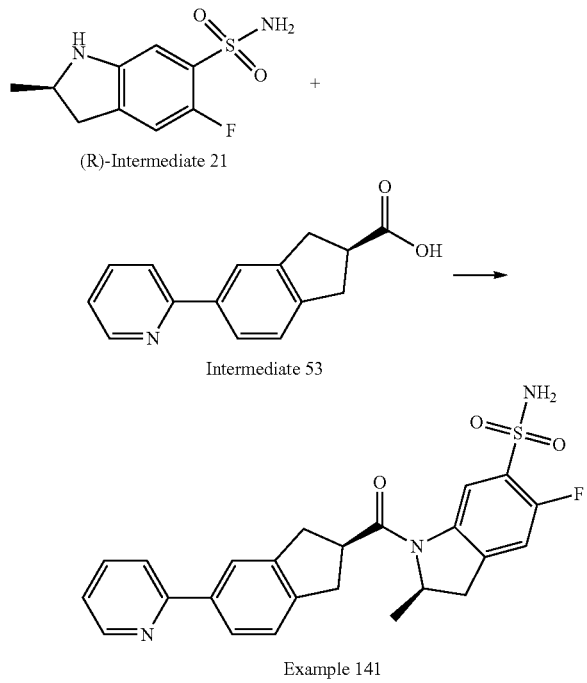

Example 141 was prepared in a manner similar to Example 35 employing (R)-Intermediate 21 and Intermediate 53 (General Procedure B). $^1$H NMR (400 MHz, DMSO-d6) δ 8.68 (dd, J=4.8, 1.5 Hz, 1H), 8.54 (d, J=6.6 Hz, 1H), 7.99 (dd, J=6.2, 1.8 Hz, 2H), 7.95-7.83 (m, 2H), 7.58 (s, 2H), 7.52-7.33 (m, 3H), 4.91 (q, J=7.5, 7.0 Hz, 1H), 3.77-3.31 (m, 5H), 3.42 (ddd, J=29.3, 16.2, 8.2 Hz, 2H), 3.20 (ddd, J=40.2, 16.0, 8.1 Hz, 2H), 2.81 (d, J=16.9 Hz, 1H), 1.30 (d, J=6.3 Hz, 3H). LC/MS: 452.1 [M+H].

Biological Assays
HSV-2 Cellomics Assay

Compounds were tested for their ability to inhibit HSV-2 replication by monitoring the expression of the HSV protein gD using a high-throughput immunofluorescence-based assay. 10-dose, 3-fold serial dilutions of compounds were prepared at starting concentrations of 0.2 or 2 mM in 100% DMSO. 250 nl of compounds were spotted in quadruplicates onto black collagen-coated 384-well microplates with clear bottom (Greiner cat #781956) using a Labcyte ECHO acoustic dispenser. The final starting concentration in the assay was either 1 or 10 µM. DMSO (no compound) and pritelivir were included on each microplate as negative and positive controls, respectively.

ARPE-19 cells (ATCC cat #CRL-2302) were maintained DMEM/F-12 Glutamax medium (Thermo Fisher Scientific cat #10565018) supplemented with 10% FBS (Corning cat #35-011-CV) and 1% Penicillin-Streptomycin (cat #30-002-CI). Prior to confluence, cells were transferred to a centrifuge tube and spun for 5 minutes at 1000 rpm. Cells were resuspended in assay medium (DMEM/F-12 Glutamax, 2% FBS, 1% Penicillin-Streptomycin) and counted. Cell density was adjusted to 150,000 cells/ml and infected with HSV-2 virus (MS strain, ATCC cat #VR-540) at a MOI of 0.06 in a 50 ml conical tube for 1 hour under constant rocking. Cells were then spun for 5 minutes at 1000 rpm and the media replaced with assay medium containing either 2% FBS or 10% human serum (EMD Millipore cat #S1-100 ML). 50 µl of the infection suspension were added into microplate wells that were pre-spotted with compounds (7,500 cells per well). Plates were incubated for 16 hours at 37° C.

Cell culture medium was aspirated using a Biomek Fx and 50 µl of a paraformaldehyde solution (Electron Microscopy Sciences cat #15712-S) diluted to 4% in DPBS (Corning cat #21-031-CM) were added per well. After a 30-minute incubation at room temperature, plates were washed 4 times with 100 µl/well of PBS using a Biotek plate washer. A 1:500 solution of primary antibody (anti-HSV gD, Virusys cat #P1103) was prepared in permeabilization buffer (Invitrogen cat #00-8333-56) and 50 µl were added into wells. After a 1-hour incubation at room temperature, 50 µl of a 1:1000 solution of secondary antibody (Alexa Fluor 488 goat anti-mouse, Thermo Fisher Scientific cat #A11001) and DAPI (Thermo Fisher Scientific cat #62248) in permeabilization buffer were added into wells and plates were incubated in the dark at room temperature for 1 hour. Plates were washed 4 times again and 50 µl of DPBS were added to all wells prior to sealing the plates with a black adhesive seal. Fluorescence was measured on a Cellomics plate reader.

Data analysis was carried out using the Thermo Scientific HCS Studio software. Briefly, cells were identified using the DAPI nuclear stain and thresholds were set to filter cells out based on shape and size. A second threshold based on green fluorescence intensity (detection of HSV-2 gD) was set to identify HSV-2 infected cells. Data was reported as the average fluorescence intensity of HSV-2 infected cells. EC50 values were defined as the compound concentration that caused a 50% decrease in the average fluorescence intensity and was calculated using a sigmoidal dose-response model to generate curve fits. EC50 for pritelivir in this assay was 150 nM. Data for certain compounds are reported in Table 1 below.

TABLE 1

| Example | EC50-HSV2-FBS (nM) | EC50-HSV2-10% Human Serum (nM) | CC50-MT4 (nM) |
|---|---|---|---|
| 1 | 721 | | |
| 2 | 65 | 23600 | |
| 3 | 129 | ≥25000 | |
| 4 | 284 | ≥25000 | |
| 5 | 35 | ≥25000 | |
| 6 | 72 | ≥25000 | |
| 7 | 62 | ≥25000 | |
| 8 | 9.9 | 22700 | 42300 |
| 9 | 105 | 2600 | |
| 10 | 537 | | |
| 11 | 7655 | | |
| 12 | 5039 | | |
| 13 | 250 | ≥10000 | |
| 14 | 2480 | | |
| 15 | 28 | 276 | ≥50000 |
| 16 | 775 | | |
| 17 | 551 | | |
| 18 | 180 | | |
| 19 | 23 | ≥25000 | 37700 |
| 20 | 91 | | |

TABLE 1-continued

| Example | EC50-HSV2-FBS (nM) | EC50-HSV2-10% Human Serum (nM) | CC50-MT4 (nM) |
|---|---|---|---|
| 22 | 48 | | |
| 23 | 19 | 11000 | ≥50000 |
| 24 | 19 | ≥25000 | |
| 25 | 32 | ≥25000 | |
| 26 | 131 | | |
| 27 | 383 | | |
| 28 | 6.0 | 8440 | ≥50000 |
| 29 | 193 | 3240 | |
| 31 | 849 | 9380 | |
| 33 | 165 | 1370 | ≥50000 |
| 34 | 158 | 1570 | |
| 35 | 7.0 | 57.5 | 24000 |
| 36 | 71 | ≥25000 | ≥50000 |
| 37 | 10 | 19300 | ≥50000 |
| 38 | 19 | 543 | ≥10000 |
| 39 | 45 | 188 | |
| 40 | 196 | 816 | |
| 41 | 37 | 140 | ≥10000 |
| 43 | 352 | 9270 | |
| 44 | 14 | 326 | ≥10000 |
| 45 | 67 | ≥10000 | |
| 46 | 16 | 143 | ≥10000 |
| 47 | 423 | 3660 | |
| 48 | 16 | 104 | ≥10000 |
| 49 | 162 | 1040 | |
| 50 | 61 | 214 | ≥10000 |
| 51 | 53 | 239 | |
| 52 | 340 | 2000 | |
| 53 | 48 | 415 | ≥10000 |
| 56 | 255 | 2220 | |
| 57 | 35 | 381 | ≥10000 |
| 58 | 12 | 4310 | ≥10000 |
| 59 | 385 | ≥10000 | |
| 60 | 13 | 434 | ≥10000 |
| 61 | 28 | 169 | ≥10000 |
| 62 | 59 | 318 | ≥10000 |
| 63 | 25 | 912 | ≥10000 |
| 64 | 115 | ≥10000 | ≥10000 |
| 65 | 16 | 147 | ≥10000 |
| 68 | 31 | 233 | ≥10000 |
| 69 | 119 | ≥25000 | |
| 70 | 91 | ≥25000 | |
| 71 | 30 | ≥25000 | |
| 72 | 252 | 12300 | |
| 73 | 129 | 6040 | |
| 74 | 59 | 11800 | |
| 75 | 32 | | |
| 76 | 107 | | 2500 |
| 77 | 121 | 10500 | |
| 78 | 65 | 20700 | ≥50000 |
| 79 | 2061 | | |
| 80 | 409 | | |
| 81 | 20 | ≥25000 | ≥50000 |
| 82 | 8044 | | |
| 83 | 177 | ≥25000 | |
| 85 | 8.9 | 7500 | 330 |
| 86 | 455 | | 28500 |
| 87 | 13 | 3280 | 306 |
| 88 | 535 | | 1800 |
| 89 | 23 | 1960 | 308 |
| 90 | 23 | 14600 | 36900 |
| 91 | 40 | 11600 | ≥50000 |
| 92 | 28 | 238 | |
| 93 | 1848 | ≥25000 | |
| 94 | 49 | 195 | ≥50000 |
| 95 | 2852 | ≥25000 | |
| 96 | 24 | 85 | 12900 |
| 97 | 14 | 56.0 | ≥50000 |
| 98 | 1356 | 6650 | |
| 99 | 63 | 396 | ≥10000 |
| 100 | 34 | 107 | 5430 |
| 101 | 6757 | | |
| 102 | 160 | 905 | |
| 103 | 36 | 221 | |
| 104 | 20 | 64.4 | ≥10000 |
| 105 | 45 | 251 | |
| 106 | 81 | | |
| 107 | 95 | ≥25000 | |
| 108 | 285 | | |
| 109 | 390 | | |
| 110 | 26 | ≥25000 | |
| 111 | 1743 | ≥25000 | |
| 112 | 81 | 579 | |
| 113 | 19 | 168 | ≥10000 |
| 114 | 128 | 926 | |
| 115 | 99 | 1640 | |
| 116 | 42 | 489 | |
| 117 | 226 | 1630 | |
| 118 | 81 | 474 | ≥10000 |
| 119 | 285 | 1260 | |
| 123 | 46 | 291 | ≥10000 |
| 125 | 11.1 | 70.2 | |
| 126 | ≥1000 | ≥10000 | |
| 127 | 553 | 5445 | |
| 128 | 8.3 | 62.9 | |
| 129 | 231 | 7610 | |
| 130 | 110 | ≥10000 | |
| 131 | 753 | ≥10000 | |
| 133 | 102 | 6130 | |
| 134 | 231 | 3100 | |
| 136 | 89.6 | 2220 | |
| 137 | 129 | 538 | |
| 138 | 23.4 | 184 | |
| 139 | 74.2 | 1710 | |
| 140 | ≥10000 | ≥10000 | |
| 141 | 293 | 2630 | |

MT-4 CC50 Assay

Compounds were tested in 384-well plates: 18 compounds in duplex. Compounds were diluted in 7 points, 3-fold with DMSO by Bravo. Assay plate, which contains 20 uL medium with compounds, was seeded 2000 MT-4 cells in 20 uL/well by Multi-drop to start the assay. The plate was incubated at 37° C. for 5 days. On 6th day, the CellTiter Glo 40 uL was added in each well. Luminescence was read by Victor II. $CC_{50}$ values are defined as the compound concentration that causes a 50% decrease in luminescence signal, and were calculated using a sigmoidal dose-response model to generate curve fits. Data for certain compounds are reported in Table 1 above.

HSV qPCR Assay

HSV replication in the presence or absence of compounds was measured by qPCR according to the following procedure: DMSO stock compound solutions (1-10 mM) were serially diluted (2.5-fold) in DMSO in clear round bottom 96-well plates. Compounds were then diluted 1:20 in assay medium (DMEM/F12 Glutamax+2% Fetal bovine serum+1% Penicillin Streptomycin) and 10 µL of these dilutions were added to 96-well tissue culture plates for final starting concentrations between 0.5 and 5 µM.

ARPE-19 cells (ATCC cat #CRL-2302) that were maintained in growth medium (DMEM/F12 Glutamax+10% FBS+1% Penicillin streptomycin) were transferred to a centrifuge tube and spun for 5 minutes at 1000 rpm. Cells were resuspended in assay medium, counted, and cell density was adjusted to 2.8E+05 cells/ml with assay medium. Cells were then infected with HSV-1 (KOS strain, ATCC cat #VR-1493) or HSV-2 virus (MS strain, ATCC cat #VR-540) at a MOI 0.05 in a 50-ml conical tube for 1 hour under constant rocking. 90 µL of the infection suspension (25,000 cells) were added to assay plates in which compounds were already added. After an overnight incubation at 37° C., cell culture medium was removed, and cell lysis was performed using the prepGEM Universal kit (MicroGEM cat #PUN1000). Specifically, 100 μL of prepGEM master mix (94.75 μL Water, 5 μL buffer, 0.25 μL enzyme stock) were added to each well and plates were incubated at room temperature for 15 minutes, with the 5 last minutes on a plate shaker. The cell lysates were then transferred to a 96-well PCR compatible microplate (Applied Biosystems, Cat #$N_{8010560}$). Plates were sealed with a heat resistant plastic sealer and heated on a thermal cycler using the following conditions: 75° C. for 10 min, 95° C. for 5 minutes. Finally, plates were cooled down to room temperature with light shaking before proceeding to the qPCR setup.

qPCR reactions were carried out in a total reaction volume of 20 μL, using the QuantiNova multiplex PCR kit (Qiagen Cat #208456). 15 μL of reagent mix (5 μL of 4× QuantiNova Master Mix, 0.1 μL of QN Rox reference dye, 1 μL of 20×HSV primer/probe mix and 8.9 μL PCR grade water) and 5 μL of cell lysate were added to wells of a 96-well fast optical microplate (Applied Biosystems cat #4246906). Plates were sealed with a clear sealer, spun down, and qPCR reactions were performed in an Applied Biosystems Quantstudio 7 Flex instrument using the following conditions: 95° C. for 2 minutes, then 40 cycles alternating between 95° C. for 5 seconds and 60° C. for 30 seconds.

Analysis was performed using dCT method where dCT=CT (test)−CT (DMSO). Fold change was calculated using the $2^{-dCT}$ equation. This fold change was then converted to percentage relative to DMSO control (no drug). EC50s were determined by non-linear regression analysis using GraphPad Prism software.

| Type | Target | Sequence (5' to 3') |
|---|---|---|
| Forward primer | HSV-1 and HSV-2 UL30 gene | AGAGGGACATCCAGGACTTTGT (SEQ ID NO: 1) |
| Reverse Primer | HSV-1 and HSV-2 UL30 gene | CAGGCGCTTGTTGGTGTAC (SEQ ID NO: 2) |
| Probe | HSV-1 and HSV-2 UL30 gene | ACCGCCGAACTGAGCA (SEQ ID NO: 3) |

EC50 for both pritelivir and amenamevir in this assay were 14 nM. EC50 for acyclovir was 1250 nM. Data for certain compounds are reported in Table 2 below.

TABLE 2

| Example | EC50-HSV2-qPCR (nM) | IC50-hCAII (nM) | IC50-hCAI (nM) |
|---|---|---|---|
| 3 | 18.5 | | |
| 5 | 10.9 | ≥25000 | |
| 15 | 4.9 | 47100 | ≥50000 |
| 35 | 1.1 | 2900 | 35300 |
| 44 | 1.0 | 5800 | ≥50000 |
| 65 | 1.4 | 12000 | ≥50000 |
| 70 | 25.8 | ≥25000 | |

TABLE 2-continued

| Example | EC50-HSV2-qPCR (nM) | IC50-hCAII (nM) | IC50-hCAI (nM) |
|---|---|---|---|
| 73 | 17.5 | ≥25000 | |
| 74 | 8.3 | ≥25000 | |
| 75 | 14.3 | ≥25000 | |
| 76 | 22.0 | ≥25000 | |
| 81 | 1.9 | ≥25000 | |
| 94 | 3.9 | ≥50000 | |
| 97 | 1.3 | ≥50000 | ≥50000 |
| 106 | 10.9 | | |
| 125 | 0.56 | 26500 | ≥50000 |
| 126 | 56.7 | 2000 | ≥50000 |
| 127 | 58.3 | 2460 | 4190 |
| 128 | 1.4 | 7420 | ≥50000 |
| 138 | 2.0 | 1970 | 41000 |

Carbonic Anhydrase (Esterase) Biochemical Assay

Compounds were tested in a high-throughput 384-well assay format for their ability to inhibit the human carbonic anhydrase (hCA)-mediated hydrolysis of 4-nitrophenyl acetate (4NPA) (Verpoorte et al, JBC, 1967). 10-dose, 3-fold serial dilutions of compounds were prepared at starting concentrations of 10 mM in 100% DMSO. 200 nl of compounds were then spotted in quadruplicates onto clear 384-well microplates (Perkin Elmer cat #6007640) using a Labcyte ECHO acoustic dispenser. Final starting concentration in the assay was 50 μM. DMSO (no compound) and acetazolamide were included on each microplate as negative and positive controls, respectively.

A 1.5 μM solution of hCAI (R&D systems cat #2180-CA) or a 1 μM solution of hCAII (Genscript cat #U3256FL150-4/P5GA002) was prepared in assay buffer (25 mM Tris (pH 7.5), 100 mM NaCl, 1% DMSO) and 20 μl were added to compounds using a Biotek Micro Flo. Following a preincubation at room temperature for 15 minutes, 20 μl of a 4 mM solution of 4NPA substrate (Sigma cat #$N_{8130}$) in assay buffer were added to start the reaction. Microplates were incubated at room temperature for 60 min after which absorbance at 405 nM was read on an Envision plate-reader. IC50 values were defined as the compound concentration that caused a 50% decrease in absorbance signal and were calculated using a sigmoidal dose-response model to generate curve fits. IC50 of acetazolamide was 0.04 uM in the hCAII assay and 1.1 uM in the hCAI assay. Data for certain compounds are reported in Table 2 above.

Plasma Stability Assay

The test compound was incubated at 2 μM in either rat or human plasma (BioIVT, Westbury, NY) up to 4 hours at 37° C. At specified time points, an aliquot from the incubation was quenched by addition of 9 volumes of 100% acetonitrile containing internal standard. Following the last collection, samples were centrifuged at 4500 rpm for 10 min and supernatants were transferred to a new plate containing an equal volume of water for analysis by liquid chromatography coupled to triple quadrupole mass spectrometry (LC-MS/MS). The percentage of test compound remaining (analyte to internal standard peak area ratio) in plasma after incubation was plotted versus incubation time and plasma half-life (t1/2) was calculated from the linear fit of the natural logarithm of the curve.

Stability Assay in Cryopreserved Hepatocytes

Test compound was incubated at 1 μM with either rat or human cryopreserved hepatocytes (BioIVT, Westbury, NY) up to 6 hours at 37° C. in a 24-well plate format (1×10$^6$ cells/mL per well). At specified time points, samples were transferred to a 96-well plate and quenched with 2 volumes of a solution containing 90% acetonitrile 10% methanol 0.1% formic acid and internal standard. Sample plate was centrifuged at 3200 rpm for 15 min and supernatants transferred to a new plate containing half volume of water. The resulting solution was analyzed by LC-MS/MS. Data (analyte to internal standard peak area ratio) was plotted on a semi-log scale and fitted using an exponential fit. Assuming first order kinetics, the half-life (t1/2) and rate of metabolism were determined. Predicted hepatic clearance was calculated from the half-life using the well-stirred model. Data for certain compounds are reported in Table 3 below.

TABLE 3

| Example | Predicted human hepatic clearance (L/hr/kg) |
|---|---|
| 15 | 0.056 |
| 16 | 0.12 |
| 28 | 0.22 |
| 34 | 0.20 |
| 35 | 0.055 |
| 44 | 0.05 |
| 58 | 0.32 |
| 60 | 0.17 |
| 61 | 0.15 |
| 65 | 0.05 |
| 81 | 0.14 |
| 87 | 0.31 |
| 89 | 0.05 |
| 116 | 0.05 |
| 125 | 0.062 |
| 126 | 0.16 |
| 127 | 0.34 |
| 128 | 0.21 |
| 129 | 1.05 |

TABLE 3-continued

| Example | Predicted human hepatic clearance (L/hr/kg) |
|---|---|
| 130 | 0.45 |
| 131 | 0.57 |
| 138 | 0.06 |
| 140 | 0.36 |

Unless otherwise defined, all technical and scientific terms used herein have the same meaning as commonly understood by one of ordinary skill in the art to which this disclosure belongs.

Thus, it should be understood that although the present disclosure has been specifically disclosed by preferred embodiments and optional features, modification, improvement and variation of the disclosures embodied therein herein disclosed may be resorted to by those skilled in the art, and that such modifications, improvements and variations are considered to be within the scope of this disclosure. The materials, methods, and examples provided here are representative of preferred embodiments, are exemplary, and are not intended as limitations on the scope of the disclosure.

The disclosure has been described broadly and generically herein. Each of the narrower species and subgeneric groupings falling within the generic disclosure also form part of the disclosure. This includes the generic description of the disclosure with a proviso or negative limitation removing any subject matter from the genus, regardless of whether or not the excised material is specifically recited herein.

In addition, where features or aspects of the disclosure are described in terms of Markush groups, those skilled in the art will recognize that the disclosure is also thereby described in terms of any individual member or subgroup of members of the Markush group.

It is to be understood that while the disclosure has been described in conjunction with the above embodiments, that the foregoing description and examples are intended to illustrate and not limit the scope of the disclosure. Other aspects, advantages and modifications within the scope of the disclosure will be apparent to those skilled in the art to which the disclosure pertains.

The invention claimed is:
1. A compound of Formula (I):

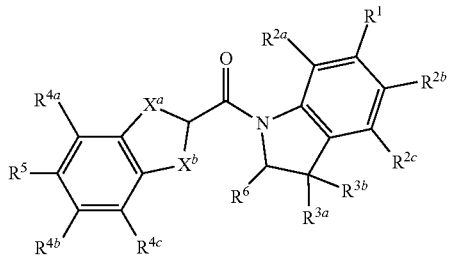
(I)

or a pharmaceutically acceptable salt thereof, wherein
$R^1$ is

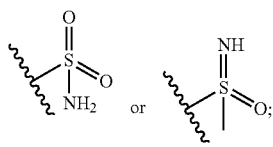

$R^{2a}$, $R^{2b}$, and $R^{2c}$ are each independently H, halogen, $C_{1-6}$ alkyl, $C_{1-6}$ haloalkyl, $C_{1-6}$ alkoxy, —CN, $C_{1-6}$ haloalkoxy, or —SCF$_3$;
$R^{3a}$ and $R^{3b}$ are each independently H, halogen, $C_{1-6}$ alkyl, or $C_{1-6}$ haloalkyl;
or $R^{3a}$ and $R^{3b}$ together with the carbon to which they are attached form $C_{3-6}$ cycloalkyl; wherein the cycloalkyl formed from $R^{3a}$ and $R^{3b}$ may be optionally substituted with one to three $Z^3$, which may be the same or different;
$X^a$ and $X^b$ are each independently O or $CR^{7a}R^{7b}$;
$R^{7a}$ and $R^{7b}$ are each independently H, $C_{1-6}$ alkyl, or $C_{1-6}$ haloalkyl;
or $R^{7a}$ and $R^{7b}$ together with the carbon to which they are attached form $C_{3-6}$ cycloalkyl; wherein the $C_{3-6}$ cycloalkyl formed from $R^{7a}$ and $R^{7b}$ may be optionally substituted with one to three $Z^7$, which may be the same or different;
$R^{4a}$, $R^{4b}$, and $R^{4c}$ are each independently H, halogen, $C_{1-6}$ alkyl, $C_{1-6}$ haloalkyl, $C_{1-6}$ alkoxy, —CN, —SCF$_3$, or $C_{3-6}$ cycloalkyl optionally substituted with $Z^4$;
$R^5$ is $C_{6-10}$ aryl or heteroaryl; wherein the aryl or heteroaryl of $R^5$ may be optionally substituted with one to three $Z^5$, which may be the same or different; the heteroaryl of $R^5$ is 5 to 10 membered heteroaryl having one to three heteroatoms each independently N, O, or S;
$R^6$ is H, $C_{1-6}$ alkyl, $C_{1-6}$ haloalkyl, $C_{2-8}$ alkoxyalkyl, or $C_{3-6}$ cycloalkyl, wherein the cycloalkyl of $R^6$ is optionally substituted with one to three $Z^6$; and
each $Z^3$, $Z^4$, $Z^5$, $Z^6$, and $Z^7$ is independently halogen, —CN, $C_{1-6}$ alkyl, $C_{1-6}$ haloalkyl, $C_{1-6}$ alkoxy, or $C_{1-6}$ haloalkoxy.

2. The compound of claim 1, or a pharmaceutically acceptable salt thereof, wherein the compound of Formula (I) is represented by Formula (IIa) or (IIc):

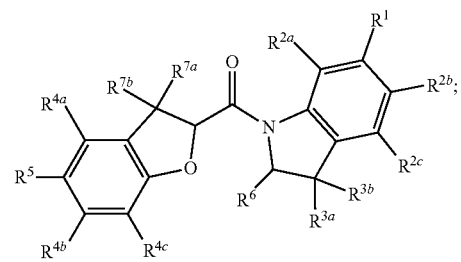
(IIa)

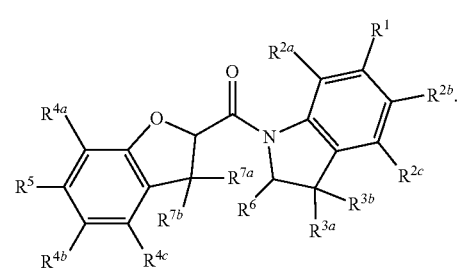
(IIc)

3. The compound of claim 1, or a pharmaceutically acceptable salt thereof, wherein the compound of Formula (I) is represented by Formula (IIe)

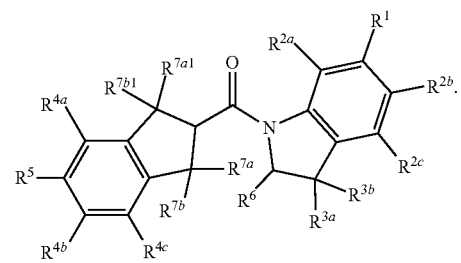
(IIe)

wherein $R^{7a1}$ and $R^{7b1}$ are each independently H, $C_{1-6}$ alkyl, or $C_{1-6}$ haloalkyl; or $R^{7a1}$ and $R^{7b1}$ together with the carbon to which they are attached form $C_{3-6}$ cycloalkyl; wherein the $C_{3-6}$ cycloalkyl formed from $R^{7a1}$ and $R^{7b1}$ may be optionally substituted with one to three $Z^7$, which may be the same or different.

4. The compound of claim 1, or a pharmaceutically acceptable salt thereof, wherein:
$R^{2a}$ is H, halogen, or $C_{1-6}$ alkyl;
$R^{2b}$ is H or halogen; and
$R^{2c}$ is H, halogen, or $C_{1-6}$ alkyl.

5. The compound of claim 1, or a pharmaceutically acceptable salt thereof, wherein $R^{3a}$ is H or $C_{1-6}$ alkyl.

6. The compound of claim 1, or a pharmaceutically acceptable salt thereof, wherein $R^{3b}$ is H or $C_{1-6}$ alkyl.

7. The compound of claim 1, or a pharmaceutically acceptable salt thereof, wherein $R^{4a}$ is H or halogen.

8. The compound of claim 1, or a pharmaceutically acceptable salt thereof, wherein $R^{4b}$ is H or halogen.

9. The compound of claim 1, or a pharmaceutically acceptable salt thereof, wherein $R^{4c}$ is H or halogen.

10. The compound of claim 1, or a pharmaceutically acceptable salt thereof, wherein $R^5$ is heteroaryl; wherein the heteroaryl of $R^5$ may be optionally substituted with one to three $Z^5$, which may be the same or different.

11. The compound of claim 1, or a pharmaceutically acceptable salt thereof, wherein $R^5$ is pyridyl optionally substituted with halogen, $C_{1-3}$ alkyl, —CN, or —OCH$_3$.

12. The compound of claim 3, or a pharmaceutically acceptable salt thereof, wherein $R^{7a}$ and $R^{7b}$ are each independently H or $C_{1-6}$alky: and $R^{7a1}$ and $R^{7b1}$ are each independently H or $C_{1-6}$alkyl.

13. The compound of claim 1, or a pharmaceutically acceptable salt thereof, wherein $R^6$ is H, $C_{1-6}$ alkyl, or $C_{1-6}$ haloalkyl.

14. The compound of claim 1, or a pharmaceutically acceptable salt thereof, wherein $R^6$ is —$CH_3$.

15. A pharmaceutical composition comprising a compound of claim 1, or a pharmaceutically acceptable salt thereof, and at least one pharmaceutically acceptable carrier.

16. A method of treating a herpesvirus infection, comprising administering to a patient in need thereof, a therapeutically effective amount of a compound of claim 1, or a pharmaceutically acceptable salt thereof.

17. The method of claim 16, wherein the herpesvirus is HSV-1 or HSV-2.

18. A method of treating a disorder induced, exacerbated, or accelerated by herpesviruses, comprising administering to a patient in need thereof, a therapeutically effective amount of a compound of claim 1, or a pharmaceutically acceptable salt thereof.

19. The method of claim 18, wherein the disorder is genital herpes, herpes labialis, HSV keratitis, HSV encephalitis, or disseminated HSV.

20. A compound

[chemical structure]

or a pharmaceutically acceptable salt thereof.

21. A pharmaceutical composition comprising a compound of claim 20, or a pharmaceutically acceptable salt thereof, and at least one pharmaceutically acceptable carrier.

22. A method of treating a herpesvirus infection, comprising administering to a patient in need thereof, a therapeutically effective amount of a compound of claim 20, or a pharmaceutically acceptable salt thereof.

23. A compound

[chemical structure]

or a pharmaceutically acceptable salt thereof.

24. A pharmaceutical composition comprising a compound of claim 23, or a pharmaceutically acceptable salt thereof, and at least one pharmaceutically acceptable carrier.

25. A method of treating a herpesvirus infection, comprising administering to a patient in need thereof, a therapeutically effective amount of a compound of claim 23, or a pharmaceutically acceptable salt thereof.

26. A compound

[chemical structure]

or a pharmaceutically acceptable salt thereof.

27. A pharmaceutical composition comprising a compound of claim 26, or a pharmaceutically acceptable salt thereof, and at least one pharmaceutically acceptable carrier.

28. A method of treating a herpesvirus infection, comprising administering to a patient in need thereof, a therapeutically effective amount of a compound of claim 26, or a pharmaceutically acceptable salt thereof.

29. A compound

[chemical structure]

or a pharmaceutically acceptable salt thereof.

30. A pharmaceutical composition comprising a compound of claim 29, or a pharmaceutically acceptable salt thereof, and at least one pharmaceutically acceptable carrier.

31. A method of treating a herpesvirus infection, comprising administering to a patient in need thereof, a therapeutically effective amount of a compound of claim 29, or a pharmaceutically acceptable salt thereof.

32. A compound

[chemical structure]

or a pharmaceutically acceptable salt thereof.

33. A pharmaceutical composition comprising a compound of claim 32, or a pharmaceutically acceptable salt thereof, and at least one pharmaceutically acceptable carrier.

34. A method of treating a herpesvirus infection, comprising administering to a patient in need thereof, a therapeutically effective amount of a compound of claim 32, or a pharmaceutically acceptable salt thereof.

35. A compound

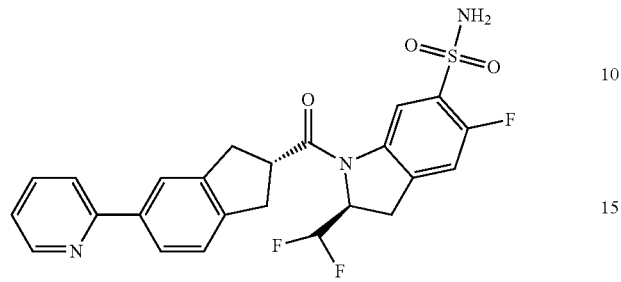

or a pharmaceutically acceptable salt thereof.

36. A pharmaceutical composition comprising a compound of claim 35, or a pharmaceutically acceptable salt thereof, and at least one pharmaceutically acceptable carrier.

37. A method of treating a herpesvirus infection, comprising administering to a patient in need thereof, a therapeutically effective amount of a compound of claim 35, or a pharmaceutically acceptable salt thereof.

* * * * *